(12) United States Patent
Myrick

(10) Patent No.: US 10,858,296 B1
(45) Date of Patent: Dec. 8, 2020

(54) ENERGETICS, COMPOSITIONS, MANUFACTURE AND APPLICATIONS

(71) Applicant: James J. Myrick, Glencoe, IL (US)

(72) Inventor: James J. Myrick, Glencoe, IL (US)

(*) Notice: Subject to any disclaimer, the term of this patent is extended or adjusted under 35 U.S.C. 154(b) by 760 days.

(21) Appl. No.: 15/136,818

(22) Filed: Apr. 22, 2016

Related U.S. Application Data

(63) Continuation-in-part of application No. 14/190,082, filed on Feb. 25, 2014, now Pat. No. 9,765,271, and a continuation-in-part of application No. 13/929,771, filed on Jun. 27, 2013, now abandoned.

(60) Provisional application No. 62/151,622, filed on Apr. 23, 2015, provisional application No. 61/745,810, filed on Dec. 25, 2012, provisional application No. 61/664,987, filed on Jun. 27, 2012.

(51) Int. Cl.
*C06B 45/04* (2006.01)
*C06B 33/00* (2006.01)
*C01B 33/02* (2006.01)

(52) U.S. Cl.
CPC .............. *C06B 45/04* (2013.01); *C01B 33/02* (2013.01); *C06B 33/00* (2013.01)

(58) Field of Classification Search
CPC .......... C06B 45/04; C06B 33/00; C01B 33/02
See application file for complete search history.

(56) References Cited

PUBLICATIONS

Sa Zhou, Xiaohua Liu, and Dunwei Wang, Si/TiSi2 Heteronanostructures as High-Capacity Anode Material for Li Ion Batteries, 2010, Nano Letters 10, (3), 860-863. DOI: 10.1021/nl903345f (Year: 2010).*

* cited by examiner

*Primary Examiner* — Aileen B Felton
(74) *Attorney, Agent, or Firm* — Husch Blackwell LLP

(57) ABSTRACT

Flash-cooled freestanding silicon particles are provided for electrochemical use. The particles are solidified from a vapor or molten phase at a cooling rate of at least about $1 \times 10^3$ degrees Celsius per second. The particles have a major dimension less than 1 micron, comprising silicon, and an electrically conductive component within the freestanding submicron particles having an electrical conductivity higher than that of silicon. The silicon is in the form of elemental silicon or lithiated silicon, and the electrically conductive component has a weight ratio to the silicon in the range of from about 0.01 to about 0.25 to 1. The electrically conductive component is in the form of electrically conductive zones within the flash-cooled freestanding silicon particles.

4 Claims, 31 Drawing Sheets
(31 of 31 Drawing Sheet(s) Filed in Color)

Plasma Torch 100   Plasma Arc 112   De Laval expansion cooling nozzle 114 (supersonic)

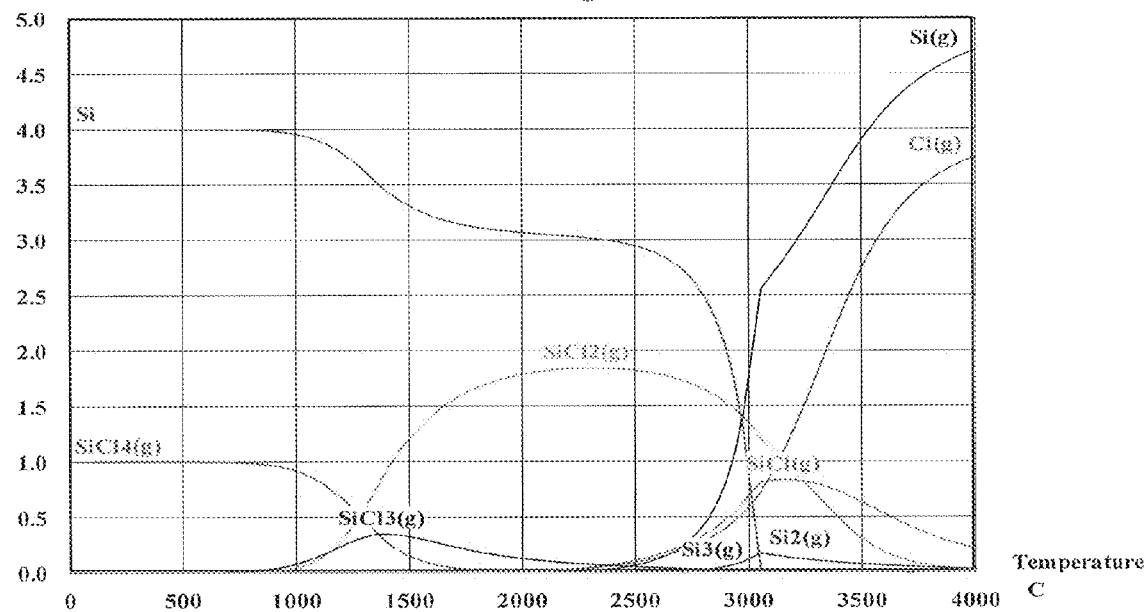
FIGURE 3A  4Si + SiCl₄ at 1 Bar
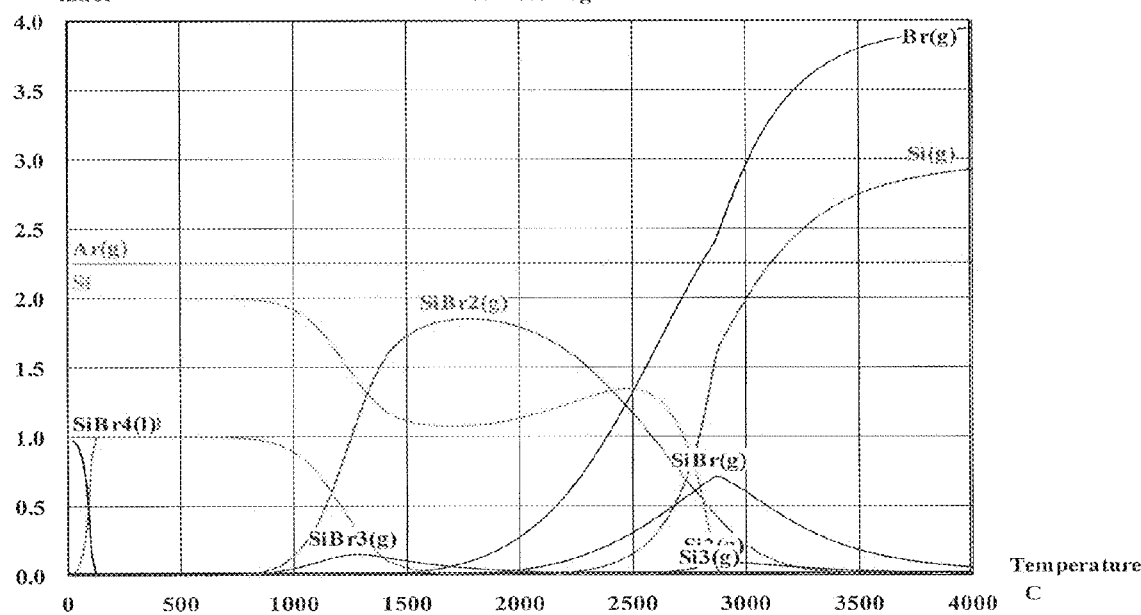
FIGURE 3B  2 Si + SiBr4 at 1 bar

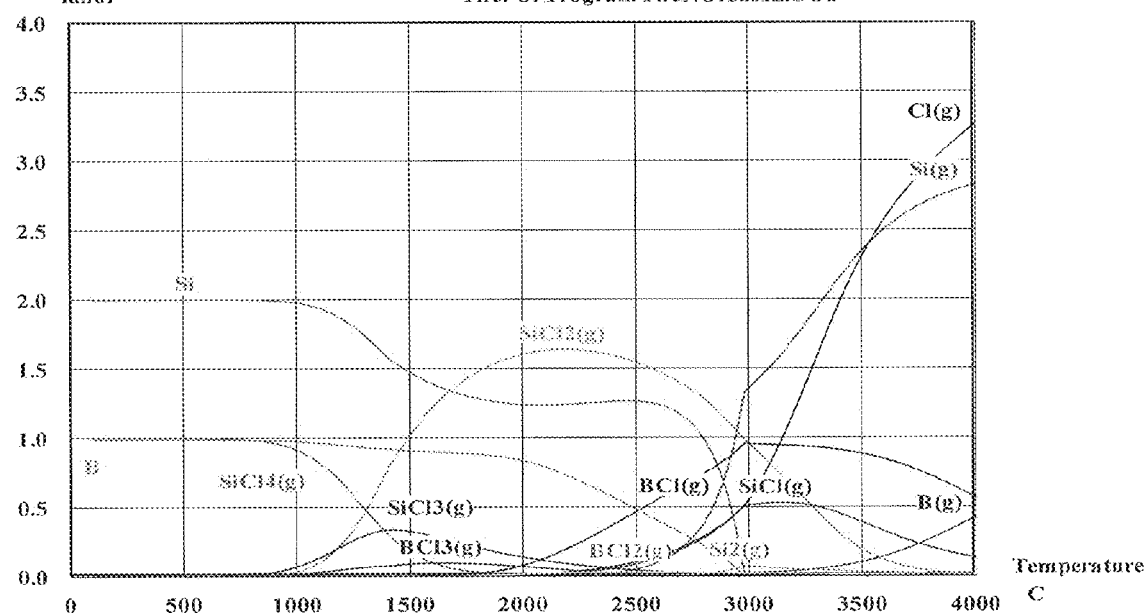
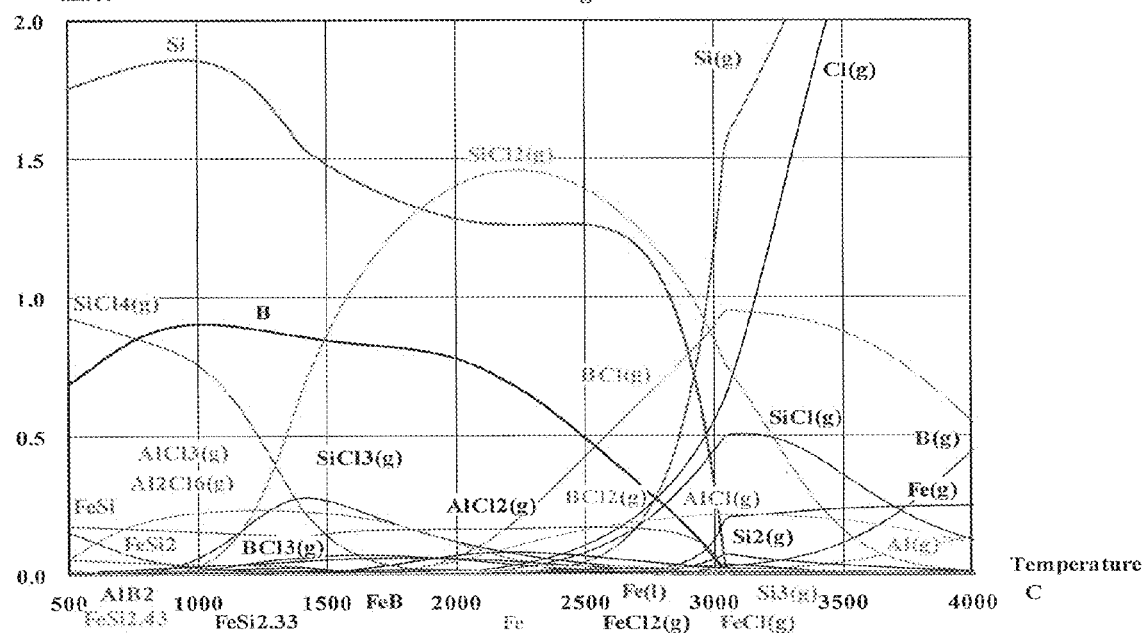

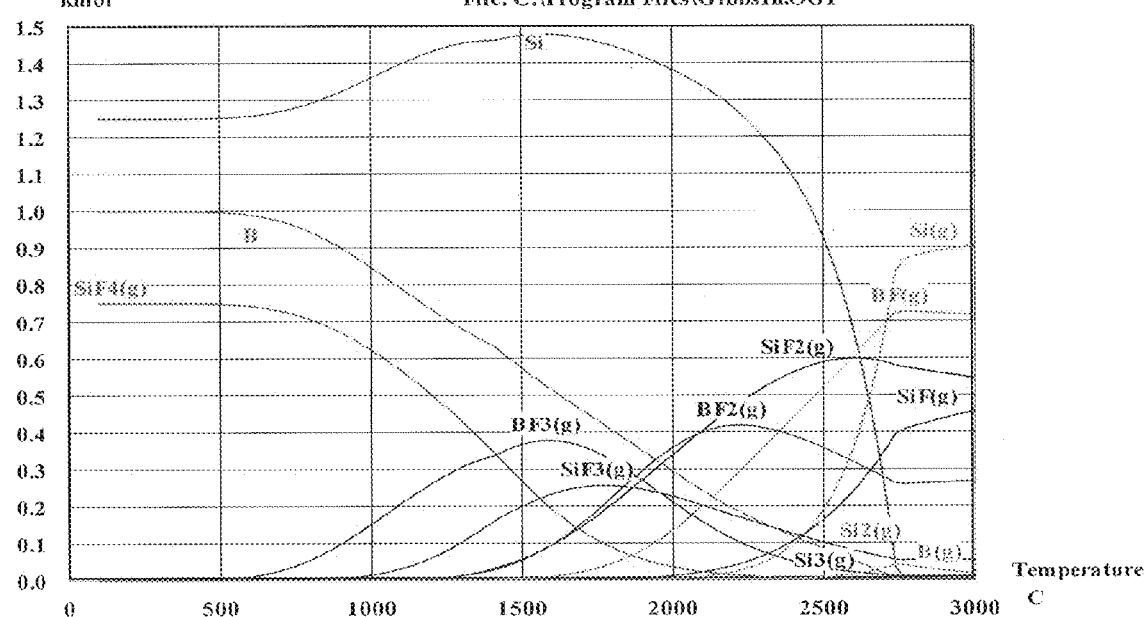
FIGURE 3E  2 Si + BF3 at 1 Bar
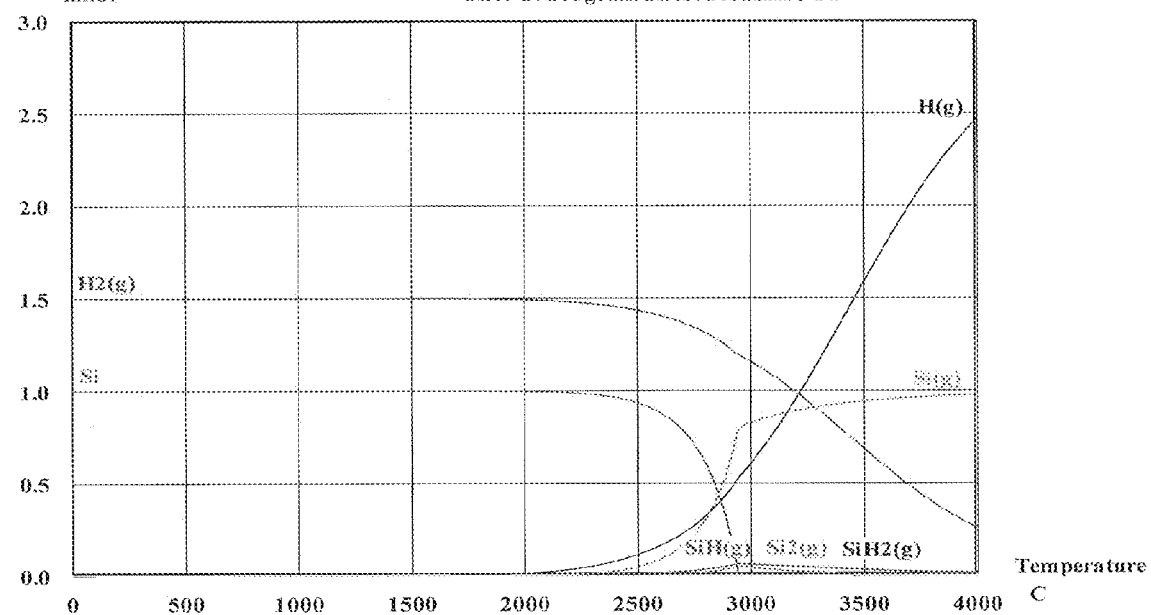
FIGURE 3F  1 Si + 1.5 H₂ at 1 Bar FIGURE 3G-1  4Si + 3H2 +0.05 SiF4 + 0.05 SiCl4 + 0.025Al + 0.025B at 0.01 Bar
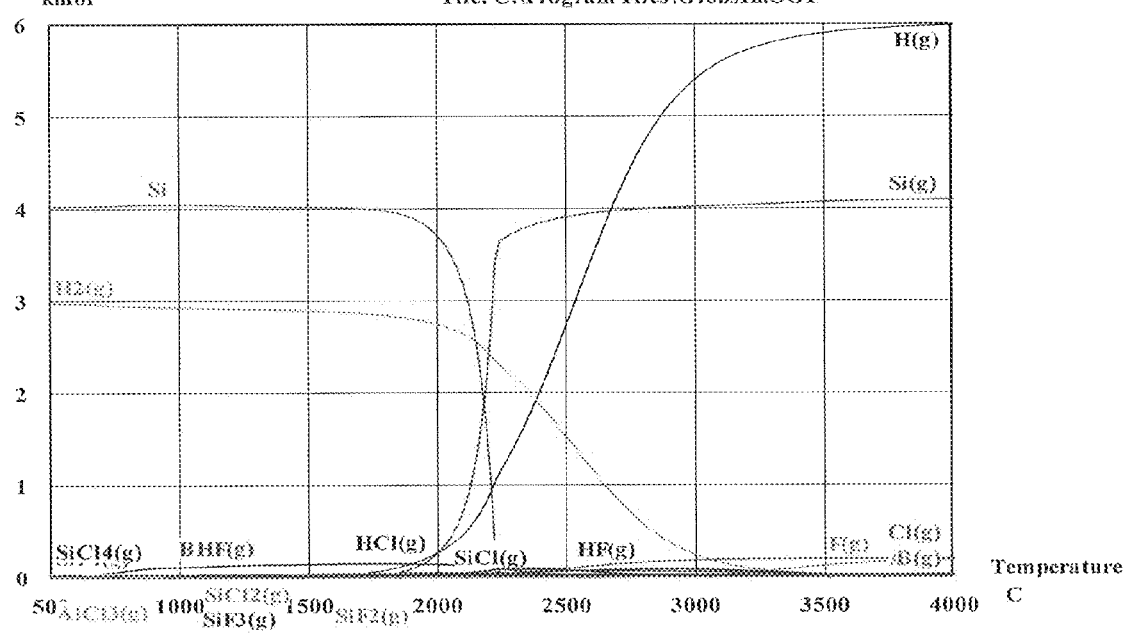
FIGURE 3G-2  4Si + 3H2 +0.05SiF4 + 0.05 SiCl4 + 0.025Al + 0.025B at 0.01 bar
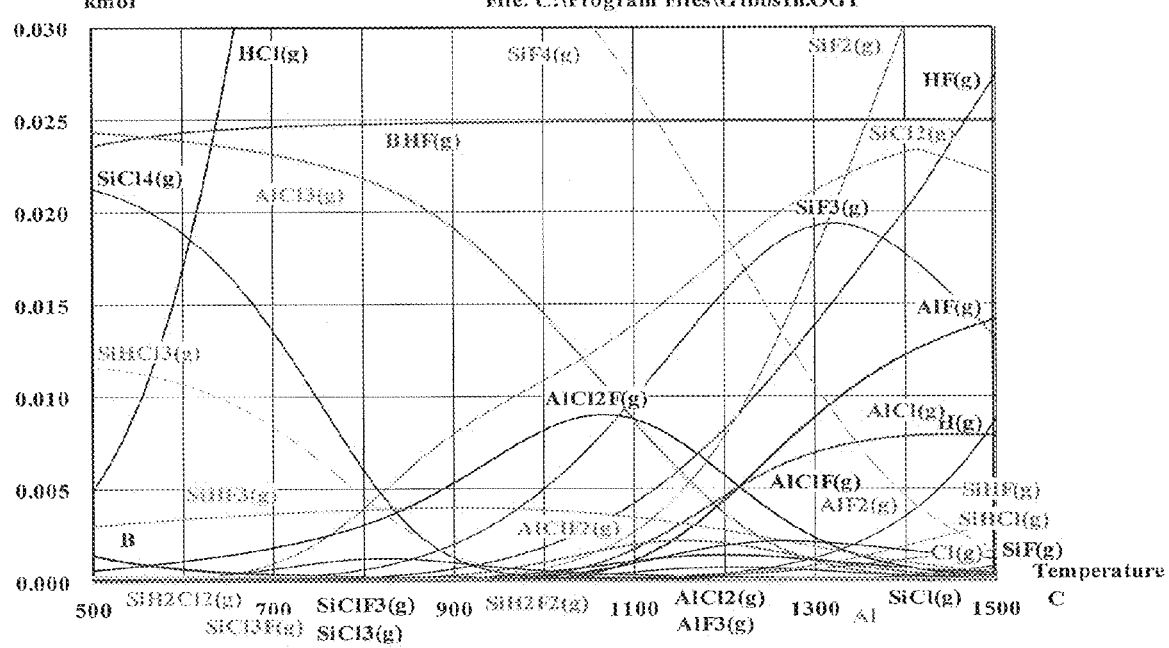

FIGURE 3H  3Al + 2H2 in 1 Ar at 1 bar
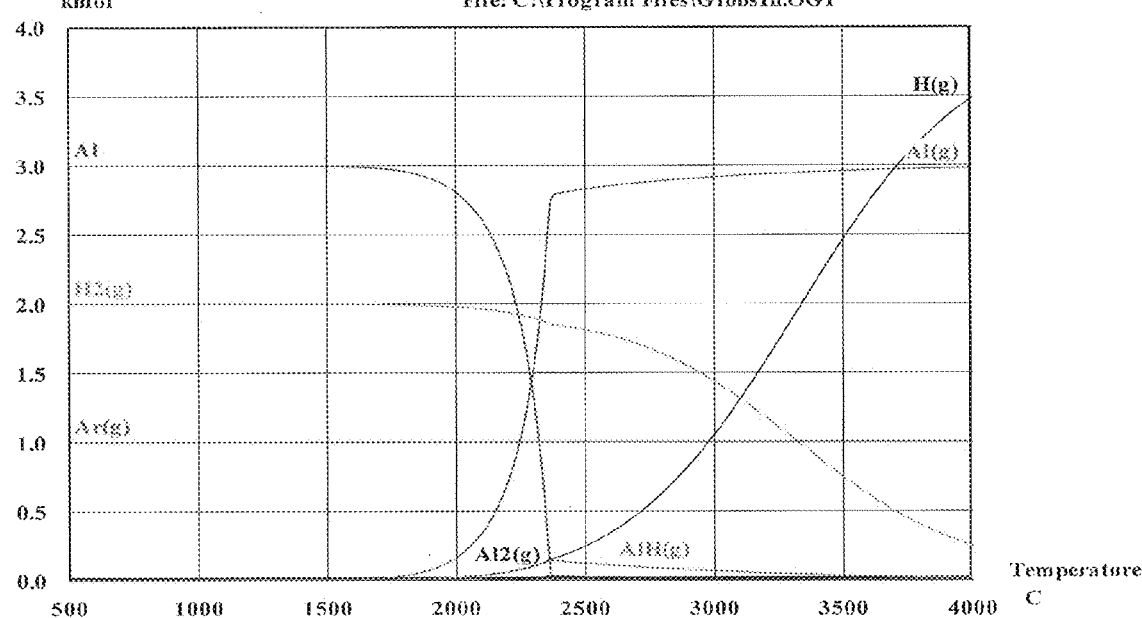
FIGURE 3 I  B2O3 + 2.5C + 0.25 CH4 + 2.25Ar at 1 bar
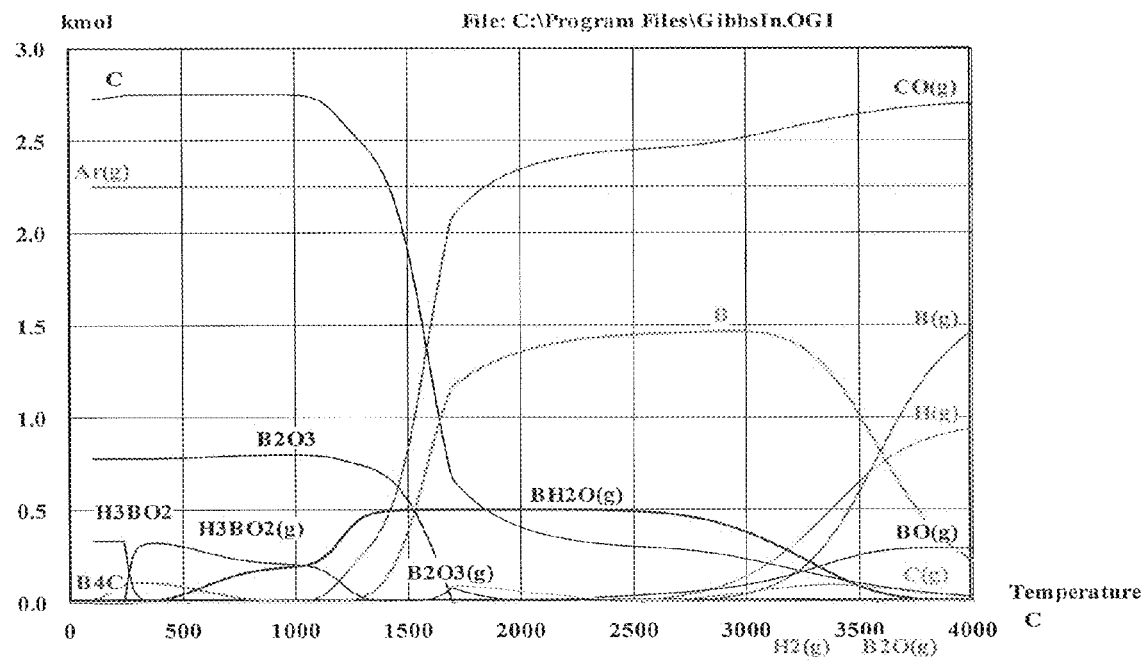

FIGURE 3J     $B2O3 + 3 Si + 2.5 C + 0.25 CH4 + 2.25 Ar(g)$
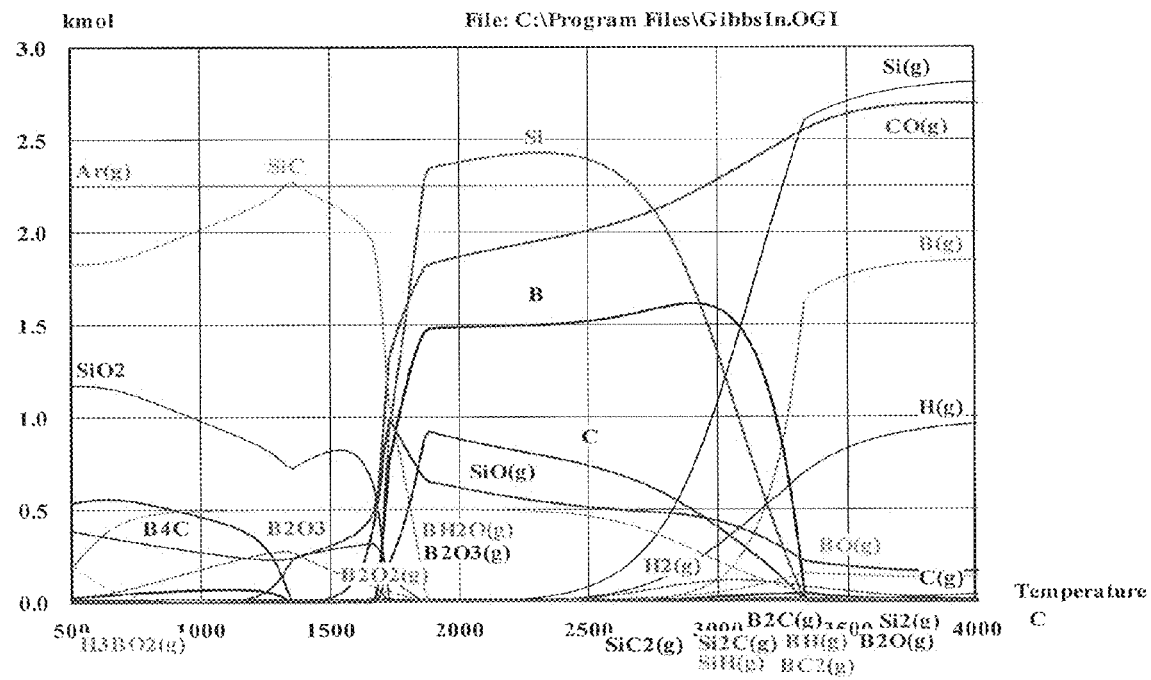
FIGURE 22
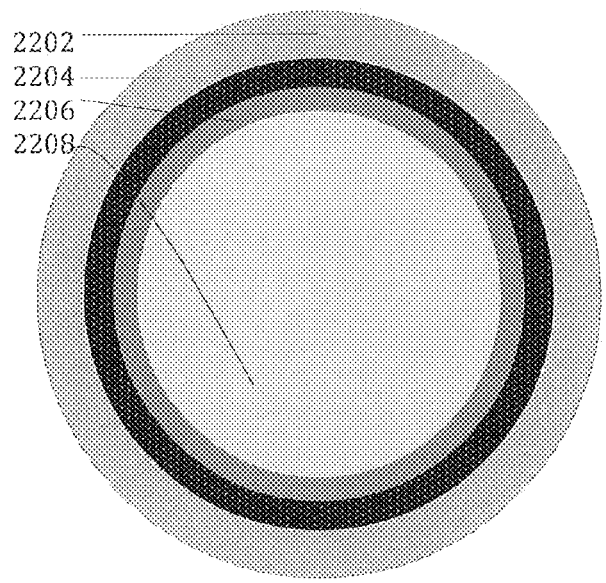

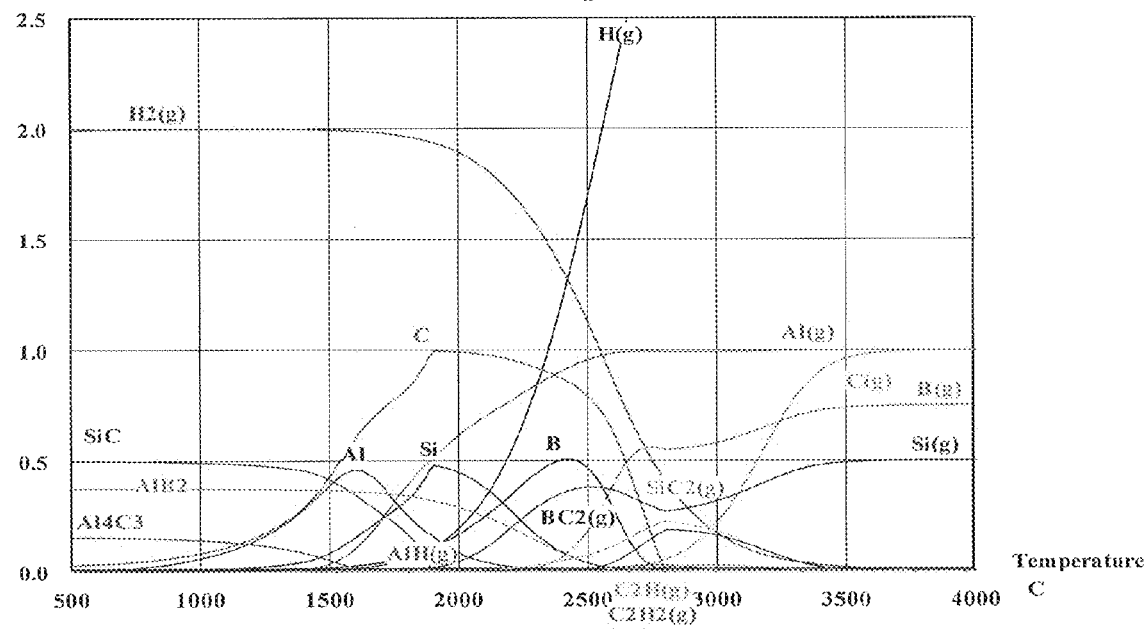
FIGURE 3K  CH4 + Al + 0.75 B + 0.5 Si at 0.01 bar
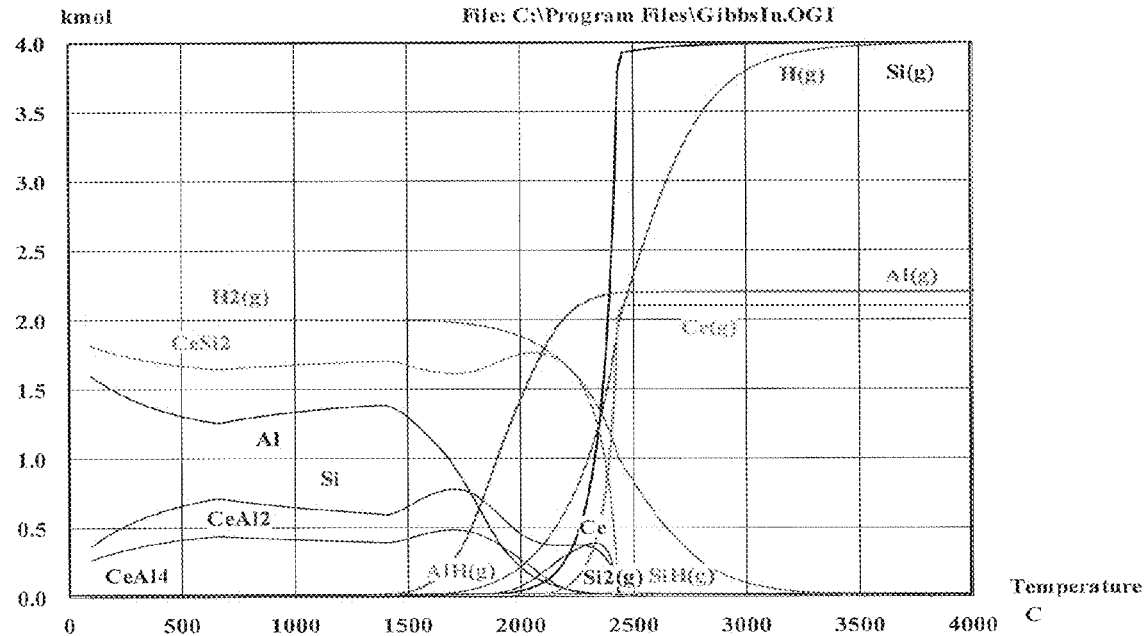
FIGURE 3L  2H2 + 2 Ce + 2 Si + 2 Al at 0.01 bar FIGURE 18A
FIGURE 18B
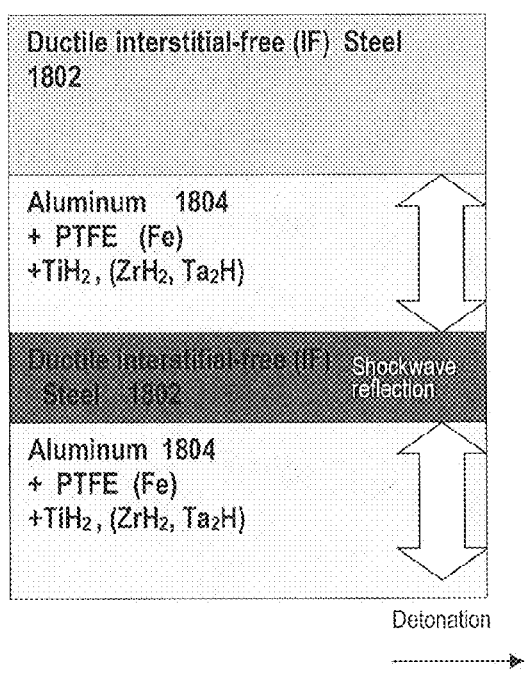
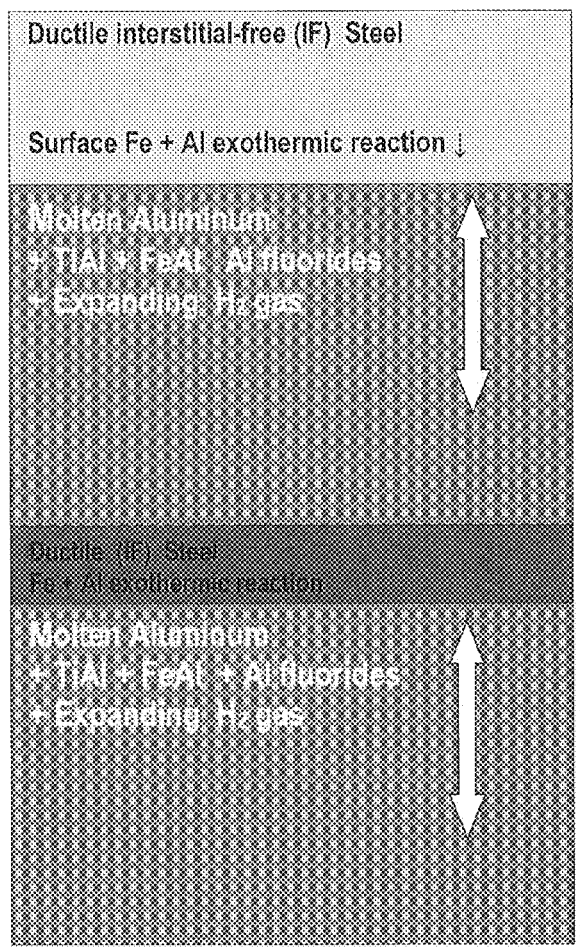
FIGURE 18C
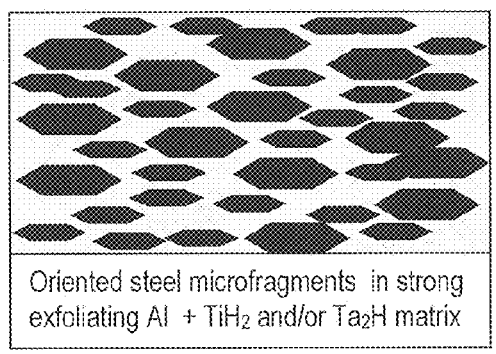

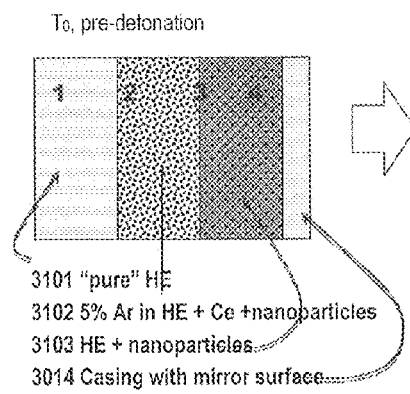

$T_0$, pre-detonation

3101 "pure" HE
3102 5% Ar in HE + Ce +nanoparticles
3103 HE + nanoparticles
3014 Casing with mirror surface

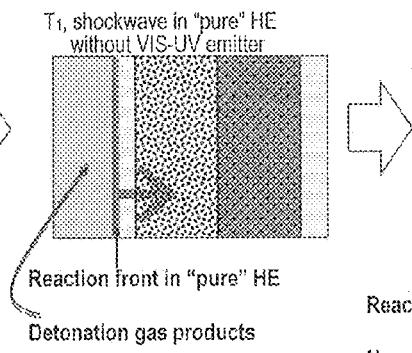

$T_1$, shockwave in "pure" HE without VIS-UV emitter

Reaction front in "pure" HE

Detonation gas products

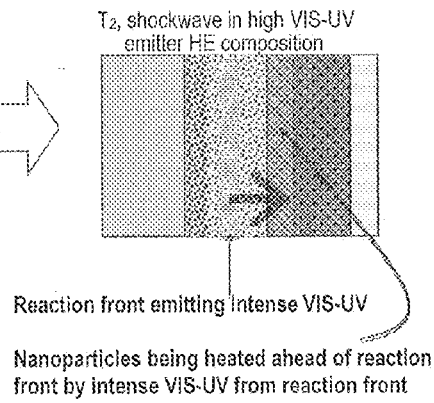

$T_2$, shockwave in high VIS-UV emitter HE composition

Reaction front emitting intense VIS-UV

Nanoparticles being heated ahead of reaction front by intense VIS-UV from reaction front

FIGURE 32A

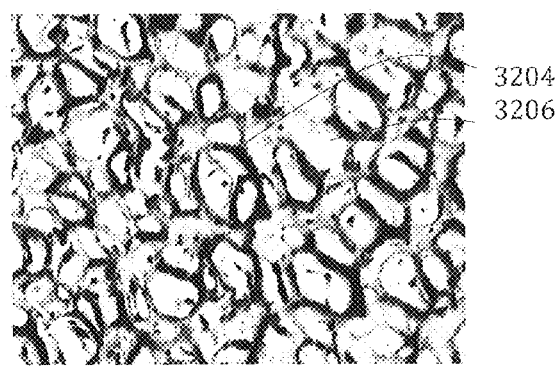

3202

3204
3206

FIGURE 32B        3210
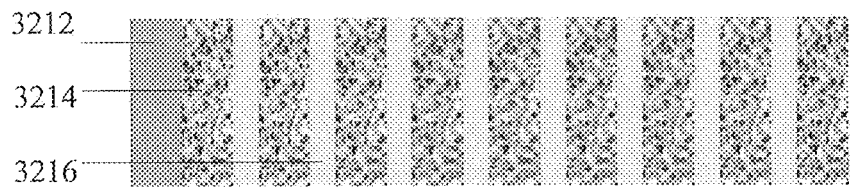
3212
3214
3216
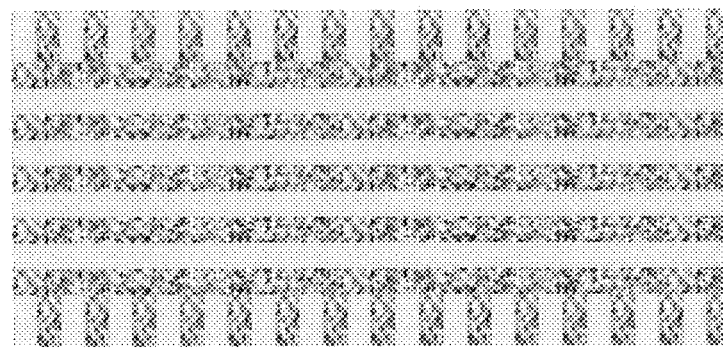
FIGURE 32C
3220
3222
3224
FIGURE 32D
3204 RF-reflecting end mirror or plasma
3206 coil-generated magnetic field
3208 electric coil
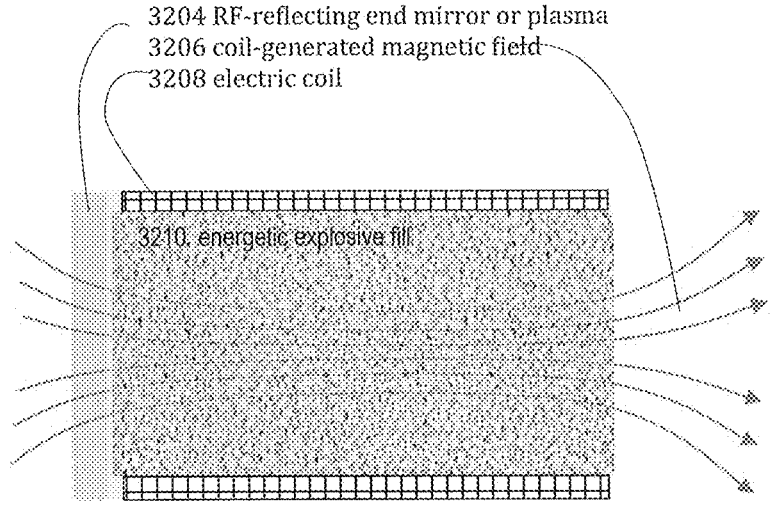
3210 energetic explosive fill

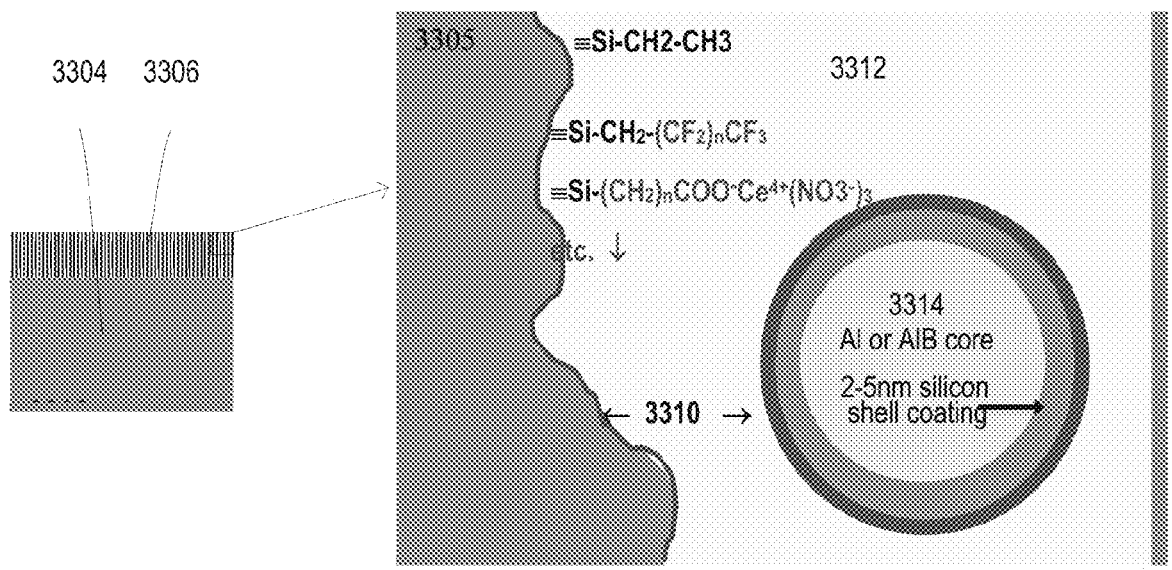
Figure 33A  Enlarged Silicon Micro-Nano-pore Zones
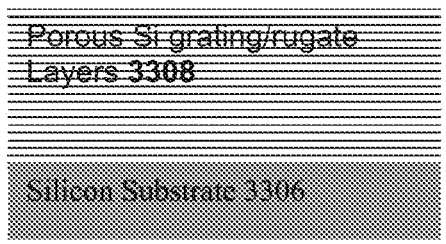
FIGURE 33B
3320
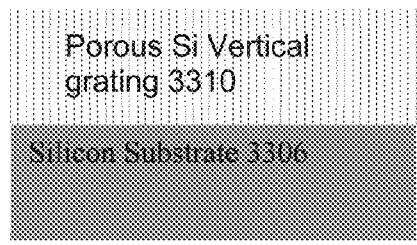
FIGURE 33C
3330

3402

Impermanent
Transient Sensor
3502

3602

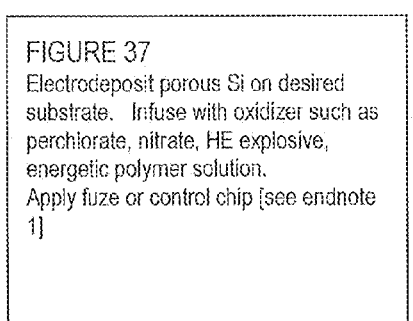

FIGURE 37
Electrodeposit porous Si on desired substrate. Infuse with oxidizer such as perchlorate, nitrate, HE explosive, energetic polymer solution.
Apply fuze or control chip [see endnote 1]

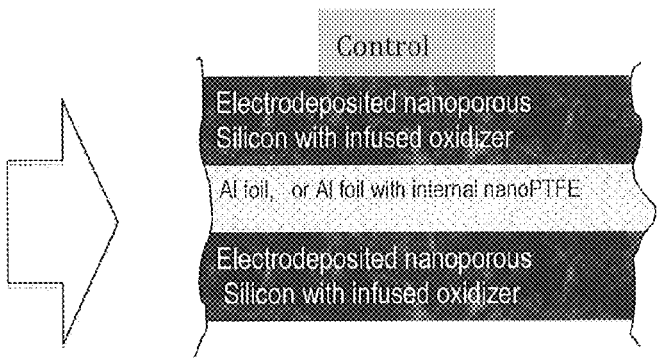

FIGURE 38

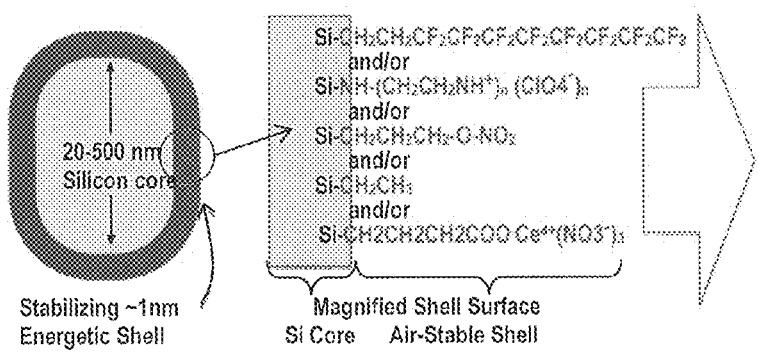

FIGURE 38
Mix with oxidizer salt such as perchlorate and or nitrate, in soluble PTFE or other energetic polymer solution, and print desired pattern on selected substrate. Can include a candoluminescent.

FIGURE 44A                    FIGURE 44B

Dense WOCl₄ + Aluminum Fill for Kinetic and Conventional Munitions

Unitary fill                    HE-initiated fill

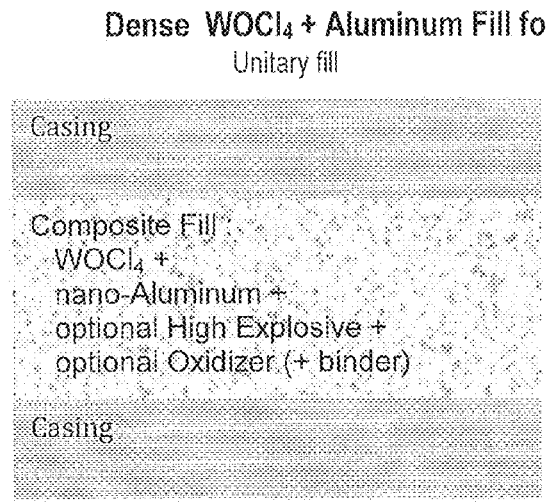 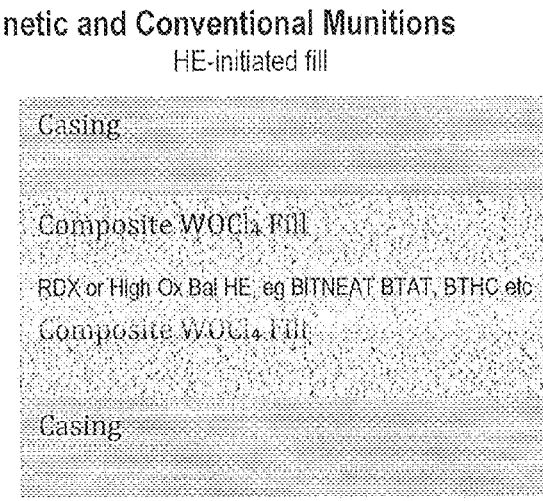

FIGURE 42

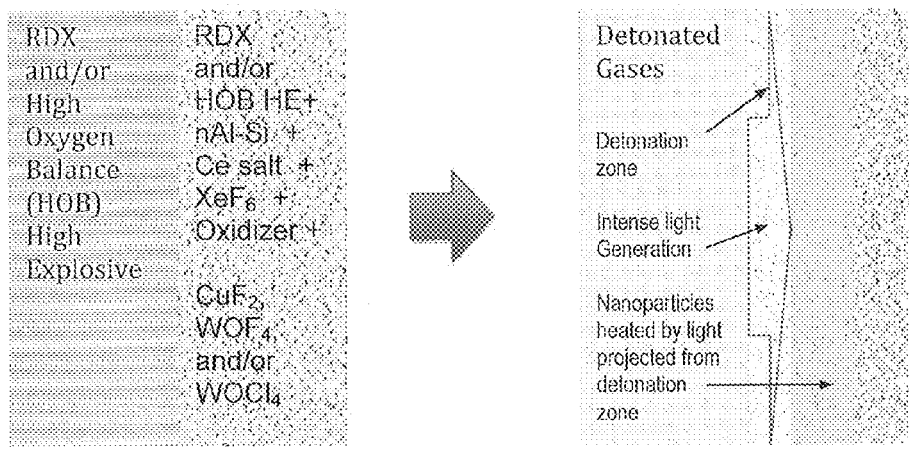

An RDX or other high explosive (HE) adjacent an explosive composite comprising 40-90wt% HE, 10-20wt% energetic nanoparticles such as described above, 0.5-3wt% $Ce^{+4}$ and/or $XeF_6$ candoluminesent, 0-10% wt% of a fluoride thermite-type oxidizer, and 5-20% wt% of an oxidizer such as $NH_4ClO_4$, balance HE Upon detonation (from the left side), the intense light generated in the detonation zone is deposited in and activates the metallic fuel nanoparticles immediately adjacent and in advance of the rapidly advancing detonation zone. The pre-heated and activated particles react in the detonation zone as it engulfs them nano- micro-seconds later.

FIGURE 39

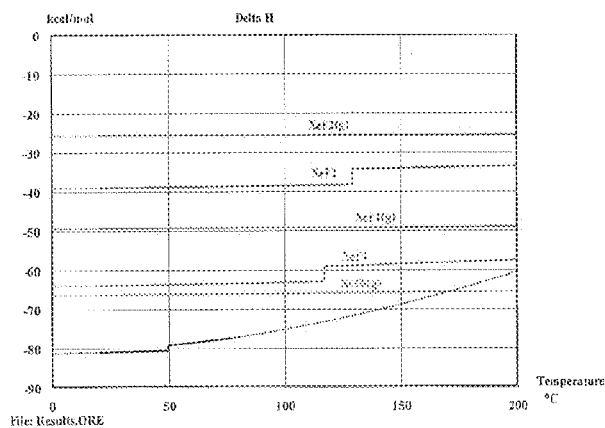

FIGURE 40

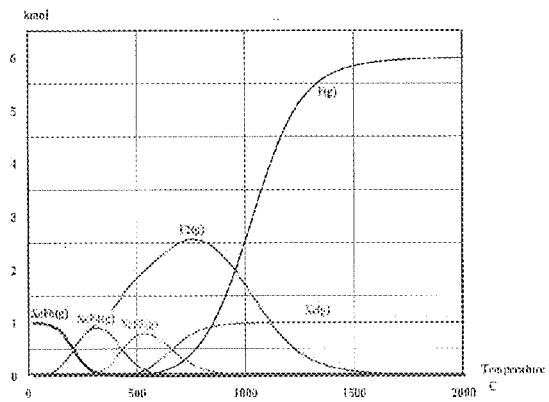

ENERGETICS, COMPOSITIONS, MANUFACTURE AND APPLICATIONS

This application claims the benefit of U.S. Provisional Application Ser. No. 62/151,622 filed on Apr. 23, 2015, and claims priority to co-pending U.S. patent application Ser. No. 14/190,082, filed on Feb. 25, 2014, as well as co-pending U.S. patent application Ser. No. 13/929,771 filed on Jun. 28, 2013 and its U.S. Provisional Application Ser. No. 61/664,987 filed on Jun. 27, 2012, and 61/745,810 filed on Dec. 25, 2012.

FIELD OF THE INVENTION

The present disclosure is directed to nanoparticles, compositions, manufacture and applications, particularly including silicon nanoparticle manufacture, designed multilayered energetic nanoparticles, and graphene nanoenergetics, as well as and their uses, compositions, composites including structural and energetic composites, and methods for making such materials.

BACKGROUND OF THE INVENTION

Nanoscale silicon particles have many current and potential commercial uses[1], including electronics, sensors[2], high-hardness chemoabrasives[3], optoelectronics[4], optomagnetic switches[5], electronic storage[6], silicon ink[7], photoelectric solar cells[8], high power density batteries[9], thermoelectrics[10], light emitters[11], seed crystals, and catalysts[12]. There are a wide variety of (generally expensive) ways to prepare silicon nanoparticles[13]. But such production methods typically have cost, shape, and/or product characteristic drawbacks. Accordingly, there is a need for inexpensive bulk manufacturing methods capable of producing nanosilicon powders with a broad range of product characteristics and uses.

There is also a need for energetic nanopowders, compositions and composites which are designed for specific uses with various characteristics including composition, structure size, shape, phase structure (eg, amorphous, multicrystalline or monocrystalline condition), reactant structure, surface/layer composition(s), grafting, purity, doping, and compatibility within composite compositions. Flakelike noncontinuous fluorocarbon coatings have been applied to relatively large silica particles by expensive plasma-enhanced chemical vapor deposition (PECVD) with a goal of being able to coat aluminum particles[14]. In attempts to limit progressive aluminum nanoparticle surface oxidation, coatings have also been applied to aluminum by perfluoroalkyl-carboxylate reaction with surface Al—OH groups, leaving an intermediate oxygenated layer, and nickel coatings have been attempted to address the oxidative storage-instability of aluminum nanoparticles. $AlB_2$ (perhaps as a coating on) aluminum nanoparticles formed by expensive electrical resistance explosion of aluminum/boron has been tested to protect against aluminum surface oxidation[15]. However, nanosilicon powders are inherently more storage-stable than aluminum nanoparticles. Accordingly, to realize and facilitate practical storage-stable and affordable propellant and explosives applications, new scalable methods and composition designs which facilitate storage stability and minimize oxide surface layer formation and oxidative aging are important for manufacture of inexpensive high energy nanosilicon powders which do not substantially degrade over time.

For some applications such as self-consuming munition casings, structural rocket fuel, and UAVs and other autonomous "disposable" or self-destructible military drones, structural energetics are needed which have physical strength in addition to high energetic output. Energetic composites reinforced with nanosilicon particles covalently bonded within a polymeric matrix could provide strong energetic materials. Energetic graphene could also reinforce energetic matrices. Graphene sheets are thin, one-atom-thick layers of sp2 hexagonal carbon atoms, which have extraordinary electronic and mechanical properties[16]. Graphene sheets have extreme stiffness and strength with nanoscale flexure-without-brittle-cracking capability, together with high thermal and electrical conductivity[17]. Preparation of a wide variety of pristine, derivatized, multilayer and/or partially-oxidized forms of graphene can be readily carried out[18]. Partially-oxidized graphene nanosheets have been tested as an additive[19] to improve nitromethane decomposition, perhaps via thermal transfer and/or catalysis.

Graphene and precursor graphite are readily oxidized to introduce —COOH, ketone, oxirane and hydroxyl groups, over a very wide range of carbon-to-oxygen ratios[20]. Graphene oxide sheets may also be reduced back to sp2 sheet form at selectable lower levels of pendant oxygen-containing groups—in fact, graphene oxide can rapidly, even "explosively", revert to more regular hexagonal sp2 graphene structures upon sufficiently intense light flash, providing a mechanism for simultaneous multi-location or patterned activation, reaction initiation or detonation[21].

Graphene sheets are conventionally functionalized at their less-stable edges, including by preferential reaction with acidic —COOH and ketone/aldehyde groups which are typically present from a number of conventional processes used in their manufacture[22]. A common approach to graphene functionalization has been isocyanate reaction with carboxylic acid groups at graphene edges[23]. Reactions with surface hydroxyl and oxirane groups, and the sp2 carbon backbone also provide routes to functionalization with the graphene surface structure[24].

There has been substantial work done on covalent grafting to graphene and graphene oxides. This work includes grafting of long alkyl chains by amidation reaction[25], and covalent diazonium addition to graphene to initiate radical polymerization (eg, polymerization of styrene grafted to the graphene)[26]. If energetic groups such as nitrate —NO2, nitrate ester —O—NO2, and/or azide groups could be directly or indirectly (eg, by grafting of nitrate and/or azide-containing monomers or polymers) coupled to graphene sheets, important new energetic materials would be provided.

It is an object of the present invention to provide such processes for manufacturing silicon nanopowders, and new nanosilicon compositions. It is also an object to provide high performance energetics, and energetic applications, including composite energetics, munitions and propulsion systems which include nanoscale silicon as an energetic component.

These and other objects will be apparent from the following Summary, Figures, and Detailed Description of various embodiments of the present disclosure.

SUMMARY

In accordance with the present disclosure, methods for manufacturing silicon nanopowders are provided, as well as energetic nanoparticle designs, structures and compositions.

Various embodiments of the present disclosure use isentropic flash-quench or other vapor processing which can produce high-purity silicon nanopowder. Some of these processes may include silane and/or silicon subhalide thermocycle vaporization and cooling. Other processes in accordance with the present disclosure may include carbothermic reduction and vaporization, and cooling. Other processes can produce energetic mixtures and compounds of silicon and/or multilayered silicon-containing particles which are adapted for use in primary or secondary batteries such as lithium-ion batteries. In accordance with various process embodiments, silicon and/or other constituents may be substantially fully vaporized[27] in a vaporization zone at a temperature of at least about 2000° C., and preferably at least about 3000 C, at a first pressure of at least about 0.5 bar, preferably at least 2 Bar, and more preferably at least 4 Bar (1 Bar=100,000 Pascals=750 Tor=0.987 Atmosphere=14.5 pounds per square inch). The substantially vaporized silicon is conducted into an expansion cooling zone at a second pressure lower than the first pressure, where it is cooled at least 500° C., and preferably at least 1000° C. at a rate of at least about $1 \times 10^{3}$° C. per second, and preferably at least about $1 \times 10^{5}$° C. per second, to nucleate and precipitate nanoparticles of silicon and/or other energetic constituents. For highly rapid cooling and some purification processes, the second pressure is desirably a subatmospheric pressure, preferably less than about 0.2 Bar, and more preferably less than about 0.1 Bar. However, various processes for low-cost production of silicon powder may utilize atmospheric and/or superatmospheric pressure in the downstream processing zones. Vacuum equipment adds capital cost to manufacturing processes, so it is an advantage for simpler and lower cost processing that manufacture may be carried out in which the system can be largely driven by pressure (eg, from recycle pumping) in the first vaporization zone. In such processes, the vaporization zone pressure may desirably be greater than 4 Bar, for example from about 5 bar to about 30 bar, and the pressure in the expansion zone may preferably be less than half of the vaporization zone pressure, for example in the range of from about 2 bar to atmospheric pressure. The silicon nanoparticles formed in the expansion zone are separated from the remaining gas stream, such as by momentum separators or entrapment on or in a liquid stream, film and/or condensed mist. Recycle process gas such as hydrogen, argon, helium and the like may be purified if desired, and can be directed to superatmospheric pressure storage reservoirs by appropriate pumps, for subsequent reuse. Such processes can (but need not) produce high purity silicon at relatively low cost. Cost reduction for manufacture of high-purity nanosilicon is an important need for practical electronic, photoelectric and other commercial uses, and realization of some of the potential benefits of nanoscale silicon powders.

There is also a need for highly energetic nanosilicon powders for use in energetic compositions such as explosives and propellants[28] as well as for electrochemical applications. Silicon nanoparticles can overcome the poor shelf life, low initiation temperature[29], and practical inability to reach "theoretical" enthalpy output[30] which unfortunately can characterize aluminum and boron energetics[31]. Other embodiments of the present disclosure are directed to manufacture, applications and use of high-energy nanosilicon powders, including those containing boron, carbon, aluminum, lithium, calcium, magnesium, titanium and other electrically conductive silicide-forming metals, heavy metals such as Ta, Hf, Zr, hydrogen and/or phosphorous, which provide desirable characteristics to nanosilicon energetics for specific purposes. Boron, iron, aluminum and phosphorus can be natural "impurities" in crude metallurgical silicon, which must be removed at significant expense to facilitate electronic monocrystalline and other semiconductor uses for nanosilicon powders. Nanosilicon propellants and energetics do not require monocrystalline or high-purity silicon. Moreover, "impurities" such as boron which can be harmful for electronics applications, can be a significant advantage for energetic applications of nanosilicon powders. Boron content of nanosilicon powders can significantly enhance the available oxidation enthalpy $\Delta H$ energy output[32] of nanosilicon powders for propulsion and other energetic applications if appropriately designed and composed. The following Table 1 lists some full oxygen-oxidation enthalpies calculated at 100° C. for aluminum nanopowders, 20% $Al_2O_3$ oxide-coated aluminum nanopowders, and a variety of silicon, boron and carbon compositions, all of which significantly exceed the oxidation enthalpy of 20% $Al_2O_3$-coated aluminum nanoparticles:

TABLE 1

| Otokumpu HSC thermodynamic calculations @ 100° C. | Silicon | Aluminum | Nano-Al coated with 20 wt % native-formed $Al_2O_3$ | Boron | $B_4C$ | SiC | 60 wt % Si 40 wt % B |
|---|---|---|---|---|---|---|---|
| $\Delta H$ Full $O_2$ Oxidation output per gram | 7.75 KCal per gram | 7.42 KCal per gram | 5.94 KCal per gram | 14.06 KCal per gram | 12.40 KCal per gram | 7.34 KCal per gram | 10.27 KCal per gram |
| $\Delta H$ Full $O_2$ oxidation output per $cm^3$ | 12.06 KCal per $cm^3$ | 20.04 KCal per $cm^3$ | 16.03 KCal per $cm^3$ | 33.04 KCal per $cm^3$ | 31.25 KCal per $cm^3$ | 23.21 KCal per $cm^3$ | 20.45 KCal per $cm^3$ |

It is noted that nanoparticles of approximately 60 wt % silicon-40 wt % boron (which can include some carbon) which can be economically produced in accordance with the present disclosure, can have almost twice the full oxidation enthalpy of 20% surface-oxidized aluminum nanoparticles. It is also noted that silicon reacts exothermically with nitrogen, which is present in the product gases of many propellants and explosives, such as RDX. Formation of silicon nitride (3Si+2N2=>Si3N4, $\Delta H$ @ 100° C., 1 bar=84.25 KCal) approaches the exothermic energy release of aluminum nitride formation (2Al+N2=>2AlN, $\Delta H$ @ 100° C., 1 bar=53.96 KCal).

As indicated, boron (a natural "impurity" of inexpensive silicon metal and metallurgical grade silicon[33]) can increase the thermal output of nanosilicon powder, but has been difficult to use in propellants, explosives and other energetics because of its high elemental melting and vaporization points, and reaction inhibiting effects of its molten surface oxide. However, elemental boron particles can be combusted in submicron particle size as a minority component in high temperature thermite mixtures with a majority fuel component of elemental aluminum powder[34]. The reaction of boron with nitrogen is also very highly exothermic (2B+N2=>2BN, ΔH @ 100° C., 1 bar=21.62 KCal), significantly exceeding the per-gram enthalpy of reaction of both aluminum and silicon with nitrogen. Moreover, silicon-boron compounds with small enthalpies of formation such as SiB3 (Si+3B=>SiB$_3$ ΔH @ 100° C.=10.6 KCal; Si+6B=>SiB$_6$ ΔH @ 100° C.=13.97 KCal) have much higher energetic oxidation enthalpies than pure aluminum or silicon (full O$_2$ oxidation enthalpy of SiB$_3$ @100° C. is approximately 10.96 KCal/gram; full O$_2$ oxidation enthalpy of SiB$_6$ @100° C. is approximately 12.0 KCal per gram, compared to only about 6 KCal per gram for aluminum nanoparticles coated with 20 wt % native-formed Al$_2$O$_3$). It should also be noted from Table 1 that small amounts of carbon "impurity" incorporated in nanosilicon powder do not significantly affect its oxidation ΔH thermal output, and can. A variety of other "impurities" are also energetic, and can contribute important characteristics to energetic Si-containing nanopowders and their composites, so that expensive processes to eliminate carbon can be counterproductive for energetics uses. For example, TaSi$_2$, (high density >>8 g/cm$^3$, TiB2 (high volumetric energy density >40 KCal/cm$^3$) and SiP, BP, Ti/Zr/Hf-hydrides, and Al (providing internal H$_2$, Al$_2$ and P$_2$ gas volatility at elevated temperatures) can contribute important functional capabilities to storage-stable silicon-containing nanoenergetics:

also comprise carbon, phosphorous, iron, aluminum, titanium, zirconium, heavy metals such as Tantalum, etc. and compounds, alloys, amorphous glasses, and mixtures thereof) based on the total weight of the inorganic nanoparticle composition, to provide energetic nanoparticles having a total burn/detonation full oxygen-oxidation enthalpy above that of (20 wt %) surface-oxidized aluminum, and preferably greater than that of elemental aluminum and elemental silicon. The full oxygen oxidation enthalpy of such embodiments of multielement energetic nanoparticles in accordance with the present disclosure should best be at least about 7.5, and preferably at least about 8.0 KCal per gram at 100° C. and 1 bar pressure.

Other silicon (and aluminum/boron) based embodiments of the present disclosure comprise inexpensive energetic nanoparticles made by carbothermic plasma reduction processing with excess carbon, which can contain at least about 1 wt % carbon while providing greater safety, storage stability and energy output than surface oxidized nanoaluminum. Carbothermic plasma reduction processes in accordance with the present disclosure can use inexpensive raw materials, such as metallurgical silicon, silica sand, silica clay, borates/B$_2$O$_3$, and an inexpensive carbon source (coal, coke, oil, natural gas, silicon carbide, boron carbide, etc.) as raw materials. The use of low cost, less-refined or crude silicon sources, which may include normally-unwanted alu-

TABLE 2

| Otokumpu HSC calculations @ 100° C. | ZrSi2 | TiB2 | Al4C3 | AlB2 | FeSi | FeB | TaB2 | TaSi2 | BP |
|---|---|---|---|---|---|---|---|---|---|
| ΔH Full O$_2$ Oxidation output per gram | 4.47 KCal per gram | 6.50 KCal per gram | 7.17 KCal per gram | 9.63 KCal per gram | 3.54 KCal per gram | 3.544 KCal per gram | 2.46 KCal per gram | 2.75 KCal per gram | 7.45 KCal per gram |
| ΔH Full O$_2$ oxidation output per cm$^3$ | 21.83 KCal per cm$^3$ | 41.61 KCal per cm$^3$ | 16.94 KCal per cm$^3$ | 30.72 KCal per cm$^3$ | 21.60 KCal per cm$^3$ | 25.34 KCal per cm$^3$ | 27.43 KCal per cm$^3$ | 25.10 Kcal per cm$^3$ | 22.20 Kcal per cm$^3$ |

In addition, the phonon-deflection properties of heavy energetic elements facilitates shockwave heating of the nanoparticles, as discussed hereinafter with respect to explosive energetics and casings. Alkali silicides such as lithium, sodium and potassium silicides are somewhat saltlike with low enthalpy of formation[35]. A wide variety of lithium silicides may be formed[36], including Li$_{4.4}$Si, Li$_{22}$Si$_5$, and Li$_{15}$Si$_4$. Li$_3$Si$_4$ has a (negative) formation enthalpy of only about 7.3 Kcal, Li$_7$Si$_3$ only about 7 KCal and Li$_{12}$Si$_7$ only about 6.1 KCal per mole. Electrochemical lithiation of silicon can produce amorphous silicon, and ultimately Li$_{15}$Si$_4$[37] (energy level ~3579 mAh/g). A 1:1 molar ratio of SiLi (~28 g Si, 6.9 g Li) has an oxidation enthalpy of ~8 Kcal/gram, which is higher than silicon. Lithiated silicides are useful as anodic energetics in lithium-ion batteries, and potentially highly rapidly reactive energetic materials for munitions and propellants if ways can be developed to provide storage-stable nanopowders thereof.

Accordingly, the present disclosure is also directed to manufacturing processes for producing energetic compositions and materials containing silicon and other energetic elements, including vapor-fast quench carbothermic processes which can produce bulk-volume nanopowders at low cost. These nanopowders can intentionally include up to about 90 wt % boron and/or aluminum or more (and may minum, borate and phosphorus content, reduces cost, and can even increase thermal output of the nanosilicon powder produced. Purified elemental boron is relatively expensive, but B$_2$O$_3$ and other borate raw material is inexpensive (currently about 50 US cents per pound[38]) and widely used for borosilicate glass and fiberglass manufacture.

Processes in accordance with various vaporization embodiments of present disclosure are inexpensive, and scalable to high volume production. Nanoparticle shape can preferably be spherical. To meet military and other specifications, particle size (eg, diameter) can be readily selected by process conditions to be less than about 80 nm, and can be designed to have a broad or narrow distribution by process modification. For example, particle size distributions can be selected by adjustment of process parameters such as temperature, vaporization and expansion pressures, inert gas volume, input materials, etc, to produce bulk nanoparticles with a desired surface area, such as in the range of from about 10 to about 90 square meters per gram. For example, a range of 30-50 square meters per gram (which may include some surface roughness, nonsphericity and/or internal porosity), an average particle size (diameter of spherical particle) less than about 80 nm, and a volumetric d90 of 100 nm has been specified as a goal by the US Army for propulsion and munitions uses of silicon nanoparticles (see Endnote 28, below).

The present disclosure is also directed to silicon nanoparticle compositions with specific features and/or compositions for energetics uses. In this regard, in some embodiments, bulk silicon nanoparticles are provided comprising from about 20 to about 99 weight percent silicon, from about 1 to about 70 weight percent boron and/or aluminum, from about 0 to about 15 weight percent carbon, from about 0 to about 5 weight percent phosphorus, and from about 0 to about 30 weight percent of a component selected from the group consisting of iron, titanium, zirconium, tantalum and mixtures thereof, from about 0 to about 0.1 weight percent hydrogen, and from about 0 to about 2 weight percent oxygen based on the total weight of the nanoparticles. The nanoparticles of these specific embodiments may further have a surface area of at least about 20 square meters per gram, preferably in the range of from about 25 to about 600 square meters per gram. Desirably, nanoparticles have a numerical count of at least about $1 \times 10^{15}$ particles per gram[39], and at least about $1 \times 10^{17}$ particles per gram for ultrahigh surface area nanoparticles which are provided with a covalently bound perfluorocarbon protective and energetic coating.

As indicated, nanoparticle compositions in accordance with the present disclosure may also have a covalently bound coating such as hydrogen, alkane and/or alkene moieties to protect and/or isolate the nanoparticle surfaces. Preferred covalently bound surface coating materials are fluorinated aliphatic and aromatic alkanes and alkenes which can react with the nanoparticles at elevated temperatures to produce volatile fluoride gases. Preferably, the organic fluorinated covalent coatings will have a thickness of from about 2 to about 50 Angstroms. Grafted polymers and oligomers such as perfluorinated polymers, GAP, NIMMO, GLYN and BAMMO and butadiene polymers, copolymers and oligomers are also useful surface coating materials for the energetic nanoparticles.

The present disclosure is also directed to inorganic core-shell layered nanopowder compositions which have an energetic core composition, and at least one energetic shell composition surrounding the core composition. The core composition may desirably comprise aluminum, titanium, hydrogen, silicon, phosphorus, and/or boron (including compounds, glasses or mixtures thereof). The energetic shell composition is different from the core composition, and may desirably comprise silicon, boron, carbon or mixtures thereof. Preferably, the outside inorganic energetic shell composition substantially continuously surrounds and is attached to the core nanoparticle. The shell composition will typically have a mass of less than about 200%, and more preferably less than about 50% of the mass of the core composition. When silicon is used primarily as a coating to protect more active core energetic materials such as aluminum, the shell mass may be less than 5 nm in thickness, and have a total mass of less than about 10% of the core mass. The external shell may be selected to be more storage-stable than the core composition, as will be described in more detail with respect to specific embodiments of FIG. 9. For example, the core may be an elemental aluminum based composition, and the shell may be a more storage-stable and oxygen-stable silicon-based composition. For use in explosive compositions, the core and shell layer(s) may have different densities, and may include heavy metal components to enhance internal shock-wave heating of the nanoparticles. The core-shell nanoparticles may also be provided with covalently bound, protective and/or compatibility-enhancement coatings, as previously described, including covalently bound reactive fluorocarbon coatings and energetic polymers.

The intermolecular velocity of reaction of energetic nanoparticles is typically mixing or diffusion limited. In addition, initially-formed interfacial reaction products such as $Al_2O_3$, $SiO_2$ and/or $B_2O_3$ can block or restrict further reaction of energetic reactants such as aluminum, silicon and boron, impairing reaction, reaction velocity, and effectiveness. Accordingly, reducing the size of solid energetic reactants can greatly increase their rate of reaction. Nanoscale energetic fuels such as silicon and aluminum, and oxidizer reactants such as oxygen-rich and fluorine rich materials, hold the potential for very rapid reaction rates, if they can be produced and maintained in close proximity to energetic oxidizers while maintaining stability against unintentional ignition and degradation in storage. The dramatic increase in interfacial reaction surface area with decreasing silicon particle size is illustrated by the following Table 3, which is calculated for spherical, non-porous silicon nanoparticles (an "effective radius" can also be defined for a nonspherical particle as the radius it would have if its mass was in the shape of a nonporous sphere, although the particle will necessarily have a larger surface area if it is not actually spherical):

TABLE 3

| Spherical silicon nanoparticle radius, nanometers | Individual silicon particle volume, cubic nanometers | Individual silicon particle surface area, square nanometers | Number of silicon particles per gram (density 2.239 g/cm³) | Surface area of bulk silicon nanopowder, square meters per gram |
|---|---|---|---|---|
| 2 | 33.51 | 50.27 | 1.2813E+19 | 644.05 |
| 5 | 523.60 | 314.16 | 8.20035E+17 | 257.62 |
| 10 | 4,188.79 | 1,256.64 | 1.02504E+17 | 128.81 |
| 15 | 14,137.16 | 2,827.43 | 3.03717E+16 | 85.87 |
| 20 | 33,510.29 | 5,026.54 | 1.2813E+16 | 64.41 |
| 25 | 65,449.79 | 7,853.98 | 6.56028E+15 | 51.52 |
| 30 | 113,097.24 | 11,309.72 | 3.79646E+15 | 42.94 |
| 35 | 179,594.23 | 15,393.79 | 2.39077E+15 | 36.80 |
| 40 (see endnote[40]) | 268,082.35 | 20,106.18 | 1.60163E+15 | 32.20 |
| 45 | 381,703.19 | 25,446.88 | 1.12488E+15 | 28.62 |
| 50 | 523,598.33 | 31,415.90 | 8.20035E+14 | 25.76 |
| 55 | 696,909.38 | 38,013.24 | 6.16104E+14 | 23.42 |
| 60 | 904,777.92 | 45,238.90 | 4.74557E+14 | 21.47 |
| 65 | 1,150,345.54 | 53,092.87 | 3.73252E+14 | 19.82 |
| 70 | 1,436,753.83 | 61,575.16 | 2.98846E+14 | 18.40 |
| 75 | 1,767,144.38 | 70,685.78 | 2.42973E+14 | 17.17 |

TABLE 3-continued

| Spherical silicon nanoparticle radius, nanometers | Individual silicon particle volume, cubic nanometers | Individual silicon particle surface area, square nanometers | Number of silicon particles per gram (density 2.239 g/cm$^3$) | Surface area of bulk silicon nanopowder, square meters per gram |
|---|---|---|---|---|
| 80 | 2,144,658.77 | 80,424.70 | 2.00204E+14 | 16.10 |
| 85 | 2,572,438.61 | 90,791.95 | 1.66911E+14 | 15.15 |
| 90 | 3,053,625.48 | 101,787.52 | 1.4061E+14 | 14.31 |
| 95 | 3,591,360.97 | 113,411.40 | 1.19556E+14 | 13.56 |
| 100 | 4,188,786.67 | 125,663.60 | 1.02504E+14 | 12.88 |
| 105 | 4,849,044.17 | 138,544.12 | 8.85471E+13 | 12.27 |
| 110 | 5,575,275.05 | 152,052.96 | 7.7013E+13 | 11.71 |
| 115 | 6,370,620.92 | 166,190.11 | 6.73983E+13 | 11.20 |
| 120 | 7,238,223.36 | 180,955.58 | 5.93196E+13 | 10.73 |
| 10,000 (20 μ diameter) | 4,188,786,667,000.00 | 1,256,636,000.00 | 102,504,343.65 | 0.13 |

Accordingly, further aspects of the present disclosure are directed to manufacture of silicon nanoparticles of extremely small particle size, with enormous reactive surface area in covalently bonded contact with an energetic oxidizing agent which pacifies and stabilizes the energetic silicon nanoparticles against storage degradation. Such embodiments comprise electrodepositing friable nanoporous silicon, and comminuting the nanoporous silicon in the presence of a perfluorinated alkene and/or alkyne, as will be described hereinbelow with respect to specific embodiments of FIGS. 10 and 11.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A is a calculated thermodynamic graph of the equilibrium reaction products of feedstock for an embodiment of a plasma torch nanoparticle production process at a ratio of 4 moles of silicon and one mole of silicon tetrachloride over a temperature range of 100° to 4,000° Celsius at one bar pressure;

FIG. 3B is a calculated thermodynamic graph of the equilibrium reaction products of feedstock for an embodiment of a plasma torch nanoparticle production process at a ratio of 2 moles of silicon and 1 mole of silicon tetrabromide over a temperature range of 100° to 4,000° Celsius at one bar pressure;

FIG. 3C is a calculated thermodynamic graph of the equilibrium reaction products of feedstock for an embodiment of a plasma torch nanoparticle production process at a ratio of 2 moles of silicon, 1 mole of boron, and one mole of silicon tetrachloride over a temperature range of 100° to 4,000° Celsius at one bar pressure;

FIG. 3D is a calculated thermodynamic graph like that of FIG. 3C, of the thermodynamic equilibrium reaction products of 2 moles of silicon, one mole of boron, and one mole of silicon tetrachloride, together with 0.25 mole of iron "impurity" and 0.25 mole of aluminum "impurity", over a temperature range of 500° to 4,000° Celsius at one bar pressure, scaled to show the lower range of components;

FIG. 3E is a calculated thermodynamic graph of the equilibrium reaction products of feedstock for an embodiment of a plasma torch nanoparticle production process at a ratio of 2 moles of silicon and one mole of boron trifluoride over a temperature range of 100° to 4,000° Celsius (Centigrade) at one bar pressure;

FIG. 3F is a calculated thermodynamic graph of the equilibrium thermodynamic reaction products of feedstock for an embodiment of a plasma torch nanoparticle production process at a ratio of one mole of silicon and 1.5 moles of hydrogen over a temperature range of 100° to 4,000° Celsius at one bar pressure;

FIG. 3G-1 is a calculated thermodynamic graph of the equilibrium reaction products of feedstock for an embodiment of a plasma torch nanoparticle production process at a ratio of 4 moles of silicon, 3 moles of molecular hydrogen, 0.1 mole of silicon tetrafluoride, together with 0.025 mole of boron "impurity" and 0.025 mole of aluminum "impurity", over a temperature range of 500° to 4,000° Celsius at 0.01 bar pressure (vacuum);

FIG. 3G-2 is a calculated thermodynamic graph of the equilibrium reaction products of FIG. 3G-1 over a temperature range of 900° to 2,000° Celsius at 0.01 bar pressure, magnified to show the volatile boron and aluminum components at low concentration levels;

FIG. 3H is a calculated thermodynamic graph of the equilibrium reaction products of feedstock for an embodiment of a plasma torch nanoparticle production process at a ratio of three moles of aluminum and two moles of molecular hydrogen with one mole of argon over a temperature range of 500° to 4,000° Celsius at one bar pressure (argon is included to illustrate its lack of effect on the equilibrium products);

FIG. 3 I is a calculated thermodynamic graph of the equilibrium reaction products of feedstock for an embodiment of a plasma torch nanoparticle production process, at a ratio of one mole of boron oxide (B2O3), 2.5 moles of carbon, and 0.25 moles of methane (with 2.25 moles of inert argon) over a temperature range of 100° to 4,000° Celsius at one bar pressure;

FIG. 3J is a calculated thermodynamic graph of the equilibrium reaction products of feedstock for an embodiment of a plasma torch nanoparticle production process at a ratio of one mole of boron oxide (B2O3), 2.5 moles of carbon, 3 moles of silicon, and 0.25 moles of methane (with 2.25 moles of inert argon) over a temperature range of 100° to 4,000° Celsius at 0.01 bar pressure (one kilopascal=vacuum);

FIG. 3K is a calculated thermodynamic graph of the equilibrium reaction products of feedstock for an embodiment of a plasma torch nanoparticle production process at a ratio of one mole CH4, one mole Aluminum, 0.75 mole Boron, and 0.5 mole Silicon over a temperature range of 500 to 4000° C. at 0.01 bar pressure (vacuum);

FIG. 3L is a calculated thermodynamic graph of the equilibrium reaction products of feedstock for an embodiment of a plasma torch nanoparticle production process at a ratio of 2 moles H2, 2 moles Cerium, 2 moles silicon and 2 moles aluminum, over a temperature range of 500 to 4000° C. at 0.01 bar pressure (vacuum);

FIG. 11 is a schematic cross sectional side view of an electrodeposition system for continuously electrodepositing nanoporous silicon on wires, fibers, sheets, films, screens, cloths and the like;

FIG. 18A is a schematic cross sectional partial side view of a strong, laminated, energetically reactive metallic munition casing prior to detonation of internal munition explosive;

FIG. 18B is a schematic cross sectional partial side view of the initial stage of the expansion and disintegration of the reactive munition casing of FIG. 18A, upon detonation of internal munition explosive;

FIG. 18C is a schematic cross sectional partial side view of a strong, extruded energetically reactive exfoliating Al+TiH$_2$ and/or Ta2H matrix munition casing reinforced with oriented steel microparticles, which has been extruded from a high extrusion ratio extruder like that of FIG. 16 at an elevated extrusion temperature of 150-250° C.;

FIG. 22 is a schematic cross sectional view of a munition like those of FIG. 18, 19 or 20, in which a high-electromagnetic VIS-UV radiating candoluminescent such as Ce or Ca is included within the high-energy explosive adjacent and/or within a zone including energetic silicon and/or metallic nanoparticles, to pre-heat the nanoparticles in advance of the detonation shockwave and detonation reaction front, thereby increasing energetic nanoparticle reaction velocity and decreasing nanoparticle ignition delay, to increase munition brisance and energy production rate;

FIGS. 31A, 31B and 31C are progressive (in time) schematic cross sectional views of an explosive munition composition and structure, illustrating NIR-VIS-UV driven pre-heating of energetic fuel particles to decrease their ignition delay and enhance their reaction rate;

FIGS. 32A, 32B, 32C and 32D are schematic cross sectional views of energetic porous silicon devices and structures, FIGS. 33A, 33B and 33C are schematic cross sectional views of porous silicon-based energetic structures which can include active optical and/or microwave generation, FIG. 37 is a schematic cross sectional view of an energetic aluminum foil with electrodeposited or printed porous silicon energetic composite layers, together with a fuze control, FIG. 38 is a schematic cross sectional illustration of the combination of a stabilized energetic nanosilicon energetic with an oxidizer salt and a polymer matrix in a printing solution to form printed energetic composites, FIG. 39 is a graph of the enthalpy of formation of various Xenon fluorides vs. temperature, FIG. 40 is a chart of the number of moles of equilibrium species vs. temperature of 1 mole of Xenon with 6 moles of fluorine, FIG. 42 is a schematic side view of a detonating energetic composite which comprises halothermite oxidizer and nanoparticle energetic fuel particle components, the left side showing the composite prior to detonation, and the right side showing the composite partially detonated (from left-to-right) with the detonation wave having reached the energetic zone containing energetic fuel nanoparticles being preheated by the advancing detonation wave, FIGS. 44A and 44B are schematic cross-sectional views of munition casings with energetic fills of at least 2.70, up to over 13 g/cm$^3$ density and at least the reactive energy of TNT for kinetic and/or penetrating munitions.

DETAILED DESCRIPTION

High purity silicon nanoparticles are useful in a wide range of electronic and optical applications based on nanoscale semiconductor properties of relatively pure silicon, which may be doped at precise levels to induce n-type, p-type or intrinsic characteristics. In accordance with certain embodiments of the present disclosure, relatively pure doped and undoped silicon nanoparticles may be manufactured by thermocycle processes which vaporize silicon and/or apply different stabilities of silicon subhalides or silanes at elevated temperatures to vaporize and subsequently condense silicon as nanoparticles. Energetic nanoparticles comprising silicon, boron, aluminum and/or carbon can also be produced by carbothermic plasma torch processes. Plasma torch technology is relatively highly developed, and plasma torch equipment is powerful and mature, highly productive, and cost-efficient[41]. This technology can be modified and adapted to produce energetic silicon nanopowders, as described herein. Various embodiments of the present disclosure can process relatively low-cost raw materials to provide silicon and silicon-containing nanopowders. Silicon metal at 98.5% purity now costs less than \$1.50/pound[42]. Silica is "dirt cheap" and can be purified inexpensively before use. Boron oxide is ~50 cents/pound. By published cost calculation methods for fast-quench plasma production systems and energy usage, production costs for carbothermic nanosilicon can be well less than \$5-10 per pound[43].

A wide variety of scalable plasma torches may be utilized to vaporize silicon and silicon compounds, depending on the rate and total volume of nanosilicon powder which is to be manufactured. Small scale plasma torches may operate at power levels of several kilowatts, with nanosilicon production rates of several kilograms per hour, while large scale plasma torch systems can operate at energy input levels of several megawatts and production rates of up to several thousand kilograms per hour.

Figure 1:
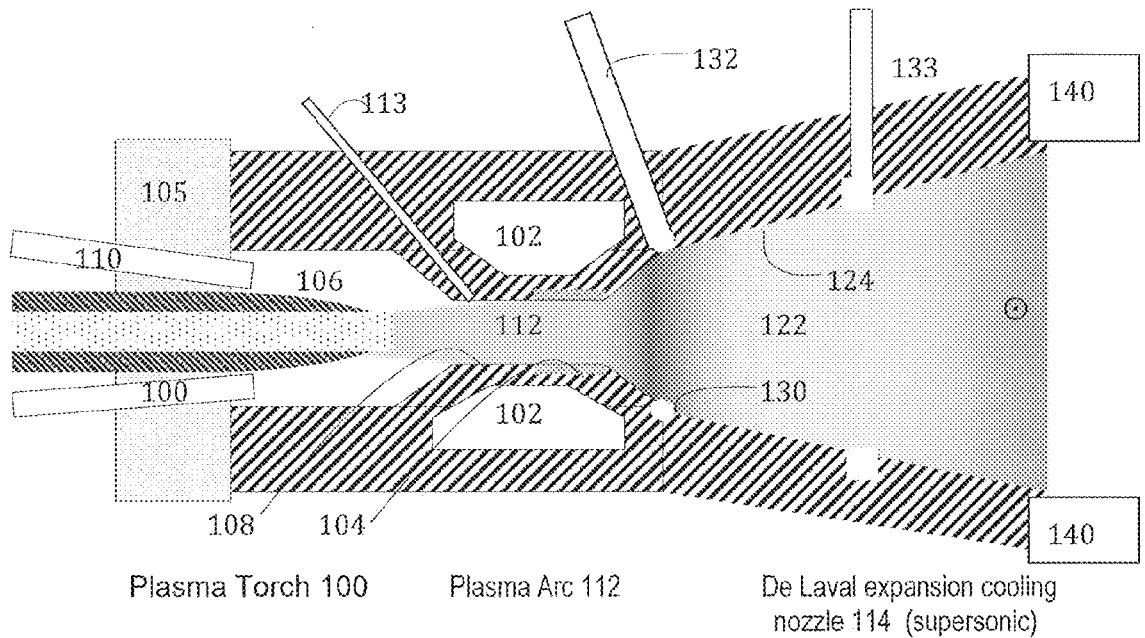
FIG. 1 is a schematic cross sectional side view of an embodiment of a plasma torch with an extended plasma discharge barrel L/D ratio greater than 2 for vaporizing silicon, and a de Laval-type expansion nozzle for supersonic expansion and rapid cooling of the silicon-containing vapor to rapidly nucleate and produce silicon nanoparticles.

In accordance with an embodiment of the present invention, a plasma torch 100 such as illustrated in cross-section in FIG. 1, may be used to fully vaporize silicon introduced into the torch 100. Plasma torches are conventionally designed for rapid heating of plasma and processed materials to extremely high temperatures, which can approach 20,000° Centigrade (C)[44].

In this regard, FIG. 3A is a calculated thermodynamic equilibrium chart of the equilibrium species derived from 4 moles of silicon and one mole of silicon tetrachloride over the temperature range of 100° C. to 4000° C., calculated by Outokumpu HSC thermodynamic software. As illustrated in FIG. 3A, silicon tetrachloride ($SiCl_4$) vapor, with a boiling point of approximately 57° C., is the stable chloride of silicon at lower temperatures. However, silicon forms a series of subchloride gases, $SiCl_3$, $SiCl_2$, and $SiCl$ which are more stable at respectively higher temperatures. As indicated, various of the charts of FIG. 3A-3L are calculated at 1 Bar (to illustrate equilibrium conditions in a first pressure zone) and 0.01 bar (to illustrate equilibrium conditions in a lower pressure cooling zone). Lower pressures (Le Chatelier's principle), for example in expansion-cooling zones tend to slightly favor formation of vapor species, while higher pressures tend to slightly favor condensed phase (solid/liquid) phases. These effects are illustrated in various of the FIG. 3 charts, and are utilized, for example, in various embodiments of silicon purification methods herein.

With reference to FIG. 3A, as $SiCl_4$ and elemental silicon are heated above about 1000° C., to 3000° or more, the elemental silicon reacts to form silicon subhalide vapor. Elemental silicon itself also starts to vaporize at temperatures above about 2000° C. With higher ratios of elemental silicon to $SiCl_4$, (or in the absence of $SiCl_4$) substantially total vaporization of silicon takes place under equilibrium conditions at temperatures above about 3000° C. over a broad range of pressures.

In accordance with FIG. 3A, upon slowly cooling fully vaporized silicon (as subchloride and/or elemental species) from 3000° C. under kinetic equilibrium or near-equilibrium conditions, elemental silicon particles, or deposits on surrounding surfaces, will slowly nucleate, accrete, and grow in size, and $SiCl_4$ vapor will be formed as the most stable equilibrium species. The condensed silicon particles and/or solid surface condensation products can be relatively large under slow cooling conditions which approximate kinetic and thermodynamic equilibrium. But if the elemental silicon vapor (with any silicon subchloride, argon and/or hydrogen gases) is cooled extremely rapidly, preferably in a nonequilibrium manner, nanosilicon particles are rapidly nucleated and formed in profusion, together with $SiCl_4$ gas which is readily separated from the condensed silicon nanoparticles. If there is only silicon vapor (eg, as in FIG. 3F, no $SiCl_4$, just silicon and inert gas such as Argon and/or hydride-terminating $H_2$ gas), rapid cooling from above 3000° C., also produces silicon nanoparticles by rapid prolific nucleation from the shock-cooled vapor. The particles are relatively spherical in shape[45]. The size of the nanoparticles may be readily varied and controlled by controlling the density, vapor pressure and dilution of vaporized silicon, the rate and degree of cooling, and the proportion of inert and/or other gases mixed with the vaporized silicon before and during fast cooling. In general, decreased silicon vapor density, decreased silicon vapor pressure, increased dilution of vaporized silicon and increased rate and degree of cooling will produce smaller silicon nanoparticles, and vice versa.

Figure 4:
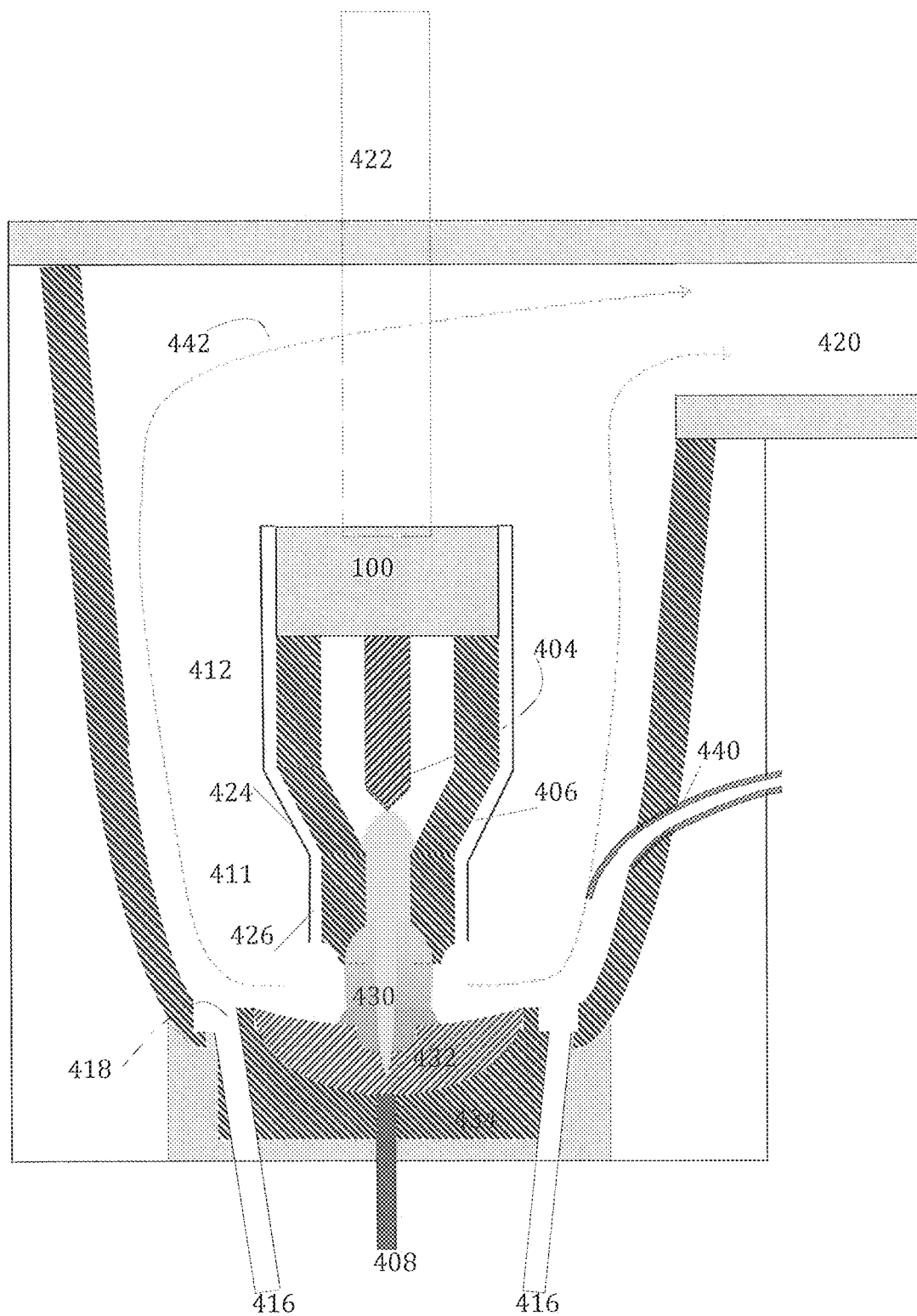
FIG. 4 is schematic cross-sectional side view through the axis of a generally radially symmetrical embodiment of a high-power, high-production plasma torch system for vaporizing silicon, having a plasma arc which is transferred to a (molten) silicon vaporization surface, and an expansion zone for flash expansion and cooling of silicon-containing vapor to rapidly nucleate and produce silicon nanoparticles.

Illustrated in FIG. 1 in cross section is a generally radially symmetrical plasma torch system 100 capable of heating and vaporizing silicon and/or silicon halide at temperatures above about 4000° C., and for rapidly quenching the temperature of the vapor to below 1300° C. by rapid expansion (and, optionally, cool/cold gas injection), to produce silicon nanoparticles. The DC plasma torch 100 of FIG. 1 is a relatively small plasma torch, which forms an electrical arc 112 between an axially central rod cathode 106 and a hollow, tubular, radially symmetrical water-cooled anode 104, which forms a discharge nozzle. The two electrodes are separated by an insulator 105, which also has inlets 110 for plasma-forming gas such as argon and/or hydrogen (which can also include Si particles to be vaporized, and less preferably, $SiCl_4$). When an ionizable gas is introduced in the electrode gap and a dc arc 112 is established between the electrodes 104, 106, the arc is forced through the nozzle throat 108 producing a very high temperature plasma discharge through the nozzle. Electromagnetic forces and gas stabilization constrict the arc column and can heat the plasma to a temperature in the range of from about 5000 to 15,000° C., with plasma temperatures of about 4000-10,000° C. preferred for silicon vaporization. Thermodynamic equilibrium is reached rapidly at elevated plasma temperatures above, for example, 2000-4000° C. as produced in the first higher pressure plasma arc heating zone. However, at the lower temperatures reached by rapid expansion and/or injected gas-cooling of, for example, 400-1000° C., equilibrium is reached more slowly, and can be limited by component separation such as by injection of inert gas to cool and displace otherwise reactive gases, and/or by separation of condensed nanoparticles from the remaining gases. For example, a momentum classifier such as system 750 of FIG. 7B, and the gas manifolds of FIGS. 4 and 5 are useful for rapid reactive gas displacement.

Figure 2:
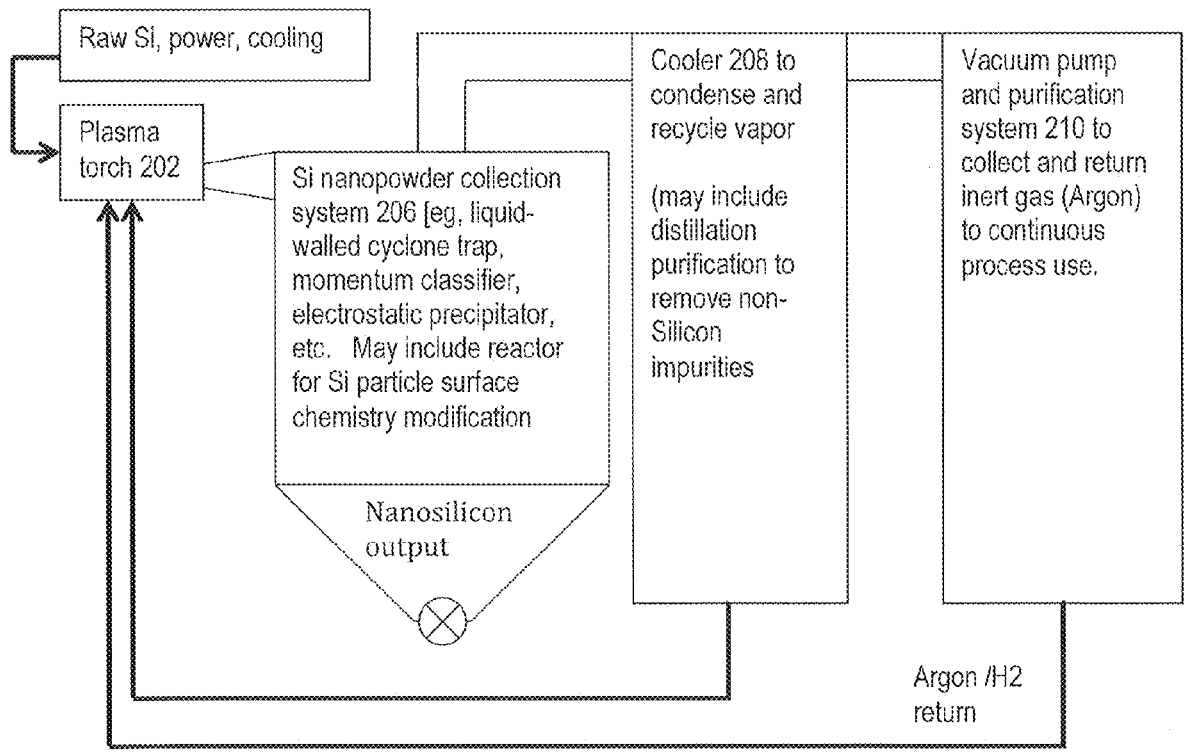
FIG. 2 is a schematic diagram of a nanoparticle separation and manufacturing system utilizing a nanoparticle generator such as that of FIG. 1, 4, 5 or 6 for continuous manufacture of silicon nanoparticles, with recovery and/or recycling of reaction components.

The body of the torch comprises cooling chambers 102 for the anode. The torch is supplied with coolant (eg, water) and power through cables and conduits from a conventional plasma torch system power supply and coolant headers (FIG. 2). A plasma torch can be operated in a transferred or non-transferred arc configuration, depending on whether the ionized electric arc is electrically transferred to a separate conductor externally of the discharge electrode. The illustrated embodiment 100 of FIG. 1 is a nontransferred arc plasma torch. A more energy-efficient transferred arc system 400 is illustrated in FIG. 4.

The illustrated plasma torch 100 is a relatively small plasma torch similar to a conventional thermal spray gun, but having an extended nozzle barrel throat 108 and a flash-cooling expansion nozzle 124. The plasma torch 100 comprises an outer anode body 104, with internal cooling channel(s) 102 surrounding the cylindrical plasma throat zone. A hollow tungsten cathode 106 is used to introduce silicon powder of micron scale particle size (eg preferably from about 2 to about 5 microns in diameter) with $SiCl_4$ and/or a gas such as Argon and/or $H_2$ as an input stream 116 into the arc discharge zone between the cathode 106 and the anode throat zone 108. Such micron-scale silicon particles are readily produced by a variety of manufacturing processes, including gas atomization and rotating wheel spray, such as used for manufacture of inexpensive steel powders for powder metallurgy.

Argon and/or hydrogen may be introduced as plasma gases into the plasma torch interior by inlets 110 to protect its surfaces from chloride-induced erosion, and to partially cool the cathode 106. A powder feed conduit 118 at the proximal opening of the nozzle plasma throat barrel 108, may also be used to feed silicon particles into the plasma arc 112. A de Laval-type expansion-cooling nozzle 114 is contiguously provided at the distal discharge end of the plasma throat zone 108, to enclose an expansion zone 122 where the plasma-heated vapor exiting the plasma throat is expansion-cooled, and thermal energy of the vapor stream components is converted into kinetic velocity. In the illustrated embodiment 100, the plasma velocity within the plasma anode barrel zone 108 may approach sonic velocity, while the velocity within the lower pressure expansion zone 122 can become supersonic. The plasma nozzle discharges directly into a de Laval-type expansion nozzle zone 122 formed by expansion nozzle 114. A radially symmetrical gas injection manifold 130 opening from the interior surface 124 of the expansion nozzle, fed by one or more inlet conduits 132, is configured to inject gas (with or without entrained particles) at the periphery of the rapidly expanding vapor in the expansion zone 122. Inlet conduits such as 132 can also be used to direct a jet(s) of gas (and particles) into the core of the expanding plasma vapor and condensing particles in the expansion zone 122. As described hereinafter, the conduits 132 can be used to introduce cooling gas and cold nanoparticles into the expanding plasma vapor, to produce silicon-coated core-shell energetic particles. The conduits 132 can also be used to introduce reactants such as silane ($SiH_4$) to coat particle surfaces with H-terminated silicon, and/or a hydrosilylation reaction agent to coat the surfaces of the condensing-condensed silicon nanoparticles surfaces with a functional organic covalently bonded coating. Also, thermally depolymerizable organopolymer powders such as PTFE polymers and copolymers may also be introduced with a cooling gas to be depolymerized in the hot gas, and then grafted on the silicon nanoparticle surfaces as the nanoparticles and gas are cooled.

A small thermal spray gun like the left-hand portion of FIG. 1 with a shorter barrel, typically is designed to melt and accelerate particles of moderate size in the 10's of microns, without substantial vaporization. To accomplish this, the particle steam to be melted and accelerated toward a target deposition surface is typically introduced into a downstream portion of the plasma gun throat. However, in accordance with the present methods, it is important to vaporize the silicon, rather than just accelerate them and melt their surfaces. In the illustrated embodiment 100, the silicon particles are introduced into the gun internal chamber to maximize the heating effects of the cathode-anode arc plasma, in order to fully vaporize the silicon. The silicon particles may be introduced directly into the arc at the interior of the gun chamber, as illustrated in FIG. 1. A plasma spray gun such as illustrated in FIG. 1 can typically process and substantially fully vaporize from about 2 to about 5 pounds of <5 micron silicon powder per hour introduced into the plasma gun chamber. One useful method to introduce silicon and $SiCl_4$ is to pump silicon particles with $SiCl_4$ through the cathode center to maximize the vaporization of the silicon particles[46]. The silicon powder particles can also be introduced with a conventional thermal spray powder feeder with inert gas and/or $SiCl_4$ into the plasma chamber, or back of the high L/D plasma discharge throat, for example via powder feed conduit 113.

The plasma torch system has an expanding de Laval type nozzle on its plasma discharge end for flash cooling the plasma and vaporized silicon, to nucleate and precipitate nanosilicon particles. The De Laval nozzle adiabatically cools the plasma by converting its thermal and pressure energy to kinetic energy upon adiabatic expansion of the plasma plume into a region of lower pressure than the pressure within the plasma torch body and high L/D discharge throat channel. The converging zone of the plasma torch between the electron-emitting end of the cathode 106 and the nearby proximal end of the anode accelerates the plasma flow to sonic velocity within the plasma discharge throat, and the subsequent diverging zone accelerates the flow to supersonic speed while expanding and flash cooling it. De Laval nozzles have long been conventionally used to "freeze" reactants in a non-equilibrium state by reaction quenching[47]. In this "high-purity" silicon process, and other flash-cooling processes, the flash quenching forces prolific nucleation and limits particle growth, so that nucleated nanoparticles stay at nanoscale particle size, rather than growing substantially by accretion of condensing silicon as would happen if the silicon-containing vapor is cooled slowly.

The nanosilicon plasma torch system carries out continuous, and scalable production of nanosilicon particles. Inert gases such as argon and/or hydrogen, inexpensive micron scale powder and (optionally) silicon chloride or subchloride such as $SiCl_4$ are fed into the plasma torch 100.

In many of the plasma torch embodiments herein, the expansion ratio of the cross sectional area of the plasma torch discharge nozzle area, to the downstream cross-sectional area of the expansion nozzle is preferably at least about 1:2, and more preferably at least about 1:5. The ratio of pressure within the plasma torch to the pressure at the downstream exit of the expansion nozzle is preferably at least about 5:1, and more preferably at least about 30:1. High ratios can result in higher expense for vacuum equipment and operation, and result in inefficient "throttling" of a de Laval nozzle, but can produce faster thermal quenching, so practical process parameter selection represents a balancing of cost and performance for a particular nanoparticle product manufacture. For inexpensive silicon particle manufacture, the pressure in the nozzle interior may be maintained at for example at least 5-10 bar via introduction of input gas and raw materials via pump and pressurized gas supply systems. The nozzle throat and downstream flow and particle recovery system may be designed to operate at nominally 1-2 bar, so it is effectively driven by the pressure within the silicon vaporization nozzle. The nominal temperature drop across the expansion nozzle (including cold gas injection) is preferably at least about 1800, and more preferably at least about 2200° C., at a nominal rate of at least about $1\times10^5$ and more preferably at least about $1\times10^7$ degrees Centigrade per second.

The plasma gas flow rate and the electric power to the plasma torch 100 may be appropriately balanced to stabilize the arc in accordance with conventional practice. Suitable gases in the generation of plasma include argon, helium, and hydrogen, which may be recycled as described herein with respect to the embodiment 200 of FIG. 2.

The cathode 106 is the source of electrons for maintaining the arc discharge, "evaporation" of which generates less heat than electron collection by the anode(s). Cathode materials include tungsten, thoriated tungsten (to facilitate arc initiation), graphite, copper, and zirconium. Nickel is useful for processing of chloride materials. The cathode may be designed with internal cooling, but the cathode of FIG. 1 is not cooled other than by contact with gas introduced near its base, and contact with injected components introduced through its internal central passageway. The electron-emitting cathode 106 is heated less than the electron-receiving anode 104 by the passage of arc current. Copper anode and plasma torch barrel components have high thermal conductivity for cooling purposes and low electrical resistance. A refractory metal coating such as a nickel coating may be used for the zones of the anode in contact with the plasma arc, which is particularly desirable for use with halide-containing reactants. Materials such as graphite, and refractory metals may also be used as base and/or coating materials for plasma torch anodes, depending upon the materials to be processed. Conductive silicon coatings may be useful to produce high-purity silicon, but may require frequent replacement.

Figure 7A:
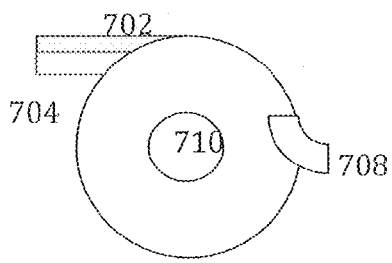
FIG. 7A is a schematic cross sectional top view of a cyclone-type classifier for separating silicon nanoparticles from a gas stream in which they have been produced.
Figure 8:
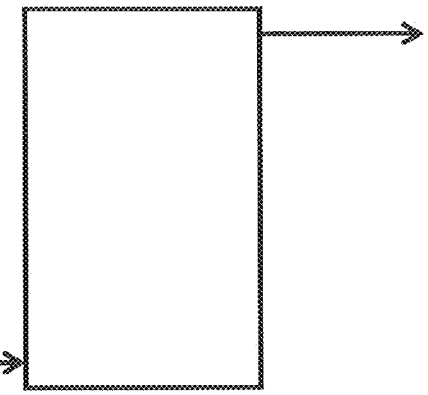
FIG. 8 is a schematic illustration of a fluid centrifugal size classification system.
Figure 7B:
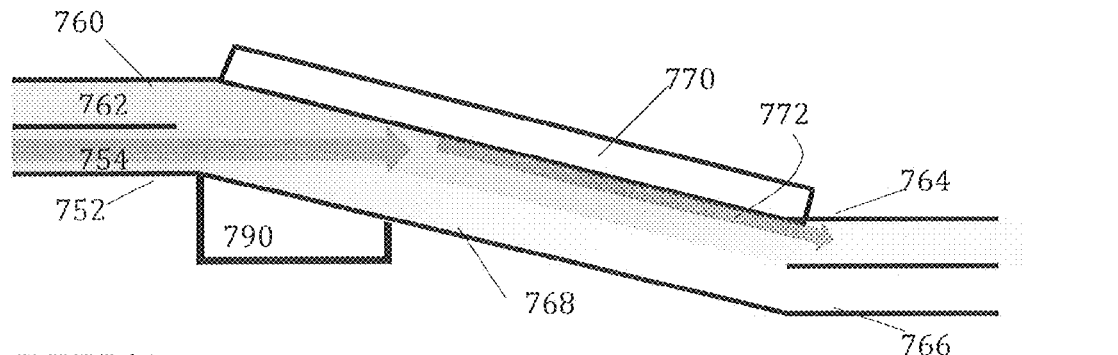
FIG. 7B is a schematic cross-sectional side view of an in-line momentum classifier which is adapted to force the high-momentum nanoparticles through a flow of cooling gas and force them to concentrate adjacent an oblique cooled surface for separation from the reaction gas in which they are entrained upon exit from an expansion-cooling nozzle.

In conventional plasma-spray processes, a thermally-arc-ionized plasma of a nontransferred plasma torch is used to melt and propel finely-divided (eg, 30-60 micron diameter) particles onto a substrate where they solidify to produce coatings. The powder to be sprayed is typically introduced into the plasma stream within the nozzle to melt and accelerate the particles to high velocities, without excess evaporation of the particles. In this regard, the torch 100 is provided with a conventional powder feed conduit 113 which can be used with a conventional powder feeder to introduce silicon particles (in this case preferably less than 5μ in diameter) into the plasma arc 112 within the discharge nozzle. A conventional plasma spray nozzle length-to-diameter ratio appropriate to achieve high particle velocity without substantial particle vaporization is typically approximately 1:1 or less, where the length is the distance of particle travel through the nozzle throat from its point of injection to the nozzle exit orifice. However, because it is important herein to fully vaporize the silicon (and other elemental energetic components such as boron and/or phosphorus) introduced into the plasma torch, the ratio of length of the nozzle anode throat 108 to its diameter is relatively large in the embodiment 100 of FIG. 1, for example at least 3:1, to increase the time for thermal transfer and reaction equilibration prior to downstream thermal quenching in the expansion zone 122. The nozzle arc zone for the illustrated embodiment of small plasma torch 100 may be approximately 1.5 to 2 centimeters or more in length, and have a cross-sectional area at its exit of about 0.4 square centimeters or less (circular diameter). The de Laval nozzle 114 may have an axial length of about 1-2 centimeters, and a downstream exit area of approximately 3 square centimeters, such that the area expansion ratio from the plasma nozzle exit to the discharge end of the expansion nozzle is about 7 or more. The pressure in the plasma torch 100 body and other plasma torch process embodiments herein may be maintained by material introduction and arc power, for example, in the range of from about 1.5 to about 6 Bar (150 to 600 kilopascal), while the subatmospheric pressure (vacuum) in the expansion zone downstream of the expansion nozzle may be in the range of, for example, from about 100 pascal to about 20 Kilopascal. The flow velocity through the nozzle throat may accelerate from subsonic velocity in the plasma torch body, to higher velocity, even supersonic velocity, eg Mach 1.5-3 in travel through the expansion-cooling nozzle 114 into the lower-pressure expansion zone 122. One role of a fast thermal quenching system is to rapidly and prolifically nucleate condensed particle formation, and also can be to briefly "freeze" the vaporized reaction products at a higher-temperature equilibrium level. The cooling rate of the plasma with vaporized silicon in the expansion nozzle 112 as it is expanded into the expansion zone 122 can be extremely fast—up to $1\times10^7$ or more degrees Kelvin per second. The plasma gas including silicon vapor exiting the plasma nozzle throat is cooled from a temperature in the range of from about 3000-4000° C., to a temperature in the range of from about 500 to about 1300° C. upon exit from the downstream end of the expansion zone defined by the expansion nozzle (which may also include the cooling effects of cold gas and/or surface-coating reactants introduced via conduits 132 into injection manifold 130 within the expansion nozzle). A similar downstream manifold 133 system may be used to introduce additional, or different gas, such as a silane for coating the particles as described further below. The nanosilicon particles produced are generally spherical, as is typical of thermal plasma processing. By varying the power, introduction rates of $SiCl_4$, silicon and inert gas (eg, Argon is typical for small thermal spray equipment, and hydrogen is beneficial for enhancing silicon surface properties via hydrogen surface termination), the throughput production rate and particle size can be varied over a relatively wide range. As discussed below, vaporization of silicon, aluminum, boron and mixtures thereof is useful for low-cost energetic particle manufacture, which may also be carried out with subsequent in-line coating processes. The particle size for a single pass through the system 100 may be controlled within a range of approximately 10 nm to about 150 nm, with the larger particle sizes being perhaps somewhat more difficult to achieve in high-speed flow, flash-cooled plasmas. An important separation mechanism applies the force generated on fast-moving electrically charged particles moving in a magnetic field having a field component orthogonal to the electric charged particle motion, by properly structuring the condensed(ing) particle processing system. The condensing/condensed particles formed upon rapidly cooling the vaporized mixture can be electrically charged by the processing in the electric arc, and or by subsequent (e.g. Corona) charging. The amount and polarity of the charge on the particles may be designed and applied by control of the polarity of the arc, the vapor components surrounding the particles, and/or the polarity of Corona emission into the particle stream. For example, vaporization of silicon and/or aluminum particles in a plasma arc system such as that of FIG. 1, in pure Argon as a plasma gas, can provide positively charged condensed silicon and/or aluminum particles which can be subjected to a turning force. In this regard, introduction of powdered silicon (and/or aluminum) in an argon gas stream introduced into the plasma torch chamber via conduit electrode 106 is subjected to extended vaporization heating in the plasma arc 112, then cooling condensation to nanoparticles in the expansion cooling zone 122. The silicon (and/or aluminum, ect) particles become positively charged, and the argon negatively charged in the vaporization arc. The powerful UV light generated in the arc 112 can also dislodge electrons to charge condensed particles by photoelectric electron emission and similar effects. A positive charge can remain upon the condensed particles upon condensation. By providing a magnetic field ⊙ as shown in FIG. 1 perpendicular to the direction of travel of the fast-moving charged particles condensed from the plasma in the expansion-cooling zone 122, they may be forced to move in a controlled direction by the Lorentz force F=qv×B where F is the force on the particle, q is the electric charge of the particle, v is the instantaneous velocity of the particle, and B is the magnetic field (vectors). The direction of the Lorentz force in the FIG. 1 illustration will be upward or downward, depending on the polarity of the magnetic field, and the "plus" or "minus" charge of the particles, as determined by Fleming's "Left Hand Rule". The magnetic field may be provided by permanent magnets, but preferably is provided by direct current magnetic coils on either side of the expansion nozzle. The current which drives the plasma arc 112 can efficiently be used to drive magnetic coils (not shown) on either side of the expansion-cooling zone to produce a magnetic field perpendicular to the plane of FIG. 1, and to the left-to-right travel of the condensed particles in FIG. 1. Suitable inert nonmagnetic ceramic wall 140, or nonmagnetic metallic construction of the system may be used in the zone of the magnetic field to facilitate the generation of the magnetic field. The strength of magnetic field within the condensed particle passageway perpendicular to the condensed particle velocity vector will preferably be at least about 25 milliTesla, and more preferably at least about 0.5 Tesla. The stronger the field, the larger the upward or downward force on the moving particles. The particle motion may be used to facilitate separation of particles, and/or displace them into different gas zones (as in FIGS. 7A and 7B). The flash-cooled discharge stream from the exit of the expansion zone of the system 100 of FIG. 1, comprising condensed silicon (or other particles such as Al, Al—B, Al—Si, Li—Si, Li—Si—Ti—Ca, Si—Ca, Si—Mg, Li—Si—Mg, Li—Si—C—B, Si—Al—Ca, etc) nanoparticles and entraining gas at a temperature of, for example, less than about 1300° C. can be further cooled if desired and processed by a nanoparticle collection system such as illustrated in FIGS. 2, 7, 8.

Figure 5A:
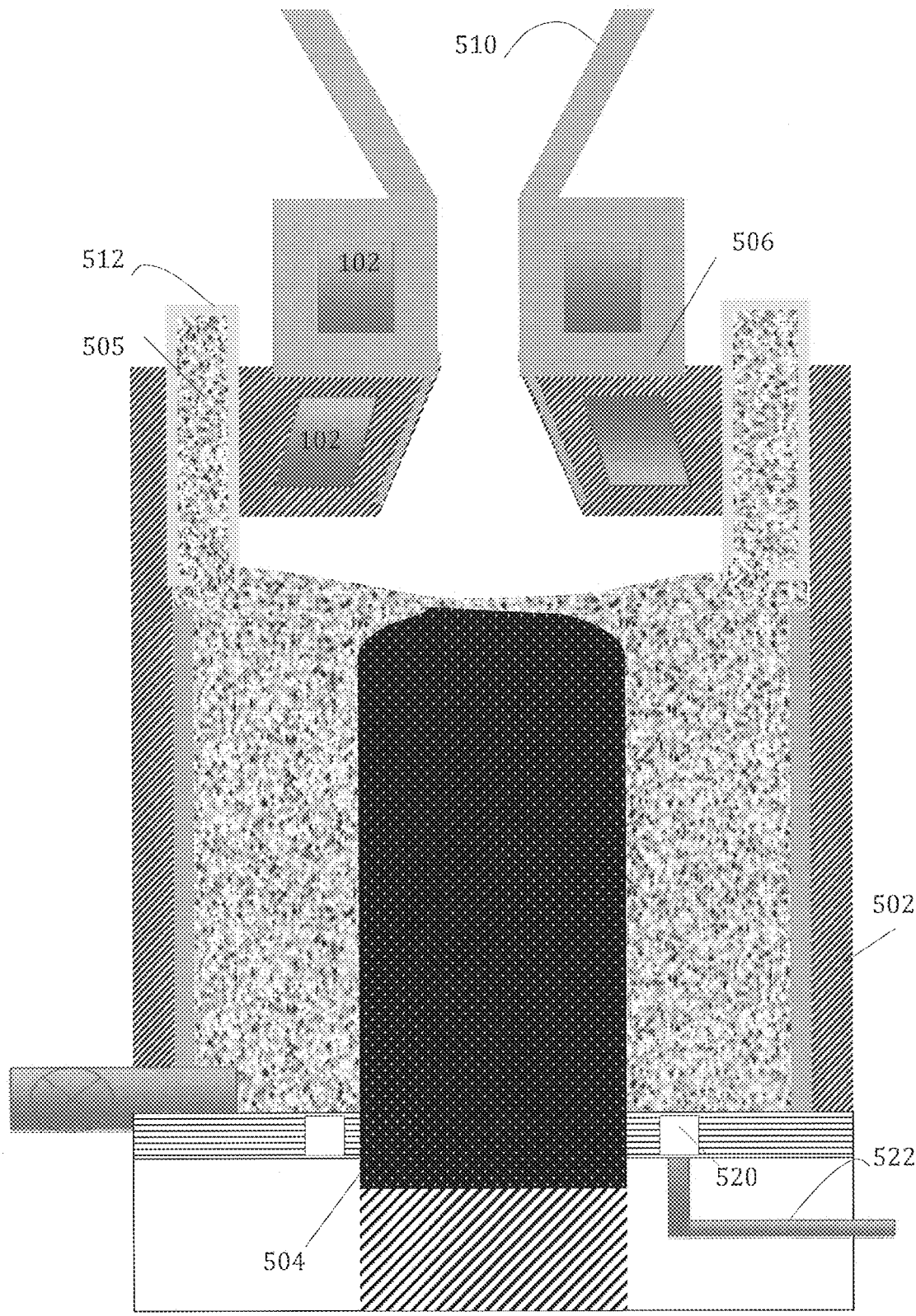
FIG. 5A is a schematic cross sectional view through the axis of another generally radially symmetrical embodiment of a plasma torch system for vaporizing silicon, together with an expansion and cooling nozzle, which is particularly adapted to pre-heat crude metallurgical silicon particulate solids to facilitate silicon vapor generation, which may include partial refinement of crude feedstock in the electrode chamber.
Figure 5B:
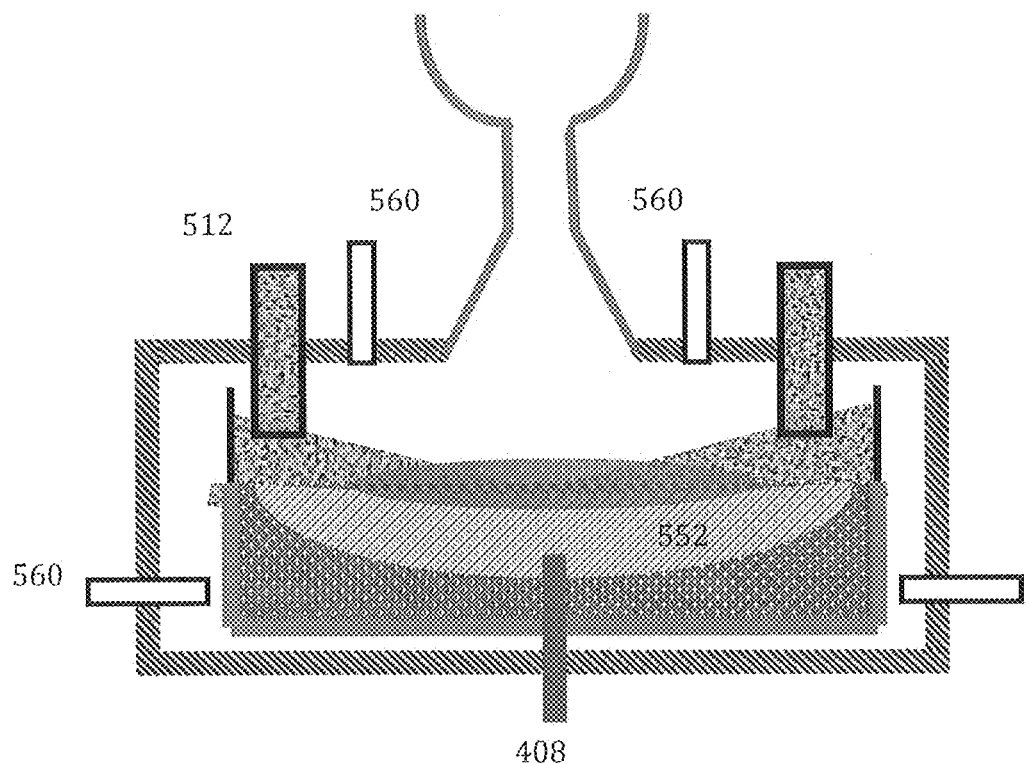
FIG. 5B is a schematic cross sectional view through the axis of another generally radially symmetrical embodiment of a plasma torch system for vaporizing silicon in carboreduction operation, together with an expansion and cooling nozzle, which is particularly adapted to pre-heat crude metallurgical silicon particulate solids to utilize "waste heat" for more efficient silicon vapor generation.
Figure 6:
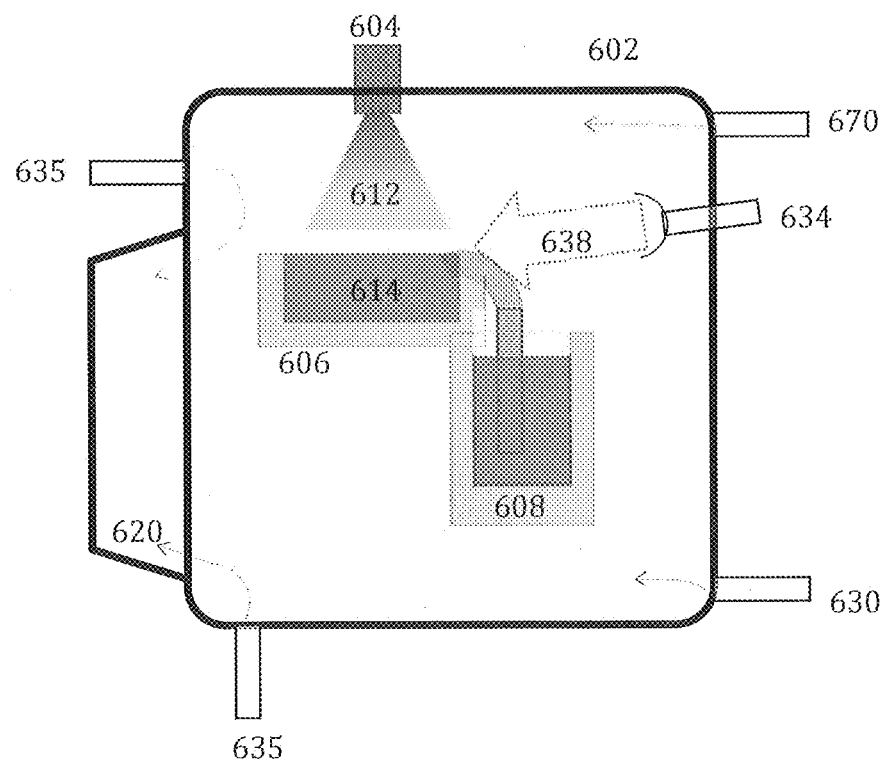
FIG. 6 is a schematic cross sectional side view of an embodiment of a vacuum electron beam furnace for vaporizing silicon, and removing silicon nanopowder precipitated by cooling and nucleation from the electron beam vaporized silicon.

Illustrated in FIG. 2 is a schematic process diagram of a hermetically closed manufacturing system 200 for separation of silicon nanoparticles. As illustrated in FIG. 2, the silicon nanoparticle manufacturing system 200 comprises a silicon nanoparticle stream generator 202 such as the nontransferred arc plasma gun and de Laval expansion nozzle of FIG. 1, a transferred arc plasma torch system 400 such as illustrated in FIG. 4, plasma solids processors 500, 550 with expansion discharge such as illustrated in FIG. 5A, 5B, or a vacuum electron beam system 600 such as illustrated in FIG. 6.

With reference to FIG. 2, the silicon nanoparticle generator 202 is provided with raw materials, power, cooling and process control via conventional plasma torch supply and control system 204. The nanopowder output stream from the nanoparticle generator may be continuously directed to a particle collection system 206 which further cools particle output, and separates vapor components (eg, $SiCl_4$ or $SiBr_4$ if used, impurity and other vapors, and inert gas such as argon and/or hydrogen) for recycle use. When used with a strong downstream vacuum system, the illustrated nanopowder separation means 206 may be operated under subatmospheric conditions, eg, in the range of from about 100 pascals to about 20 Kpascals, which can facilitate nanoparticle separation. However, silicon and other nanoparticles can be readily separated at atmospheric and superatmospheric pressures as well. Electrostatic precipitators and filters are useful for nanopowder collection. Centrifugal cyclone separators and other collectors which trap particles against a flowing fluid wall are efficient and useful for collecting a slurry of silicon or other nanoparticles for further processing. A high-boiling organic fluid which can serve as a reaction medium for surface chemistry modification of the silicon nanoparticles is especially useful for this purpose, and can efficiently facilitate collection, removal, transport, and subsequent formulation of the nanopowders into electronics, propellant or energetic munition compositions. For example, a high-boiling fuel such as RP-1 or melted paraffin wax can collect nanoparticles in the efficient, direct manufacture of propellants. High-boiling alkane paraffins, or less-expensive middle-distillate petroleum fractions (preferably desulfurized) with an atmospheric boiling point range of at least 250-350° C. are especially useful for direct cooling, collection, and separation of silicon and/or other nanoparticles in a cyclone or other liquid wall or spray separator. Paraffins which are solid at room temperature, such as primarily $n-C_{14}H_{30}$ to $C_{40}H_{82}$ alkanes, are readily melted for use as a cooling nanoparticle collecting spray or film useful in the vacuum environment of the collection system. The relatively inert paraffins may also serve as a reaction medium for hydrosilylation and/or surface-grafting polymerization reactions, as described herein to provide passivation and energetic oxidative surface interface area. Paraffins are excellent propellants, particularly for hybrid rocket engines[48]. Upon cooling the paraffin with silicon and/or other energetic nanoparticles suspended therein, the paraffin solidifies, producing a protective matrix for the energetic nanoparticles dispersed therein. Such paraffinic rocket propellants comprising, for example, from about 1 to about 30 weight percent silicon nanoparticles as described herein (based on the total weight of the propellant) may be directly cast into rocket motor casings, or stored in tankage until melted and pumped into a liquid rocket or scramjet/turbojet combustion chamber for use. For cast fuel use, strengthening agents such as polyethylene, and/or fluorinated or other energetic oxidizing polymers may be included in the propellant composition. Oxidizers such as ammonium perchlorate, ammonium dinitramide, trinitramide, etc. may be included in substoichiometric, finely divided powder form to reduce the amount of liquid oxidizer (eg, liquid oxygen) used in the rocket engine, and to facilitate rapid burning and surface dispersion of the paraffinic fuel containing the suspended silicon or other energetic fuel nanoparticles. Energetic nanoparticles which have a protective hydrogen, alkane/alkene and/or energetic fluorinated covalently-bound surface coating, and/or an energetic polymer or oligomer grafted to the nanoparticle surfaces, as described herein, are preferred as high-performance propellant components with high uniformity, compatibility, and storage stability in the paraffinic matrix. Low-boiling cooling and collection liquids may also be used where it is desirable to separate the Si-containing or other nanoparticles after separation from the gas stream from which they are condensed. For example, lithiated silicon particles may be collected in a low-boiling hexane liquid which may be easily removed from the collected particles by evaporation.

Some of the high-boiling hydrocarbon of a liquid-wall collector may be vaporized in a vacuum or high-temperature environment, but can be collected downstream. The collection-cooling fluid may also comprise or consist of an agent such as an alkene, alkyne, Grignard reagent, organometallic compound, ethylene or vinyl monomer which is reactive with the silicon nanoparticle surfaces. For example, silicon or other nanoparticles with hydrogen-terminated surfaces (Si—H) may be collected and reacted at an effective reaction temperature in a spray or wall film of a solvent comprising a fluorinated alkyne or alkene. One low-cost method to produce fluorine-containing monomers for surface grafting to silicon nanoparticles is to introduce micron-or-nanosize tetrafluoroethylene mono- or copolymer powder upstream of the particle collector 206, which is depolymerized in the hot gas stream, but can then thermally polymerize on H-terminated silicon nanopowders collected in the high-boiling hydrocarbon. At temperatures in the range of 200-300 C, the fluorinated monomers can graft to and thermally polymerize on H-terminated silicon nanoparticle surfaces, Chloride-terminated silicon nanoparticle surfaces (≡Si—Cl) may similarly be reacted with a spray or wall-film of a solvent comprising an alkyl Grignard reagent or lithium alkyl reagent, as will be described with respect to nanoparticle embodiments of FIG. 9. Multifunctional capping agents such as butadiene, effectively a 1-alkene can be grafted and copolymerized on silicon nanoparticle (and graphene and graphene oxide) surfaces to produce useful reinforcing particulates.

In the illustrated embodiment 200, a vacuum system or pumping system 210 withdraws the gases (such as $SiCl_4$, Argon and/or Hydrogen) separated by filter/separation system 206 from the nanoparticles through a cooled condenser 208 to remove materials such as $SiCl_4$ (and various other components if present) for recovery, purification and/or reuse. For example, the cooler-condenser 208 may cool the process gases to a sub-zero ° C. temperature to condense silicon, boron and aluminum halides, which may be re-distilled to separate the components for recycle use (eg, $SiCl_4$) or removal (eg, $AlCl_3$ and $BF_3$ when purified silicon nanopowder is desired as a product) from the system. The vacuum pump system 210 is desirably scaled to, and capable of, pumping to a vacuum of less than about 0.01 bar, and for some processing less than about 100 Pa in the interconnected nanopowder separator 206, cooler-condenser, and purification system 210 during operation of the nanoparticle generator 202. Recovered $SiCl_4$ or $SiBr_4$ gas (if used), or liquid may be purified prior to reuse, in accordance with conventional practice, such as distillation, when high purity silicon nanoparticles are desired. The optionally purified $SiCl_4$, Ar and/or hydrogen, and recovered reactants if any, are separated if appropriate and returned to the silicon nanoparticle generator 100, 400, 500, or 600. Coolant gas such as refrigerated methane, unreacted process components such as silanes or hexane coolant, introduced into the product gas stream upon or after flash expansion cooling, are easily separated from the argon or other inert process gases by conventional processes for recyclic use.

In an example of the operation of the plasma torch nanoparticle generator 100 and silicon nanoparticle collection system 200, raw feed components of FIG. 3A, 3F and the like (such as silicon particles and $SiCl_4$) are introduced under pressure into the plasma torch 100 of FIG. 1 through the central passageway 116 of cathode 106, or along the internal axis of the cathode 106 from the proximal end of the cathode. Alternatively, a powder feeder conduit 113 may be used for this purpose in a more conventional plasma torch design. To achieve vaporization of the silicon feed in a small torch such as that of FIG. 1, the silicon particles have a particle size (diameter or largest dimension) in the range of from about 2 to about 5 microns. As indicated in FIG. 3A, the silicon particles and silicon tetrachloride are metered together at a ratio of 4 moles of silicon particles to 1 mole of $SiCl_4$. Feeding the silicon particles and $SiCl_4$ is assisted by suspension with 0.5 to 2 moles of argon per mole of $SiCl_4$. An additional 1-4 moles of argon is introduced per mole of a SiCl4 into the proximal end of the plasma torch at the base of the cathode adjacent the interior wall of the anode to protect the (eg, nickel-sleeved or plated copper) interior surface of the torch from the harsh chloride environment. The silicon is metered into the plasma torch 100 at a rate in the range of from about 2 to about 5 pounds per hour at the molar ratio of 4 silicon to 1 SiCl4 to 2-6 moles Argon. The length of the anode throat in one embodiment may be for example about 2 cm, the axial length of the cooling-expansion nozzle is about 0.75-2 cm, the internal pressure in the plasma torch upstream of the nozzle throat is in the range of from about 1.5 to about 3 bar, and the pressure (vacuum) provided by the vacuum pump 210 (FIG. 2) at the downstream exit end of the nozzle 114 is in the range of from about 100 to about 2000 Pa. The plasma arc 112 is provided with sufficient power to heat the plasma constituents to a temperature in the range of approximately 3000° C. to 3800° C., which is sufficient to substantially fully vaporize the 2-5μ silicon microparticles as silicon vapor and silicon subchloride gases (FIG. 3A) or silicon (FIG. 3F). Upon passage through the expansion-cooling nozzle 124, the superheated gas stream is cooled over 2000 degrees centigrade to a temperature in the range of from about 700 to about 1200 degrees centigrade, and accelerated to supersonic speed of at least about Mach 1.5. Relatively cold argon or methane (eg, −80 to 50° C.) is introduced by the gas introduction manifold 130 into the periphery (or center by forced jet) of the gas stream in the expansion nozzle 124 to assist cooling and protect the expansion nozzle walls from condensation of silicon thereon (the expansion nozzle and the manifold 130 are illustrated in linear fashion for simplicity, but may desirably have a curved more-efficient de Laval surface). Passage of the superheated gas stream through the nozzle 114 and expansion-cooling with cold-gas assist therein takes less than $1 \times 10^{-4}$ second, such that the cooling rate is nominally at least about $1 \times 10^{7}$° C. per second, although the kinetic, vibrational and rotational energy is probably not fully equilibrated in this short time. Upon such rapid cooling, silicon undergoes extremely rapid and prolific nucleation and condensation to form silicon liquid and then solid nanoparticles (FIG. 9) at the reduced nanoparticle-containing stream temperature of about 700-1000° C.

In a subchloride thermocycle system, the silicon nanoparticles produced have chloride-termination at their surfaces. The supersonic stream of silicon nanoparticles, silicon chloride vapors and argon is conducted to the nanoparticle separator and collector 206 (FIG. 2) which may be a filter, dry cyclone, liquid wall and/or liquid spray cyclone, in-line momentum classifier, and/or electrostatic precipitator. The nanoparticles and the remaining argon and silicon chloride vapor retain significant thermal and kinetic energy upon entering the particle separator 206. In one embodiment, the silicon nanoparticles are cooled and collected by tangential passage around a liquid wall cyclone formed by continuously pumping a cooled fluid onto an externally-cooled internal cyclone wall. The liquid wall coating fluid may be a relatively high-boiling liquid comprising a Grignard reagent cooled to about 50-100° C., to react with and coat the surfaces of the silicon nanoparticles with a covalently attached protective alkane surface layer (FIG. 9). The coated nanoparticles may be washed, centrifuged and recovered in accordance with conventional practices.

After separation of the silicon nanoparticles, the argon and silicon chloride gas is conducted to a high surface area multi-plate cooler 208 maintained at a temperature of from about −30° C. to about 0° C. to remove silicon chloride, remaining solids, hydrocarbon if used in the particle collector 206, fluorinated monomer if direct surface hydrosilylation reaction is carried out in the collector 206, and other impurities and reaction products from the argon (or hydrogen if used instead of argon and/or silicon chloride) plasma gas. The silicon tetrachloride and/or other collected material may be distilled to remove impurities if desired, and recycled to the plasma torch input stream (FIG. 1) as appropriate. The argon gas is withdrawn through the cooler 208 to the vacuum pump system 210, filtered/purified if desired, and returned to the plasma torch input stream under appropriate pressure.

Other subhalides, such as silicon bromides and iodides, which are less reactive and less destructive toward plasma torch electrodes and other processing equipment, may also be used to assist full silicon vaporization. Illustrated in FIG. 3B is a calculated thermodynamic equilibrium for silicon and bromine at a molar ratio of 3:4 (2 Si+SiBr4), which may be heated in a nanoparticle generator such as 100, 400, 500 to a temperature greater than about 3000° C. with plasma gas and flash cooled to below 1000° C. as described herein.

As indicated, nanoparticles comprising both silicon and boron in intimate admixture have very high enthalpy of oxidation. In this regard, illustrated in FIG. 3C is a thermodynamic equilibrium chart for 2 moles of silicon, one mole of boron and 1 mole of silicon tetrachloride. Upon vaporization of silicon and boron particles (eg, 2-5 micron particles in the plasma torch of FIG. 1, or larger particles in the plasma torch 400 of FIG. 4) with silicon tetrachloride (with appropriate molecular hydrogen and/or argon plasma gas dilution as described herein to achieve the desired nanoparticle size), at a temperature above about 3200° C. in the plasma torch, followed by flash cooling of the vapor in the expansion zone to a silicon-boron condensation temperature below about 1400° C. (e.g., 1000° C.), silicon-boron nanoparticles are produced. The hydrogen, silicon tetrachloride and boron trichloride gasses can be separated from the nanoparticles, for example by a separation system similar to that of FIG. 2, and recycled.

With reference to FIG. 3C, it is noted that volatile boron chlorides are produced preferentially to silicon chlorides in a nanoparticle condensation and separation temperature range of for example, 1000° C. to 1400° C. Aluminum is similarly more reactive with halides such as chlorine and fluorine. This characteristic can be more pronounced for fluorides, as illustrated in FIG. 3E, which is a thermodynamic equilibrium chart for 2 moles of silicon with one mole of boron trifluoride. These characteristics may be used to purify silicon as will be described with respect to FIGS. 3 G-1 and 3G-2.

Illustrated in FIG. 3D is an equilibrium calculation for 2 moles of silicon and one mole of boron with one mole of silicon tetrafluoride, together with 0.25 mole of iron "impurity" and 0.25 mole of aluminum "impurity". Upon full vaporization of these components in this feed ratio with appropriate plasma gas in nanoparticle generator 100, 400, 500 or the like, and subsequent cooling to a silicon condensation temperature in the range of from about 900° C. to about 1400° C., intrinsically mixed silicon-boron nanoparticles are formed which are partially depleted in aluminum. Iron forms a silicide which is not as reactive with chlorine at low temperatures, which characteristic can be exploited to partially purify silicon in a preheating pre-reactor 500 such as illustrated in FIG. 5A.

Formation of silicon subhalides can facilitate and speed silicon vaporization. However, the nanosilicon particles produced will have at least some surface halide termination (even in the presence of hydrogen), which unless removed, tends to be less stable than hydrogen or alkyl terminated silicon surfaces. Silicon can also be fully vaporized with hydrogen (including hydrogen/argon mixtures) and then cooled to produce hydrogen-terminated silicon nanoparticles which are relatively stable under ambient conditions. In this regard, illustrated in FIG. 3F is a thermodynamic equilibrium calculation for a 1:1.5 molar ratio of silicon with molecular hydrogen over a temperature range of 500° C. to 4000° C. Silicon is fully vaporized at equilibrium above about 3000° C. at 1 bar, and can subsequently be flash-cooled as described herein (for example to a condensation temperature in the range of 700–1100° C.) to produce silicon nanoparticles which can have surface hydrogen termination. By utilizing a pure silicon powder (e.g. 2-5µ) feedstock and hydrogen-containing plasma gas with the nanoparticle generator 100 as previously described with the specified FIG. 3F components as feedstock, a pure silicon nanoparticle product is produced having Si—H surface termination. However, because of slower kinetics, somewhat higher temperatures, longer plasma residence time and/or somewhat smaller feed particles may be appropriate to achieve full vaporization of silicon particles in hydrogen in the absence of chlorine, in plasma torch such as 100 or the like. It is noted however that nanoparticle generator 400 has extended residence time in its transferred plasma arc, and also uses a secondary process to more efficiently vaporize silicon feed particles.

As indicated, vaporized silicon which condenses in a hydrogen-containing environment can attach hydrogen-terminating surface groups, which are relatively stable against surface oxidation in ambient storage, and which can participate in hydrosilylation reaction to covalently attach other storage-protective groups which may further be highly energetic in reaction with silicon at elevated temperatures. In this regard, FIG. 3F is a is a calculated thermodynamic graph of the equilibrium reaction products of one mole of silicon and 1.5 moles of hydrogen over a temperature range of 100° to 4,000° C. at one bar pressure. As illustrated by FIG. 3B, silicon can be substantially fully vaporized in hydrogen at temperatures above about 3000° C. To produce hydrogen-surface-terminated silicon nanoparticles in the plasma torch and expansion nozzle of FIG. 1, silicon particles may be vaporized and condensed as nanoparticles in hydrogen. The silicon particle feedstock to a nanoparticle generator such as 100, 400, 500 or the like, may be silicon metal (eg, greater than 95 wt % silicon, up to 5% impurities), metallurgical silicon (greater than 95.5 wt % silicon) or more purified silicon powder (e.g. greater than 99 wt % silicon). The impurities in the silicon feedstock may typically include oxygen, boron, phosphorus, iron and aluminum. If it is desired to produce silicon nanoparticles having significantly higher purity than the silicon feedstock, small amounts of hydrogen chlorides and/or and fluorides may be introduced with the feedstock. Aluminum and boron subfluorides have greater negative enthalpy than silicon subfluorides at high temperatures. Boron also reacts preferentially with oxygen and hydrogen to form volatile oxides and hydro-oxides. Such subfluorides and/or hydroxides are relatively more volatile than silicon and can be separated into the gas phase upon collection of the purified silicon particle product.

Very high purity silicon nanoparticles can be achieved with high-purity silicon feed into the process. In addition, halide and oxygen/hydrogen reactions can be used to remove impurities, as previously described. For example, small amounts of $SiF_4$ introduced into the plasma can preferentially remove boron, aluminum and other impurity elements which more strongly bond to fluorine than does silicon at preselected separation temperatures utilized in the processing. Relatively volatile boron-hydrogen-oxygen compounds are also preferentially removed during condensation and collection of vaporized silicon. Such "impurities" originally present in the silicon feed can be preferentially removed with silicon halide or other vapor when it is separated from the silicon nanoparticles. In this regard, the separated vapor components are accordingly enriched in "impurities" such as aluminum and boron, which may be removed by appropriate purification processes such as fractional distillation before recycling.

As indicated, high silicon purity is not important, and may even be deleterious, for energetic nanoparticle products primarily utilized for thermal oxidation energy purposes. However, high silicon purity is very important for electronic, optical and solar energy applications. It is especially important to remove impurities such as aluminum, boron and phosphorus which are electronic dopants for silicon. In this regard, illustrated in FIGS. 3G-1 and 3G-2 is a thermodynamic equilibrium calculation for a raw material feed of for moles of silicon, 3 moles of molecular hydrogen, 0.025 mole of aluminum "impurity", 0.025 mole of boron "impurity", and 0.1 mole of silicon fluoride impurity "getter" under vacuum conditions of 0.01 bar (1 kilopascal, Kpa). FIG. 3G-1 shows the proportional range of major equilibrium species over the 500-4000° C. temperature range. FIG. 3G-2 shows the proportional range of minor species over the temperature range of 900° C. to 1500'° C. which includes a cooled vapor particle-forming silicon condensation range of 900° C.-1400° C. It is noted that the boron preferentially forms volatile BHF (and other volatile fluorides) and that aluminum preferentially forms aluminum fluorides and chlorides. Aluminum fluorides have high melting and vaporization temperatures (AlF3 sublimates at about 1000° C. at 1 bar, less at 0.01 bar), but at low pressure (vacuum) exhibit sufficient vapor pressure upon flash cooling. Small amounts of chloride (eg, SiCl4 at for example half the molar quantity of SiF4) can facilitate maintaining preferential aluminum vaporization as mixed aluminum fluoride-chlorides. Further, it is noted that substantially all of the boron and aluminum are present as halide vapor species in an 800° C.-1300° C. temperature range, while most of the silicon is condensed. Phosphorus, another highly undesirable silicon dopant impurity, is itself relatively volatile and is also preferentially removed from the condensing silicon, and preferentially enriched in the cooled plasma gas for separation from the purified silicon condensed particles[49]. As an example of a pure silicon nanoparticle production process, metallurgical silicon may be zone-refined to partially remove impurities, and the zone-refined silicon containing aluminum, boron and phosphorous impurities at levels less than 0.025 wt % is pulverized and processed in a nanoparticle generator 100 of FIG. 1 or 400 of FIG. 4. The zone-refined, pulverized silicon feedstock with 0.02 wt % boron, 0.02 wt % aluminum and 0.01 wt % phosphorous impurities, based on the total weight of the raw silicon feed, is fed into the plasma torch vaporizer(s) 100, 400 at a ratio of 4 moles of silicon to 3 moles of hydrogen gas, which may be varied to produce silicon particles of desired size. The zone-refined silicon particles are vaporized in the plasma arc at a temperature above 3200° C. in a hydrogen plasma stream further containing 0.2 wt % $SiCl_4$ and 0.15 wt % $SiF_4$ based on the total weight of the raw silicon feedstock fed into and vaporized in the plasma arc. The plasma torch cathode chamber is operated at a pressure of about 3 bar, the expansion pressure (vacuum) at the downstream end of the expansion nozzle is about 0.01 bar, and the plasma is flash cooled by a 5:1 expansion ratio in the de Laval-type expansion nozzle and manifold introduction of cold hydrogen gas, to a temperature of about 1100° C. The hydrogen flow rate is adjusted as needed to maintain an efficient plasma flow and a desired particle size in the range of 20 to 90 nm. In operation, upon vaporization and subsequent flash-cooling of the impurity-containing feedstock, a predominant majority of purified silicon (see FIG. 3G-1) condenses at temperatures below about 2000° C. and solidifies below about 1400° C. for separation from the remaining boron, aluminum and silicon fluoride/chloride and hydrofluoride gases (see FIG. 3G-2). Phosphorous, as $P_2$ gas, is also volatilized and separated from the condensed silicon. The purified silicon nanoparticles collected in a separator system such as that of FIG. 2 are at least 90% and preferably at least 99% depleted in aluminum, boron and phosphorous impurities as compared to the feedstock. The impurity-rich gases separated from the purified silicon particles may be collected in a cooler such as 208 of FIG. 2, distilled/separated, into desired components or recycled as appropriate. In plasma torch production of purified silicon, the plasma torch, expansion nozzle and piping interior surfaces should be cooled by external coolant to a temperature below 500° C., and preferably below 350° C., may have silicon components, electrodes or coatings, and/or may have argon and/or hydrogen gas flow shields to protect against vaporization of impurities into the vaporized silicon stream. In this way, a raw, relatively impure silicon feedstock may be highly purified. Repeat cycles can further purify the silicon product. For example, the once-purified silicon may be melted and zone-refined in an ingot mold such as illustrated in FIG. 6, the zone-refining tail with the concentrated impurities removed, and the fragmented zone-refined silicon washed and recycled through the plasma purification process.

As described with reference to FIGS. 9D and 9E, nanoparticle embodiments of core-shell nanoparticles may be provided in accordance with the present disclosure, including nanoparticle (including aluminum, aluminum/silicon, aluminum boride and aluminum carbide) cores having a nanosilicon shell to protect the aluminum-containing cores from oxidation. The nanoparticle aluminum may be produced in any suitable process[50], although it is noted that it is conventionally difficult to produce aluminum nanoparticles without an oxygenated surface because of its extreme reactivity. In this regard, FIG. 3H is a thermodynamic equilibrium chart for aluminum and molecular hydrogen feed components over the temperature range of from about 500° C. to 4000° C., illustrating the relative ease of vaporizing aluminum. As a specific example, upon feeding and vaporizing micron-scale (eg, 5-30 micron) aluminum powder and hydrogen (or spraying molten aluminum under atomizing conditions) into a nanoparticle generator such as 100, 400 or 500 in the feedstock proportions of FIG. 3H, the aluminum may be substantially fully vaporized at temperatures above about 2800° C. in the plasma torch chamber at, for example, a 2-5 bar torch internal operating pressure, such as described herein with respect to the systems of FIGS. 1, 2, 4 and 5. Other flash vaporization and cooling systems and processes may also be used. Boron may similarly be included with the aluminum in the feedstock, to produce $AlB_2$, which is also a highly-energetic nanoproduct. Alkali metals such as calcium may be readily vaporized with, and subsequently condensed with the aluminum to produce Ca—Al materials with higher melting points than pure aluminum[51], which are also useful per se as battery and hydrogen-generating materials. Silicon may also be mixed with the aluminum core material by co-vaporization and condensation with the aluminum vapor. Aluminum nanoparticles are formed by flash-cooling the aluminum and hydrogen vapor to below the melting point of aluminum nanoparticles (eg, to a temperature below 450° C.-550° C.). By flash cooling with de Laval expansion and cold hydrogen and/or cold argon or other gas injection into the plasma expansion zone (eg, via input manifold and jets 130, 132 at a pressure (vacuum) of 0.01 bar at the downstream end of the de Laval expansion nozzle of the systems such as those of FIG. 1, 4, or 5 in an oxygen-free environment, highly surface-reactive aluminum nanoparticles are formed, which may be collected in the oxygen-free apparatus of FIG. 2 for coating with a silicon surface shell. An inexpensive cooling gas such as methane may be used instead of hydrogen, but may produce some $Al_4C_3$ with aluminum at higher temperatures, which is not particularly harmful for energetic aluminum particles and in any event facilitates their use as a propellant with water as an oxidizer. Silane may desirably be used as a cooling gas to efficiently coat the aluminum-based particles with a thin silicon coating, as described hereinafter. The metallic aluminum surface can facilitate the crystallization of a silicon layer deposited thereon. The aluminum nanoparticles may be separated by appropriate separation means such as separator 206, with scrupulous exclusion of oxygen and moisture as in all these processes. The aluminum nanopowder suspended in hydrogen (and/or argon or the like) may be transferred directly in the absence of oxygen to a silicon-coating reactor such as reactor 800 of FIG. 8, to deposit a 3-20 nm silicon coating thereon via silane decomposition, to produce core-shell nanoparticles such as illustrated in FIG. 9D.

Similarly, aluminum nanoparticles may be manufactured by rapid heating and flash cooling of aluminum alkyls. Rapidly heating aluminum alkyl source material to a decomposition temperature in the range of from about 400 to about 1000° C. within a heating time of less than 1 second to decompose the aluminum alkyl source material to form aluminum powder in a vapor stream, and fast-quenching the aluminum vapor within $1\times10^{-4}$ second can be employed to form oxide-free, less than 100 nm diameter aluminum-based nanoparticles. The nanoaluminum particles may be coated with silicon via silane decomposition, and protective groups may be covalently attached to the silicon surface by hydrosilylation reaction or the like. Aluminum alkyls such as triethyl aluminum triisobutyl aluminum, diethyl aluminum hydride, and diisobutyl aluminum hydride are also useful raw materials for manufacture of aluminum-based energetic nanoparticles in accordance with the present disclosure. Aluminum alkyls such as the triethyl aluminum dimer (which dissociates to the monomer at above-ambient temperatures) are readily and economically manufactured in bulk by simple reaction of alkene with aluminum in the presence of hydrogen:

$2Al+3H_2+6\ C_2H_4 \leftarrow\rightarrow Al_2Et_6$ (aluminum triethyl dimer)

Triethyl aluminum is a liquid which has a relatively low boiling point of about 186° C. at 1 atmosphere, which makes it ideal for introduction into a higher-temperature thermal decomposition zone. Commercial triethyl aluminum contains higher alkyls, such as propyl and butyl components, which also have relatively low boiling points. For example, the $Al(n-C_3H_7)_3$ boiling point is abut 193° C. and the $Al(i-C_4H_9)_3$ boiling point is about 214° C. at 1 atmosphere. The reaction is reversible or quasi-reversible to form aluminum and hydrocarbon at temperatures above about 350-400° C.[52], such that aluminum metal powder can be produced by rapidly heating aluminum alkyl vapor to decompose it, under strong nucleation conditions for formation of aluminum powder such as provided by systems and processes illustrated by FIGS. 1, 2, 4. In this regard, significantly less thermal energy is used to manufacture aluminum nanoparticles using aluminum alkyl feedstock, as the feedstock is typically flash-heated to only a temperature in the range of from about 350 to about 750° C., rather than a metallic aluminum vaporization temperature. The aluminum alkyl may be introduced into a hot gas or plasma stream in proportions to provide the desired decomposition temperature, followed by de Laval expansion to cool the nucleating aluminum particles. The aluminum particles may be subsequently coated with silicon to produce Al—Si core shell particles of the present disclosure.

Al—Si core-shell particles are important energetic materials of the present disclosure. They are highly energetic, and more stable than aluminum nanoparticles. Such aluminum core-silicon shell nanoparticles may be further coated with a passivating and/or reactive organic coatings as described hereinafter.

Silanes readily decompose at elevated temperatures to form and coat solid silicon particles[53] which can be of relatively high purity. A homogeneous first-order rate constant $K_{homogenous}$ for diluted silane decomposition to condensed silicon and hydrogen gas may be roughly approximated as:

$K_{homogeneous}=2.0\times10^{13}\ exp(-51,700/RT)$

A heterogeneous decomposition rate constant $K_{heterogeneous}$ of diluted silane to Si and $H_2$ for a fixed particle bed of relatively large (>1 micron to 10 s or even 100 s of microns diameter) may be approximated as:

$K_{heterogeneous}=5.14\times10^9\ exp(-38,800/RT)$

In a stream of condensing and condensed aluminum, silicon, boron, calcium or the like nanoparticles (eg, Al—B, Al—Ca, silicon-aluminum) such as produced by fast vapor cooling in accordance with the present disclosure, the heterogeneous decomposition of silane(s) onto the nanoparticles is more favored than onto greater-than-micron-size silicon particles. The surface area, number of aluminum particles per silane decomposition zone volume, and the average and the maximum distance of decomposing silane molecules from an aluminum-core condensed particle surface are generally at least an order of magnitude more favorable for heterogeneous surface deposition of silicon onto the aluminum nanoparticles than onto a micron-sized fluidized particle bed. Incipiently-formed homogenous-decomposition silicon nuclei are also more readily scavenged and incorporated onto the surfaces of the aluminum-core nanoparticles. Greater than 95 wt % of the silicon from silane decomposition may be deposited as surface layers on the aluminum nanoparticles. These silicon surface layers are typically hydrogen-terminated, which is desirable for both storage stability, and for subsequent hydrosilylation reaction as described herein.

As indicated, the decomposition rate of the silane is dependent on the temperature in the silicon-coating zone. Desirably, the temperature in the silicon-coating zone is in the range of 550-650 C for pure aluminum nanoparticles during at least the latter part of the coating deposition processing. For aluminum-silicon nanoparticles (which may also contain B and/or C), comprising at least about 5-10 wt % silicon, a low-melting eutectic does not form. Below about 550 C, silane coating is slow, and may not form a continuous relatively impervious protective layer on the aluminum nanoparticles. Aluminum is molten above ~660° C. (perhaps lower for nanoparticles), so can more readily form a eutectic with silicon which may require more silane-deposited silicon to form a continuous layer protect and passivate the nanoparticle surfaces as the nanoparticles cool further. However, aluminum nanoparticles containing other energetic materials, such as Ca, boron, (and greater-than-eutectic amounts of silicon) can begin to solidify at higher temperatures above ~660° C., at which silane decomposes more rapidly. A particularly useful energetic nanopowder is formed as a blend of aluminum and silicon. Aluminum and silicon do not form stoichiometric compounds of a type which lose significant amounts of enthalpy (as do silicon-boron, aluminum-boron, aluminum-carbon and silicon-carbon compounds upon formation) so their respective oxidative enthalpies are maintained in the resulting mixed-element energetic nanopowders. Molten silicon-aluminum blends may be readily formed into powders for vaporization by conventional atomization processes used for aluminum and silicon separately (and as described herein). Molten blends may also be solidified and comminuted to form powders which can be vaporized herein. Aluminum and silicon source materials may also be separately provided in predetermined raw material ratios for vaporization to produce desired aluminum-silicon particle products. Weight ratio blends of silicon and aluminum ranging from 1:99 to 99:1 aluminum:silicon are useful. Preferable ranges are 5:95 to 95:5, and more preferably 1:3 to 3:1 weight ratio of aluminum to silicon in the condensed powder product particles.

High silane decomposition temperatures, especially when the silane is not diluted with inert gas, can conventionally produce excess homonucleated pure silicon "fines". However, it is noted that because of the high number and volume density and surface area-to volume ratio of condensing(ed) aluminum nanoparticles, the silane decomposition temperature may be relatively high (eg, 700-1000 C) while maintaining deposition on the aluminum nanoparticles without excessive "fines" generation. Introduction of silane at a temperature of 650-1000° C. for the extremely brief time in the high-speed nanoparticle stream, followed by cooling below 600-650° C. can produce silicon-coated aluminum nanoparticles of high stability. There is little time for thorough mixing of liquid aluminum with surface-deposited silicon, even on the nanoscale level.

The temperature of the aluminum nanoparticle expansion stream at the zone(s) of introduction of the silane-containing gas(es) may be adjusted as described herein. In this regard, the temperature at which the aluminum is vaporized is readily adjusted by plasma arc power level, and amounts of inert gas and aluminum feed stream in the respective plasma vaporization system. Because of its low vaporization temperature, the plasma vaporization stream for aluminum vaporization may be at a relatively lower temperature compared to that utilized for a similar vaporization of silicon which has a much higher vaporization temperature. The temperature of the condensing aluminum nanoparticles may also be adjusted as described herein by controlling the expansion cooling conditions of the de Laval or similar expansion zone, and the introduction of cooling gas (if used) into the expansion-cooling zone or subsequent zone(s). For example, the aluminum-nanoparticle-forming expansion zone may be cooled to a temperature in the range of from about 700 C to about 1100 C by expansion and introduction of cool/cold hydrogen or argon (eg, via manifold 130 of FIG. 1). Cool silane or silane containing gas may also be introduced into the aluminum nanoparticle containing gas stream (eg, via a downstream manifold similar to that of manifold 130), with sufficient mass and thermal sink capacity to cool the stream to a temperature below the melting point of the aluminum (or aluminum mixture/alloy) nanoparticles. The silicon-coated aluminum nanoparticles stream may be further cooled, if necessary, by additional cool/cold gas such as hydrogen or argon for collection of the solidified, silicon-coated aluminum nanoparticle product.

Silane manufacture from silicon is well commercialized. And silicides useful for silane generation for coating use herein, such as magnesium disilicide, are readily manufactured by the exothermic reaction of silicon with alkali/alkaline earth metals, such as the reaction of silicon with magnesium[54]. Silanes are generated upon reaction of alkali and alkaline earth silicides with acids such as hydrochloric acid. For example, industrial grade silane, $SiH_4$, is readily produced by reaction of $Mg_2Si$ with HCl gas or solution:

$Mg_2Si+4HCl=>SiH_4(gas)\uparrow+2\ MgCl_2$

There is no need to remove higher molecular weight (condensed) silanes, because they are also useful for silicon coating of nanoparticles. Chlorosilanes which may be produced as byproducts can be removed by vapor-phase reaction passing through solid alkali/alkaline earth oxide/hydroxide beds if desired, but also may be used in some silicon coating processes in which chlorotermination of product particles is permissible or desirable (eg, for subsequent Grignard reaction as described herein). The $MgCl_2$ formed may be recycled for conversion to magnesium metal and/or magnesium silicide. The silane(s) may be used directly as a cooling gas by injection into the flash-cooled stream of aluminum at a temperature which decomposes the silane onto the aluminum particles. For example, aluminum vaporized at a temperature greater than 2000 C (e.g. 2500-3000° C.) in an apparatus such as illustrated in FIGS. 1, 3, 4, 5 can be rapidly cooled as described herein by expansion (and/or cold gas injection) to a temperature less than about 1100° C. (eg. 600-1000° C.). A cooling gas such as argon and/or hydrogen with silane can be injected into the condensed(ing) aluminum stream in mass proportion to reduce the temperature of the aluminum particles and the entraining blended gas stream to a temperature below the melting point of aluminum and silicon-aluminum eutectic, and at which the silane is decomposed to silicon and hydrogen, (eg, 470-580 C). Preferably, the mass ratio of silane to the condensed aluminum particles is adjusted to a deposit a continuous, dense layer of silicon onto the particles having a thickness in the range of from about 2 to about 20 nm, and more preferably for many energetic products, from about 3 to about 10 nm, on the outside surfaces of the condensed aluminum particles. It is noted that the UV light can activate particle surfaces, and assist the decomposition of silane, to facilitate silicon surface formation on condensed nanoparticles. The silicon-coated aluminum particles are preferably terminated by hydrogen surface groups (eg, by condensation in a hydrogen atmosphere) which may be further, subsequently reacted with alkenes, alkynes, amines, etc. as described herein to produce passivated and/or exceptionally energetic surface moieties.

Elevated temperature supercritical deposition of silicon onto nanoparticle cores is also a useful way to deposit crystalline protective shells around low-melting nanoparticles such as aluminum nanoparticles. For example, a dispersion of aluminum nanoparticles (without a surface oxide) in a high-boiling inert fluid such as high-boiling alkanes/paraffins or an inert supercritical fluid such as propane or hexane, together with a thermolytically degradable silane such as $SiH_4$ or cyclopentasilane sufficient to deposit a silicon layer at least 2 nm thick on the aluminum nanoparticles under the reaction conditions (eg, 5 wt % of the weight of 50-100 nm aluminum nanoparticles) may be pumped in a continuous flow-through system (to a pressure of at least 375 bar for supercritical hexane), then heated in a heating zone to 450-500° C. for 2-10 minutes with sonication or turbulence/stirring, then cooled and depressurized. Propane has lower supercritical pressure requirements than hexane, for example, and is readily separated from the treated nanoparticles. A UV light source may be used to irradiate the suspended aluminum nanoparticle-silane mixture in the reaction zone to facilitate silicon deposition, and subsequent hydrosilylation reaction. A hydrosilylation reactant may be introduced (under pressure) into the reaction stream during cooldown, to further passivate the new silicon surface with alkane or fluoroalkane functional moieties. Other silanes such as CH3SiH3, H3SiBr, etc, hydrosilylation agents and/or reducing agents may be included in the reaction mixture. The resulting core-shell nanoparticles may be separated from the solvent fluid for energetic applications such as propellant or explosive composites. They have an energetic aluminum core 922, and a continuous, adherent protective yet energetic crystalline silicon shell 932 which may be H-terminated for modest passivation, or further capped with an alkane or fluoroalkane coating for more substantial shelf-stabilizing passivation as described herein.

Core aluminum or other nanoparticles may also be reacted with silanes, hydrochlorosilanes and/or SiCl4 with thermolytic silicon precursor decomposition or with a reducing agent in a variety of other ways to provide a continuous, adherent protective silicon coating on the core nanoparticles[56]. When using chlorosilanes as a silicon shell-forming agent, the reactivity of aluminum with silicon halides may be minimized by first introducing a reducing agent into the reaction mixture with the aluminum nanoparticles before introducing a halogenated silicon reactant. In this way, a surface adsorbed layer of reducing agent on the aluminum nanoparticle surfaces can preferentially reduce the halosilane onto the metallic aluminum surfaces to provide a protective layer during further silicon deposition thereon. Aluminum nanoparticles, such as formed herein or by other production processes without a surface oxide layer, may be dispersed in an inert solvent containing a reducing agent capable of reacting silicon halides, such as di-isobutylaluminum hydride (DIBAH), LiAlH4 triethyl aluminum, sodium napthenate, LiBu in RP-1, high-boiling alkanes, paraffin, etc. heated under pressure to 400-500° C. with addition of thermolytically decomposable silicon precursor such as $SiH_4$ and/or a thermal or reduction-reaction precursor such as $SiCl_4$, $SiBr_4$, $HSiCl_3$, etc. High temperature facilitates crystallized silicon shell formation, although crystallized silicon can also be produced at lower temperatures. The reducing agent(s) may be titrated into the reaction mass with additional silicon precursor. When using Si—H group-containing agents, the core-shell nanoparticle reaction products may be further hydrosilylated by reaction with a hydrosilylation reactant as described herein. After reaction, the core-shell nanoparticles may be separated, washed/cleaned and formulated into propellant, explosive or other energetic compositions. There is a need for combustion enhancement of liquid fuels via nanoparticle additions[57] to increase the overall energy content of base fuels[58]. A polymeric fuel of a solid ramjet comprising such nanoenergetic metal particles may theoretically provide a better energetic performance of the motor together with increased fuel loading[59]. The nanoparticulate energetics of the present disclosure may desirably be incorporated in such fuels and propellants at levels from about 3 to about 35 or more weight percent (based on the total weight of the fuel or propellant composite).

Shell deposition around a core nanoparticle using silane SiH4 as the silicon precursor, in a RP-1, kerosene or paraffin suspension medium, preferably with hydrosilylation capping, is attractive for propellant manufacture, because the cooled reaction suspension (eg, after mild vacuum treatment) can be the finished product. Similarly, grafting of butadiene, and butadiene oligomers and polymers (including copolymers and hydroxyl-functional grafts) are desirable for crosslinked ("cured) plastic explosives and propellants[60]. Stored in paraffin, compatible passivated energetic nanoparticles with organic surface groups enhance the matrix to provide a storage-stable, powerful energetic propellant. In this regard, a nanoparticle-containing propellant 980 is illustrated in FIG. 9G.

Figure 9A:
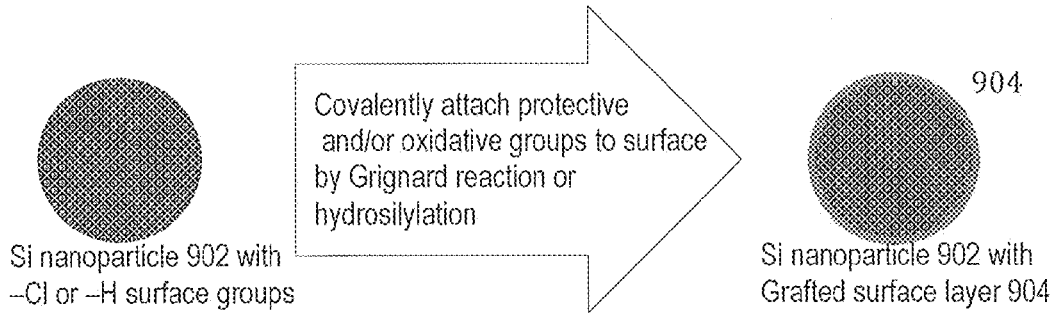
FIG. 9A is a schematic illustration of embodiments of Grignard, metallo-organic and hydrosilylation surface reactions of silicon nanoparticles having halide or hydrogen surface groups, to produce silicon nanoparticles with covalently bonded protective and/or energetic surface coatings.
Figure 9B:
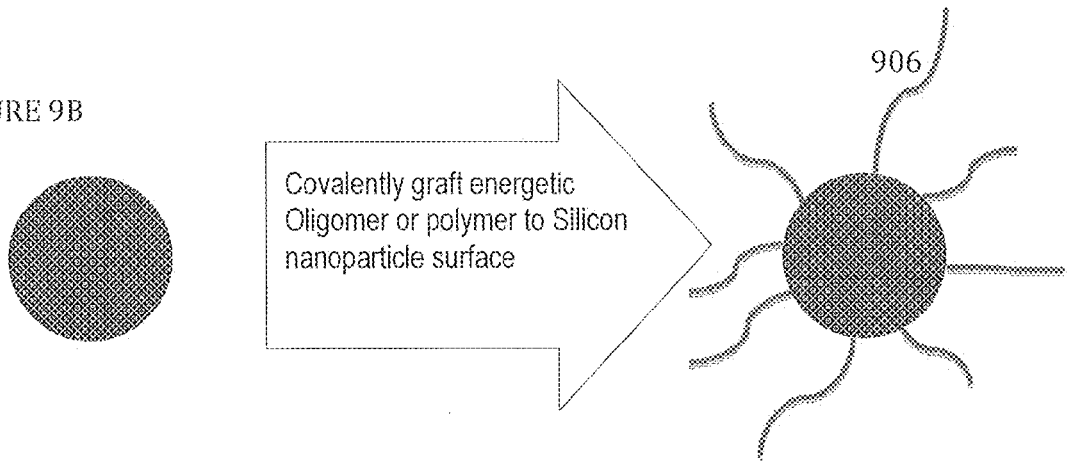
FIG. 9B is a schematic illustration of embodiments of polymerization reactions onto, through or from the surfaces of silicon nanoparticles to produce silicon nanoparticles having covalently bonded surface polymers such as energetic fluorine- and nitrate-containing polymers.
Figure 9C:
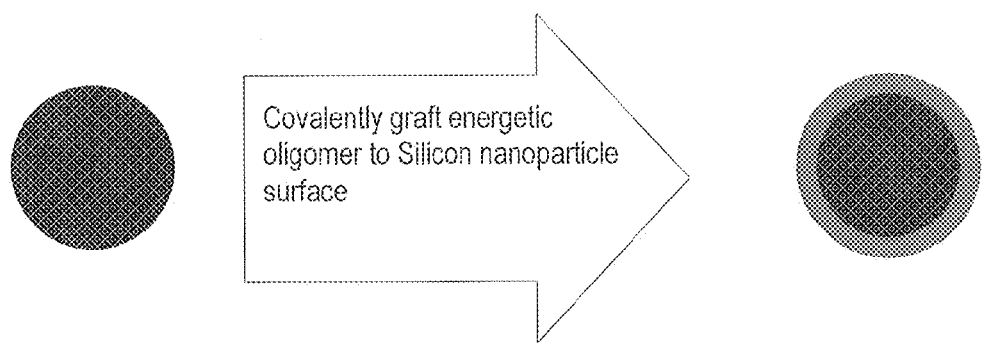
FIG. 9C is a schematic illustration of the production of multilayer inorganic nanoparticles having covalently bonded protective and/or energetic surface coating.
Figure 9D:
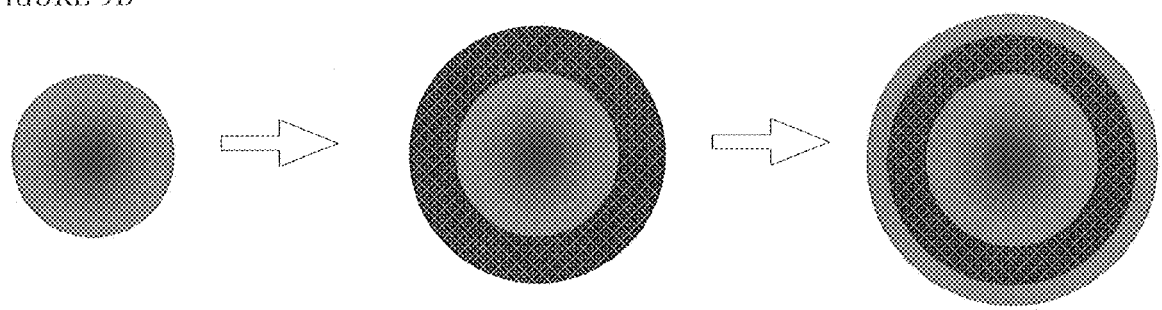
FIG. 9D is a schematic illustration of the production of silicon-coated aluminum nanoparticles having a covalently bonded protective and/or energetic surface coating.
Figure 9E:
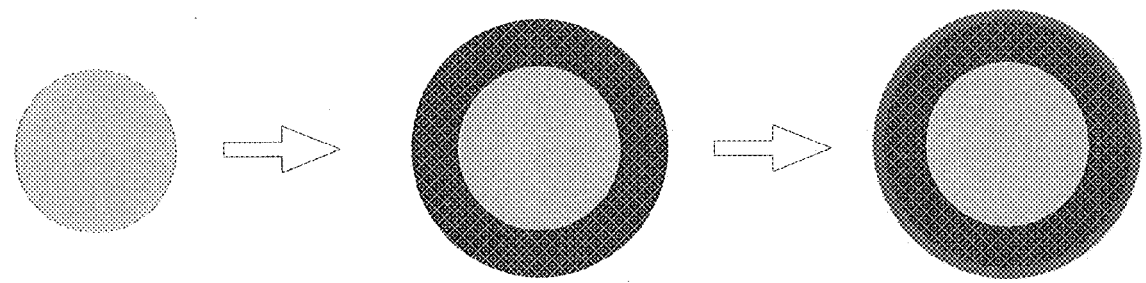
FIG. 9E is a schematic illustration of the production of silicon-coated aluminum nanoparticles having a covalently bonded protective and/or energetic surface coating.
Figure 9F:
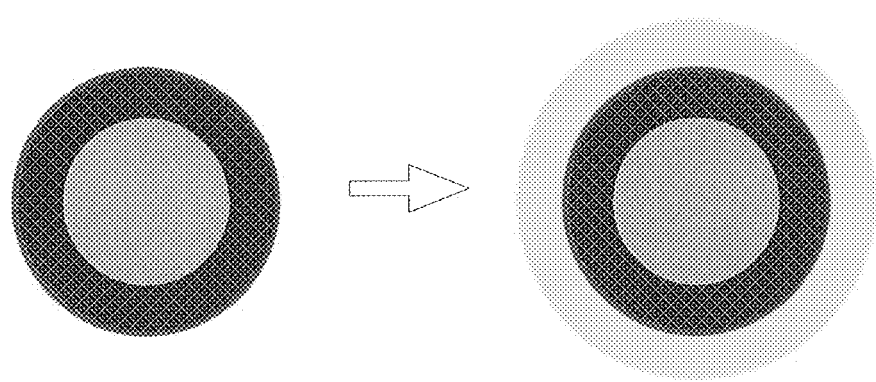
FIG. 9F is schematic illustration of attachment of reactive oligomers to energetic nanoparticles to produce materials for composite crosslinking.
Figure 9G:
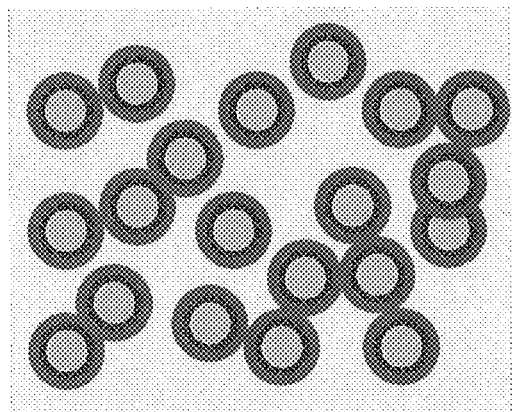
FIG. 9G is a cross sectional view of a fluid propellant comprising fluidized energetic silicon nanoparticles suspended in a liquid or gelled propellant.
Figure 9H:
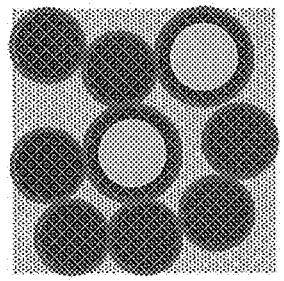
FIG. 9H is a cross sectional view of a solid composite energetic material comprising silicon nanoparticles dispersed within an energetic matrix.

A solid composite propellant 990 containing energetic nanoparticles in accordance with the present disclosure is illustrated in FIG. 9H. Solid composite propellants utilizing silicon-based and/or silicon-coated nanoparticles 992 may be manufactured, for example, by blending a mixture containing a liquid polyol polymer (from 5% to 15% by weight), a finely comminuted oxidizing charge of ammonium perchlorate, ammonium dinitramide (ADN), trinitramide (TNA) or similar solid oxidant (from 40% to 80% by weight), silicon nanoparticles (from 5% to 20% by weight), at least one agent for crosslinking the liquid polyol polymer (eg, with a bridging ratio between 0.8 and 1.1), at least one plasticizer and at least one additive (said crosslinking agents, plasticizers and additives being present in the mixture at less than 5% by weight, placing the mixture a mold (which may be a rocket casing), and crosslinking the mixture in the mold to form a solid energetic composite propellant. Aluminum particles such as described herein and energetics such as HMX, RDX, high-oxygen-balance explosives, candoluminesents and/or additional oxidizing agents may also be included in the composition. High density energetic halothermites may also be incorporated, as described below.

The polyol polymer may be a hydroxytelechelic polybutadiene, and the crosslinking agent may be a polyisocyanates such as an alicyclic polyisocyanate such as conventional dicyclohexyl-methylene diisocyanate (MCDI). The plasticizer may be a conventional plasticizer such as dioctyl azelate (DOZ), diisooctyl sebacate, isodecyl pelargonate, polyisobutylene and/or dioctyl phthalate (DOP), or an energetic plasticizer. The solid propellant may further comprise a variety of additives such as bis(2-methylaziridinyl)methylamino-phosphine oxide (methyl BAPO) or triethylenepentamineacrylonitrile (TEPAN), antioxidants such as di-tert-butyl-para-cresol (DBC) and/or 2,2'-methylene-bis(4-methyl-6-tert-butylphenol) (MBPS), crosslinking catalysts such as iron or copper acetylacetonate, dibutyltin dilaurate (DBTL), and combustion catalysts such as nanoscale iron or copper oxide. As described herein, the energetic nanopowder may be provided with covalently bonded protective coatings with —OH, —NH@, —COOH, and/or grafted polybutadiene polymer or copolymer which has terminal and/or pendant hydroxyl, amine or epoxy groups for crosslinking in the matrix. Such functional groups are designed to react with crosslinking agents such as polyfunctional epoxies and polyfunctional isocyanates. By incorporating such surface-reactive energetic nanoparticles in the propellant mixture, the nanoparticles crosslink with the polyols or other binder to structurally reinforce and physically strengthen the composite propellant structure.

Illustrated in FIG. 3K is a thermodynamic equilibrium chart for feedstock components for plasma torch nanoparticle generators 100, 200, 400 and 500, in a molar ratio of one mole methane CH4, one mole aluminum powder, 0.75 mole boron powder, and 0.5 mole silicon powder at 0.01 bar vacuum at the downstream end of the expansion cooling zone of an apparatus such as illustrated in FIG. 1, 4 or 5. In accordance with a further embodiment of this disclosure, such a feedstock is continuously introduced at such ratio into a pressure plasma zone of plasma torch system such as illustrated in FIG. 1, 2, 4, or 5 at a pressure of 1.5 to 5 bar. The components are substantially fully volatilized by plasma arc as previously described. Upon substantially full vaporization of these feedstock components with an appropriate plasma gas such as $H_2$ and/or argon at a plasma torch temperature of 3500-4000° C., and subsequent expansion and gas cooling into a vacuum zone (0.01 bar) to a condensation temperature in the range of 600-1200° C., Al (+B, Si, C, Mg, Ca, and/or Li) nanoparticles are formed which may vary in composition from their core to their periphery as indicated in FIG. 9D. The proportions and/or constituents may of course be varied, and the amount of inert gas/hydrogen plasma and/or cooling gas may be varied to vary the nanoparticle size(s). For example, aluminum may be vaporized with boron (eg in a molar ratio of 1 mole aluminum to from about 0.1 to about 3.0 moles boron) with little or no silicon or carbon feedstock, to produce Al—B nanoparticles which are somewhat more stable to surface oxidation than aluminum per se.

Similarly illustrated in FIG. 3L is a thermodynamic equilibrium chart for plasma vaporization torch feedstock in a molar ratio of two moles hydrogen $H_2$, two moles cerium metal powder, two moles silicon powder, and two moles aluminum powder over a temperature range up to 4000 C at a 0.01 bar vacuum immediately downstream of the expansion cooling zone of a plasma torch nanoparticle generating system such as described herein. Cerium is a rare earth metal which is significantly more energetic in reaction with oxygen and fluorine than aluminum or silicon. More importantly, cerium is a candoluminescent material which radiates intense VIS and UV light upon being heated to temperatures above about 1500-2000° C., as described in more detail hereinafter with respect to the munition 2200 of FIG. 22. As indicated in FIG. 3L, cerium forms low-enthalpy reaction products with both aluminum and silicon in the condensed nanoparticles. While the feedstock example of FIG. 3L has a relatively high proportion of cerium for purposes of illustration clarity, amounts of cerium to provide from about 0.1 to about 2.0 weight percent, based on the total weight of silicon/boron/aluminum or other metal components in the finished nanoparticles are more practical in view of the expense of rare earth components, while still producing powerful VIS-UV light output upon the extremely high temperature oxidation of the nanoparticles which occurs in propellant and explosive uses.

In a further example of stabilized, high-energy core-shell nanoparticle manufacture, aluminum or aluminum-containing nanoparticles such as Ca—Al, Mg—Al Li—Al and/or silicon-boron-aluminum nanoparticles (produced for example with FIG. 3H, 3J, 3K, or 3L feedstock by the systems of FIGS. 1-5), for example having a surface area of about 30-50 square meters per gram, may be suspended in anhydrous toluene under sonication and mixing, while 0.5 weight percent of $LiAlH_4$ reducing agent (based on the nanoparticle weight) is added to the suspension as 1 molar $LiAlH_4$ in THF to adsorb on the particle surfaces. Two weight percent of $SiCl_4$ and/or $HSiCl_3$ is then added under mixing and ultrasonication, followed by 2.5 weight percent of $LiAlH_4$ reducing agent and 1 to 3 hour reaction time at ambient or elevated temperature to form Si—H terminated silicon shells around the core Al (and/or B, Si, C, Mg, Ca, and/or Li) nanoparticles. The thickness of the shells may be varied by varying the amounts of $HSiCl_3$, $SiCl_4$, etc. Excess reducing agent may be quenched by titration with anhydrous methanol. Vapor deposition of Si on pre-formed aluminum-containing nanoparticles may also be economically carried out as described herein.

A catalyzed, thermogenerated, free-radical initiated, and/or UV activated hydrosilylation reaction may then be carried out to react a hydrosilylation agent such as described herein (eg, allyl amine) with Si—H terminated silicon nanoparticles, or H-terminated silicon shell surfaces (other H-terminated silicon nanoparticles and silicon surfaces as described herein may also be used). For example, a catalytic amount of $H_2PtCl_6$ in isopropanol catalyst and excess allyl amine[61] may be added to the H-terminated nanoparticle suspension with ultrasonication and mixing (and UV irradiation if desired) to produce covalently bound propyl amine coated core-shell nanoparticles with dense, passivating surface ≡Si—CH2CH2CH2NH2 groups. Microwave processing can increase in the rate of the hydrosilylation reaction and surface coverage[62]. The propylamine passivated nanoparticles are stabilized against surface oxidation, and are reactive with a variety of polymerization and crosslinking reactants such as epoxies, and isocyanates. The amine-terminated nanoparticles can also form monomolecular layer amine-perchlorate salt at the outer surface of the passivating propylamine coating, to produce rapidly-activated energetic nanoparticles. By first polymerizing/grafting a monomer such as ethylene imine onto the surface-bound propyl amine groups, nanoparticles with a polyethylene imine coating are produced, which are useful as a layers surrounding the energetic nanoparticle.

Butadiene may similarly be grafted and polymerized on the nanoparticle surfaces. It may be hydroxyl terminated or otherwise functionalized, and may also be nitrated across its remaining double bonds by mild $N_2O_5$ treatment to produce nitrated butadiene polymer attached to the nanoparticles.

In a similar manner, alkenes such as allyl alcohol, H2C=CH—CH—OH, or other hydrosilylation agents may be covalently attached through Si—C bonds to H-terminated nanosilicon particle surfaces (eg, to produce a covalently bound ≡Si—CH2CH2CH2-OH coating) to protect and functionalize them. Butenoic acid may similarly be grafted to the silicon nanoparticle surfaces to provide functional —COOH terminal groups[63] which can be used for crosslinking purposes. The attached peripheral —OH groups may be nitrated to produce a nitrate-ester-terminated surface for the silicon nanoparticles. Moreover, the surface —OH groups can be utilized as initiators for polymerization and/or oligomerization grafting reactions for energetic epoxide, oxirane and other ring-opening monomers such as glycidyl azide, fluorinated monomers such as monomers such as 3-nitratomethyl-3-methyl oxetane (NIMMO), 3,3-bis-(azidomethyl) oxetane (BAMO), 3-azidomethyl-3-methyl oxetane (AMMO), Glycidyl nitrate (GLYN), and difluoroamino oxetane for example by cationic polymerization processes, or by activated monomer polymerization processes employing attack of a hydroxyl-terminated polymer on an activated monomer. Such cationic grafting/polymerization/oligomerization can be performed with co-initiator (typically BF3 or AgSbF6) with the surface —OH groups and biscumyl chloride (BCC) co-catalyst carried out at −90° C., while activated catalytic quantities of a stable acid catalyst (such as boron trifluoride etherate, triethoxonium tetrafluoroborate, fluoroboric acid, etc) with the surface-bound alcoholic initiator (such as the Si—(CH2)$_3$—OH initiator on the silicon nanoparticle surfaces), carried out at ambient temperatures. Nitramine-containing monomers can be reacted with the surface-terminal —OH groups to provide —O—[N(NO2)CH2]$_n$ type polymers/oligomers attached to the very energetic silicon nanoparticles, to contribute very high specific impulse in propellant formulations[64]. Molecular weights of 400-5000 are preferred for such polymers covalently bonded to the surface of the nanoparticles.

In one embodiment, the silicon nanoparticles may have a covalently-bonded aminopropyl, or poly(ethylene imine) surface layer, eg from hydrosilylation with allyl amine or trimethoxy gamma-aminosilane. The terminal amine groups may be ionically bonded to a layer of amino cerium nitrate or perchlorate formed by mixing the amine-coated nanoparticles in an ethanolic solution of ammonium cerium nitrate or perchlorate, separating the nanoparticles, and drying them under vacuum at ambient temperature. Similarly, nanoparticles with terminal surface amine groups may be dispersed in such a solution of ammonium perchlorate, or ammonium nitrate, to respectively form an ionically bonded amine-perchlorate salt layer and/or amine-nitrate salt layer at the nanoparticle surfaces. The covalently-bonded surface amine groups may also be nitrated with cold N$_2$O$_5$ to form oxidatively energetic ≡Si—CH2-CH2-CH2-N═NO2 groups and the like covalently bonded to the silicon nanoparticle surface. Carboxylic acid surface functional groups on nanoparticle surfaces such as provided by Si—C covalently-bonded alkanoic acids (eg, by hydrosilylation reaction with butenoic acid to affix butanoic acid as described herein) may be reacted with cerium salts such as cerium acetate or preferably cerium perchlorate or cerium nitrate (lightly titrated with strong base to "remove say ⅓ of the perchlorate or nitrate ions), to produce the respective cerium salts ionically bonded to the protective coatings of the nanoparticles. These particles are relatively stable at ambient conditions, but disperse well in other energetic materials and components, and are very rapidly energetic upon initiation. The amine-terminated silicon nanoparticles may similarly form salts with energetic anions such as picrate, nitrate and perchlorate anions; eg,

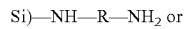
Si)—NH—R—NH$_2$ or

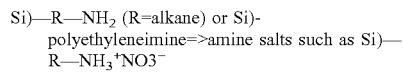
Si)—R—NH$_2$ (R=alkane) or Si)-
polyethyleneimine=>amine salts such as Si)—
R—NH$_3^+$NO3$^-$

Si)—(CH2CH2NH$^+$)CH2CH2NH3$^+$[NO3$^-$,ClO4$^-$]

Si)—NH$^+$—R—NH3$^+$[NO3$^-$ClO4$^-$]

The amine-terminated and carboxylic-acid-terminated energetic nanoparticles (eg, core aluminum, silicon shell nanoparticles) may also be self-assembled with oxidants such as nanoscale Fe2O3, CuO, WO3 and/or Bi2O3 to form fast-reacting, well-dispersed thermitic energetics.

Highly shelf-stable crystalline silicon nanoparticles, and silicon-coated silicon and aluminum nanoparticles may readily be prepared by thermal decomposition of silanes and/or alkyl silicon[65], in the absence of oxygen/moisture. For example, phosphorous-containing silicon nanoparticles produced by the system 600 of FIG. 6, or mixed silicon-carbon-boron and/or aluminum nanoparticles produced using a feedstock such as that of FIG. 3C, 3D, 3J, 3K or 3L in a nanoparticle generator such as that of FIG. 1, 2, 4 or 5 having an average particle size of about 50-70 nm and a surface area of about 35-60 square meters per gram (or another nanosilicon powder) may be dispersed in a 1:3 molar ratio mixture of pure tetraethyl silicon and pure trioctylamine. The nanoparticles comprise about 10 wt % of the slurry. The mixture is heated under pressure to a temperature of 700° with mixing and/or sonication for 5-15 minutes, in either batch or continuous flow-through processing. The reaction product is cooled, washed in dry ethanol or hexane with centrifugation, and vacuum dried under nitrogen. The dry powder comprises the initial nanoparticles having a continuous adherent crystalline silicon coating thereon which is passivated with alkyl groups (primarily Si—C coupled ethane) and/or amine-coupled alkyl groups (primarily Si—N coupled octylamine). The crystalline silicon coated nanoparticles are very stable against oxidation under ambient conditions, and are readily dispersed in propellant mixtures, melted paraffin fuels, and casting explosive melts to form highly stable propellants and explosive composites.

Lower temperatures can also be used to coat core nanoparticles with a continuous adherent dense crystalline silicon shell, because the core nanoparticles facilitate crystallization of the thermally deposited silicon. Lower amines such as trihexyl amine, tributyl amine, secondary amines, and primary amines such as hexyl amine etc, and mixed amines can also be used. Primary, secondary and tertiary diamines such as pentamethylene diamine, hexamethylene diamine, decane 1,10 diamine, and/or ethyleneimine (aziridine) including mixtures thereof are useful for preparing silicon surfaces stabilized by Si—N— bonds and pendant alkyl groups. Diamines can also be used to manufacture such passivated silicon nanoparticles also having a surface amine functionality. Silane and mixed alkyl silanes may also be used as thermally decomposable silicon deposition agents for coating the nanoparticles. For example, a slurry of phosphorous-containing nanoparticles produced by impurity vaporization in the apparatus of FIG. 6 are mixed and dispersed in a 2:1:5 molar mixture of tetrabutyl or tetraamyl silicon, silane (SiH4) and hexyl amine. The slurry contains approximately 10 weight percent of the nanoparticles. The slurry is pressurized and heated to a temperature of about 500-550° C. for 15 minutes. The reaction mixture is cooled, washed with dry ethanol or hexane with centrifugation, and vacuum dried under vacuum. The product comprises phosphorous-containing nanosilicon cores with crystalline shells having a passivated surface comprising Si—N coupled amine groups and/or Si—C coupled amyl or butyl groups. The nanoenergetic product is very shelf-stable to atmospheric conditions. In another example, pure aluminum nanoparticles having an average particle size in the range of 30-80 nm, such as made using a feedstock like that of FIG. 3H processed with the systems of FIG. 1, 2, 4 or 5, (or other commercially available aluminum nanoparticles) are slurried in a 2:1:3 molar ratio of tetraamyl silicon, silane ($SiH_4$) and trioctyl amine. The slurry contains approximately 15 wt % aluminum nanoparticles. The slurry is heated under pressure to a temperature of 500-550° C., which is below the melting point of aluminum, for 15 minutes. The reactor is cooled, washed with ethanol, and vacuum dried. The product is an energetic nanoparticle material having aluminum cores protected from storage-oxidation by a crystalline silicon shell. The silicon shell surfaces are protected against storage oxidation by Si—C-amyl/butyl groups covalently bound to the silicon surfaces, and/or Si—N covalently bound amine groups (in this case, octyl amine) covalently bound to the silicon surface. The aluminum-silicon nanoparticles are highly energetic, storage stable, and have desirable ignition/detonation characteristics which are "safer" than aluminum nanoparticles. It is noted that primary, secondary and tertiary amines may be introduced in the expansion zone with the cooling silicon vapor, in a momentum classifier cooling gas, or as part of a cooling particle collection fluid, with or without alkyl silicon compounds and/or silanes, to facilitate surface passivation of the silicon nanoparticles.

As indicated, carbothermic reduction processes in accordance with the present disclosure are provided which can be designed for inexpensive production of high performance energetic nanoparticles at low cost. In this regard, illustrated in FIG. 3I is a thermodynamic equilibrium chart of feed components in the molar ratio of one mole of boric oxide, 2.5 mole of carbon (e.g. hard coal or graphite) and 0.25 mole of methane (e.g. natural gas) together with 2.25 mole of inert argon (and/or hydrogen) plasma gas. Upon continuously introducing such feedstock in such ratio to a nanoparticle generator such as illustrated in FIG. 1, 4, 5, at for example an operating pressure of 2-5 bar, substantially complete vaporization via plasma arc may be accomplished at a plasma temperature of about 4000° C. As indicated in FIG. 3I, boron is formed by carbothermic reduction of boric oxide and is substantially vaporized above about 4000° C. Upon flash cooling by expansion (and cooling gas if desired) to temperatures in the range of about 1600° C. to about 2500° C., condensation of boron particles from the gas stream permits separating the boron nanoparticles from carbon monoxide (which would re-oxidize boron at equilibrium at lower temperatures) and other volatile oxide and hydro-oxygen compounds of boron.

Further in this regard, as illustrated in FIG. 3J, by combining and vaporizing silicon particles with boric oxide, /or carbon and a hydrocarbon or hydrogen gas, inexpensive silicon-boron-carbon energetic nanoparticles may be produced at very low cost. As illustrated in FIG. 3J, feedstock for example in the proportion of 3 moles of silicon, one mole of boric oxide and 2.5 moles of carbon, together with 0.25 mole of methane may be continuously introduced and vaporized at temperatures above about 3000° C. at a pressure of 1.5-4 bar in a first thermal plasma zone such as that of the plasma arc of systems 100, 400, 500, then expanded and cooled into a low pressure zone (vacuum) of 0.01 bar to flash-cool the vapor, with formation of silicon-boron-carbon nanoparticles together with vaporized carbon monoxide, boron oxide(s)/hydro-oxide(s), silicon oxide and other vapors. Upon flash cooling to a condensation temperature in the range for example of about 1000° C. to 1800° C., the high temperature volatile reaction products can be briefly kinetically "frozen". If desired, cold argon, C1-C6 alkane, hydrogen, etc can be blasted into the expanding stream to facilitate cooling, and dilution of CO and SiO before particle separation. The ratio of silicon and boron can be varied, and boron, silicon carbide and/or boron carbide can also serve as inexpensive raw material feedstock. Carbon can be limited, or excess carbon provided to form more, or less, carbon/carbide solids in the Si—B—C nanoparticles. The nanoparticles can be separated from the carbon monoxide, silicon monoxide, boron oxide and hydro-oxide volatile materials by a separation system such as illustrated in FIG. 2. The Si—B—C nanoparticles can be very highly energetic (see Table 1), and can be coated with a silicon, and/or an energetic organic coating such as a covalently-bound fluoroalkane. An in-line momentum classifier 750 with a cooled inert gas such as illustrated in FIG. 7B may also be used beneficially for rapid separation of energetic nanoparticles from carbon monoxide and other oxygen-containing components.

As indicated above, silicon particles are useful energetics for electrochemical reactions as well as combustion reactions. Silicon nanoparticles are useful as a source of hydrogen for hydrogen fuel cells, and as anodes for lithium ion batteries, lithium-oxygen batteries, and, examples of which—sulfur batteries. In Li-ion battery use, upon charging, silicon absorbs lithium with concomitant swelling, and upon discharge, the silicon anode particles shrink, with repetitive cycles progressively adversely affecting the integrity, capacity and electrical conductivity of the silicon structure. Initial charge-discharge cycles with common electrolyte solvents such as alkyl carbonates can form a solid electrolyte interface (SEI) layer on the silicon surfaces which together with trace oxygen and/or water can irreversibly bind Li as its oxide. Silicon particles may be manufactured in accordance with the present disclosure which are adapted for Li battery use[66]. In this regard, preferred silicon particles for battery use comprise an electrically conductive component which alone or upon reaction in the condensed particles is electrically conductive, such as Al, Cu, Ag, C, a metallic electroconductive silicide such as $TiSi_2$, a metallic electroconductive boride such as $TiB_2$, silicon boride, and/or an electrically conductive carbide such as silicon carbide. Preferred silicon particles comprise a metallic component which has an oxidation potential higher than that of lithium, which is capable of reducing lithium oxide, such as calcium and/or magnesium. Mg forms silicides in the condensed particles which are also useful as a reversible lithium-absorbing compound[67]. The formation of electrically conductive zones within fully or partially lithiated silicon particles maintains routes for conductive electrode operation which are at structural equilibrium when the particles are fully or partially swollen ("charged"). Upon shrinking by loss of lithium upon battery discharge, the nanoscale conductive components associated within the respective nanoparticles tend to maintain their size, condition and position for electrical continuity. Upon recharging of the nanoparticles with swelling caused by relithiation, the electrically conductive components are restored toward their equilibrium condition which is still in intimate contact with the respective lithiated silicon nanoparticle(s). Because, crudely, the volume of the nanoparticles scales with the third power of the radius of the particles, and the distance between conductive components scales linearly with radius, manufacture of lithiated particles having an intermediate molar ratio in the range of from about 0.5 to about 2.0 lithium to one mole of free silicon is preferred as a product for manufacture of improved Li-ion batteries. By free silicon is meant silicon which is free to react with lithium, rather than silicon such as that in compounds such as $TiSi_2$ which is not available for lithiation in battery charging operation. Electrical conductivity through the electrically conductive zones, such as copper or nanoscale $TiSi_2$ crystals formed within the silicon particles upon condensation from the vapor or molten phase, may also reduce the destructive formation of SEI when the lithiation potential is higher than the reduction potential of the electrolyte solvent, as is the case for common solvents such as diethyl carbonate and other alkyl carbonates. Lithium can be trapped in such SEI layers, especially during the first several charge-discharge cycles, for example as lithium oxide(s). A metallic reducing component such as calcium can restore the lithium to active use in the battery. Use of electrolytes such as ionic liquids which have a wide electrochemical window which includes the lithium cell reduction-oxidation range can further alleviate disadvantages of electrolyte electrolysis and/or an SEI layer[68].

Li, Mg, Ca, Na, K and Al are more readily vaporized than Si, and carbon can be introduced inexpensively as hydrocarbon gases such as methane. Small amounts (eg, 0.001 to 0.1 mole per mole of Silicon) of titanium and other metals (preferably those which form electrically-conductive silicides) can also be vaporized with major amounts of silicon (and other components) in the systems of FIGS. 1, 2 and 4. The combined vapor mixture can be flash-cooled, preferably with concomitant introduction of cold gas into the flash-cooling stream, to produce silicon particles containing these components.

Examples of manufacturing processes include vaporizing silicon, lithium, a lithium oxide reducing agent, and/or an electrical conductivity agent, wherein the lithium is vaporized in a molar ratio in the range of from about 0.1 to about 3.75 moles per mole of vaporized silicon, the lithium oxide reducing agent is vaporized in a molar ratio of from about 0 to about 0.2 per mole of vaporized silicon, and the electrical conductivity agent is vaporized in a weight ratio of from 0 to about 20 percent based on the weight of the vaporized silicon, to produce a mixed vapor comprising at least about 25 weight percent silicon. The mixed vapor is flash cooled to nucleate and condense the mixed vapor components to form lithium-containing silicon nanoparticles having enhanced electrical conductivity and/or lithium oxide reduction capacity. Because of the relatively low melting and vaporization temperatures of lithium, the flash cooling should be best carried out to a temperature range below the boiling point of lithium at standard conditions of temperature and pressure, and more preferably to a temperature below the melting point of lithium. It is noted that the negative enthalpy of mixing and of formation of lithium-silicon compounds[69] facilitates solid particle formation at temperature above the Li melting point. Flash cooling in addition to that achieved by expansion may be achieved by introduction of cold inert gas such as argon or hydrogen, introduction of cold reactive gas or liquid such as silane (used to coat the condensed Li—Si particles with H-terminated silicon), and/or introduction of or contact with a substantially inert gas, liquid spray or film of a fluid suspension agent such as cold hexane.

The silicon-based nanoparticles may be coated with a silicon outer layer if desired, as described herein by recycled vapor deposition, introduction of silane into a flash-cooled stream of condensed particles, and/or liquid phase deposition on pre-formed nanosilicon particles. The surfaces of the nanoparticles may also be hydrosilylated as described herein, to increase their stability in battery charge-discharge use. The silicon nanoparticles may be fabricated into a lithium ion battery (LIB) anode structure in a wide variety of ways, including conventional designs, as well as new and novel designs and structures.

In this regard, with reference to the apparatus of FIGS. 1 and 2, silicon particles (eg, nominally 5 micron or less major dimension) or silane may be introduced into the plasma torch with an inert argon and/or hydrogen gas stream by conduit 113 and/or 106. Lithium particles may be mixed with the silicon particles, or introduced by separate conduit like 113 upstream of throat 112. An efficient alternative is to introduce lithium as a liquid melt or gas by mean of a conduit like 113 or a conduit which opens in the upstream end of the throat 108. In this manner, the lithium can serve as a coolant for the plasma torch. Other components and/or precursors such as titanium, $TiSi_2$, Ca, Al, $TiB_2$ $CH_4$, Mg, $MgSi_2$, Cu, Ag, can be introduced as powders with process gas flow as described by means of conduits such as 106, 113 in preselected ratios to achieve the desired nanoparticle product(s). Desirably the component powders may be homogenously blended and introduced together in the preselected ratios. For production of lithiated silicon particles, the plasma arc power utilized and arc temperature reached may be selected to vaporize most, if not all of the silicon, but excess thermal input and plasma temperature should best be avoided in view of the subsequent flash- and other cooling appropriate to condense and solidify the lithiated silicon particles. To the extent some partially-unvaporized silicon particles may remain, they may not be highly detrimental to use in Li-ion batteries. For example, even up to about 50 mass percent of the silicon may remain as unvaporized particles, for example of less than 5 microns in maximum dimension. They can form nuclei for Li and other vapor condensation, and are themselves useful as anode components. For example, silicon, lithium in an amount to condense in 2:1 molar ratio with silicon, calcium in an amount to condense in 0.05:1 molar ratio with silicon, and titanium in an amount to condense in 0.03:1 molar ratio with silicon, are continuously introduced into the argon carrier stream of a plasma torch system like that of FIG. 1 and through its plasma arc. The Ti may be efficiently introduced as $TiSi_2$, and excess Li and Ca may be used to compensate for volatility of these components after initial flash-cooling). The vaporized arc components in argon carrier are subsequently continuously flash-cooled to supersonic velocity by de Laval expansion device to cool and condense the components, and cold argon and silane are introduced into the condensing stream by means of circumferential manifold and jets 130, 132 and 133. The mass ratio of cold argon and silane to the mass of the plasma stream argon and components is appropriate to reduce the temperature of the condensed particles to a solid condition. The silane may be introduced in a first zone defined by conduit/manifold 130, 132 in the still-heated stream to initiate its decomposition, and cold argon alone introduced in a subsequent zone(s) 133 to complete cooling and solidification. The argon coolant may beneficially be cooled to subzero (Celsius), even cryogenic temperature, say, in the range of −150 to −50° C. if desired prior to introduction, to facilitate cooling of the condensed particles. A wide variety of other compound particles of different ratios and components may be produced in this manner by introducing selected components in appropriate ratios into the plasma torch system. The particles may be subsequently collected and hydrosilylated as described with respect to the systems of FIGS. 1-4.

Electrodeposition systems like those of FIGS. 10A, 10B and 10C may also be used to manufacture silicon-based particles which contain lithium, and a lithium oxide-reducing agent and/or an electrical conductivity-enhancing agent, as will be described below.

Illustrated in FIG. 4 is a hermetically-sealed, generally radially symmetrical transferred arc plasma torch system 400 for efficiently vaporizing silicon particles and other particle feed components. The illustrated transferred arc plasma torch system 400 comprises a radially symmetrical plasma torch 402 similar to that of FIG. 1 having an internal cathode 404 and anode barrel 406 directed toward a cooled-hearth silicon electrode 410 within a nickel or steel expansion-cooling flow enclosure 410 which has cooled walls. The upper region of the plasma nanoparticle production system 400 has a vacuum discharge outlet 420 connecting to nanoparticle separation, plasma gas recovery and vacuum pump systems such as those of FIG. 2. Gas conduits 416 connecting to a discharge manifold 418 surrounding a cold hearth arc transfer electrode 408 are provided to inject cooling gas[70] into the expansion zone to cool the silicon vapor and to protect the inner surfaces of walls 411 of the expansion vessel. A cold inert gas injection manifold 424 is provided for conducting cooling gas along the outside of the plasma torch 402 directed along the plasma arc nozzle and discharging into the expanding plasma gas at outlet 426. As indicated, the system 400 is a transferred arc plasma torch. In operation, the plasma torch 402 directs a plasma arc 426 from its internal cathode 404 through its anode barrel 406, to a silicon anode 408. A conventional plasma arc current control system (not shown) to initiate, transfer and partition the arc current from the cathode to the torch anode barrel 406 and the silicon transfer anode 408 is provided in accordance with conventional practice. Preferably in operation, from about 40 to about 80% of the plasma arc energy is desirably directed from the cathode to the transferred anode 408, with the remainder to the torch 402 anode 406. In operation, the thermal energy of the transferred arc heats and melts a surface zone 432 of the silicon transfer anode 408, while a cooled copper hearth maintains a solid silicon shell around the molten silicon zone upon which the transferred arc is directed. A narrow conductive metal (eg, cooled copper) anode power supply connector 408 having a top surface area approximating that of the cathode 404 cross-sectional area focuses the transfer arc current toward the center of the molten silicon anode pool.

In operation, granulated silicon particles, electric power, and plasma gas such as argon are introduced into the plasma torch via service connection 422 (shown by dotted line for clarity of the other features of the drawing). A stream of hydrogen and 325 mesh >98.5% metallurgical silicon particles may be introduced into the proximal base of the plasma torch 402 of FIG. 4 at a molar ratio of 3Si:2H2:0-2 Ar (if desired for plasma generation and stabilization, and/or silicon vapor dilution for nanoparticle size reduction) at a rate of from about 10 to about 20 pounds or more per hour (see FIG. 3F feedstock example). The nanoparticle generator 400 is designed to vaporize larger silicon particle feedstock, at significantly higher production rates and thermal efficiency than the plasma torch 100. The internal pressure in the plasma torch 402 body is in the range of from about 1.5 to about 5 bar. The input power is adjusted to heat the plasma in the anode barrel and transferred arc to a temperature in the range of from about 3500° to about 4000° C. A cold argon or cold hydrogen gas stream from a manifold 424 may be used to cool the outside of the plasma torch 402, and provide a downwardly-flowing cold gas stream enclosing the vaporized gas stream and transferred arc exiting the plasma torch nozzle anode exit 426. The silicon particles are substantially vaporized over their extended travel within the nozzle 406 and the transferred arc 430, but interior zones of the silicon particles injected into the plasma torch may remain as molten silicon particles. Upon exit from the nozzle orifice 426, hydrogen (and argon if used) and silicon vapor are partially expanded in a de Laval expansion nozzle face at the exit of the plasma torch. The lower-momentum gas and silicon vapor (and incipient nanoparticles) which is not within the centrally-focused transferred arc 430 can also immediately expand and cool into the expansion chamber 412 against an outer de Laval-type expansion surface, as shown. This is a partially free expansion, rather than a fully efficient de Laval-type unidirectional thrust generation expansion in which thermal energy-consuming work is done with maximum efficiency against the expansion nozzle. But the expansion nozzle has a radially symmetrical outer de Laval-type expansion surface for this purpose as shown in FIG. 4. Moreover, the expanding vapor encounters the cold gas shroud from the manifold 424, 426 upon proceeding into the vacuum zone 412. The expanding, cooling silicon vapor (with hydrogen and/or argon) undergoes prolific nucleation and condenses to form silicon nanoparticles. Some of the vapor from the nozzle exit 406, together with any unvaporized high-momentum silicon particles, remain within and continue to be heated in the transferred arc 426 which impinges on the cooled-hearth silicon anode 434.

The hydrogen gas and vaporized silicon are forced to deflect outwardly from a stagnation point along the transferred arc axis, but high-momentum unvaporized molten silicon particles and some nucleated condensed formed in the partially-cooled gas, are not deflected with the vapor flow into the vacuum zone 412, and impinge on the molten surface 432 of the silicon anode, were they (may "splat" but) are collected at the molten silicon pool surface for subsequent vaporization. The transferred arc superheats the molten silicon surface 432, which vaporizes silicon from the surface. The plasma arc energy is concentrated along the central axis toward the anode power supply electrode 408. The concentrated thermal deposition rapidly vaporizes silicon, and the vaporized silicon together with the force of the impinging plasma gas stream from the transferred plasma arc 430 produces concavity in the molten silicon surface which facilitates resupply of silicon to the central evaporation zone, and assists the deflection of the cooling plasma vapors outside the transferred arc. Silicon vapor from the molten transferred arc anode surface is forced outwardly into the vacuum expansion zone 412 where it cools, nucleates, condenses to form nanoparticles, and encounters a flow of cold hydrogen (and/or cold argon, lower alkane, etc.) from gas introduction inlets 416 and manifold 418 which protect the inner cooled wall 411 of the expansion chamber 412 from silicon deposition. The cooler hydrogen/argon with entrained silicon nanoparticles is withdrawn through vacuum exit conduit 420 to a recovery system such as that illustrated in FIG. 2. The hydrogen surface-terminated silicon nanoparticles produced in the hydrogen-rich atmosphere may be further subjected to hydrosilylation reaction to produce alkane or perfluoroalkane coated nanoparticles, described with respect to the embodiments of FIG. 9. Alternatively, the sidewall of the nanoparticle generator 410 may also be provided with a momentum classifier take-off system 440 which collects nanoparticles forced by momentum to travel along the inner wall 411 of the expansion zone vacuum chamber (see FIG. 7A, 7B).

Illustrated in FIG. 5A is a hermetically sealed, generally radially symmetrical plasma torch nanoparticle manufacturing system 500 which is particularly adapted to process raw material particulate solids. The system 500 comprises a hermetically sealed vessel 502 operated at an internal pressure of 1-5 bar, with a massive internal cathode 504, and an upper cooled anode 506 plasma electrode assembly, appropriately connected to conventional power supply (not shown). The anode barrel discharges into a vacuum expansion and cooling zone as part of a nanoparticle separation and vacuum system such as that of FIG. 2 or the like. The plasma system 500 further comprises input conduits 512 which feed solid reactants 505 into the vessel from external airlock storage chambers. The solid reactants such as crude metallurgical silicon, $B_2O_3$, coal, graphite, $B_4C$, SiC, $SiO_2$, etc. surround the cathode 504 and are heated within the chamber during plasma arc operation. Accordingly, the use of internal heat in system 500 increases the thermal efficiency of arc vaporization by preheating the components. Plasma and/or reactant gasses may be introduced by various supply conduits and manifolds 520, 522, as shown.

In a subhalocycle mode of operation, the cathode 504 may be a relatively massive electrically conductive silicon or silicon carbide ingot (which may be raised by appropriate mechanism as it is consumed). Inexpensive ground/fragmented silicon chunks, fragments and particles may be introduced into the top of the plasma zone, so that the particles fill the space along the side of the silicon ingot cathode, and overflow onto its top surface. In use, a plasma arc is generated from the cathode to the cooled anode and exit nozzle. The arc and electrical resistivity heat the silicon cathode ingot 504, the particles surrounding it, and the interior of the sealed vessel. The cathode and zone immediately surrounding it may be operated at a temperature approaching the melting point of silicon (with an appropriate safety margin, and monitoring equipment). The top surface of the silicon ingot is melted, with the silicon particles which are deposited thereon by the solid silicon particle feed inlets. A (relatively small) cooling line may be used to prevent melting of the lower zones of the anode. Silicon halide(s), such as SiCl4 or SiBr4 are introduced into the bottom of the vessel into the porous, heated silicon particle mass, where it can react with the silicon and silicon particles to form silicon subhalides such as SiCl3(gas). Impurities such as iron which have a less negative enthalpy of chloride formation than silicon, and nonvolatile ionic chlorides such as CaCl2 (with a bp of 1935° C. at STP) tend to be retained, while silicon particles are consumed (see FIG. 3D). Transition impurities such as iron form low-energy silicide-aluminide compounds[71] which slightly inhibit reaction with halides (eg, chlorine) as compared to elemental silicon, aluminum and silicon. Accordingly, $FeSi_2$ and similar impurities, and less volatile halides such as $CaCl_2$, are preferentially left in the solids of the preheating and pre-reaction chamber of the nanoparticle generator of FIG. 5A. Impurity-enriched feedstock dregs may be periodically removed from the bottom of the reactor vessel. As the silicon halide gas stream nears the top of the silicon anode, it has been progressively heated to a temperature of, for example, about 800-1100° C. As it passes through the zone near the molten surface of the anode, it is further heated and reacts with the molten silicon as it is vaporized by and through the plasma arc between the anode 506 and the cathode surface. The thermal efficiency of the plasma torch system 500 is relatively high, because "waste heat" is used to preheat the plasma gas and the silicon/silicon carbide cathode and surrounding silicon fragments to at least 1000-1400° C., which reduces the arc energy needed to generate, for example, a 3000° C. plasma to fully vaporize silicon as low-order silicon halides. The plasma-vaporized silicon subhalide is flash-cooled by expansion into a low-pressure (vacuum) zone through a de Laval-type expansion nozzle to form silicon nanoparticles, which are separated from the plasma gas, and recovered as previously described.

A high-volume hermetically sealed, generally rotationally symmetric nanoparticle generator 550 like that of FIG. 5A, which is adapted to preheat feedstock for carbothermic reduction, is illustrated in FIG. 5B. In a carboreduction mode of operation the process equipment embodiment of FIG. 5B may have a shallow feed zone with a massive electrically conductive silicon, silicon carbide or boron carbide ingot cathode 552, to preheat the reactants. Alternatively, the internal anode may be carbon, rather than silicon, although this may require more frequent electrode replacement. Blended silicon, boric oxide, silicon carbide, or boron carbide and solid carbon such as graphite, coal and/or coke (such as the feedstock of FIGS. 3I, 3J) are continuously or intermittently introduced into the reaction zone to cover the top of silicon/SiC/C ingot cathode and replenish silicon mass evaporated therefrom during nanoparticle production operation. A plasma gas such as argon, which may contain hydrogen and/or a hydrocarbon such as methane as a carbon and hydrogen source, is introduced into the feed zone by inlet conduits 560 as shown to maintain a preselected pressure therein, for example in the range of from about 1.5 to about 6 bar. Although a carbonaceous electrode (for example like those used for electrorefining aluminum) may be used, it is still preferable to use a conductive silicon or higher-temperature silicon carbide electrode when longer-term stability and extended processing runs are desired. The reactants are pre-heated in the outer feed zone to an elevated temperature below the melting point of the reactant components, for example a temperature in the range of from about 500 to about 1400° C. at the periphery of the plasma arc, to decrease the energy transfer from the plasma arc necessary to fully vaporize the reactants by the plasma arc at temperatures of 3000-3600° C., and decrease the time necessary for such vaporization. The reactants such as carbon and $B_2O_3$ together with silicon are melted and intensely heated to vaporization at the central surface zone of the cathode where the arc initiates to the anode. The arc may be rotated magnetically to facilitate uniform operations. It is noted that components such as silicon carbide and boron carbide can be heated to a higher temperature.

The anode barrel of nanoparticle generator 550 discharges into a vacuum expansion and cooling zone as part of a nanoparticle separation and vacuum system, such as that of FIG. 2 or the like. In carbothermic process embodiments, shock cooling (inlets and manifold in the expansion nozzle like those of FIG. 1 not shown) is also used to limit back reaction before the nanosilicon particles are separated from the reactant gases. For gas-assisted shock cooling, preferably a mass of cool gas at a temperature below about 50° C. is rapidly mixed with the plasma vapor at a mass ratio in the range of from about 1:20 to about 2:1. Hydrogen is useful for production of hydrogen-terminated nanoparticles. Lower C1-C8 alkanes such as methane are inexpensive and easily separated for recycle. Injecting liquid lower alkanes such as hexane or liquefied propane/butane as a jet or spray into the expanding plasma in the expansion zone provides a further enthalpy heat sink upon evaporation of liquid.

Illustrated in FIG. 6 is a high-vacuum electron beam vaporization system 600 for vaporizing silicon, and converting the vaporized silicon to silicon nanopowder. The electron beam furnace silicon nanoparticle generator 600 comprises high vacuum enclosure 602, a high-voltage electron beam gun 604, a cooled copper hearth anode vessel 606 with an overflow spillway into an ingot-forming mold 608, and a high vacuum port connector 620 to a high vacuum system which are of conventional design and construction like those of a vacuum silicon refining EB furnace. A silicon nanoparticle separation system such as components of FIG. 2 are connected between the vacuum exit port and the vacuum system, to collect the nanoparticle products. The anode vessel 606 has a conventional particulate/fragment silicon feed supply system 610 within the furnace high vacuum zone for introducing solid silicon into the refining hearth 606 for processing. In operation, raw silicon such as crushed metallurgical silicon, is continuously introduced into the cooled hearth anode 606, where it is melted by the electron beam 612 from the electron gun cathode(s) 604. The melted silicon 614 within the cooled anode hearth 606 is superheated on its surface so that silicon and volatile impurities such as phosphorus are vaporized into the vacuum chamber.

Energetic silicon nanopowder may be produced as a byproduct of purification of metallurgical silicon. The electron beam system 602 of FIG. 6 is similar to the electron beam purification manufacturing plants for upgrading metallurgical silicon for use in solar energy applications[72] such as that reported for the Kawasaki Steel Corporation, which comprises the electron beam melting equipment in a 1st stage which has electron beam guns of 750 K up maximum power. The raw silicon material is continuously introduced into a water cooled copper hearth, where it is melted and surface-heated to a temperature of at least about 1500° C., and preferably a surface temperature of at least about 1600° C. by the electron beam gun to evaporate silicon, phosphorus, and other elements which are more volatile than silicon. The molten silicon overflows into a cooled mold for directional solidification in ingots of approximately 100 kg mass. In the illustrated embodiment, at least about 5, and preferably at least about 9 weight percent of the raw silicon introduced into the electron beam target hearth is vaporized into the chamber and withdrawn through port 620 under high vacuum of less than about 200 Pa. This represents a higher pressure than conventionally used for electron beam purification of silicon, because of the continuous inert gas introduction into the chamber. In this regard, inert gas such as argon or hydrogen is introduced at specific locations through conduits 630, 634 to sweep the silicon vaporized by the electron gun from the surface of the hearth toward the vacuum exit 620 of the processing chamber, and to protect the interior surfaces of the vacuum processing chamber from silicon deposition thereon.

Hydrogen-capping can be carried out at high temperature adjacent the molten silicon surface. In this regard, in the illustrated embodiment 600, a hydrogen gas inlet 634 with a de Laval-type expansion nozzle 636 directs relatively high-speed cold hydrogen stream 638 across the superheated surface of the molten silicon 614. The hydrogen stream may have a speed of at least Mach 0.25, to sweep vaporized silicon impurities such as phosphorus and aluminum, as well as vaporized silicon from the molten silicon surface toward the vacuum exhaust exit 620. This reduces impurity vapor concentration at the molten silicon surface, thereby thermodynamically facilitating more rapid impurity removal. Operation at much higher pressure (still high vacuum) levels in accordance with the present procedure, also reduces "top-down" time in processing cycle runs, as compared to conventional electron beam purification of silicon at very high vacuum levels. By introducing alkenes and/or alkynes in the vacuum chamber so they interact with the silicon vapor/nanoparticles slightly downstream of the ebeam and molten silicon surface, the nanoparticles surfaces can be covalently coated in situ. Suitable 1-alkenes are produced in a variety of ways[73]. For example introducing 1-octene into the vacuum chamber via inlets 635 provides a reactive environment for surface coating the nanosilicon particles prior to their separation from the gas stream[74].

At least about 5 weight percent, and preferably at least about 9 weight percent of the raw feedstock silicon introduced into the anode hearth is vaporized into the vacuum chamber. The remaining molten silicon 614 overflows the hearth over a spillway into an ingot mold 608. The overflow silicon may be subsequently zone refined and further processed for additional impurity removal in accordance with conventional practice. Impurities in the raw silicon feed which are more volatile than silicon itself, such as phosphorus, are preferentially vaporized. For both higher nanoparticle production and further phosphorus reduction in the refined silicon overflow, at least about 15 weight percent of the raw silicon input stream may be volatilized. In this regard, the illustrated embodiment 600 may be operated for dual function production of both silicon nanopowder, and refined bulk silicon, to provide these two different products. If the primary purpose of operation is to produce silicon nanopowder, the raw silicon input stream flow rate, the e-beam power level, and other parameters may be adjusted so that higher levels, such as at least about 50 weight percent of the input silicon is vaporized. If higher levels of the raw input silicon are vaporized to manufacture silicon nanoparticles, the silicon remaining in the cold hearth anode 606 may be replaced from time to time as relatively nonvolatile impurities become concentrated there.

Inline momentum or (other) centrifugal classification is an effective method for separating the condensed silicon nanoparticles produced upon rapid cooling of vaporized silicon, from the remaining gases in which they are entrained. In this regard, the subatmospheric pressure (partial vacuum) downstream of the expansion-cooling zone accentuates the momentum difference between the condensed nanoparticles and the remaining gases, and also reduces the capacity of the remaining gases to suspend or alter the nanoparticle travel direction. Upon exit from the expansion zone, the gases and particles can have high, supersonic velocity. Upon encountering a solid surface, the gas can relatively easily deflect, until intersecting the solid surface. If the solid surface is cooled, and/or coded with a relatively cool liquid, the kinetic energy of the nanoparticles (which would otherwise be converted back to thermal heat) can be effectively cooled. For example, a supersonic stream of silicon nanoparticles exiting the expansion nozzle of the nanoparticle generators of FIG. 1, 4, 5 or 6 may be directed tangentially into and along the internal periphery of a cyclone separator 206 such as illustrated in FIG. 2, which effectively separates nanoparticles under vacuum, which reduces particle suspension. The particles may also loosely agglomerate and can be more readily collected in agglomerated form (agglomerated silicon nanoparticles may be separated by sonication in a fluid). For some nanoparticle products, particle separation and collection is desirably carried out by use of a thermally and chemically stable fluid flowing down a cyclone or other momentum classifier inner wall, which is cooled to a temperature, for example, in the range of from about 100° C. to about 200° C. Suitable fluids include high molecular weight aliphatic compounds such as C (16-25) alkanes having a boiling point in the range of from about 280-400° C. at 1 bar. The nanoparticles may be recovered at the bottom of the cyclone separator by suitable pumps, for further processing. The fluid may be cooled and returned to the top of the cyclone wall in continuous operation. Suspensions of 2-20 wt % of energetic nanoparticles collected in such alkanes produces a ready-made propellant, fluid in the case of lower alkanes, and solid in the case of paraffinic alkanes. Excess hydrosilylation reactants "left over" from covalently bonding protective and/or energetic organic coatings on the nanoparticles are typically not detrimental to such propellants, and can be beneficial.

Nanoparticles may also be rapidly cooled and separated by a vapor-phase momentum-based diverter separator. FIG. 7A is a top view of a momentum particle separator 700 which has an inlet conduit 702 for cool, inert gas (such as argon cooled to a temperature in the range of from about 0 to about 100° C.), and an inlet conduit 704 for the high-speed nanoparticle gas stream. The cooling gas, such as hydrogen, methane or argon at a temperature in the range of from about 0 to about 50° C., enters the separator 700 and travels along its inner wall which is also cooled. The nanoparticle stream from the conduit 704, which may be supersonic, proceeds at high-speed through the inert gas until it encounters the inner curved wall of the separator 700, then proceeds with at least some inert gas flow to exit conduit 708 positioned at the periphery of the inner curve separator wall. The inert gas from conduit 702 along the inner curved separator wall at least partially displaces gases initially with the nanoparticles. The gas which does not flow with nanoparticles into the exit conduit 708 is withdrawn through a central conduit 710. Each of output conduits 708, 710 discharges to a separate vacuum pump, collection and recycle system such as that of FIG. 2. The ratio of gas withdrawn through each separate outlet 708, 710 may be varied to optimize particle separation efficiency.

Illustrated in FIG. 7B is another embodiment of a momentum separator 750 for separating condensed-phase nanoparticles from its entraining (high-velocity) gas stream. The separator 750 comprises an inlet conduit 752 (preferably of rectangular cross-section) for introducing a gas stream 754 comprising partially-cooled gas 756 and an trained condensed-phase nanoparticles 758 such as produced by the systems 100, 400, 500 or the like, into the separator 750. The separator 750 further comprises an inlet conduit 760 for introducing a relatively cold (wrt the stream 754) separation gas stream 762 into the separator 750. The inlet nanoparticle-containing gas stream 754 may typically be directly supplied from the expansion-nozzle outlet of the nanoparticle generator, and accordingly may be a very high velocity stream at a temperature in the range of 500-1500° C. It will typically also have significant kinetic energy which will be converted back to thermal energy upon interruption of its linear travel vector. The separation gas 762 is preferably cooled to a temperature in the range of from about −50 to about 150° C., to provide a heat-sink capacity for cooling the high-velocity gas stream 756. The temperature and mass flow ratio of the separation gas 762 to the mass flow rate of the nanoparticle-containing gas stream is desirably selected to reduce the temperature of the stream 754 to a temperature at least 50, and preferably at least about 100° C. below the temperature of the stream 754 as it enters the momentum separator 750. The separation gas may be, or may comprise, an inert gas (such as helium or argon), hydrogen (desirable for introducing surface ≡Si—H groups on the nanoparticles surface), or other surface-coating gases such as $SiH_4$, halosilanes such as $SiHBr_3$, alkanes or alkynes such as ethylene, acetylene, 1-dodecene, vinyl ether fluorocarbons, vinylidene fluoride, trifluoro ethylene, tetrafluoroethylene, and/or other unsaturated fluorocarbon monomers, to produce coated nanoparticles such as described with reference to FIGS. 9A-9H. A wide variety of unsaturated fluoro-monomers in addition to tetrafluoroethylene, such as hexafluoropropylene, vinylidenefluoride, fluorinated vinyl ethers and other fluorinated monomers may be grafted or (co)polymerized to the nanoparticle surfaces; iodo-alkane terminated silicon nanoparticle surfaces (for example attached to the surface via Grignard reaction or hydrosilylation) may also be used to initiate polymerization of fluorinated oligomers and polymers from the nanoparticle surfaces[75]. Methyl and ethyl termination of silicon surfaces is highly thermally stable, and reaction with ethylene, propylene, (and/or acetylene/propyne) can produce C1- and/or C2-surface-terminated energetic silicon nanoparticle-containing propellants and explosives with high storage stability.

The separator 750 further comprises a discharge conduit 764 for a condensed-phase nanoparticle-containing gas stream, and a discharge conduit 766 for a gas stream which is depleted in condensed-phase nanoparticles. Each discharge conduit 764, 766 discharges to a particle collection and vacuum system such as that of FIG. 2. The nanoparticle-enriched conduit 764 directly discharges to a nanoparticle collector, gas separation/purification/recycle system and vacuum pump such as those of the system of FIG. 2. The gas conduit 766 (which still may contain some condensed matter) similarly may discharge to a particle collector and gas separation/purification system, and ultimately to a vacuum pump system like that of FIG. 2, for separation, collection and recycle of components.

The momentum separator 750 further comprises a central conduit 768 to which the conduits 752, 760 feed, and which in turn feeds outlet discharge conduits 764, 766. A straight or slightly concave cold wall surface 770 of the central conduit is disposed at an oblique angle to the incoming gas streams 754, 762 from the conduits 752, 760. The cold wall surface 770 is preferably a polished, highly heat conductive surface such as a nickel or copper surface (which may have a thin, polished high purity silicon face for high-purity silicon nanoparticle production). A refrigerated or otherwise cooling fluid may be circulated within the cooled wall structure 770 to maintain the cold surface 770 at a temperature in the range of −50 to 150° C., preferably from about −50 to about 0° C. Each the conduits 752, 760, 764, 766 may be similarly cooled if desired to reduce the temperature of the material streams at this stage of the processing. The separation gas stream 762 initially flows immediately adjacent the cold wall surface 770, while the condensed nanoparticle-containing high velocity gas stream is initially separated from the cold wall surface by the cooled separation gas stream. The separation gas stream is preferably introduced at a relatively high velocity to limit extreme turbulence at the interface of the streams 754, 762 within the separator 750. The condensed nanoparticles entrained in the gas stream 754 have significantly higher momentum per unit volume than the vapor components of the entraining gas stream, so more readily penetrate through the cool separation gas to intercept the cold wall surface 770. The oblique interaction of the condensed nanoparticles with the cold gas 762 and cold wall 770 functions as a heat sink for the thermal and kinetic energy of the nanoparticles. The nanoparticles are accumulated in a stream 780 adjacent the cold wall surface 770 and preferentially flow into the nanoparticle enriched discharge conduit 764 which is adjacent the cold wall surface 770. By providing and intercepting cold wall surface 770 at an oblique angle to the condensed nanoparticle velocity vector, conversion of kinetic nanoparticle energy to heat is limited. The relatively denser nanoparticles collect in a flow stream 772 adjacent the cold wall surface 770. The cold wall may be slightly concave to enhance and maintain such collection.

The relatively cold separation gas 762 is at least partially mixed at its interface with the entraining gas stream 756 over its transit between the inlet 752, 760 and outlet conduits 764 766. Preferably, the flow conditions are selected to reduce intra-stream turbulence. The nanoparticle enriched discharge stream of conduit 764 is enriched in separation gas component(s), and the discharge stream of discharge conduit 766 is depleted of nanoparticles, and enriched in entraining gases originally from the nanoparticle generator system.

A primary design function of a momentum transfer system such as 750 is the ability to rapidly separate condensed nanoparticles from their (potentially reactive) entraining vapor. Another capability is the efficient utilization of the heat energy of the nanoparticle gas stream to carry out thermally-activated coating reactions on the surface of still-heated nanoparticles. For example, thermally initiated hydrosilylation reactions, and/or vapor deposition of silicon on the nanoparticle surfaces can be carried out at an appropriately elevated temperature range designed for the nanoparticle stream. Further in this regard, the momentum separator 750 of FIG. 7B may further include an irradiating source 790 such as a UV light or radiological source for initiating or assisting hydrosilylation reactions, surface-grafting polymerization of monomers, and/or silicon deposition on the surfaces of the nanoparticles.

Propulsion and energetic munition uses do not require high purity nanosilicon particles. In fact, "impurities" such as boron can significantly enhance the thermal output performance. The extensive purification of silica, silanes and other high-purity silicon precursors is not only wasted, but can also be detrimental to maximization of thermal output performance.

Relatively pure silica is conventionally reduced in electric furnaces by carbon at high temperatures to produce metallurgical silicon of 98-99% purity. Silica can also be reduced by carbon in a plasma torch at high plasma temperatures, with production of CO and SiO gases.

Upon shock cooling of a fully-vaporized plasma from, for example, 5000° C., silicon nanopowder is produced, together with CO gas. Small amounts of carbon may be retained in the silicon nanoparticles, but do not adversely affect the thermal performance of the product.

Boron oxides can also be reduced in a plasma torch by carbothermic reaction. Boric oxide is a relatively inexpensive raw material for nanoboron particles. Boron nanoparticles have almost twice the thermal energy output as nano-aluminum and nanosilicon powders[76], provided that they can be made small enough and their protective $B_2O_3$ surface oxide can be minimized or made porous. In accordance with the present disclosure, mixed silicon-boron nanoparticles are provided which have very high thermal energy output. The nanoparticles can also comprise small amounts of carbon, typically as carbides and/or amorphous components. Upon oxidation, these nanoparticles can react to form SiO and CO gases which can preserve reactive access to the silicon and boron components at the interior of the nanoparticles. Aluminum can also be incorporated.

Accordingly, by eliminating the expense of high purification of silica to remove boron, and the expense of removing silicate from borate ores, the raw material cost for nanoenergetics for propellants and explosives can be greatly reduced. The expense of pre-manufacture of relatively pure metallurgical silicon as a precursor to silanes and halides for distillation and other purification steps is also unnecessary for energetics uses. "Crude" raw material silicon and boric oxide can be blended and continuously processed in a plasma torch fast-quench reactor to produce high-energy silicon-boron nanoparticles with significantly higher energy than the purest 100% silicon nanoparticles.

Carbothermic plasma reduction may also be used to remove doping impurities from silica raw materials. In this regard, addition of small amounts of chlorine and/or fluorine (eg, as SiCl4, SiF4) and hydrogen together with silica, siliceous clay, or another silicon precursor and a carbon source can be fully vaporized in a plasma torch reactor such as those of FIGS. 1, 4, 5. The carbon combines with oxygen from the silica to form carbon monoxide, while some oxygen remains as volatile as SiO gas. Upon rapid expansion cooling of the plasma, the silicon preferentially condenses, while boron, aluminum, and phosphorus impurities are preferentially removed as more volatile fluorides phosphorus vapor and boron-oxygen-hydrogen (and/or chloride) volatiles.

The transferred arc-plasma system of FIG. 4 has an overall efficiency of heating and vaporizing silicon (and other components) which is significantly higher than the nontransferred arc plasma system of FIG. 1. The anode target is cooled by conventional cooling means (not shown) which maintains a solid shell of silicon. The silicon anode zone where the transferred arc impinges forms a molten pool which undergoes further significant direct volatilization of silicon. One purpose of the transferred arc anode is to significantly extend the length of the ultrahot plasma in which the silicon particles are introduced for vaporization. In this regard, the length of the transferred arc is preferably at least the diameter, and more preferably at least 3 times the diameter of the plasma jet nozzle, and at least times the length of the distance between the discharge end of the nozzle and the cathode 404. The temperature of the plasma within the nozzle throat should best be at least about 3000 C, preferably at least about 4,000 C to directly vaporize at least the majority of the silicon particle feed in the plasma arc. Another purpose of the transferred arc design of the embodiment 400 is to provide a surface for intercepting and collecting particles which have not fully vaporized during their transit through the plasma arc. If these particles continued through the system in the cooling vapor, they could serve as condensation points for silicon condensation, producing even larger particles. Large particles can be separated from the product stream in a variety of ways, but it is preferred to remove their precursors before they pass into the separation zone of the system 200, in order to directly produce a uniform nanoparticulate product. Another purpose of the molten silicon transfer anode is to efficiently utilize the thermal energy of the plasma arc. Much of the thermal energy of the arc can be transferred to the anode, where it serves to melt and vaporize the surface of the anode, increasing the overall efficiency of the plasma torch system for heating the plasma gas (including silicon components) to 70-80% of the input power, or more. For a non-transferred arc-plasma torch system such as that of FIG. 1, the efficiency may typically only be in the range of 35-50%.

The cross sectional area of the illustrated expansion zone 412 at the level of the nozzle exit is at least 10, and preferably at least 20 times the cross sectional area of the plasma nozzle exit 410.

In order to protect the exterior surfaces of the plasma gun and its discharge nozzle, and to limit condensation of silicon or other solids thereon, an inert cold gas discharge manifold 418 surrounds the discharge end of the nozzle and the transferred arc anode. Cold inert gas may also be used to cool the surfaces in the hot environment of the plasma arc. Other cold gas discharge zones may be used for such purposes as appropriate to a particular flow design.

It is noted that while argon has relatively high Joule-Thompson coefficients at ambient and elevated temperatures, hydrogen has a small Joule-Thompson coefficient, has a very low inversion temperature, and retains heat of dissociation which is released when atomic hydrogen reforms diatomic molecular form. Argon is accordingly a better cooling gas, but multiple gas compositions are more difficult to work with as a practical matter.

At least one cold gas discharge manifold zone is also provided between the cooled anode shell and the outside expansion wall for a similar purpose. A clean, cold inert gas introduced into the expanding and cooling plasma flow protects the interior wall of the expansion zone from condensation of solids. In addition, as is further described with respect to embodiments of FIG. 9, the inlets may also be used to forcefully introduce nanopowder cores to serve as nuclei for coating by the cooling plasma vapor constituents. In this regard, the nanoparticle cores are preferably introduced suspended in a cooled gas stream, and injected to rapidly mix with the cooling plasma gases under conditions of supersaturation with silicon or other material to be deposited. The ratio of core material introduction will desirable be at least 5 weight percent of the weight of the supersaturated content of the cooling plasma gas at the time of introduction. Preferably, from about 5 to about 200 wt % of shell material is deposited on the core particles, based on the weight of core particles.

A large range of operating conditions, for example from nozzle diameter of about 5 mm to about 80 mm, internal plasma torch pressures of from about 1 atm to about 50 atmospheres, mass flow processing rates of from about 0.1 g/s to about 5 Kg/s and power levels of from about 5 kW to about 50 MW are within the scope of conventional technology, and may be adapted for nanoparticle processing in accordance with the present disclosure.

Surface groups may be tailored to optimize characteristics of nanosilicon particles in specific applications. Surface functional groups can facilitate dispersion of the nanosilicon powders in solvents and composites, and can be used to protect the nanosilicon surface from oxidation. Chemically active surface species (e.g., Si—Br, Si—Cl, and for hydrosilylation, Si—H) can readily be provided on the silicon particle surfaces for subsequent covalent bonding, grafting or polymerization of desired surface groups.

The subchloride manufacturing processes described herein can produce nanoscale silicon particles with surface chlorine atoms, which is ideal for attachment of desired functional groups by Grignard reagents or alkyl lithium reactants[77]. Fast-thermal-quench silicon vaporization in hydrogen, and carbothermic processes in hydrogen can produce silicon nanoparticles terminated with hydrogen atoms. Surface treatments with hydrofluoric acid can also be used to produce hydrogen-terminated surfaces on silicon nanoparticles.

When using a subchloride thermocycle process, the silicon nanoparticles produced have an at least partially chloride-terminated particle surface, with —Si—Cl bonds at the particle surfaces. The chloride-terminated surfaces are ideal for covalent attachment of functional surface coatings by means of Grignard and alkali (eg, lithium) reagents, as will be described below. When vaporizing silicon in the presence of hydrogen, the silicon nanoparticles formed upon flash nucleation cooling are hydrogen-terminated at their surfaces. The hydrogen-terminated nanoparticle surfaces are relatively stable in ambient storage, and are useful for hydrosilylation reaction to covalently attach protective, and/or energetic organic functional groups to the nanoparticle surfaces. Silicon nanoparticles which do not have hydrogen-terminated od chloride-terminated surfaces, respectively, may also be provided with the desired hydrogen or chloride surface functionality by conventional methods such as hydrofluoric acid and/or ammonium fluoride treatment, or UV treatment of silicon nanoparticles in the presence of chlorine[78].

Illustrated in FIG. 9A is a silicon nanoparticle 902 having a chloride-terminated or hydrogen-terminated surface. Halide-terminated silicon nanoparticles 902 and H-terminated silicon nanoparticles, for example as produced in accordance with processes described herein, may be directly reacted with Grignard and alkali-organic reagents to covalently bond a protective and/or reactive layer 904 of organic moieties to the surfaces of the nanosilicon particles. For example, chloride-terminated nanosilicon particles may be suspended in methyl, ethyl, propyl, butyl or other alkyl Grignard solutions in tetrahydrofuran or other suitable Grignard solvent and heated with mixing at 50-95° C. for 4-18 hours to produce silicon nanoparticles the corresponding methyl, ethyl, propyl, butyl or other alkyl terminated silicon nanoparticles. The Grignard alkyl groups may be fluorinated or perfluorinated alkyl groups if energetically reactive surfaces are desired. The processing should be free of oxygen, water or other undesired reactants. The alkyl-terminated nanosilicon particles 902 with such alkane or perfluoroalkane surface layers 904 are much more stable to atmospheric oxidation than the chloride-terminated silicon particles[79].

Silicon nanoparticles with hydride-terminated surfaces readily undergo hydrosilylation reaction with alkenes and alkynes under relatively mild conditions. A broad range of functional groups may be covalently bonded to silicon nanoparticle surfaces in this way[80]. Fluorinated alkenes are particularly useful for coating the surfaces of silicon nanoparticles for use as storage-stable energetic materials. For example, hydrosilylation reaction of hydride-terminated nanosilicon surfaces with reactive 1-perfluorodecene vapor produces a monomolecular layer of perfluorodecane covalently attached via Si—C bonds at the surface of the nanosilicon particles[81]. The perfluoro coated nanoparticles can be relatively stable up to well over 300° C. The silicon-carbon surface bonds formed are thermodynamically and kinetically robust, and protect against oxidative degradation[82]. SF5-terminated perfluoroalkenes (for example, $SF_5$ $(CF_2CF_2)$—$CH_2CH=CH_2$, eg, n=1 and 2) are also useful fluorination moieties for bonding to the silicon nanoparticle 902 surfaces[83] via hydrosilylation reaction. Hydrosilylation can be carried out at relatively low temperatures, and is best carried out under conditions of total exclusion of oxygen. In addition to heating, hydrosilylation reactions can also be carried out by peroxide initiators, ionizing radiation, transition metal catalysts and photochemical activation, preferably with ultraviolet light shorter than 370 nm (eg, <350 nm) wavelength[84], although "white light" may also be used for some reactions. Hydrosilylation grafting of highly oxidatively energetic fluorinated organic surface coating agents may be carried, for example, out by reacting 1-decene, 3,3,4,4,5,5,6,6,7,7,8,8,9,9,-10,10,10-heptadecafluoro-1-decene[85], or other perfluorinated alkene or alkyne under oxygen (and moisture) free conditions at a temperature of 100° C. for 20 hours (10 vol % of ethylaluminum chloride or another hydrosilylation catalyst such as chloroplatinic acid, cobalt-carbon monoxide adducts, etc may be added to activate the reaction). UV light of 365 nm or shorter may be used to facilitate the reaction. A rotary reactor may be used for vapor phase hydrosilylation reactions[86]. The densely-coated perfluorinated silicon nanoparticles are stable to room temperature storage, but are quite rapidly energetic when intentionally detonated or deflagrated at high temperature and/or shockwave conditions.

Hydrosilylation with straight-chain alkenes imparts stability to the surfaces of the silicon nanoparticles 902. Hydrosilylation with fluorinated alkenes produces energetic silicon nanoparticles with covalently attached reactive fluorine groups which produce volatile silicon and boron (if present) fluorides together with rapid, large energy release. For example, hydrogen-terminated silicon nanoparticles 902 comprising about 98 wt % silicon and about 2 wt % boron and having an average particle size (effective diameter) in the range of from about 20 to about 90 nm in accordance with the present disclosure may be reacted in oxygen-free conditions with 1-hexene, styrene, and/or 1-hexyne in stirred toluene suspension irradiated by UV light to produce storage stable respectively hexane, hexene and/or styrene-coated nanoparticles 900. Octadecene coated silicon nanoparticles may be prepared by hydrosilylation reaction[87] by dispersing H-terminated silicon nanoparticles as described herein, in a mixture of 5-10 weight % 1-octadecene in a high-boiling inert solvent such as paraffin or mesitylene. The slurry, which may preferably contain from about 1 to about 40 wt % (based on the weight of the total slurry of nanoparticles, inert solvent and 1-octadecene) may be heated with reflux or under pressure (eg to the mesitylene boiling point of) 165° C. or higher paraffin temperature under stirring and/or ultrasonication for 4 hours reaction time. The silicon nanoparticle surfaces are densely coated with octadecane covalently bound to the silicon surfaces of the nanoparticles by Si—C bonds. The octadecane-coated silicon nanoparticles are stabilized against oxidative degradation, and are highly compatible with and dispersible in hydrocarbon fuels such as RP-1 and paraffin. The surface-coated nanoparticles may be washed and separated from the solvent and unreacted 1-octadecene by vacuum distillation, washing, and/or solvent treatment, such as washing in liquefied propane or butane which is easily removable by evaporation. Such a procedure using paraffins or RP-1 as a hydrosilylation reaction medium, followed by vacuum recovery of unreacted alkene, is an economical way to directly produce high-performance propellant containing stabilized and compatible silicon nanoparticles. Silicon-based nanoparticles having fluorinated covalently-bound surface groups are similarly manufactured by using a fluorinated alkene hydrosilylation reactant. Liquid rocket fuel comprising a suspension of from about 1 to about 20 wt % of such surface-passivated silicon nanoparticles (as described herein) in RP-1 or other kerosene fuel has excellent stability and performance with fluid oxidants such as LOX, $F_2O_2$ (~30-70), nitric acid, or $N_2O_4$ in fluid rocket engine use. Paraffin solid rocket fuel made in this manner comprising from about 1 to about 30 wt % silicon nanoparticles is a high performance, storage stable hybrid rocket fuel.

In another example, hydrogen surface-terminated silicon nanoparticles comprising about 95 wt % silicon and about 5 wt % boron may be reacted under hydrosilylation conditions with the perfluoro alkene 3,3,4,4,5,5,6,6,7,7,8,8,9,9,-10,10,10-heptadecafluoro-1-decene to produce highly storage-stable energetic materials comprising both highly energetic fuel and highly energetic oxidizer in molecularly close proximity. The 3,3,4,4,5,5,6,6,7,7,8,8,9,9,-10,10,10-heptadecafluoro-1-decene may be placed in an oxygen-free reaction vessel (eg, a Schlenk glass tube on small scale preparation), heated at 90° C. for 30 min under pure argon flushing to remove O2 and traces of water, and then cooled to room temperature under hermetically-sealed conditions. The hydrogen-terminated Si—B nanoparticles may be placed in the reaction vessel Heptadecafluoro-decyl monolayers are covalently bonded to the surfaces of the Si—B nanoparticles 902 by heating at 100° C. for 20 hours, with 10 vol % of ethylaluminum chloride catalyst added to activate the reaction. After the reaction, the heptadecafluorodecyl layers may be rinsed with CF3CO2H (3% in tetrahydrofuran) and finally with tetrahydrofuran and dichloromethane.

An example of other storage-stable silicon nanoparticles with large surface area of silicon fuel molecularly bound to energetic oxidizer, hydrosilylation reaction can be applied to produce silicon nanoparticles 902 having a covalently bound surface monolayer of perfluorinated alkyls with a terminal pentafluoro-$\lambda^6$-sulfanyl (SF5) group. In this regard for example on a small laboratory scale, silicon nanoparticles 902 having H— terminated surfaces can be reacted with alkenes and alkynes by hydrosilylation methods. To illustrate peroxide free-radical initiated hydrosilylation reaction to produce sulfanylperfluorinated energetic silicon nanoparticles, 2.0 grams of $SF_5CF_2CF_2CH=CH_2$, 0.20 gram of tert-butyl peroxide, and 50 grams of hydrogen-terminated silicon nanoparticles 902 having a surface area of about 30 square meters per gram (~40 nm radius) may be placed in an oxygen-free and moisture-free reaction vessel and heated at 110-130° C. for 22 hours to produce silicon nanoparticles having a monomolecular covalently bonded layer 904 of —$CH_2CH_2CF_2CF_2SF_5$. The nanoparticles are relatively stable under ambient conditions in the atmosphere. Upon sudden heating/detonation to high temperature, the nanoparticles are highly energetically reactive in the environment of HE vapor and air, initially forming volatile silicon fluorides with heat release and minimal surface silicon oxide on the nanoparticles. Similarly, to illustrate catalyst-initiated hydrosilylation production of sulfanylperfluorinated silicon nanoparticles, 2 . . . 0 grams of $SF_5CF_2CF_2CH=CH_2$, 5 mL of hexane or methylene chloride, and 40 grams of hydrogen-terminated silicon nanoparticles 902 having an effective radius of about 25 nm and a surface area of about 50 square meters per gram and approximately 700 ppm of chloroplatinic acid (relative to the amount of olefin) are combined under oxygen- and moisture-free conditions in a batch reactor, and heated at 90° C. for 22 hours. The reaction mixture is washed in hexane and centrifuged several times to provide silicon nanoparticles 900 having a covalently-bonded coating 904 of —$CH_2CH_2CF_2CF_2SF_5$. Similar procedures provide silicon nanoparticles 900 having a coatings of —$CH_2CH_2(CF_2CF_2)_2SF_5$. The surface coated silicon nanoparticles are relatively stable in storage under ambient conditions, but are extremely rapidly reactive with their perfluorinated surface coating when heated/detonated to high temperatures.

Fluorinated monomers such as tetrafluoroethylene, energetic vinyl monomers such as nitroethylene, and cyclic ether energetic monomers such as NIMMO and GLYN may be grafted to, and/or polymerized from, through, or onto silicon nanoparticles, to provide useful energetic and other compositions in accordance with the present disclosure[88]. Silicon nanoparticles having H-terminated surface groups may be suspended in a high-boiling liquid used for collection, such as desulfurized middle distillate, of collected and suspended in a liquid perfluorocarbon such as perfluorodecalin and octadecafluoronapthalene as a reaction medium. A radiologic source or field may be introduced into the stirred suspension of silicon nanoparticles to create radical surface groups on the nanoparticles, which are relatively long-lived[89]. Fluorocarbon monomers such as tetrafluoroethylene, hexafluoropropylene, vinyl fluoride, vinylidene fluoride, perfluoropropyl vinyl ether and mixtures thereof are introduced into the activated nanosilicon slurry stream at a reaction temperature in the range of −50 to 250° C. Small amounts of alkynes, which are highly reactive with Si—H groups to produce active radicals, may be included in the grafting monomer mix. A suitable thermal free radical initiator such as 1,1'-azobiscyclohexanecarbonitrile, may alternatively (or concomitantly with radiologic initiation) be used to initiate fluorocarbon monomer polymerization from the nanosilicon particle surfaces. Similarly, UV irradiation (eg, λ<350 nm), may be used to initiate radical or radical cation initiation of polymerization from the silicon nanoparticle surfaces[90]. The "grafting-from" polymerization is preferably carried out to graft from about 2 to about 100 weight percent of fluorinated polymer onto the silicon nanoparticles. Introducing tetrafluoroethylene (preferably under pressure, into the reaction zone induces polymerization of covalently-bonded polytetrafluoroethylene from the radicals on the silicon nanoparticle surfaces. The molecular weight of the surface-grafted fluorinated polymer and the number of polymer chains grafted to each particle may be controlled by the amount of polymerization-initiating radiation, and conventional molecular weight control methods. Such polymerizations may be carried out over a broad range of temperatures, eg, −60° C. to 100° C. For example, a 5-10 wt % suspension of H-surface-terminated silicon nanoparticles in a substantially inert liquid may be pumped through a gamma radiation field having a radiation dose rate of 1=3 rad/second, into a graft reaction zone into which tetrafluoroethylene monomer (with or without co-monomers) is also introduced. The graft reaction zone may also (but need not) be subjected to a gamma radiation dose field of 1-3 rad/second, depending on desired product characteristics. PTFE is grafted onto the silicon nanoparticles. The irradiation and graft reaction zone may be agitated and/or subjected to ultrasonic irradiation to limit or prevent agglomeration. The H-terminated silicon nanoparticles may also be polymerized with tetrafluoroethylene and other fluorocarbon monomers in free-radical-induced fluid suspension.

It is an important aspect of the present disclosure that the silicon nanoparticles formed in an expansion-cooling zone may be directly and immediately reacted to coat the surfaces with organic passivating agents. Hydrosilylation and related reactions, as well as amine-silicon reactions, take place at elevated temperatures and are enhanced by ultraviolet (and near ultraviolet) radiation. The plasma arc produced by the cathode and anode(s) which vaporizes the silicon components, emits intense ultraviolet and near ultraviolet radiation which is synergistically utilized in preferred embodiments of the present disclosure to facilitate hydrosilylation and other surface-grafting reactions on the nanoparticle surfaces.

The high velocity expansion zones of the cooling silicon-containing vapor and the forming nanoparticles can produce well defined isotherm envelopes of specific decreasing expansion temperatures, as may be determined with conventional thermodynamic calculations. Of course, measurement of actual temperatures and product analysis can be used to adjust cooling and reaction parameters. External cooling gases containing surface-reactants can be injected into and mixed with the expanding silicon nano-particle rich vapors. The cooling reactant-containing gas can be proportioned in introduction rate to the flow of expanding silicon-containing plasma treated vapor to produce a preselected elevated-temperature reaction zone for coating the nanosilicon particle surfaces with protective layers covalently bound thereto. Useful reactants include alkene and alkynes such as ethylene, propylene, 1-decene, vinylidene fluoride, fluorinated 1-alkenes, amines such as allyl amine and hexyl amine, Diane means such as eczema for lean diamine, 1, 5 pentacene diamine, ethylene in mean, dioctal amine, etc.

Preferably the plasma gas comprises hydrogen such that the condensing nanosilicon has hydrogen-terminated surface groups. The surface passivation reactant is introduced into the expansion zone such as by jets directed toward the expanding vapor axis from manifold 130, 426, 418 into the expansion cooling plasma-vaporized stream. The amount of reactant and cooling gas is selected and proportioned so that upon full mixing with the condensing-silicon vapor stream, the resulting mixture is at a reaction temperature for the coating reaction to covalently attach to the silicon nanoparticle surfaces. While argon is a good cooling gas, methane is also a good cooling gas, and is very inexpensive and easily recovered and recirculated. This reaction is preferably synergistically carried out under UV and near UV radiation from the (nearby upstream) plasma arc upstream of the expansion zone. In this regard, in the illustrated embodiment of FIG. 1, the cooling gas with surface reactant is introduced within 5 centimeters (preferably within 2 centimeters) downstream of the entrance to the expansion zone from the high UV radiance from plasma nozzle exit. UV and near UV light is strongly absorbed by silicon, which promotes energetic electrons and makes its surface highly reactive. It can also cause electron emission from silicon particle surfaces, which can facilitate electrostatic particle collection downstream.

The amount and rate of reactant introduced should best be sufficient to substantially fully coat the silicon nanoparticles. The amounts will vary, depending on the particle surface area (smaller particles have more surface area and thus require more surface coating reactant) reaction rate and reaction efficiency. Typically, the surface reactant is introduced at a rate of 2-10 weight percent, based on the weight of the condensed(ing) silicon being processed. For example, a silicon hydrogen plasma exiting the nozzle with a temperature of about 3000° C. is cooled to about 800° by the action of the expansion nozzle into a vacuum of less than 0.01 bar. CH4 at a temperature of −40° C. may be introduced with propylene via jets from one or more axially sequentially positioned manifolds 130 surrounding the axis of the expansion zone, to reduce the final temperature of the mixed stream to a temperature of 280-300° C. for hydrosilylation attachment of propane groups to the silicon nanoparticle surfaces with the enhancement of UV activation emitted from the plasma arc in the nozzle throat. The rate of cold propylene introduced with the cold CH4 may be from about 2 to about 5 weight percent of the silicon nanoparticle production rate. Similarly, the mixed cooling reaction temperature for hexylamine or ethyleneimine surface coating agent may be in the range of 300-600° C. When injecting cooling gas, it is preferred to use higher expansion ratios in the expansion-cooling zone, eg, 5:1 to 12:1, to accommodate the additional gas volume. Of course, surface-coating reactions may continue downstream, and even after particle collection. Unused reactant may be recovered for recycling, as can a cooling gas in which it is diluted for introduction into the expansion cooling zone.

As illustrated in FIG. 9B, silicon nanoparticles 902, which may have a protective hydrogen or alkane/perfluoroalkane or other coating layer 904), may have organopolymer chains 906 surface-grafted thereto. For example, silicon nanoparticles having hydrogen surface termination may be suspended in a suitable polymerization vessel in a fluid solvent for fluoropolymer polymerization such as perfluorodimethylcyclobutane for grafting polymerization[91]. Hexafluoropropylene, tetrafluoroethylene or mixtures thereof may be compressed and introduced into the mechanically stirred pressurized reactor at temperatures up to 280° C. Thermal, free-radical, radiation-induced, batch and/or continuous polymerization (homopolymerization or copolymerization) may be used to covalently graft fluorinated polymer chains onto silicon nanoparticles. Direct radical mono, co- or terpolymerization of fluoroalkenes can be utilized. Initiators such as potassium or ammonium persulfates (emulsion process) or peroxides (suspension and solution processes) may be used in such grafting polymerization. The average molecular weight of the grafted polymer chains may be selected by operating conditions (including use of chain-terminating agents) to be in the range of from about 1000 to about 20,000.

Other polymer chains 906, such as polyethyleneimine, difluoroamino[92] and other energetic oxetane polymers may similarly be surface-grafted to the silicon nanoparticles 902 for use in energetic formulations. Monomers such as nitro and dinitro ethylene may also be polymerized (including copolymerization) onto silicon nanoparticles to provide energetic nitrate polymers and/or oligomers attached to the silicon nanoparticle surface. Such nanoparticles with grafted oxidatively energetic polymer surfaces may be injection or compression-molded to form highly energetic munitions, and may be included in composite cured and cast explosives and propellants.

Illustrated in FIG. 9C is a silicon nanoparticle 902 which has a cross-linkable, covalently bonded surface coating 922 protect against storage oxidation, but permit covalent incorporation into a propellant or explosive composite as a dispersed structural reinforcing agent as well as an energetic component. In this regard, covalently bonded agents with surface hydroxyl, amino and/or carboxylic functional peripheral groups (as produced by hydrosilylation reaction with for example, allyl alcohol, allyl amine or butylene carboxylic acid) bound to the nanoparticle surfaces, can readily react with epoxy and/or isocyanate cross-linking agents and polymeric components explosives and propellants, such as hydroxy-terminated polybutadiene and hydroxy-terminated glycidyl azide polymer (GAP), PolyN-IMMO, PolyGLYN, hydroxy terminated polyfluoroformals, epoxy-terminated N,N'-bonded Epoxy Binders in explosive and propellant cast cured polymer-bonded explosives and cast composite rocket propellants.

Illustrated in FIGS. 9D and 9E are core-shell nanoparticles 920 and 930, respectively. Core-shell nanoparticle 920 comprises a silicon-containing nanoparticle core 902 of a first composition, and a silicon shell 922 of a second composition. The core-shell nanoparticles 930 comprise a nanoparticle aluminum core 932 and a silicon shell 934.

Silicon nanoparticle compositions which can tolerate the high-temperature conditions of the plasma torch expansion-cooling nozzle (such as silicon, boron, silicon-boron and Si—B—C nanoparticles) may be directly coated with a silicon shell layer by a nanoparticle generator 100, 400, by introduction of the core particles into the nozzle-cooling expansion zone of the generator which is processing a hydrogen-terminating feedstock such as those of FIG. 3F or 3G, as previously described. The core nanoparticles may be entrained in cold hydrogen, and introduced into the vaporized silicon plasma in the expansion zone through jets or manifolds like 130, 132, 409 of FIG. 1 or 4. The core nanoparticles introduced into the cooling silicon-supersaturated plasma vapor with cold hydrogen form cool nuclei for enhancing condensation of a shell silicon layer, which is of different composition from the core layer. The core nanoparticles also have a bulk cooling mass which enhances heat removal from the cooling plasma discharge. If the cooling in the expansion zone is sufficiently large (so as preferably not to melt the respective aluminum Ca—Al particles), core aluminum nanoparticles may also be coated with a silicon surface shell layer in this manner. For example, if the expansion nozzle cooling itself is designed to cool the silicon-vapor containing plasma gases to a temperature in the range of about 600-800° C. or below, the introduction of cooling gas and aluminum core nanoparticles can be carried out without, or with only brief melting of the heat-sinking aluminum nanoparticles, which are then covered with a condensed, hard, continuous dense adherent silicon layer having hydrogen termination. The shell deposition thickness depends on the ratio of the mass of cool nanoparticle cores introduced into the plasma coating/expansion zone, to the silicon condensation rate and amount from the plasma vapor. Desirably the ratio of cooled core nanoparticle mass introduced into the silicon condensing-condensation mass will be in the range of from about 1:50 about 50:. Preferably, core nanoparticles having a diameter in the range of from about 10 to about 100 nm are introduced with entraining inert gas and/or with hydrogen at a temperature of less than 100° C., and more preferably less than 50° C. The shell layer, which may desirably be in the range of from about 3 to about 80 nm, protects a less stable core nanoparticle from environmental deterioration or premature reaction. As indicated, the surface layer may be further passivated or reacted with lithium, Grignard or hydrosilylation reactants to provide a protective and/or oxidatively energetic surface layer.

For heat sensitive nanoparticles such as aluminum nanoparticles, deposition of silicon shells thereon may be carried out at temperatures below the melting point of the nanoparticles, which is effectively somewhat below the 660° C. bulk melting point of aluminum. The nanoscale core silicon, boron and/or aluminum powders, may be coated with a thin layer of silicon to produce core-shell nanoparticles. For aluminum, the nanoparticles may be heated with silane, SiH4[93], for example at a temperature above about 450-550° C. in vapor, solution/suspension or supercritical gas. One pass is useful for uniform deposition. Higher-melting silicon-based nanoparticles can be processed with silane at a higher temperature, for example in the range of 600-650° C. A surface layer of silicon of from about 1-20 nm, and preferably 2-8 nm, is useful to "passivate" aluminum nanoparticles, and provide a surface for covalent attachment of alkenes and alkanes, particularly including perfluorinated alkanes as previously described. In this regard, for example, vapor-suspended nanosilicon powder particles 902, or nanoaluminum particles 922 suspended in silane, bromosilane or other thermally unstable silicon precursor such as cyclopentylsilane (with an inert fluid as appropriate) may be introduced into a reaction chamber maintained at a temperature of 500-550° C. under conditions[94] to deposit continuous, adherent silicon shells on the nanoparticles to a desired thickness. A continuous flow reactor 800 such as illustrated in FIG. 8 may be used for such coating, or batch reactors may be used.

Silicon deposition on the aluminum nanoparticle cores may be carried out by pyrolyzing silanes such as SiH4 (SiH4=>Si+2H$_2$) and/or related compounds such as hydrogenated cyclic silanes[95] (eg, cyclopentasilane) at temperatures below the melting point of aluminum, and more preferably below the aluminum-silicon eutectic temperature[96] of about 577° C. This pyrolysis process releases hydrogen. Polysilicon layers can be deposited using 100% silane at a pressure of 100-1000 Pa or with 20-30% silane (diluted in pure oxygen-free hydrogen or Argon). Silicon may be deposited at rates of 1-50 or more nm/min on the nanoparticle surfaces with uniform thickness, with deposition rate increasing with increasing temperature and/or UV radiance. Process variables for silicon deposition include temperature, pressure, and silane concentration. Deposition rate may be increased by UV light applied within the deposition zone. The rate of polysilicon deposition d decreases rapidly with temperature decrease, in accordance with Arrhenius model, d=A·exp(-qE$_a$/kT) where q is electron charge, k is the Boltzmann constant $8.617 \times 10^{-5}$ eV per degree Kelvin, and the activation energy E$_a$ for silicon deposition is about 1.7 eV. Deposition rate decrease at lower temperatures can be compensated by increasing the silane partial pressure and UV irradiation energy in the deposition zone, such as single-pass or fluidized bed reactor 800 of FIG. 8.

Bromosilanes and iodosilanes such as tribromosilane (SiHBr$_3$), mixtures such as bromosilanes and silanes, and even chlorosilanes and silanes may also be used to produce nanosilicon coatings on pre-formed nanoparticles. The silicon deposition in a pass-through deposition zone where the tribromosilane gas and core particles to be coated are introduced into the reaction zone, where doped or high purity silicon is deposited on the core nanoparticles. Off gasses from this reaction can be reused in bromosilane synthesis. While core nanoparticles may be coated in a suitably designed (eg, subatmospheric pressure and very low flow rate to accommodate the aerodynamic characteristics of nanoparticles) fluidized bed reactor, in the illustrated embodiment of FIG. 8, a silicon coating layer of at least about 2 nm, and preferably at least about 5 nm, is deposited in one pass through the deposition zone. This is a relatively expensive process per gram of silicon produced, compared to the plasma vaporization nanoparticle generation processes. Accordingly, because a primary purpose of the shell coating of silicon is to encapsulate a less-stable, or more gas-generating, core material, the deposited layer for reasons of economy may be in the range of from about 2 to about 25 nm.

Solution methods may also be used to produce highly energetic core-shell-perfluorinated nanopowders. For example, aluminum nanoparticles having a particle size in the range of from about 70 to about 200 nm may be prepared by solution reduction of alanes in the absence of oxygen; the nanoaluminum is washed free of reactants; and the aluminum nanoparticles are provided in toluene suspension in accordance with conventional practice[97] (without an oxygenation step, so the surfaces of the aluminum nanoparticles are not covered with oxygen-aluminum reaction products). Ten grams of substantially oxygen-free aluminum nanoparticles provided in this way, or otherwise, are suspended in toluene (100 ml) in which is dissolved one gram of cyclopentasilane, and then the mixture is heated to 90° C. with mixing. The stirred suspension is subjected to UV radiation (eg, 405 nm or shorter) which opens the cyclopentasilane rings to form polysilane which is not soluble in toluene, and precipitates on the aluminum nanoparticles. After sufficient exposure to polymerize at least 50, and preferably at least 90 wt % of the cyclic silane, 200 ml of high-boiling alkane solvent with a boiling point of at least 350° C. is added to the suspension of silane-coated aluminum nanoparticles, and the toluene and excess cyclopentasilane (bp 194° C.) is evaporated at 250° C. The resulting suspension of silane-coated aluminum nanoparticles is slowly heated under pressure with mixing to a temperature of up to 350° C. to reduce the hydrogen content of the silane coatings on the aluminum nanoparticles to a range of from about 5 to about 60 mol % hydrogen, based on the silicon content of the coatings. UV light irradiation may be used to facilitate hydrogen reduction/removal. The polysilane originally has a hydrogen to silicon molar ratio of ~200%, which is reduced by loss of hydrogen, SiH4, and other hydrogenated silicon compounds. The aluminum nanoparticles with H-terminated silicon surface shells may then be reacted with a perfluorinated hydrosilylation reagent to produce highly energetic aluminum nanoparticles coated with a passivating and protective yet highly energetic silicon and perfluorinated hydrocarbon exterior surface.

As indicated, the present disclosure is also directed to nanoenergetic composites. In this regard, composites are provided which comprise nanoenergetic component solids such as nanosilicon, energetic graphene and/or mixtures thereof in a solid, liquid or gel fuel, oxidizer and/or high energy explosive (HE) matrix[98]. A wide variety of oxidizers may be used in the energetic compositions comprising energetic silicon nanoparticles of the present disclosure[99]. Solid, liquid or gel matrices 992, 994 such as illustrated in FIGS. 9G and 9H may comprise an oxidizer (eg, a perchlorate), an explosive (eg, RDX, TNT, etc), a propellant fuel (eg, RP-1, jp8, desulfurized middle petroleum distillate, or nitromethane) and/or a polymer (eg, an oxidizing polymer such as a fluorinated polymer or a nitrated polymer such as hydroxyl-terminated butadiene and energetic polymers such as polyoxetanes or oxiranes, such as ethylene oxide copolymers with NIMMO, polyGLYN, Perfluoro di- or trifunctional polyols, polyGLYN, BAMO, BNMO).

While small diameter nanosilicon particles may be prepared by vapor processes in accordance with the present disclosure as described hereinabove, electrodeposition also provides an inexpensive method for production of highly energetic, nanoscale silicon materials with extremely high silicon reactant surface area. Extremely rapidly-reactive fluoro-nanosilicon energetics can be prepared by electrodeposition of porous silicon, together with surface grafting of perfluoro compounds on the silicon surface(s) to stabilize the composite materials. Electrodeposition rates of silicon with nanoscale porosity can be very high, for example, up to a at deposition rates of up to 50 microns or more per hour, one pound or more of nanoporous silicon can be produced per square meter of electrodeposition substrate surface, facilitating high and easily scalable production rates.

Electrodeposition of porous silicon can be carried out in a variety of electrolytes, including aromatic or aliphatic hydrocarbons such as, for example, acetonitrile, DMF, dichloroethylene, benzene, toluene, xylene, meta-xylene, cumene, diphenylmethane, para-isopropyl-methylbenzene, tetralin, ethylbenzene, anisole, dipropylether, diisoproplyether, dibutylether, tetrahydrofuran, and the like, and ionic liquids such as 1-butyl-1-methylpyrrolidinium bis(trifluoromethylsulfonyl) imide saturated with silicon halide, such as SiCl4, SiBr4, SiI4 and/or mixtures thereof. The silicon source may also be a halosilane, such as trichlorosilane, SiHCl3, in PC as solvent with a tetraalkylammonium chloride as conducting salt, to produce porous silicon having substantial amounts of incorporated hydrogen. 1-alkenes and alkynes may also be incorporated in the electrolyte. By including small amounts of halosilanes in the electrolyte, the electrodeposited porous silicon may be produced with surface (and "internal porosity") hydrogen termination.

Ionic liquids tend to have a high viscosity, so desirably may be diluted with other high-electrochemical window solvents such as toluene, acetonitrile, decane etc., as desired.

Electrodeposition of Si may also be carried out using a variety of other organic electrolytes such as propylene carbonate[100], tetrahydrofuran, acetonitrile, dichloroethylene, glycol ethers such as ethylene glycol dimethyl ether, etc., preferably having high electroconductivity and minimal hydrogen evolution reaction[101]. A supporting electrolyte such as tetrabutylammoniun perchlorate or an ionic liquid such as 1-butyl-1-methylpyrrolidinium bis(trifluoromethylsulfonyl) imide may be utilized to provide electroconductivity to aprotic solvents used as electrolytes for silicon halides. The electrolyte should be substantially free of reactive oxygen constituents such as water[102]. Preferably, silicon is electrodeposited with porosity of at least about 5 volume percent, based on the total volume of the electrodeposited porous silicon. Despite extensive research effort to electrodeposit solid silicon, electrodeposition of silicon typically produces porous silicon with such high surface area that it immediately oxidizes upon exposure to air[103]. This may be due to small amounts of gas evolution during electrodeposition, or nanoscale dendrite-like irregular deposition characteristics, or other mechanisms, but has been a historically difficult problem limiting practical rapid electrodeposition of smooth, fully dense silicon layers for electronic and electrooptical uses. Assuming a layer of oxide on electrodeposited porous silicon surfaces exposed to air of only about 1.5 nm thickness[104], such spontaneous high oxidation of porous electrodeposited silicon suggests or evidences nanoscale channels and/or other porosity, for example, spaced, eg, 3-25 nm apart throughout the electrodeposited silicon mass. The same nanoporosity which permits oxygen penetration and oxidation reaction also makes the porous electrodeposited silicon relatively fragile and more readily comminuted than solid silicon. In accordance with the present disclosure, such nanoporous electrodeposited silicon may be fragmented to produce ultrananoscale silicon particles, and may be reacted with covalent bonding agents for silicon, as previously described, particularly including fluorinated agents, to produce storage-stable, highly energetic materials which have extremely high reactive surface area, and accordingly extremely high reaction rates as energetic materials.

Figure 10A:
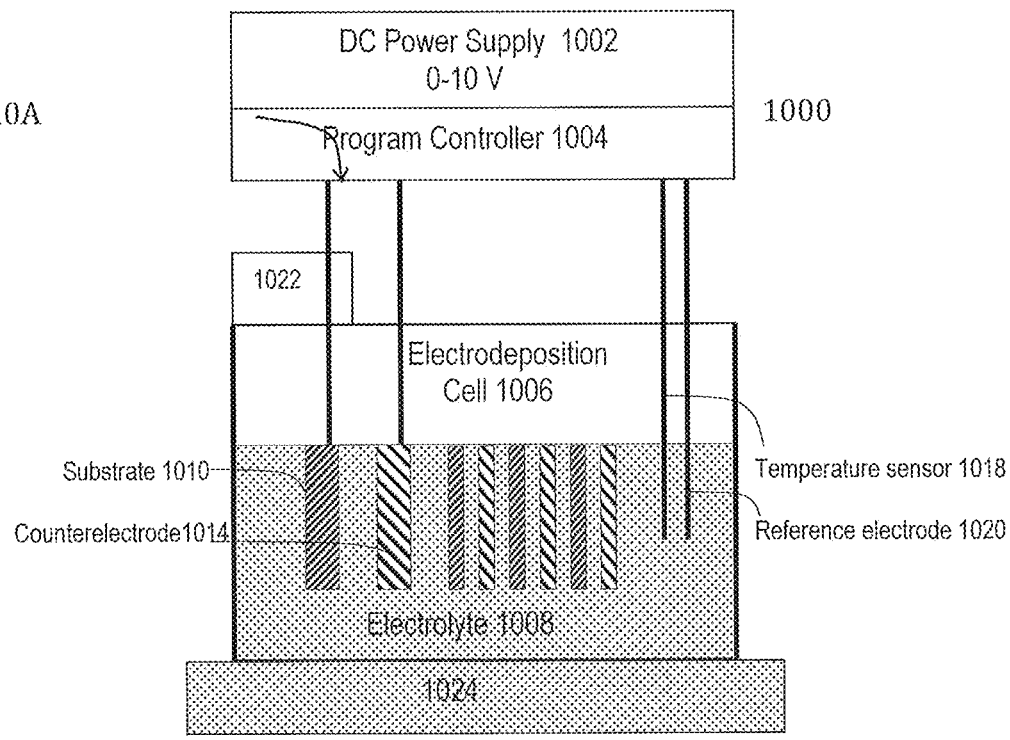
FIG. 10A is a schematic cross sectional illustration of an electrodeposition system for producing nanoporous silicon having extremely high surface area.

Schematically illustrated in FIG. 10A is an electrodeposition system 1000 for electrodepositing nanoporous silicon. Electrodeposited nanoporous silicon produced in the electrodeposition system 1000 may be further processed in the milling and reaction system 1050 of FIG. 10B to produce ultrananoparticulate silicon as will be described hereinafter. The illustrated electrodeposition system 1000 comprises a 0-10 volt DC power supply 1002, a program controller 1004 for controlling the voltage and/or current output from the DC power supply 1002, and a hermetically-sealed inert electrodeposition cell 1006. The electrodeposition cell 1006 contains an electrolyte 1008 in which are placed cathodic deposition substrate electrode(s) 1010 for electrodeposition of nanoporous silicon, and anodic counterelectrode(s) 1014, each connected by a suitable conductor to the respective electrical outlets of the deposition process controller 1004. The deposition cathode may be a conductive metal such as copper, titanium, aluminum or an alloy such as a 40:30:30 wt % alloy of titanium, nickel and niobium[105]. The electrodeposition cell 1006 also comprises a temperature sensor 1018 and a reference electrode 1020, which also respectively are connected to the program controller 1004. As also illustrated in FIG. 10, the electrolyte 1008 of the electrodeposition cell 1006 can be circulated through the cathode-anode assembly and a temperature-controlled reservoir-and-circulation pump system 1022 for temperature (heating and/or cooling) control, compositional analysis and maintenance, and/or filtering, also under the control of the program controller 1004. An ultrasonic vibration and/or stirring system 1024 may be used to adjust surface diffusion layer conditions and even gas bubble evolution at the surface(s) of the deposition electrode(s) 1010. A conductive membrane (not shown) such as an inert porous membrane may be used to separate the zones around the electrodeposition electrode(s) 1010 and the counterelectrode(s) 1014. This can increase electrical resistance, but can be useful when different electrolyte compositions are used adjacent the respective electrodes 1010, 1014, or when it is desirable to restrict electrolysis products to different zones. As an example with reference to FIG. 10A, a series of ten cathode plates 1010 of 1 meter×1 meter surface area on each side are alternated with eleven same-sized titanium anodic plates 1014 having degenerately p-doped (highly conductive) silicon thermally sprayed or sintered thereon in electrical connection to present a conductive silicon surface, with a separation distance of one centimeter (or less) between the anode and cathode surfaces to minimize effects of electrolyte resistance.

Electrodeposition conditions may be potentiostatically or galvanostatically controlled, or may be programmed to follow prescribed plating conditions. It is noted that electrodeposition current may decrease over time as an electrodeposited silicon layer increases in thickness on the cathode(s), because of the electrical resistance of the deposited layer. In batch operations, the current may be maintained at a relatively constant level under galvanic control, or the potential between the cathode(s) and the anode(s) may be progressively increased over time in batch mode, from the initial value to compensate for the increasing resistance. In order to reduce the electrical resistance of the electrodeposited silicon materials, and modify their energetic and physical properties, they may be doped with p- and/or n-type dopants and/or other energetic materials. In this regard, dopant precursors such phosphorous (eg, $PCl_5$ and similarly functional compounds), aluminum, titanium, calcium, lithium, magnesium (eg, $AlCl_3$, $AlBr_3$ $TiCl_4$ or $TiCl_3$, $CaCl_2$ $LiCl_2$ and similar compounds), and/or boron (eg, $BBr_3$, other boron halides, boron etherates, and other soluble boron compounds) may be included in the electrolyte to codeposit with the silicon at levels up to 75 weight percent, based on the total weight of the silicon-containing electrodeposit. A separate boron, lithium, calcium, magnesium titanium and/or aluminum anode(s) (each adjusted in anodic potential and/or current-controlled with respect to the cathodic deposition zone to be oxidatively dissolved and then codeposit its component at the desired rate with silicon at the cathode) may be used to provide desired codeposition content in the electrolyte and the electrodeposit. Codeposition of silicon and boron may be carried out at higher levels at levels of about 10% to about 60% or more by weight to produce silicon-boron materials of very high reaction enthalpy, which are particularly useful as rocket fuel components. Ionic liquids are particularly useful as electrolyte components for such electrodeposition. A variety of boron, Mg and other silicides such as $TiSi_2$ may be formed at the cathode upon codeposition with silicon, the reduced enthalpy of which can facilitate such boron codeposition with silicon. Lithium may be codeposited with silicon to form Li—Si components for batteries in a metastable condition, together with Ti, Ca and/or other components as described herein with respect to vapor deposition manufacture. Nano-scale and/or micro-scale particles of energetic materials may also be included in the electrolyte for codeposition with the silicon-containing electrodeposit. For example, aluminum, titanium hydride, titanium silicide, zirconium hydride, boron, carbon (eg, graphene or CNT) nanoparticles having a particle size of less than about $5 \times 10^6$ cubic nanometers can be included in the electrolyte for such co-electrodeposition. Oxidizer and vapor-generating particles such as polytetrafluoroethylene polymer and copolymer particles can be included for codeposition in appropriate electrolytes (eg, ionic liquids) which do not facilitate electroreduction of the oxidizer polymer particles at the cathode. Preferably, codeposited particles may be included in the electrodeposited silicon-containing electrodeposit at a level of up to about 25 volume percent, based on the total volume of the particle-containing electrodeposit.

A minor amount (eg, 10 mole percent based on the molarity of the $SiCl_4$ or $SiBr_4$ electrolyte component) of hydrogen-containing halosilane, such as $SiHCl_3$, $SiH_2Cl_2$, $SiH_3Cl$, $SiHBr_3$, $SiH_2Br_2$ and/or $SiH_3Br$ may be included in the electrolyte to introduce hydrogen terminal groups into the electrodeposited silicon, if desired. Electrodeposition in H-containing silanes or other hydrogen-donating groups in the electrolyte may also be carried out only at the end of an electrodeposition run (eg, by changing the electrolyte or moving the cathode(s) to a different electrodeposition cell or zone with different electrolyte), prior to harvest of the nanoporous silicon-containing electrodeposit. This is useful for subsequently carrying out hydrosilylation reactions. Small amounts (eg 0.05 to 0.5 volume percent of the electrolyte) of an agent such as triethyl aluminum may be included in the electrolyte to remove oxygen, and potentially interact with the halosilicon electrolyte to form small amounts of electrodeposited silicon having protective surface ethyl groups.

Depending in part on the electrolyte, an electroreduction potential of $SiCl_4$ (minimum of −2.3 V vs Ag/AgCl) may cause electroreduction and/or oxidation of the electrolyte solvent, which may be undesirable if relatively pure silicon deposits are desired. Silicon bromide, SiBr4, has a reduction potential approximately 0.8 V less cathodic than that of $SiCl_4$, so is preferred for electrodeposition when using solvents of more limited electrolytic window, and for rapid silicon electrodeposition at more negative cathodic voltages and higher currents. However, very large amounts of silicon tetrachloride are produced, in some cases as waste from Siemens-type silicon production processes, so there is an economic and environmental advantage for the use of silicon tetrachloride as a raw material.

Halide components are oxidized at the anode(s), which can produce free chlorine, fluorine, iodine or bromine in the electrolyte, unless they are consumed by reaction at the anode (eg, $Si+2Cl_2 \Rightarrow SiCl_4$ or $Si+2Br_2 \Rightarrow SiBr_4$). By using silicon anodes, the halide ions are consumed to produce the silicon precursor $SiCl_4$ or $SiBr_4$, and both the voltage and electric power requirements for electrodeposition are substantially reduced. In addition, impurities in the silicon anodes which are less reactive with the halide ions can be removed as undissolved solids/"mud" in an appropriate electrode sump around the anode. Some free halogen may remain, which can be reacted with pulverized silicon upon circulation of the electrolyte through filtering and conditioning reservoirs external to the electrodeposition cell(s). The anode zone can be separated from the cathode zones by a permeable/porous divider, but this adds complication and additional electrical resistance.

The electrodeposited nanoporous silicon can be readily removed from the deposition substrate by impact, abrasion or scraping the surface of the deposition electrode surface. As described with respect to FIG. 10B, porous silicon can be electrodeposited on conductive high surface area beads, which are readily transferred to a bead mill or other comminution system for further processing. Moreover, under appropriate conditions, the adhesion of the deposited silicon is relatively poor, such that even ultrasonication may be used to remove it. In addition, the nanoporous silicon is mechanically relatively weak and friable compared to bulk silicon, and readily fractures through its nanoporous defects. The brittleness and the nanoporosity of the electrodeposited silicon greatly facilitate comminution to extremely high surface area silicon nanoparticles. For example, high energy jet fluid and/or bead milling (in the absence of reactive oxygen) can readily comminute the friable nanoporous electrodeposited silicon produced in the electrodeposition system to ultrananoparticle silicon having a maximum particle dimension of less than about 20 nanometers, and preferably less than about 15 nanometers. Such ultrananoparticulate silicon desirably has a surface area of at least 120 square meters per gram, preferably at least about 190 square meters per gram, and may comprises at least about $1 \times 10^{17}$ particles per gram having a largest dimension in the range of 2 nm to 20 nm. Upon fracture, newly-exposed silicon is reactive to alkenes and alkynes in the milling fluid, in a manner similar to that of hydrosilylation reactions previously described herein[106], to directly form covalently surface-bonded energetically oxidative perfluorinated functional groups on the enormous surface area of energetic silicon. 1-fluoroalkenes in the milling fluid react with the newly-exposed silicon surfaces to conveniently form Si—C covalently bonded energetically oxidatively reactive fluoroalkanes on the particle surfaces. Because the reaction rate of nanoenergetics materials increases with increasing surface area of immediate reactant proximity, this enormous reactant surface area interface provides extremely rapid reaction upon initiation at sufficiently high temperature or other reaction-initiation conditions. However, under ambient storage conditions, the substantially adjacent elemental silicon and perfluorinated reactant are relatively stable. Accordingly, a very highly energetic but storage-stable silicon nanoparticle composition having extremely large reactive surface interface area (eg, at least 60 square meters per gram) of Si—C bonded fluorinated reactants can be produced in accordance with the present disclosure by covalently bonding a perfluorinated organic layer to the surface of ultrananoparticle silicon surfaces together with facile comminution of electrodeposited nanoporous silicon.

Figure 10B:
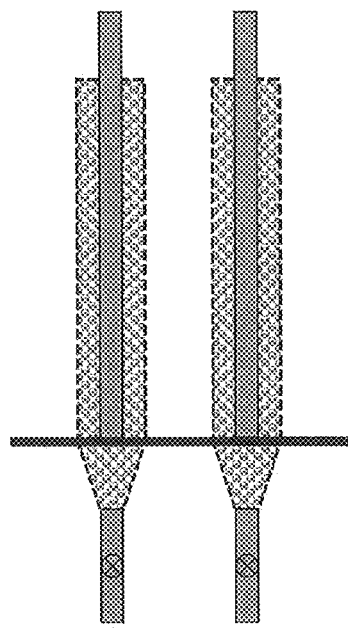
FIG. 10B is a schematic cross sectional illustration of an electrodeposition electrode comprising high surface area beads as a cathodic substrate, for facilitating removal and subsequent comminution of nanoporous silicon electrodeposited on the beads in a comminution system such as illustrated in FIG. 10C.

In this regard, illustrated in FIG. 10B is a nanoparticle comminution system 1050 for processing the nanoporous silicon produced by the electrodeposition system 1000 of FIG. 10A. The transfer of nanoporous silicon from the electrodeposition system 1000 of FIG. 10A, to and through the processing comminution system 1050 illustrated in FIG. 10B, is carried out within hermetically closed vessels, equipment, pumps and piping, with exclusion of oxygen and reactive-oxygen materials. If the electrodeposited nanoporous silicon produced in the electrodeposition system 1000 is even briefly exposed to air or moisture, it will rapidly oxidize. The illustrated comminution system 1050 comprises a series of several colloid, jet and/or bead mills of progressively smaller particle size milling capability. The electodeposited porous silicon produced in the electrodeposition system 1000 may be washed in an appropriate solvent under oxygen-moisture-free conditions, and introduced as a 5-20 wt % slurry into the first stage of the comminution system 1050. For many applications, the nanoporous silicon may be suspended in the electrolyte used in the system 1000, preferably after vacuum treatment to remove volatiles such as SiCl4. For other uses requiring "purer" silicon nanoparticles, the electrodeposited nanoporous silicon from the system 1000 may be washed once or repeatedly (or in a countercurrent manner) and the electrolyte replaced with another milling fluid. Electrodeposition on conductive beads such as illustrated in FIG. 10B provides a convenient way to wash the porous electrodeposited silicon while adherent to the beads. A hydrosilylation agent such as previously described is also combined with the slurry of porous silicon and the milling fluid, for example at a content of 5-10 wt %, based on the total weight of the milling fluid and silicon. For inexpensive passivated ultrananosilicon production, monomers of ethylene, acetylene, vinylidene fluoride, etc may be metered into the hermetically-sealed comminution zones under pressure.

Final disintegration of nanoporous silicon to ultrananoparticle silicon may be carried out by milling with small, 1-5 micron-sized beads in a high energy, high speed stirred and/or agitated bead mill. Silicon carbide beads are preferred because of their hardness and because their limited amounts of bead wear components are not detrimental to energetic final products, although other materials such as boron carbide, tungsten carbide, alumina, zirconium oxide, silicon, and the like beads may be used. Relatively pure silicon beads may be used in the production of optoelectronic ultrananoparticle silicon. For continuous processing, a series of fragmentation stages such as bead mills with decreasing bead size, with large-particle recycle is an efficient method for uniform processing of the material slurry. In the illustrated embodiment 1050 of FIG. 10C a vertical stirred microbead mill may be used having a soft inert organopolymeric-surfaced (eg, polytetrafluoroethylene) milling vessel and a multi-bladed organopolymeric-surfaced (eg, polytetrafluoroethylene) agitator connected to a high-speed motor[107]. Hard silicon carbide or spherical silicon beads are charged to 35-60 volume percent of the free space in the milling vessel. The agitator may be rotated at a peripheral speed in the range of 2-10 meters per second. The slurry may be milled under batch or continuous operation conditions, with an average residence time for the nanoparticle slurry of from about 5 minutes to about 30 minutes. The milling chamber walls may desirably be cooled to maintain temperature control. The beads may be maintained in the milling chamber by an appropriate screen, or by filtration and/or centrifugation. Cooling of the process stream and recycled fractions of the process streams facilitates temperature control in the milling zones.

As the silicon particle slurry is comminuted, it can become more viscous. Accordingly additional milling fluid may be introduced at each milling stage, as necessary or appropriate. It may be desirable to introduce additional hydrosilylation reagent at each milling stage as well. Means (not shown) for ultrasonicating the suspension may be used to disperse and maintain dispersion at each stage of the milling.

Figure 10C:
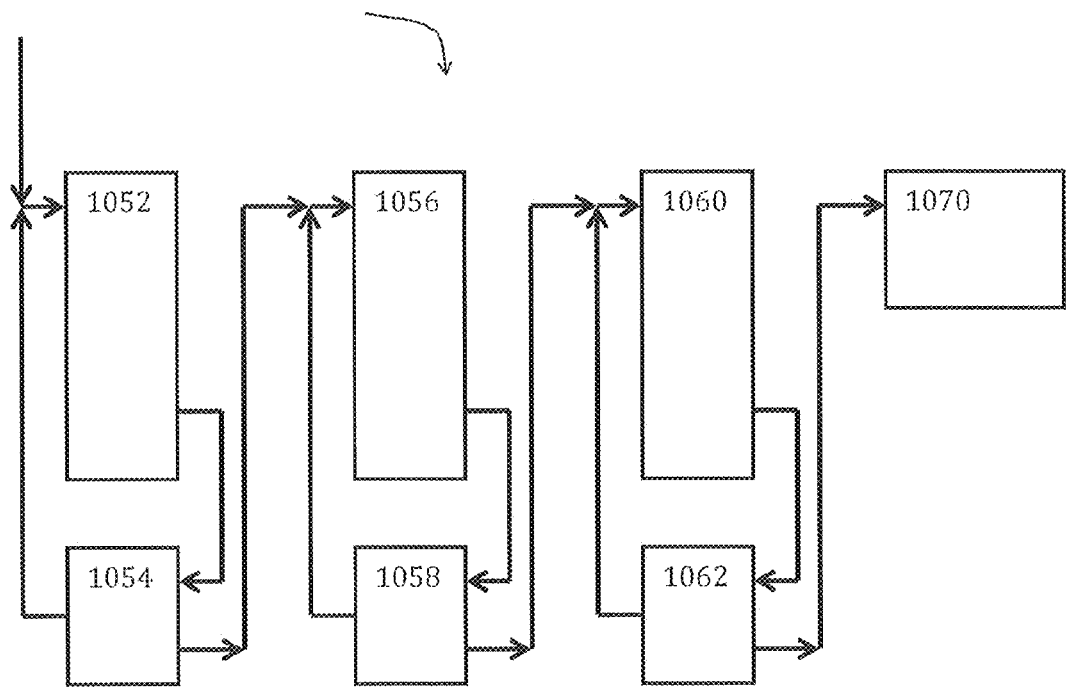
FIG. 10C is a schematic functional illustration of a comminution system for manufacturing highly rapidly reactive energetic silicon nanoparticles of large surface area from the electrodeposited nanoporous silicon produced by the electrodeposition system of FIG. 10A, which may utilize the conductive cathode beads of the cathodic electrodes of FIG. 10B.

FIG. 10C illustrates an embodiment of a progressive milling system 1050 comprising a coarse fragmenter or mill 1052 with an associated centrifugal or other recycle classifier 1054, an intermediate submicron scale bead mill 1056 with an associated centrifugal recycle classifier 1058, and an ultrananoscale high-energy agitated bead mill 1060 with associated recycle centrifugal classifier 1062. If desired, the electrodeposited silicon from the system 1000 may be heated to a crystallization temperature (eg, at least ~470° C. in the absence of oxygen such as a vacuum or hydrogen atmosphere), but will typically be used with such forced crystallization. As illustrated in FIG. 10C, electrodeposited silicon in a suitable suspension fluid may be introduced into a course bead mill 1052 where it is reduced to a preselected maximum size such as less than 5µ in largest dimension. The suspension may also be subjected to ultrasonication at one or more stages of comminution, which can assist both fragmentation and surface grafting reaction by hydrosilylation reagents such as alkenes and alkynes. The beads in the mill 1052 are of relatively large size, for example from about 500 to about 3000µ in diameter. The output stream from the bead mill 1052 is conducted through a centrifugal classifier 1054 where nanoporous silicon particles larger than the preselected maximum size are recycled into the input stream for the mill 1052. The output stream from the centrifugal classifier 1054, which contains particles less than the cutoff size, forms an input stream to the intermediate bead mill 1056, which is designed to mill the nanoporous silicon particles to a submicron size such as smaller than a cut-off size of about 0.5µ in maximum dimension. The hard milling beads in the intermediate mill 1056 are of intermediate size such as in the range of from about 30 to about 50µ in diameter. The centrifugal recycle classifier 1058 receives the output stream from the intermediate mill 1056 and separates and returns particles larger than an intermediate cutoff size (e.g. 0.5µ) as part of the input stream to the intermediate bead mill 1056. The output stream from the centrifugal classifier 1058, which contains particles less than the cutoff size, forms an input stream to the nanoparticulating bead mill 1060. To achieve ultrananoscale size reduction, the mill 1060 utilizes micron-sized beads (eg, about one micron in diameter) which produce an enormous number of high velocity particle-particle collisions under high velocity agitated rotational stirring. For example, the mill 1060 may be driven at a high rotational speed of more than 4000 RPM under high energy milling conditions in a cooled milling chamber. The output stream from the nanoscale mill 1060 may similarly be conducted to a centrifugal classifier 1062 if desired to recycle silicon particles above a cutoff size, such as larger than 8, 10 or 20 nm in largest dimension, to the mill 1060 input stream. The output stream from the ultra nanoscale mill 1060 (or the classifier 1062) is an ultra-nanoscale silicon suspension in the milling fluid. The silicon nanoparticles may be "washed" and separated from the milling fluid for subsequent use in any suitable manner ("Washing" and suspension of liquefied gases such as methane or propane is a useful bulk separation technique.) Excess hydrosilylation agent may be recovered for recycle use if desired.

The hard beads and/or colloid mill faces may be of hard materials whose wear products are not deleterious to the nanoscale product in its intended application. In this regard, silicon carbide, boron and boron carbide are useful bead materials. Pure silicon beads may also be used for high-purity product requirements. Zirconium oxide and aluminum oxide beads may also be useful for purposes were small amounts of aluminum or zirconium oxide in the final product are not deleterious.

For continuous production of electrodeposited nanoporous silicon and its comminution, electroconductive "coarse beads" may be used as cathode components onto which the nanoporous silicon is electrodeposited. The "coarse beads" bearing electrodeposited nanosilicon may then be washed, if desired, and transferred to a course bead mill like mill 1052 of FIG. 10C, and returned as cathode components after bead mill use. Further in this regard, illustrated in FIG. 10C is an electrode assembly 1070 comprising a cathode 1072 and an anode 1074. The cathode comprises a central solid electrode 1076 surrounded by an inert (for example polytetrafluoroethylene) retaining screen 1078 which retains electrically conductive beads 1080 but permits free access to the flow of liquid electrolyte. The beads 1080 make electrical contact with the solid cathode and the other beads, to form a very high surface area cathode. The cathode assembly 1072 has upper inlet means for introducing the conductive beads into the cathode zone, and a lower outlet means for removing the beads after they have had nanoporous silicon deposited thereon. The beads may be highly-doped electroconductive silicon, silicon carbide, nickel, titanium, or other appropriate metals or alloys. Hard amorphous or vitreous carbon beads may also be used, depending upon the acceptability of carbon wear products in the final ultrananoparticulate product. The electrode beads have a large surface area for rapid electrodeposition of nanoporous silicon. The anode may similarly have a central conductive silicon or inert electrically conductive carbon electrode enclosed in a nonconductive retaining screen, to contain particulate silicon to form a high surface area electrode for reaction with the electrolyte anions to regenerate the silicon halide electrolyte. Input and output conduits are similarly provided for introducing and removing the anode particles or beads. The central solid electrodes (anode and cathode) in contact with the power supply may be perforated to permit forced pumping circulation of electrolyte through relatively thin, alternatingly stacked assemblies of anodes and cathodes, to facilitate silicon electrodeposition efficiency.

While porous silicon from magnesiothermic, electrodeposition or electroreduction of silica can be ultrasonicated, milled, ground or otherwise comminuted to manufacture nanoscale powders, it is also desirable to manufacture millimeter and micron-scale particles which have high internal surface area internal porosity. Such particles are useful for manufacturing porous reticulated silicon composite energetic particles and energetic compositions comprising such particles, for example such as described herein with respect to FIGS. 32A, 32B and 32C. In this regard, fragmentation may be carried out to manufacture porous silicon particles of the desired size. For example, in milling systems such as those of FIG. 10, only one or two stages of milling or other fragmentation may be used to produce an output stream delivering millimeter or micron-scale porous silicon particle product of desired particle size. The product stream fractionated into multiple sizes if desired in accordance with conventional practices. The porous silicon particles may be washed and further processed as appropriate, such as by washing in a haloacid (e.g. HF) solution to remove impurities and surface oxide, open porosity and apply surface hydrogen bonds for hydrosilylation reaction or chlorine bonds for Grignard reaction such as described herein.

Figure 11:
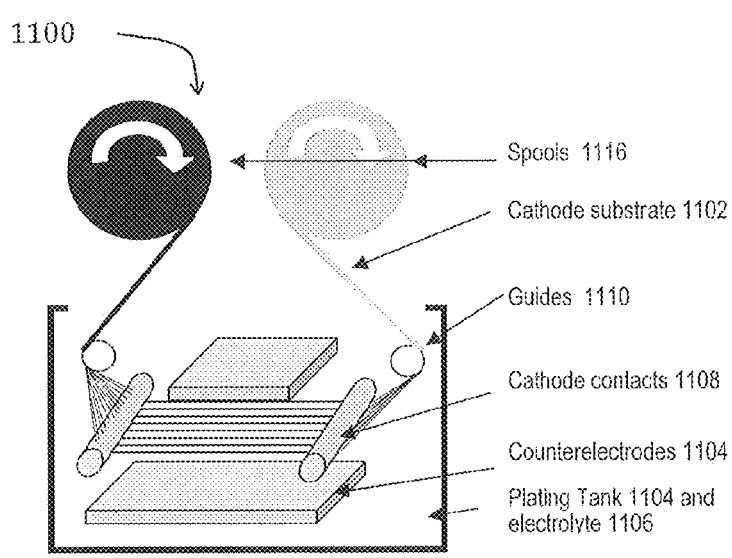

Similarly schematically illustrated in FIG. 11 is a continuous electrodeposition system 1100 for electrodeposition of nanoporous silicon on electroconductive fiber, screen, sheet or fabric substrates such as carbon/graphite or metal fibers, foils or filaments 1102 within an electrodeposition tank 1104 containing a suitable electrolyte 1106. The system 1100 may also be used for electrodepositing aluminum-fluorinated-oxidant composites, in which oxidatively energetic fluorinated polymer particles such as PTFE micro- and/or nanoparticles are embedded in a continuous matrix of aluminum or aluminum alloy[108], so that the silicon-oxidative nanoparticle interfaces are hermetically sealed within the aluminum solid matrix and thereby excluded from atmospheric contact. The electrodeposition system 1100 is sealed from the atmosphere and extraneous sources of oxygen, water and other materials which interfere with the electrodeposition process, and contains an internal inert atmosphere such as argon or nitrogen. The system 1100 comprises electrical cathodic contacts and/or guides 1108 for the conductive filaments/foil/screen 1102, and may include multifilament tow spreaders and guides 1110 as mechanically appropriate. Counterelectrodes 1112 are also provided within the electrodeposition tank 1104. The guides 1108 and counterelectrodes 1112 are electrically connected to a suitable electrodeposition power system such as that of FIG. 10A (not shown). In use, the electroconductive fibers/filaments/screens/sheets are unwound from a supply spool 1116 which may also be in electrical contact with an electrodeposition power supply, and directed into the electrodeposition tank(s) via the electrical contacts and guides 1108 and multifilament tow spreaders and/or guides 1110. The fibers/filaments/screens may be in electrical contact with additional electrode surfaces along their length (not shown) as they traverse the tank 1104, to maintain adequate current and electrodeposition conditions. The counterelectrodes 1112 in the electrodeposition tank are also electrically connected to the electrodeposition power system, which maintains appropriate nanoporous silicon (or aluminum) electrodeposition conditions. After electrodeposition treatment in the electrolyte, the silicon-coated fibers/film/screen or other substrate are rewound on the receiving spool 1118, which also may be in electrical contact with the electrodeposition power supply. While the illustrated continuous silicon electrodeposition system 1100 is shown with a single electrodeposition tank, the substrate fibers, filaments, tows, fabrics, screens, foils and/or sheets may be conducted through multiple tanks having different electrodeposition conditions and/or electrolytes, before being wound on a receiving spool 1118.

Silicon electrodeposition on a metallic sheet or foil (eg, aluminum foil, including aluminum composite sheets as described herein), wire screen or carbon cloth or fibers may be carried out in a continuous electrodeposition cell 1100 like that of FIG. 11, for example using pure anhydrous acetonitrile with 0.1M Tetrabutylammonium chloride as an electrolyte, and 0.3M silicon tetrachloride as the silicon electrodeposition precursor in the electrolyte. Graphite or preferably silicon sheets may be used as the anode counterelectrodes. A platinum reference electrode may be used for electrodeposition voltage control. Silicon is electrodeposited[109] at a voltage of −3 to −4 V (vs Pt quasireference electrode), on the carbon fibers, aluminum foil or screen as they pass through the deposition tank, and are wound on the receiving spool 1116. Preferably a denser silicon layer is electrodeposited at the lower voltage range, eg, −2.8 to −3.5 Volt range which is more adherent on the substrate, than a more porous silicon layer which is more rapidly electrodeposited at the upper cathodic range of −3.5 to −4 volts (such as may be more desirably used in the electrodeposition system of FIG. 10 where separation from the cathode is beneficial for subsequent comminution). Electroconductive carbon fibers or a metal foil/screen as the cathodic electrodeposition electrodes are progressively drawn through the electrolyte at a predetermined rate (depending on the in-cell path length) to achieve a desired level of chemically active silicon deposited thereon. For example, at an average silicon electrodeposition rate of about 40 microns per hour, a 15 minute transit time through the electrodeposition cell will increase the diameter of 10 micron carbon fibers or thickness of 10 micron thick aluminum foil from about 10 to about 30 microns. The electrodeposited silicon is so active that it is immediately oxidized in the air. Accordingly, it is excluded from air, moisture and other oxygen content, and is instead reacted with an energetic covalent surface bonding agent as described herein. This reaction may be carried out while still attached to the substrate fibers/films/screens, to produce strong energetic components for incorporation energetic composites. In this regard, porous silicon electrodeposited on the foil/screen/fibers with a bromo- or chlorosilane component in the electrodeposition electrolyte to produce H-bonded surfaces on and within the porous electrodeposited silicon, may be washed to remove electrolyte if desired, and subsequently reacted by hydrosilylation reaction as previously described, to form a passivating covalently-bonded alkane (preferably fluorinated) coating on and within the porous silicon electrodeposit.

As an electrodeposition example, porous silicon electrodeposits are obtained at rapid electrodeposition rates at a cathode potential of −3 to −4 volts in an acetonitrile electrolyte. An electrolyte consisting of pure anhydrous acetonitrile solution containing 1 molar SiCl4 and 1 molar tetraethylammonium chloride may be used to electrodeposit substantially oxygen-free porous silicon using electrodeposition apparatus such as that of FIGS. 10A, 10B, 11, or laboratory apparatus[110]. The electrodeposition of porous silicon is carried out potentiostatically under argon under oxygen and moisture free conditions at 25-50 C at a deposition voltage in the range of from about −3 volts to about −4 volts vs. Pt electrode (lower for Si counterelectrodes), providing high deposition rates. Small amounts of $BCl_3$ or similar dopants may be added to the electrolyte to increase the conductivity of the electrodeposited silicon. Similarly, ground submicron/nanoscale doped (preferably degenerately-doped semimetallic) crystalline silicon may be added to the electrolyte with stirring/ultrasonic suspension, as a particulate slurry in small amounts, such as 1 weight percent in the electrolyte. Codeposition of the submicron doped particles facilitates maintaining electroconductivity in the electrodeposited porous silicon as it becomes thicker. The deposition voltage may also be increased slightly as the electrodeposited porous layer on the cathode(s) becomes thicker, before harvesting of the electrodeposit. An RTIL with a wide electrochemical window may be partially or fully substituted for the tetraethylammonium chloride. A higher-boiling-temperature electrolyte such as n-methyl naphthalene may be used instead of the acetonitrile, eg for electrodeposition at higher temperatures in the range of 50-150° C. with pressurized SiCl4 which may produce higher crystallinity, which assists passivation. Other variations may also be practiced to produce nanoporous silicon. The porous silicon produced is washed in hexane, centrifugally separated from the solvent/electrolyte, and milled as a 5 wt % suspension a fluid consisting of 90 volume % decane and 10 volume percent heptadecafluoro-1-decene, in milling apparatus such as that of FIG. 10C. The ultrananoparticulate silicon powder produced has a surface area of at least about 60 square meters per gram of energetic silicon surface area covalently bound to a passivating yet energetically oxidatively reactive heptadecafluorodecane.

As another example, electrodeposition of porous silicon may be carried out in the electrodeposition using pure propylene carbonate and $SiCl_4$ in approximately equal volume ratio, with approximately 30 weight percent tetrabutylammonium chloride, based on the weight of the propylene carbonate, as a current-carrying salt. Small amounts, eg, from 0.5 to 5 wt % based on the weight of the $SiCl_4$, of diisobutyl aluminum hydride[111] may be added to facilitate deposition of porous silicon. Similarly, propylene carbonate (PC) and N-butyl-N-methylpyrrolidinium bis (trifluormethanesulfonyl) imide (Pyr14TFSI) may be used as a conductive electrolyte in ambient temperature electrodeposition at 1.0 V vs. Li/Li+. With 1 M SiCl4, propylene carbonate as solvent and 1 M LiTFSI as conducting salt. In another example, 1 M $SiCl_4$ and 1 M LiTFSI in Pyr14TFSI room temperature ionic liquid may be used for electrodeposition of porous silicon. The electrodeposited porous silicon may be nanomilled and reacted with a hydrosilylation reagent as previously described, to produce a passivated, very high surface area energetic material.

Figure 15:
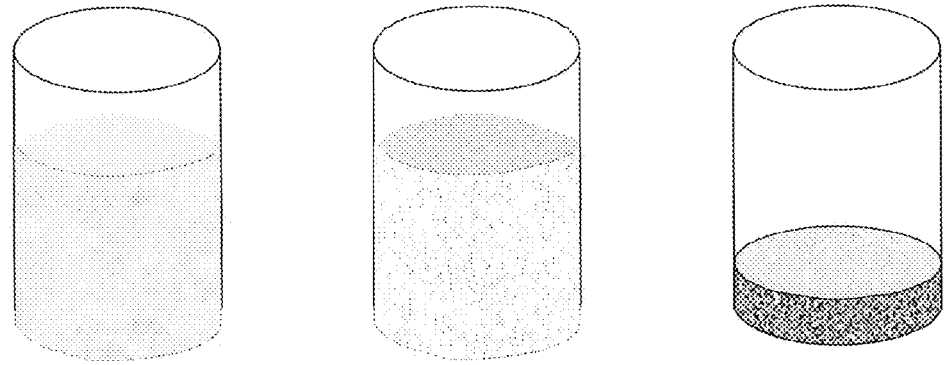
FIG. 15 illustrates the preparation of polymer-coated energetic graphene and/or energetic nanosilicon powder.

As indicated, the electrodeposition systems of FIGS. 10 and 11 may also be used to electrodeposit composites of nanoscale energetically oxidative polymer particles such as PTFE, hermetically encapsulated within an aluminum matrix. In this regard, for example, an AlCl3-EtMeImCl room temperature liquid electrolyte may be used as an electrolyte in the deposition systems for aluminum and aluminum alloys[112] together with nanoparticle PTFE suspended in the electrolyte. The purification of AlCl3 by sublimation, and the preparation and purification of an aluminum chloride-1-ethyl-3-methylimidazolium chloride (AlCl3-EtMeImCl) room-temperature ionic liquid (RTIL) may be carried out in accordance with conventional practice. The electrodeposition is carried out in a hermetically sealed, nitrogen-filled electrodeposition system with an oxygen and moisture content less than 1 part per million (ppm) at temperatures in the range of 25-150° C. Dry toluene, xylene, decalin or the like containing a nanoscale particulate polytetrafluoroethylene powder suspended therein by ultrasonication is added to reduce the viscosity of the RTIL and provide a nanoparticulate oxidizer particles for codeposition with aluminum. The nanoscale PTFE powder may be pretreated in a dry/drying inert solvent and/or with a surface-modifying agent, to insure dryness, full dispersion/dispensability, and to provide a few surface groups to facilitate codeposition. PTFE nanoparticles may be made in a variety of ways[113]. For example, electrodeposition of aluminum can be combined with "electrophoretic-like" co-deposition of PTFE nanoparticles assisted by surface charge on the nanoparticles for enhanced incorporation into the aluminum or aluminum alloy metal matrix; the surface of PTFE nanoparticles may be very lightly treated with a strong base such as sodium napthenide to introduce a small number of —OH and/or carbon double bonds C═C on the fluorinated nanoparticle surfaces (eg, 10-20 per nanoparticle), which may be reacted with cation-forming groups or hydrosilylated with silane, hydroborated with BH3 and/or preferably hydroaluminated with AlH3 to form surface groups which can participate in the electroreduction and exchange halogen ions with the aluminum electrodeposition electrolyte[114] Under appropriate circumstances, nonaqueous aluminum deposition systems can induce codeposition of particles more readily in aqueous electroplating baths[115]. Metal ions or other cations at the surface of the PTFE particles (such as by cationic comonomer introduction or grafting, surface ammonylosis, or pre-reaction with aluminum alkyl such as triethyl aluminum) can be used to facilitate attraction of the PTFE particles to the cathode in a nonaqueous electrodeposition system, where they will be incorporated into the 3-D metal layer to form a metal electrodeposit-metal powder composite[116]. Ausimont S.p.A. and others manufacture high solids-content PTFE nanoemulsions which have particles from 10 to 100 nm spheres or rods in high latex concentration (20-40 wt %)[117] which can be dispersed in nonaqueous fluids, dried and utilized in the electrolyte for codeposition with a solid continuous aluminum matrix hermetically encapsulating the codeposited PTFE nanoparticles. Fe2O3 (which may include some $Fe_3O_4$) nanoparticles with at least slight ferromagnetic properties may be coated with PTFE copolymers in a suspension of a solvent for the PTFE copolymer (eg, see FIG. 15). Soluble perfluorocarbon polymer Fluorinert™ FC-40, available from 3M is commonly used to dissolve amorphous fluoropolymers because its high boiling point (149° C.) favors solubility and film formation. Solutions of fluoropolymers can also be prepared using perfluorooctylethylene, perfluorohexylethylene as solvents. By proportioning the amounts of iron oxide nanoparticles and polymer, a thin, eg 5-50 nm layer of the PTFE copolymer may be precipitated on the individually-suspended magnetic iron oxide (thermite) nanoparticles, for example by introducing a nonsolvent liquid for the polymer into the suspension-containing solution, and/or cooling the solution to reduce solubility and precipitate a continuous polymer coating on each particle. Oxidatively energetic perfluorinated polymer-coated magnetic oxide core nanoparticles (eg, preferably <1 micron nominal diameter) are formed in which the thermitic iron oxide oxidizer is electrically insulated by, protected from the electrolyte by the continuously encapsulating fluorinated coating. These particles may be suspended in the aluminum electrodeposition electrolyte, and can be magnetically attracted to the surface of the cathode for codeposition and encapsulation in the electrodeposited aluminum matrix. Permanent magnets may be used, but electrolyte-shielded electromagnets adjacent the cathode film for attracting the codeposition particles to opposite side of the cathode surface, are preferred for process control capability. It is also noted that aluminum and/or silicon coated PTFE and other fluorinated energetic polymer particles may be provided with a thin aluminum or silicon coating prior to electrochemical codeposition with aluminum in a composite layer. Such coating can facilitate codeposition and suspension in the electrolyte. Such coatings may be applied by electroless deposition methods, or by electron-injection silicon or aluminum reduction methods such as described with respect to FIG. 24.

The concentration of PTFE nanoparticles in the RTIL electrolyte will depend on the desired content of codeposited PTFE in the electrodeposited aluminum matrix, the surface zeta potential of the PTFE particles and their codeposition rate at the cathode, the viscosity of the electrolyte, the use of magnetic attraction, whether the particles are coated with aluminum, silicon or another material, and the electrodeposition potential among other factors. A desirable range of PTFE nanoparticles is from about 0.1 to about 20 weight percent of particles maintained in suspension the electrolyte, based on the total weight of the electrolyte including the PTFE nanoparticles. Because of the viscosity of the RTIL salt, from about 10 to about 80 weight percent of an electrochemically inert solvent such as toluene, xylene, decalin, dodecane, etc. may be added to the electrolyte to facilitate electrodeposition and particle codeposition.

Figure 23:
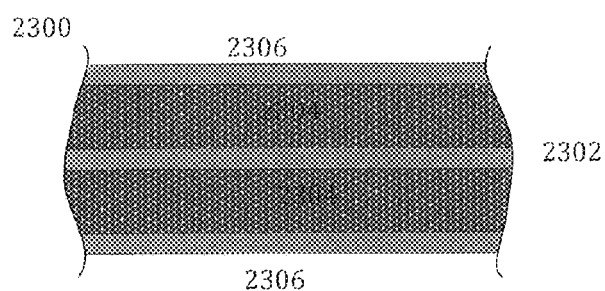
FIG. 23 is a partial side cross-sectional view of an energetic solid aluminum sheet matrix comprising fully encapsulated energetic oxidizer and/or hydride nanoparticles hermetically sealed within the aluminum matrix from the atmosphere such as made by the electrodeposition system of FIG. 10 or 11, which is useful as a structural energetic material, electrically initiated explosive, or component of a munition such as illustrated in FIG. 19.

Pure aluminum (eg, 99.9%) may be used for the counterelectrodes 1104 and reference electrode when electrodepositing aluminum. In operation, aluminum is then consumed from the anodes 1104 to replace that electrodeposited on the cathode foil 1102. The cathode 1102 for an electrodeposition example to produce an energetic sheet 2300 such as illustrated in FIG. 23, may be an aluminum foil 2302 (or sheet or screen) pre-cleaned of lubricant and surface coating by ultrasonic treatment in a toluene bath containing triethyl aluminum, and having a thickness in the range of from about 8 microns to about 100 microns. The electrolyte may be an AlCl3-EtMeImCl ionic liquid electrolyte (88 wt %) with 10-50 wt % toluene or xylene and 2-10 wt % PTFE nanoparticles suspended therein (based on the total electrolyte weight), the amount of additives which may be adjusted to produce a desired PTFE content in the finished composite. Selection of electrolyte and electrodeposition conditions is important in view of the strong oxidizing capability of fluorinated alkanes. For example, if a conventional commercial aluminum alkyl electrodeposition electrolyte[118] is used, the PTFE will tend to be defluorinated and converted to electroconductive carbon which facilitates further defluorination. Electrodeposition of aluminum with co-deposited PTFE nanoparticles on the aluminum foil cathode may be carried out under constant current electrolysis using an appropriate electrolyte such as AlCl3-EtMeImCl with a toluene, ethyl benzene or xylene cosolvent to reduce viscosity at −2 milliamp per square centimeter ($mA/cm^2$) at a temperature in the range of 40-100° C. (depending on cosolvent boiling point), preferably about 50° C. or above. The aluminum foil cathode is continuously advanced at a rate to provide a composite continuous electrodeposit of a solid aluminum matrix containing preferably from about 0.1 to about 20 weight percent (based on the total weight of the electrodeposited aluminum-PTFE composite) of embedded and encapsulated PTFE nanoparticles which are hermetically sealed in, and excluded from the atmosphere by the electrodeposited aluminum matrix. This encapsulation of the PTFE nanoparticles within the reactive aluminum matrix produces an enormous nanoscale surface area of unoxidized aluminum in intimate contact with the oxidatively reactive PTFE. The composite electrodeposit 2304 may desirably have a thickness in the range of from about 20 microns to about 250 microns on each side of the cathode. Periodic reverse pulse electrodeposition may be used if a smoother surface is desired. For use in exfoliating aluminum-iron laminates, Ti, Zr, and/or Ta hydride submicron-scale particles may also be suspended in the electrolyte, and codeposited in the aluminum matrix at levels preferably ranging from about 1 to about 10 weight percent, based on the total weight of the composite aluminum matrix.

Figure 19A:
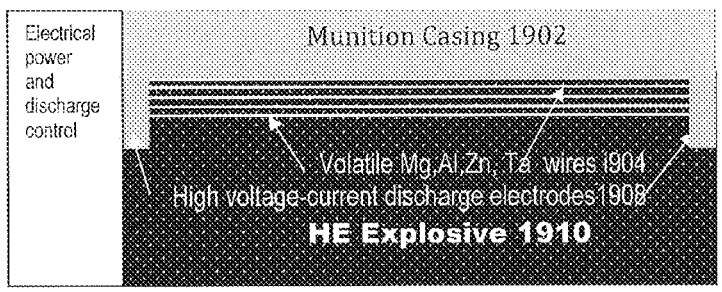
FIG. 19A is a schematic cross sectional side view through the plane of a munition axis, of a portion of a munition having electrically conductive, energetically reactive metal wires, screen or film within the munition explosive adjacent the munition casing, and a longitudinal electric current pulse system for vaporizing the metal.

As an example, illustrated in FIG. 23 is a cross-sectional view of an energetic sheet 2300 comprising a central aluminum foil (screen or layer) 2302 having a thickness in the range of from about 5μ to about 500μ, such as a 10μ aluminum foil for electro-fuze energetic use, or a 500μ sheet for use as a roll-bonding layer for a composite munition casing such as that of the layers 1804 FIG. 18A. The sheet may desirably be thicker to facilitate roll bonding to other layers such as iron foil layers of the embodiment 1800 of FIG. 18A. For high energy electric pulse initiated using or a pulse-volatilize to energetic metal foil or screen 1904 for use in a munition such as embodiment 1900 of FIG. 19A. The energetic sheet 2300 further comprises a dense aluminum or aluminum alloy matrix 2304 adherently attached to the foil 2302. Preferably both sides of the foil 2302 have composite layers 2304. The composite aluminum matrix layer 2304 have embedded and encapsulated particles of a perfluorinated energetic polymer such as polytetrafluoroethylene and/or a hydride such as titanium, zirconium or tantalum hydride, as previously described. Desirably, the particle volume hermetically encapsulated (and protected from oxygen and the atmosphere) within the solid, nonporous aluminum or aluminum alloy matrix is in the range of from about 2 to about 30% of the total volume of layers 2304. This provides an enormous internal surface area of aluminum metal in direct proximal contact with the fluorinated oxidizer nanoparticles or micro-particles. If the particles distributed within the matrix layer 2304 were not sealed and protected therein, their interface with the aluminum matrix would immediately oxidize and therefore would lose energy and not be storage stable. The energetic sheet 2300 may further comprise (optionally) an aluminum or aluminum alloy layer 2306 atop the layers 2304 to further protect them, and to facilitate roll-bonding to other metal layers if appropriate. In this regard, it may be desirable that the encapsulating aluminum matrix may be aluminum alloy which may be slightly physically stronger than the aluminum foil layer 2302 and the encapsulating protective layers 2306. Examples of alloys which may be electrodeposited atop the matrix composite 2304 are well known in the literature.

Figure 19B:
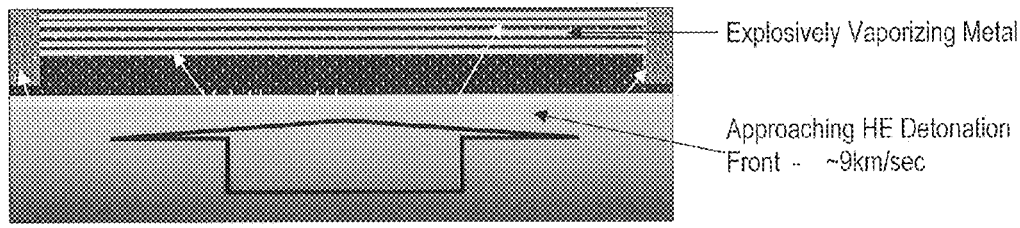
FIG. 19B is a schematic cross sectional side view of the munition of FIG. 19A, illustrating the initial stage of electric current pulse vaporization of the reactive metallic components adjacent the casing, timed as the explosion front of the detonated explosive within the casing is approaching the munition casing.

In this example of the illustrated embodiment, both sides of the foil cathode 2302 are provided with a composite aluminum solid matrix coating 2304. Only the exterior surface of the composite sheet, which in this example may be from about 50 to about 500 microns thick, forms a surface oxide on contact with the atmosphere—the composite is shelf-stable. The finished composite may be used as an energetic sheet to form casings, stacked with intermediate HE layers, and/or cut into strips and used as an electric pulse initiated explosive fuze. A composite Al-PTFE nanoparticle foil or screen can be used as an energetic or electrically vaporizable component of the munitions of FIGS. 19-21, as a rolled structural composite sheet for reactive/energetic munition casings, and as a rolling sheet with iron foil/particles, Al and optionally (Ti,Zr,Ta) hydride to provide munitions such as illustrated in FIG. 18 A, B, C. A pure solid aluminum or aluminum alloy layer 2306 may be electrodeposited atop the composite aluminum-PTFE (TiH2) layers 2304, to further seal and protect the composite electrodeposited layers 2304.

In a further example, a nanoporous silicon coating may be subsequently electrodeposited on the aluminum-PTFE composite sheet or screen, internally and externally passivated with a lower 2-6 carbon alkane (by hydrosilylation reaction with a 2-6 carbon 1-alkene or alkyne) and/or a 1-fluoroalkane (by hydrosilylation reaction with a 1-fluoroalkene), to produce an energetic foil or screen for use as energetic or electrically vaporizable components of the munitions of FIGS. 19-22, and as a rolled sheet composite for reactive/energetic munition casings.

Figure 24:
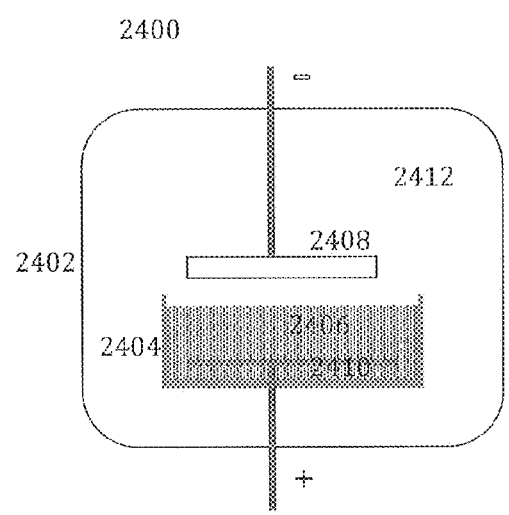
FIG. 24 is a schematic illustration of an electroreduction system for electro generating silicon nanoparticles by external introduction of electrons into an oxygen-free aprotic anodic electrolyte containing a dissolved silicon electrodeposition precursor.

Other electrochemical processes may also be used to manufacture silicon or aluminum nanoparticles and coatings. Illustrated in schematic cross section in FIG. 24 is a an electroreduction system 2400 for electrogenerating silicon nanoparticles by external introduction of electrons into an oxygen-free aprotic anodic electrolyte containing a dissolved silicon electrodeposition precursor. In this regard, the system 2400 comprises a sealed enclosure 2402, an electrolyte tank 2404 containing electrolyte 2406, an external cathode 2408 for introducing electrons into the electrolyte and an anode 2410 within the electrolyte tank 2404. The electrolyte tank may be a batch or continuously-fed tank. The anode 2410 may be an inert conductive metal or graphite, but is preferably an electroconductive consumable silicon sheet or silicon surface which can react with halide anions upon their electrooxidation to form silicon halides. For high-energy electron sources, the electrolyte tank may have a thin glass cover or the like (not shown) to retain the silicon precursor, which may be volatile at elevated temperatures. The RTIL has very little, if any, volatility. The external cathode emits electrons and introduces them into the electrolyte 2406. Upon introduction from the external cathode, the electrons can become solvated electrons within the electrolyte, which are capable of reducing aluminum or silicon precursors such as aluminum or silicon halides, alanes and silanes, for example SiCl4, SiBr4, SiHCl3, SiHBr3, AlCl3, AlBr3 (which may be complexed with the electrolyte) etc. The external cathode may be a cold cathode, an electron gun, or an ionizing electron irradiation generator. The electrolyte in the illustrated embodiment is an aprotic oxygen-free ionic liquid such as an imidazolium-based RTIL[119] (eg, BuMeImTf2N containing 1 molar SiCl4, AlCl3, AlBr3 or SiBr4) containing the dissolved silicon or aluminum precursor. In one example, the external electron source 2408 is a high energy electron radiation source such as used commercially for sterilization of sealed medical supplies (eg, $^{60}$Co or accelerated 4.5-5 MEv electron beam source emitting 10-20 milliampere beam current from a common ground). The high energy irradiation source is used to apply a 20-50 kilogray (kGy) electron irradiation dose to the cooled electrolyte 2306 which is maintained at a temperature of less than 20° C. in this example. One Gray is defined as one joule of ionizing radiation absorbed by one kilogram of irradiated material. A kilogray (kGy) is 1000 grays. A positive voltage of +3 to 5 volts with respect to the common ground potential is applied to a silicon anode 2410 to oxidize and/or react with any chloride ions which may be formed upon silicon reduction, and collect/oxidize stray solvated electrons or negative species which may be of insufficient energy to reduce silicon. Silicon nanoparticles are formed in the electrolyte. Similarly, a 1 molar concentration of AlCl3 in the electrolyte produces aluminum nanoparticles. A dispersion of aluminum or silicon-based nanoparticle cores may be mixed in the electrolyte, to coat them with a silicon coating, as previously described. Similarly, an electrolyte containing 1 molar AlCl3 may be used to coat a suspension of PTFE nanoparticles in the electrolyte with an aluminum coating. An electroless aluminum reducing agent such as DIBAH may also be added to the electrolyte to facilitate aluminum coating on PTFE nanoparticles. Upon irradiation as described, the core nanoparticles are respectively coated with a silicon or aluminum shell.

Heated thermal emission cathodes, and cold cathodes (preferably with low work function) may also be used efficiently inject electrons into the electrolyte. In the illustrated embodiment 2400, when using a cold cathode at lower energies which have lower penetration capability, a glass surface 2412 is not employed, so that the top surface of the electrolyte 2406 is directly exposed to the electrons from the cold cathode emitter. An electric field of at least about 10 volts, and more preferably from about 15 to about 300 volts is maintained between the cold cathode emitter surface and the anode 2410. The ionic liquid has no significant vapor pressure, so that a partial vacuum may be maintained in the sealed deposition chamber 2412, if the silicon precursor and any co-solvent with the RTIL are cooled to reduce their vapor pressure. The effectiveness of electron injection into the electrolyte from the cold cathode is increased with increasing vacuum, so the electrolyte should best be at a relatively low temperature. If necessary, the electrolyte should be cooled to a temperature below 20° C. to minimize SiCl4 evaporation and remove heat from electron injection energy thermalization. The electrolyte should be cooler than the chamber walls and other surfaces, to limit condensation of volatile silicon precursors.

The silicon and/or other energetic nanoparticles described herein may beneficially combined with an oxidizer to form high-performance, storage-stable rocket, scramjet and ramjet propellants. In this regard, for example, an ammonium perchlorate composite propellant may be produced by blending 15-25 weight percent of energetic silicon nanoparticles with 65-70 weight percent of finely (preferably of particle size less than 50 microns (eg, with at least 5 wt % less than 25 microns in nominal diameter) of ammonium perchlorate, together with a conventional solid rocket fuel matrix organopolymer such as PBAN (polybutadiene-acrylic acid-acrylonitrile terpolymer), HTPB (hydroxyl-terminated polybutadiene) which is appropriately crosslinked (eg, epoxy-curing for PBAN, isocyanate curing for HTPB). The mixture is formed as a highly viscous fluid, cast into shape and then cured/crosslinked into a load-bearing solid. Other oxidants and binders, such as energetic oxidative organopolymeric binder components, may also preferably be used, including energetic organopolymers grafted to the nanoparticles.

Figure 25:
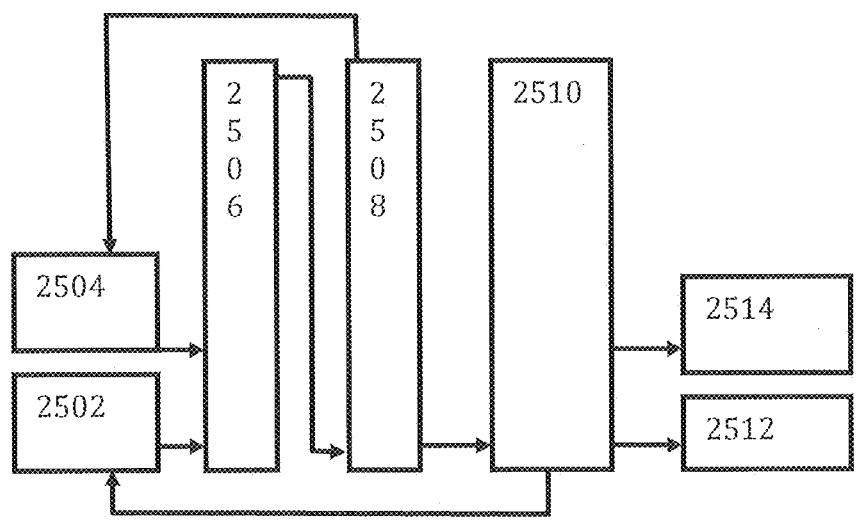
FIG. 25 is a schematic illustration of a system and process flow for manufacturing silicon nanoparticles by reaction of a liquid sodium source such as liquid sodium or liquid sodium in a high boiling hydrocarbon, with a silicon precursor gas such as a mixture of $SiCl_4$, with minor amounts of $HSiCl_3$ and $H_2SiC_2H_5$.

Silicon nanoparticles for use herein may also be made by continuous methods involving introduction of a silicon precursor gas into a liquid sodium source. A schematic illustration of hermetically sealed process equipment[120] for molten sodium reduction manufacture of silicon nanoparticles is illustrated in FIG. 25. The illustrated apparatus 2500 comprises means for providing molten sodium with appropriate pumping 2502, means for providing a silicon precursor vapor with appropriate pumping and flow control 2504 which includes at least 50 volume percent of an inert gas such as argon, a reaction vessel 2506 for introducing the silicon precursor vapor diluted with inert gas from the source 2506 into a molten stream of sodium from the sodium source 2502, a gas-separation vessel 2508 for separating inert gas from the reaction stream from the reaction vessel 2506, and a reaction product separation system 2510 for separating nanoparticle silicon reaction product from sodium and sodium halide. In accordance with embodiments of the manufacturing methods using the apparatus of FIG. 25, the silicon source gas is introduced in finely-divided bubbles into the liquid sodium source flowing at a speed of at least 1 meter per second under high shear, at a limited introduction rate such that the temperature of the reaction mixture does not increase more than 30° C. A particularly preferred molten sodium composition is a suspension of sodium (mp~97° C.) in a hydrocarbon carrier such as naphthalene, other high-boiling aromatics, or high-boiling aliphatic hydrocarbons. Sodium and naphthalene can form a sodium napthenide reducing agent which is more conducive to silicon nanoparticle formation than pure molten sodium metal. Such a sodium source or molten silicon liquid, and a silicon precursor such as silicon tetrabromide or silicon tetrachloride are combined under reaction conditions of high shear and high sodium-to-silicon precursor ratio in the reaction vessel 2506, to produce silicon nanoparticles and sodium halide. Silanes [eg, SiH4], halosilanes [eg, HSiCl3, etc], and alkylsilanes [eg, Si(C2H5)4, etc] may be included in the silicon precursor material in a weight percentage of up to 10 weight percent, based on the total weight of the silicon precursor vapor, to assist limiting the particle size of the silicon particles formed, and to provide surface passivation groups [eg, Si—H and Si—C2H5] on the silicon nanoparticles. Although the reduction reaction is highly exothermic, the high shear, dilution of silicon precursor in an inert gas, and high sodium-to-silicon precursor ratio are carried out such that the temperature of the sodium stream increases less than 30° C. in the reaction vessel as a result of reduction reaction with the silicon precursor vapor. The reduction reaction is quite rapid at temperatures higher than the sodium melting point. The reaction stream comprising molten sodium, silicon nanoparticles (which includes any sodium silicide formed) and sodium halide particles is pumped to separation means 2510 for separating the components and recovering the silicon nanoparticles. Conventional separators such as cyclones, centrifuges, particulate filters, and vacuum stills may be used. Sodium chloride and any residual sodium present on the particles may be removed in a water-alcohol wash containing hydrofluoric acid or ammonium fluoride, preferably with small amounts of HF. The treatment with HF and/or NH4$^+$F creates H-terminated silicon surfaces on the silicon nanoparticles, which limits oxidation. The sodium-salt-silicon slurry may be first ultrasonicated and/or milled to break up agglomerates, and to separate precipitated salt from the silicon nanoparticles. Depending on processing conditions, it may be possible to at least partially centrifugally or gravitationally separate silicon nanoparticles from salt crystals by size and/or density difference in the sodium carrier or an aprotic solvent.

Whether using a liquid sodium reducing agent, or a napthalene carrier for sodium, the salt-sodium chloride solids are readily separated by centrifugation in the separator system 2510. The naphthalene may be refined if appropriate, and returned to the sodium source system 2502 where it is homogenized with about 5 wt % liquid sodium to form a sodium source fluid for reuse. The salt and silicon solids, together with any remaining sodium may be vacuum distilled to remove the naphthalene and then sodium (including sodium content of sodium silicide). Prior to sodium distillation, hydrogen treatment may be useful to convert sodium to sodium hydride. Subsequent decomposition of sodium hydride upon vacuum removal of sodium may assist hydrogen termination of the silicon nanoparticles. Sodium chloride is somewhat soluble in pure methanol (~14 g/liter @25° C.), and in liquid ammonia (30 g/liter@25° C.), which have an advantage of limiting the formation of an oxide layer on the silicon nanoparticles. The centrifuged or filtered solids comprising the silicon nanoparticles and the sodium chloride may also be stored in an aprotic solvent which is unreactive with the silicon nanoparticles, but has some (albeit) small capacity for dissolving sodium chloride. Upon storage, particularly with temperature variation which raises and lowers NaCl solubility, the larger salt crystals will grow in size, while the smaller salt crystals are eliminated. The silicon nanoparticles may then be separated from the larger salt crystals by conventional size separation procedures. The silicon nanoparticles may be passivated by hydrosilylation-type reaction to form Si—C bonded protective groups, and/or reaction with amines such as hexylamine, dioctylamine, ethylene imine, etc. to form Si—N surface protective groups, as previously described herein. Reaction with 1-alkenes or fluorinated hydrosilylation reactants can also be utilized to apply passivating Si—C bonded groups to the silicon nanoparticle surfaces, all as previously described, using liquid or vapor phase reaction conditions. The salt byproduct has little or no effect on the surface passivation reactions. Subsequently, the passivated silicon nanoparticles may be suspended in an aprotic solvent which is washed with an incompatible polar solvent such as water. Alkyl-coated silicon nanoparticles are compatible with aprotic solvents such as hexane, while the salt crystals are compatible with water or more polar solvents. Other separation methods may also be used. As indicated above, a preferred method is to wash the salt-nanosilicon solids with a weak hydrofluoric acid solution in water, ethanol, methanol, or mixtures thereof. Similarly, a weak solution of ammonium fluoride in water, methanol and/or ethanol may be used. This treatment dissolves the salt for removal to a vessel 2514, and removes surface oxide, and created hydrogen surface groups on the silicon nanoparticles. The purified and surface-hydrogenated silicon nanoparticles may then be centrifuged and collected in vessel 2512 and further processed and used as desired. Molten $CaCl_2$ (and to some extent $MgCl_2$) can dissolve $O^{2-}$ ions for oxidation at the anode. A carbonaceous anode can react with oxide anions to reduce the electrochemical voltage required for cathodic metal reduction and to form CO↑ and/or $CO_2$↑ which are removed as gas(es). An inert anode such as high density $SnO_2$ can discharge $O^{2-}$ ions to produce oxygen gas, but requires more energy than a carbon anode. An oxygen-conductive anode such as a yttria-stabilized zirconia electrode can also selectively remove oxygen, and reduce the voltage requirement by reaction with a reducing gas such as hydrogen on an external anode surface.

Chlorides of metals having a higher chlorine enthalpy than that of silicon are useful inert salts for multiphase silicon particle manufacture. Anhydrous calcium chloride, $CaCl_2$, has a density of ~2.15 g/cm³, a melting point of ~772° C., an atmospheric pressure boiling point of ~1935° C., as well as solubility in water (74 g/100 mL @20° C.) and certain organic solvents (eg, acetone). $CaCl_2$ dihydrate has a lower density of ~1.8 g/cm³.

Anhydrous magnesium chloride, $MgCl_2$, has a density of ~2.32 g/cm³, a melting point of ~714° C., an atmospheric pressure boiling point of 1412° C., solubility in water (54 g/100 ml @20° C.) and some organic solvents (eg, ethanol). $MgCl_2$ hexahydrate has a density of only ~1.57 g/cm³.

Anhydrous NaCl has an ambient density of ~2.16 g/cm3, a melting point of ~801 C, a 1 Bar boiling point of ~1413 C, is soluble in water, and slightly soluble in ammonia and methanol, inter alia. NaCl has an ambient density of ~2.16 g/cm³, a mp of ~801° C., and a 1 bar bp of about 1413° C., which approximates the mp of silicon. It is slightly soluble in some organics such as methanol. KCl has an ambient density of ~1.98 g/cm³, a mp of ~770° C. and a 1 bar bp of ~1420° C., which is also near the mp of silicon. It is slightly soluble in glycerol and alcohol. Mixtures of NaCl and KCl (and other salts of energetic metals) can form eutectics with lower melting points. LiCl has a density of ~2.07 g/cm³, a mp of ~605° C., and a 1 bar bp (with decomposition) of ~1382° C. It is soluble in a variety of nonaqueous organic solvents such as pyridine and methanol.

Alkali/alkaline earth fluorides are also useful as inert molten salt components for various silicon particle manufacturing procedures, and can readily accommodate silicon dioxide as a melt component. $CaF_2$ has a 1418° C. melting point, which is close to that of silicon, and a crystalline structure which permits epitaxial growth with crystalline silicon. Its rt density is ~3.18 g/cm³, its 1 bar bp is ~2533° C., and its hardness is Mohs 4. $MgF_2$ has a similar density of ~3.15 g/cm³ a mp of ~1263° C. and a 1 bar bp of ~2260° C. (with decomposition). NaF has a density of ~2.558 g/cm³, a melting point of ~993° C., a 1 bar boiling point of ~1704° C. FLiNaK is the designation of a ternary eutectic alkaline metal fluoride salt mixture of 46.5 mol % LiF, 11.5 mol % NaF, and 42 mol % KF which has a melting point of ~454° C. and a boiling point of ~1570° C. A similar LiF-containing salt mixture of 44 mol % LiF, 40 mol % KF, 12 mol % NaF and 4 mol % $MgF_2$ has a eutectic melting point of 449° C.

Magnesium metal has a low ambient (ie, ~25° C. rt) temperature density of about ~1.74 g/cm³, and an even lower density of ~1.58 g/cm³ at its melting point of ~650° C. The atmospheric pressure boiling point of magnesium is ~1091° C., which is lower than the melting point of silicon, and lower than the boiling point of its chloride, $MgCl_2$.

Calcium metal has a very low ambient temperature density of about ~1.55 g/cm³, and an even lower density of ~1.38 g/cm³ at its melting point of 842° C. The atmospheric pressure boiling point of calcium, ~1484° C., is slightly above the melting point of silicon. Silicon dioxide, $SiO_2$, in its various forms has a melting point range of from about 1600° C. to about 1725° C. and an ambient density of about ~2.64 g/cm³, which is higher than that of silicon. Elemental silicon, a desired product of various processes herein, has a bulk melting point of ~1414° C., a density of ~2.33 g·cm⁻³ at ambient temperature (~2.57 g/cm³ at its melting point) and a Mohs hardness of ~7. Talcs and related minerals are soft, very inexpensive magnesium silicate based materials which can have nanoscale, easily separable laminarity to nanoscale, much like that of graphite. Elemental aluminum has an ambient temperature density of ~2.70 g/cm³ and a liquid density of ~2.375 g/cm at its melting point of ~660° C., which is only slightly higher than the melting points of calcium and magnesium.

Silicon micron- and nano-scale particles for use in propellant, explosive and other energetic compositions can be produced by self-propagating combustion synthesis utilizing self-sustaining exothermic reactions of a metallic reducing agent such as magnesium and/or calcium, with an oxidized silicon source such as silica, siliceous clays, quartz, sand, silica fume, and/or fumed silica. The overall reaction of magnesium with $SiO_2$ is relatively exothermic:

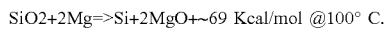
SiO2+2Mg=>Si+2MgO+~69 Kcal/mol @100° C.

The adiabatic temperature balance of the MgO and Si reaction products from a 100° C. initial stoichiometric 2Mg and $SiO_2$ molar reactant temperature is ~1948° C. (HSC Chemistry 4.0). For combustion syntheses of silicon from stoichiometric 2Mg—SiO2 reactant mixtures, the volume of one mole of SiO2 is about 60 ml, while the volume of 2 moles of Mg metal is about 49 ml, so that the silica constitutes ~55 vol % of the reaction mixture, and the magnesium constitutes about 45 volume % of the reaction mixture. After combustion synthesis reaction, the silicon product constitutes only about 26 volume percent of the reaction product, while the high-melting, relatively dense magnesium oxide byproduct constitutes about 74 percent of the reaction product volume. This makes it more economically difficult to remove the MgO byproduct by chemical solution means. Magnesium oxide, MgO, has a high melting point of ~2852° C. and a ambient density of ~3.58 g/cm³, which is significantly higher than that of silicon. It is soluble in acids, ammonia, and some organics. MgO with a hardness of ~5.8 (Mohs scale), is harder than CaO, but relatively soft compared to $SiO_2$.

The overall reaction of Calcium with $SiO_2$ is somewhat more exothermic (and therefor more complete) than the Mg—$SiO_2$ reaction:

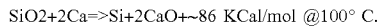
SiO2+2Ca=>Si+2CaO+~86 KCal/mol @100° C.

The adiabatic temperature balance of the CaO and Si reaction products from a 100° C. initial stoichiometric 2Ca+$SiO_2$ reactant temperature is ~2338° C. (HSC Chemistry 4.0). For combustion syntheses of silicon from stoichiometric 2Ca—SiO2 reactant mixtures, the volume of one mole of $SiO_2$ is about 60 ml, while the volume of 2 moles of calcium metal is about 80 ml, for a 43 vol % $SiO_2$ to 57 vol % Ca reactant volume ratio. After reaction, the silicon product constitutes only about 20 vol % of the reaction product volume, while the refractory calcium oxide byproduct constitutes about 80 vol % of the total reaction product volume. Calcium oxide, CaO, has a relatively high melting point of ~2572° C., a Mohs hardness of ~3, and an ambient (room) temperature density of about 3.35 g/cm³, which is higher than that of silicon. It is soluble in acids and some organics such as glycerol.

Magnesium silicide, a low density (1.988 g/cm3) structural semiconductor with an enthalpy of −77.8 kJ/mol, may be formed with a stoichiometric excess of magnesium over silicon content in the Mg—SiO$_2$ combustion reaction mixture[121]. Calcium and magnesium silicates such as Mg$_2$SiO$_4$ can also be produced under substoichiometric reducing metal conditions.

In conventional combustion reaction for nanosilicon powder preparation[122], Mg and SiO$_2$ powder starting reactants are thoroughly mixed and compacted under high pressure to a relative density of up to 70% and placed on a graphite tray in a cylindrical steel reactor. The reactor may be evacuated and then filled with pressurized argon (up to 20 atmosphere pressure), said to control the rate of magnesium evaporation from the reaction zone. The combustion synthesis reduction reaction is initiated by a short (<5 second) DC pulse through a tungsten resistance heating wire adjacent the sample surface to melt the Mg and initiate the highly exothermic reaction. After initiation, the combustion reaction proceeds through the compressed reactants as a high-temperature reaction front, typically reaching temperatures over 1800 C. The combustion reaction proceeds as a reaction front through the blended reactants. Magnesium is melted in the reaction front and quickly reacts with the SiO$_2$ to form silicon and MgO. The silicon product melts at 1414° C., and unreacted SiO$_2$ melts at 1600-1725° C., while unreacted Mg (1090° C. boiling point at atmospheric pressure) can at least partially vaporize while reacting. The velocity of the combustion propagation front varies with reaction conditions (pressure, density, surface area of reactants, and type of silicon oxide raw material) but is typically within the range from about 0.25 to about 2.0 cm/s for finely comminuted well-mixed reactants at a relative density of ~70%. The resulting reaction product is a hard sponge-like structure of MgO in a silicon network. The reticulated spongelike network may be leached for 3 hours in such conventional manufacture, with 36% hydrochloric acid in a 1:1 ratio to dissolve the MgO reaction product, followed by washing in pure water. After leaching, a nanoporous silicon sponge structure is formed, which may be milled to produce submicron-scale silicon with an average particle size of about 200 nm. The washed silicon product is dried for about 10 hours to produce silicon nanopowder having a thin SiO$_2$ surface. The thin oxide-coated particle fragments are not highly spherical, but are useful for a variety of energetic and pyrotechnic applications.

The size of the pores and the size of the milled silicon grains produced by milling the leached and dried silicon reaction product sponge structure are largely defined by the number and size of the MgO grains formed in the combustion front, which can be controlled by varying the cooling rate in the range of 50-200° K/s, by keeping the reaction layers and compressed reaction mixture composite size relatively small, so heat is rapidly radiated and/or convected away within the reaction vessel). While conventional mixing of small magnesium and silicon dioxide particles is useful, it is expensive. In addition, conventional compression of small, thin layers of reactants (so they can cool rapidly) is relatively expensive for commercial production of nanosilicon powders. Scale up is difficult without increasing the Si—MgO reaction product pore size, and hence the milled silicon particle size.

Figure 26:
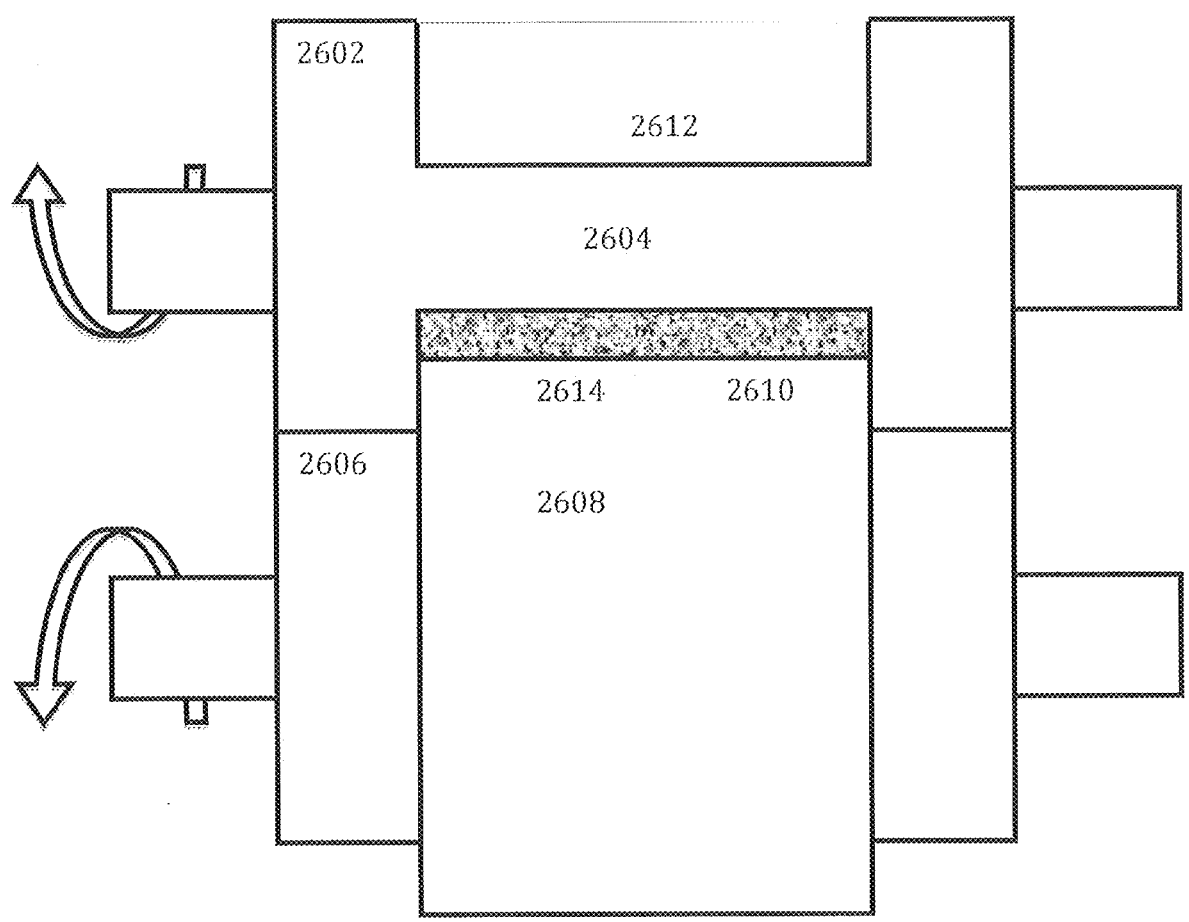
FIG. 26 is a schematic side view of a recessed compression roll assembly for shear-mixing and homogenization of silica and/or boron oxide, with a metallic reducing agent such as magnesium and/or calcium.

In accordance with the present disclosure, magnesium sheets, fragments and "chunks" may be mixed with silicon oxides (which are friable) and compression-sheared to thoroughly compress and intimately mix the reactants prior to combustion reaction. Nanoscaled silicon-source materials such as talc may also be used. It is preferred that the reactants be uniformly and intimately mixed prior to combustion reaction. This reduces nonstoichiometric reaction conditions and facilitates the uniformity of the combustion reaction as it proceeds through the reactant mass. In this regard, illustrated in FIG. 26 is a side view of a 2-roll compression-mixing roll system 2600 comprising a radially symmetrical (about its rotation axis) compression roll 2602 having a recessed rotationally symmetrical slot 2604, and a similar, mating compression roll 2606 having a projecting zone 2608 of larger circumference that fits into the slot 2604 of the roll 2602. The compression rolls 2604, 2606 may be adjusted in separation distance to provide an effectively sealed compression zone 2610 between the slot recessed surfaces 2612 and 2614 of the respective compression rolls 2602, 2606.

To prepare an intimately-mixed, densified Mg (and/or Ca) SiO2 reaction composite, a magnesium-silicon dioxide mixture may be introduced into the compression-sheer rolls and compressed at a temperature in the range of about 25° C. to about 200° C., at a mixture-thickness compression ratio ($T_{before}$-to-$T_{after}$) of at least about 2:1, and preferably at least about 4:1 ratio of the thickness of the mixture before passage through the rolls, to the distance between the rolls to which it is compressed. The magnesium is relatively soft, such that this compression forces the harder silicon dioxide particles into the relatively soft magnesium, while shearing the components, thereby "mixing" the reactants. Magnesium is relatively weak at ambient temperature, and becomes even softer and more malleable at higher temperatures. An upper compression temperature of about 200° C. limits combustion initiation risk, while facilitating mixing and compaction of the reaction components. Multiple passes of the composite mixture through such compression rolls (for example of "stacked" layers and/or previously rolled composite fragments) together with shear, mixing, flattening, homogenization and compression, intimately densifies, mixes and homogenizes the reactants. The compression roll system 2600 may be operated in an oxygen-free atmosphere (for example hydrogen, argon, and/or nitrogen. Extended shear and subdivision of silicon dioxide within the magnesium metal may result in some limited amount of pre-reaction (preferably less than 10-15%), which can be compensated for by preheating reactants as described below.

Magnesium sheets, clumps and fragments may also be blended, densified and homogenized with silicon dioxide in a high-pressure piston extruder, such as a hard-metal twin screw or a high-pressure piston extruder conventionally used for aluminum extrusion, preferably at a temperature in the range of from about 100 to 200° C. A reduction of cross-sectional area during extrusion of at least 2:1, and more preferably at least 5:1 is desirable for compression, mixing and homogenization of the reactant components prior to combustion reaction. The resulting blended and densified reactant mixture may be used for more economical, scaled-up production of nanosilicon by combustion reaction as described herein. A very simple scale-up is to loosely introduce the roll-compacted/blended reactant mixture into a hermetically-sealed high-temperature reaction vessel such as that used for Kroll manufacture of Titanium (from Mg and TiCl$_4$), provide stoichiometric excess of Mg sufficient to fill the void space of the reactor under combustion reaction conditions, and ignite the reactants.

Conventional aqueous leaching of combustion-formed silicon-magnesium oxide solid networks can be relatively expensive and produce large amounts of waste magnesium chloride aqueous solution. Such conventional processing can also produce a silicon oxide layer on the surface of the silicon particle product, which is undesirable for highestperformance energetic and propellant applications. As described below with respect to the embodiment 2700 of FIG. 27, the composite Silicon-MgO and/or Si—CaO reaction product produced by combustion reaction of Mg,Ca with SiO2 may desirably be milled and physically separated into silicon and Mg,Ca oxide fractions to reduce or eliminate the waste magnesium chloride byproduct. The MgO (and/or CaO) byproduct has a wide range of uses, ranging from cements to pharmaceuticals and agricultural products. Magnesium (and/or Calcium) metal for re-use can be produced from its oxide in a variety of ways, including carbothermic reduction, by conversion to MgCl2 (CaCl2) and subsequent electrolysis, and by dissolving MgO (CaO) in a molten salt bath for electrolytic reduction[123].

Magnesium vaporization can facilitate thorough and rapid combustion reactions. However, it is important to both retain magnesium vapor within the silicon dioxide reaction mass in the reaction zone, and to rapidly cool the silicon and magnesium oxide reaction products, which can be conflicting goals. If the magnesium reactant is transported from the reaction zone by its vaporization and expansion (22.4 liters per mole at STP), reaction stoichiometry is adversely affected and byproducts such as magnesium silicides and magnesium silicates can be produced. However, if a large mass and volume of reaction mass is used to confine the magnesium vapor produced by the reaction enthalpy, it is difficult to rapidly cool the silicon and magnesium oxide reaction products to produce fine magnesium oxide particles which structure a nanoscale porous silicon crystallization sponge.

Figure 27:
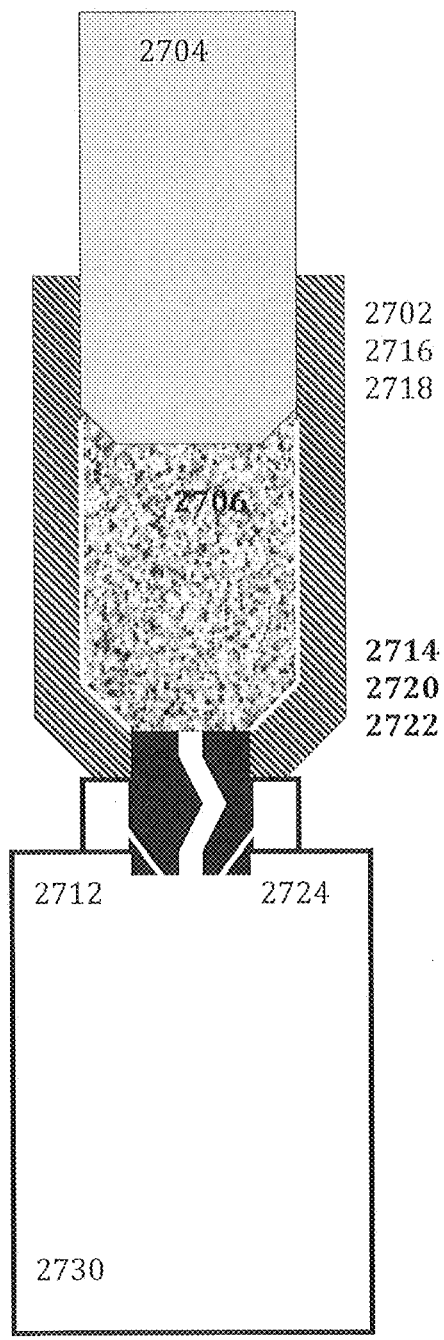
FIG. 27 is a schematic cross-sectional side view of a high-temperature reaction and extrusion system for mixtures of molten silicon with a molten dispersion medium, such as a combustion-reaction mixture.

In this regard, illustrated in FIG. 27 is an enclosed high-pressure reaction extrusion system 2700. The reaction vessel comprises a strong refractory vessel casing 2702, and a refractory compression piston 2704 which form an extrusion system capable of applying high pressure (eg, up to 50,000 psi) to blended Mg-silica reactants 2706 in the vessel interior 2708. However, the pressure need only be adequate to expel the reacting mass from the reaction zone, as will be described. The high-pressure reaction system 2700 has an extrusion conduit 2710 and discharge orifice 2712 at its distal end 2714. The reaction vessel will desirably have a volume of at least about 1 liter, and preferably at least about 10 liters for bulk nanosilicon production. In operation, the compression piston 2704 may be withdrawn from the casing 2702, and the chamber 2716 of the casing 2702 filled with blended magnesium and silicon dioxide reactants 2708. The reactants 2708 may be pre-sheared, mixed and compressed such as manufactured by the confined roll system 2600 of FIG. 26, and/or conventional blending methods. An extrusion orifice closure 2020, which may be a substantially fully-dense magnesium-silicon dioxide composite with a strong magnesium matrix, seals the upper end of the extrusion conduit 2710.

A relatively thin layer 2718 of magnesium and/or magnesium chloride (e.g., as a powder, sheet, foil, sprayed on layer, etc.) may be provided adjacent the interior wall of the compression casing 2702, surrounding the reaction mass 2708. After filling the reaction vessel with reactants, the compression piston 2704 is inserted into the conforming reaction vessel bore, and a vacuum may be drawn on the sealed interior zone to facilitate compression, if desired; however, air or an inert atmosphere may remain in the reaction chamber 2716 if expedient. The reaction mass may also include low melting fluidizing agents such as alkali and/or alkaline earth halides (eg, magnesium chloride, calcium chloride, sodium chloride, sodium fluoride and mixtures thereof), preferably at least about 1%, for example from about 2 to about 15 weight percent, based on the total weight of the reaction mass.

The compression piston 2704 may then be forced into the bore of the reactor shell 2702 to compress the reaction mass to at least 50%, and more preferably at least about 70% relative density. The compression force is not sufficient to break the extrusion orifice closure 2720.

The temperature of the reactant mass prior to initiation of reaction may be adjusted by appropriate heat transfer from the heating means (not shown) prior to reaction initiation is desired, for example in the range from about 25° C. to about 200 C, in order to control the final reaction product temperature. In this regard, the casing may be at elevated temperature from previous reaction processing, which latent heat may be efficiently and effectively used to preheat the reactant mass components.

After compressing the reactant components, a combustion reaction is initiated at the closure 2020 of the extrusion orifice, which opens the entrance to the discharge conduit to permit discharge through the conduit 2710 and extrusion orifice 2712. If the closure 2720 is a magnesium-SiO2 composite plate, it may be resistance-heated to melt the magnesium and initiate reaction of the composite, for example by a resistance heating pulse applied to through the extrusion orifice plate, to melt and/or react the plate components and adjacent reactant components at the upper entrance to the extrusion conduit 2710.

Upon initiation of the combustion reaction, a relatively rapid combustion wave travels from the zone of initiation at the extrusion cylinder distal end 2714, at a velocity characteristic of the component density and related factors, such as in the range of from about 0.25 to about 2 centimeters per second for well-mixed magnesium and silica reactants at approximately 70% or more relative density. The combustion wave heats the reaction products in a substantially adiabatic manner to a temperature determined by the initial latent heat and the reaction enthalpy of the reactants, minus limited heat losses to the compression-extruder walls, and heat sink capacity of any fluidizing agents. The reaction product temperature is typically designed to be greater than about 1800° C. and preferably at least about 1900° C. At this temperature, unreacted magnesium would be vaporized at atmospheric pressure, but is confined in the vicinity of the silica within the reaction zone, and both the silica reactant and the silicon reaction product are melted as a result of the reaction enthalpy. The relatively large volume of magnesium oxide reaction product, however, remains unmelted at the reaction temperature. Because the "free volume" in the reaction chamber can be limited substantially to the porosity of the compacted reaction mixture, the vaporized magnesium does not escape the reaction zone, but instead raises the internal pressure of the reaction zone and the corresponding vapor density of the magnesium reactant. Magnesium vaporization facilitates its reaction with the particulate silicon dioxide. The magnesium vapor may condense on relatively colder silicon dioxide particles in advance of the combustion wave, and may condense on a cooler reaction vessel interior wall. Molten magnesium and/or magnesium chloride layers at the interior wall of the reaction chamber facilitate compression and extrusion of the mass as discussed below. It should be noted that the system 2700 may be designed and constructed so as to be disassembled if appropriate to restore the system for a subsequent production run.

In this regard, upon initiation of the combustion reaction, the compression piston is advanced into the reaction vessel bore at a rate substantially matching reaction volume behind the combustion wave, to extrude the melted post-combustion-wave reaction products into and through the conduit 2710, and discharge them through the extrusion orifice 2712. The extrusion conduit may desirably be preheated to prevent solidification of the molten reaction components, which may include molten silicon, still-reacting Magnesium, and molten silica/silicates, as well as solid MgO particles. For example, a reaction mixture with a reaction front traveling at 1 cm/s through a cylinder reaction zone with a cross-sectional area of 50 cm$^2$ will generate a molten mass of approximately 50 cm$^3$ per second to be extruded through the extrusion cylinder and discharged from orifice 2712. The piston 2704 is forced into the cylindrical reaction chamber zone at a rate of approximately 1 cm/s such that the post-combustion-wave reaction mass is still molten and reacting. Upon forced passage through the extrusion conduit 2710, the multi-phase partially-molten and still-reacting mixture is desirably subjected to shear in being forced into the extrusion conduit and as it passes through the extrusion conduit. As indicated, the extrusion orifice discharges into an enclosed reaction product collection zone. A gas such as high-pressure helium, hydrogen or argon may be directed from cooling gas manifold 2722 and channels 2724 onto the emerging partially molten reaction product, to rapidly cool it to less than about 1400° C. to solidify the silicon (and any magnesium chloride present). Molten magnesium chloride lubricant (if present) may vaporize into the chamber 2730 if the chamber is under vacuum. The cooling jets may also comprise silicon-surface reactive agents such as alkyl amines, 1-alkenes or 1-alkynes as previously described, to react with the surface of the silicon as it cools.

It is economical to operate the collection zone at a near-ambient pressure (eg, approximately 1 bar) but is also useful to discharge the molten reaction product into a subatmospheric pressure collection system such as the vacuum system like that of FIG. 4. Upon extrusion of the reacting components at a temperature for example above 1700° C., gas content from the reaction bore 2706 and other low-boiling components such as magnesium chloride can vaporize to fragment, foam and/or otherwise disintegrate the extruded reactants. Alkali and alkaline earth halides can also dissolve non-silicon impurities, which can enable production of purified silicon materials. The molten mass in the compressed reaction chamber 2716 can dissolve small amounts of inert gas such as argon, helium and hydrogen. Upon exiting into a lower-pressure collection zone 2701, such dissolved gas and low-boiling halides such as magnesium chloride expand in the extrusion mass from within the silicon and the magnesium oxide interfaces, to facilitate fragmentation.

The cooling rate of the silicon solidification temperature should preferably be at least about 50 degrees centigrade per second, and more preferably at least 300 degrees Centigrade per second (Zh. Yermekova et al, supra) to a temperature below the ~1414 C melting point of silicon, which is readily accomplished in a cooling jets and/or by cooling surface impingement systems such as rotating, cooled copper or steel disks or wheels such as those used for cooling of amorphous metal ribbons and particle splats. In this way magnesium oxide particle size remains relatively small, producing a nanoreticulated silicon product structure interwoven with the solid magnesium oxide reaction product particulates.

Upon vacuum treatment at elevated temperature (below the ~1414 C mp of silicon), a significant portion of the magnesium chloride can be removed as magnesium chloride vapor prior to separation processing of the combustion reaction product composite of silicon and magnesium oxide. The extruded and rapidly-cooled reaction product may be leached in aqueous HCl in accordance with conventional practice, or may be more economically processed for centrifugal or gravity separation of magnesium oxide from as previously described.

While this example utilizes a magnesium reducing agent, other reducing agents such as calcium and sodium and/or aluminum may also be used. It is noted that calcium chloride can dissolve a significant amount of calcium oxide and non-silicon impurities from the silica source and molten silicon.

While removal of magnesium oxide with aqueous HCl is effective for removing magnesium oxide, this produces large amounts of aqueous magnesium chloride solution byproduct. The silicon may be treated in a hydrofluoric acid solution after treatment with HCl, to produce a substantially fully-hydrogen-terminated surface on the silicon particles.

But it is more economical to mill the nanoscale silicon-magnesium oxide combustion-wave reaction product in a fluid milling system, and separate the respective silicon and magnesium oxide powders. The magnesium oxide powder can be re-used, and the silicon powder can be further processed for a variety of applications. The silicon product is relatively hard, and of low density of 2.33 g/cm$^3$ compared to MgO byproduct having a higher density of 3.58 g/cm$^3$. Magnesium oxide is relatively soft, which facilitates its mechanical separation from silicon particles. In this regard, the solid Si—MgO mixture may be broken up and milled in a system like that of FIG. 10. An appropriate milling liquid such as hexane, methanol, ethanol, hexylamine, and/or dense liquids such as CCl$_4$ (specific gravity ~1.6)$^{124}$, CBr$_4$ (sg~2.96), CH$_2$I$_2$ (sg 3.3), and the like may be selected for the particular process, and with attention to subsequent use of the silicon particles. Milling in presence of 1-alkene hydrosilylation reactants can provide surface passivation and/or functionality. For example, a cooled slurry of Si—MgO reaction product in ethanol can be quickly milled in the system of FIG. 10 to produce a slurry of Si nanoparticles with surface Si—O—CH2CH3 protective groups which passivate the silicon particles against further surface oxidation. The silicon and MgO slurry may be separated in a variety of ways, including gravity/centrifugation, electrophoresis, and/or multiphase fluid separation. A fluid with density between the respective densities of silicon and MgO facilitates very economical separation in accordance with gravity/centrifugation processing, but the great difference in density between Si and MgO permits separation even in low viscosity, low density liquids such as low molecular weight alkanes. Gas classification of the ground reaction products may also be used to separate the ground Si—MgO mixture. Preferably an inert gas such as H2, N2 or Argon is used to minimize silicon surface oxidation. The MgO and Si surfaces have (and can be adjusted to have) different zeta potentials in appropriate electrophoresis liquids such as lower alkyl alcohols, for efficient electrophoretic separation of the MgO from the Si particles. In multiphase fluid separation systems (eg, hexane ethanol) the MgO may be preferentially attracted to the more polar phase, especially when small amounts of water are present. By separating at least the major part of the MgO, subsequent processing of the silicon particles is much more economical and robust. For example, by removing at least 90 weight percent of the MgO from the Si—MgO combustion reaction product, the Si particles can be more readily washed in aqueous HCL and/or provided with hydrogen surface termination with an ethanolic/aqueous HF or NH$_4$F wash.

While combustion wave reactions have an advantage of simplicity and dynamic non-equilibrium reaction conditions, they also have disadvantages of raw material cost and processing requirements. Combustion reactions are not necessary for various other silicon nanoparticle formation methods. In this regard, silicon can be melted and sheared with an inert molten inorganic liquid such as an alkali and/or alkaline earth halide, including mixtures thereof such as magnesium chloride, calcium chloride and sodium chloride. Inert particulates may be included to assist silicon size reduction. Such manufacturing methods comprise the steps of melting and mixing silicon with an inorganic alkaline earth or alkali halide dispersing agent, solidifying the silicon mixed with the dispersing agent, and subsequently removing the dispersing agent. Alkali and alkaline earth halides such as magnesium chloride, calcium chloride and sodium chloride and corresponding fluoride-based eutectics are examples of liquid dispersing agents for molten silicon (see Table 3, below).

Figure 28:
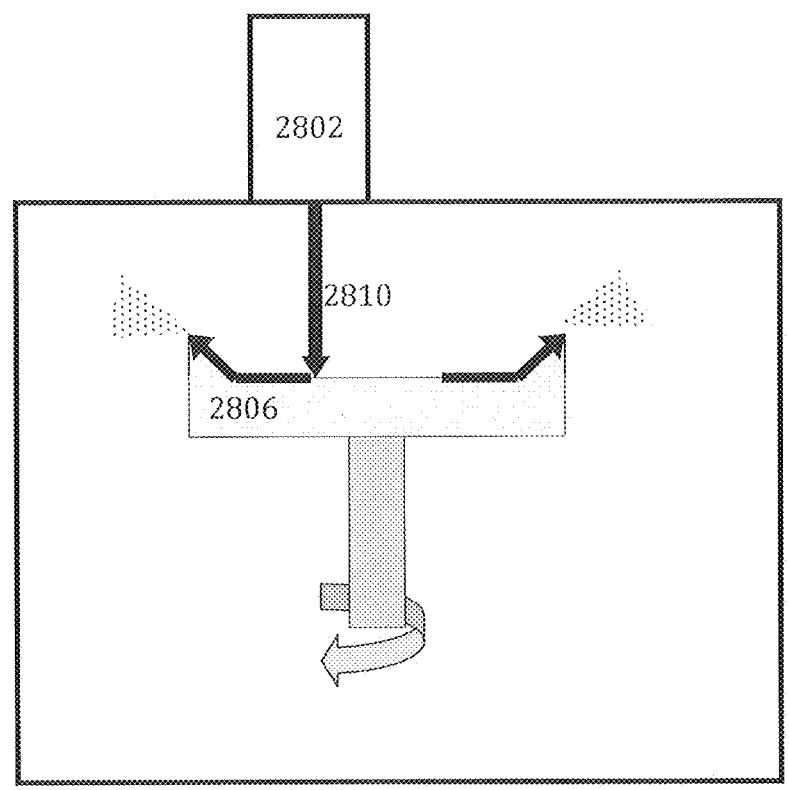
FIG. 28 is a schematic side view of a rotating disk atomizer for shearing, dispersing and solidifying a high-temperature molten stream comprising silicon and an inorganic salt such as an alkali and/or alkaline earth halide to form solid particulates for silicon powder manufacture.

Particle disk atomization[125] is an example of such silicon particle manufacturing methods. In this regard, illustrated in FIG. 28 is a schematic cross sectional side view rotating disk dispersion system 2800 for manufacturing solid multiphase particulate silicon-salt mixtures from a molten silicon-molten salt blend. The rotating disk atomization system 2800 comprises melting furnace 2802 in an enclosed furnace zone 2804. The disk atomizer further comprises a refractory high speed rotating disk 2806 and driving shaft 2808 which in the illustrated embodiment may include upturned bowl rim 2810. The furnace (which may be an induction furnace) produces a molten silicon-inorganic salt stream from the bottom of the furnace crucible which is directed onto a central portion of the rotating disk 2806. In operation, a blend of silicon and an inert salt such as calcium chloride, sodium chloride, magnesium chloride, calcium fluoride etc. are melted in the furnace 2804. The components are desirably mixed under high shear to homogenize the melted components Small amounts of silicon dioxide and magnesium or calcium may be added to the melt to increase the temperature and introduce very small nanoscale magnesium oxide or calcium oxide particles in the melt. The homogenized multi-phase melt is discharged onto the rotating disk 2808 which desirably has a very high rotational velocity in accordance with conventional practice in very small particle manufacture.

Upon contacting the rotating disk surface, the multiphase melt stream 2810 is subject to high shear and acceleration, increasing in velocity as it is forced to the rim of the disk, where it is dispersed into the hermetically sealed particle collection zone 2812 surrounding the dispersion disc. The high shear and acceleration desirably reduces the sheet thickness of the multiphasic molten stream at the periphery to less than about 10μ, and more preferably less than about 4μ in thickness. The silicon component of the multi phase mixture may remain molten on the rotating disk, or may be cooled to solidify or partially solidify the mixture before it leaves the rim of the rotating disk. In this regard, cooling jets of gas or liquid may be directed onto the top (gas) or underside (gas or liquid) of the desk. For example a stream of 30 volume percent of molten silicon dispersed/homogenized in 70 volume percent of a potassium chloride-magnesium chloride mixture, may be directed as a molten stream 2810 from the furnace 2804 at a temperature of about 1500° C. onto a central zone of a rotating disk with underside cooling to a mixture temperature of about 1420° C. at the rim to produce thin sheets and particles spun from the rim.

The multiphase Si-salt melt mixture solidifies as it is sheared and dispersed from the rotating disk. The silicon may solidify first (even before leaving the disk rim), and the discharged material cooled and collected for subsequent processing. The cooled material may be milled, and the components separated by processing appropriate to the end use of the silicon particles.

Gas atomization[126] of a molten silicon-salt stream is also a useful method for manufacturing silicon particles in accordance with the present disclosure. A mass flow ratio of atomizing gas directed onto the molten multiphase discharge stream in the range of from about 1:2 to about 8:1 gas:stream can be used to assist stream breakup into small droplets. Atomizing gas pressures of at least 3 MPa, and preferably at least 6 MPa (eg, 5-15 MPa) can facilitate discharge stream disintegration small droplet formation and/or rapid cooling. For example, an argon or helium gas mass flow rate in the range of ~5-10 kg/min directed onto a molten two-phase stream mass flow discharged from an atomization nozzle in the range of for example, ~5-10 kg/min can produce 10-50 micron two-phase particles which are readily processed to separate the silicon particulate component.

The two-phase silicon-molten salt mixture may be induction heated in the furnace reservoir to 1600° C. and atomized by high pressure He gas at 5.5 MPa[127].

Figure 29:
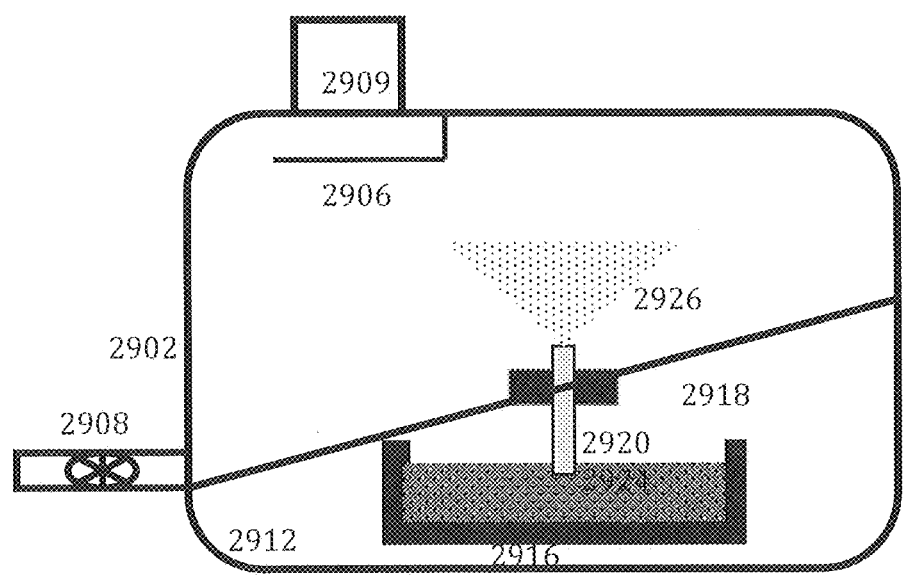
FIG. 29 is a vacuum aerosol system for shearing, dispersing and solidifying a molten stream comprising silicon and an inorganic salt such as an alkali and/or alkaline earth halide to form solid particulates for silicon powder manufacture.

Illustrated in FIG. 29 is a vacuum atomization system 2904 for dispersing silicon-salt melts into droplets for processing into silicon particles. The atomizing system 2900 comprises a vacuum chamber 2902 connected to a suitable vacuum system (not shown) via vacuum exhaust conduit 2904, with its exhaust opening protected by a baffle 2906. The vacuum chamber 2902 has a product removal port 2908 with appropriate valving as shown, for continuously or periodically withdrawing the atomized particulate product. The vacuum atomizing system 2900 further comprises a furnace chamber 2912 comprising a melting vessel 2914 for melting admixture 2916 of silicon and a non-reactive inorganic salt. The dispersion to 2920 which passes through the barrier 2918 can be lowered into the silicon-salt melt 2916. The vacuum zone and the furnace melt zone are separated by a barrier 2918.

In operation, a mixture of silicon and an inert salt such as calcium chloride, magnesium chloride, calcium fluoride, sodium chloride, etc. is introduced into the melting vessel in the furnace. The silicon may be relatively large "chunks" of inexpensive metallic silicon, or pure(er) silicon, as desired. The mass ratio of silicon to meltable inert salt phase is preferably in the range of from about 1:4 to about 4:1. In operation, silicon and salt components may be continuously or periodically introduced into the melting vessel. The silicon and the salt components may be melted in any appropriate manner, such as by DC arc and/or induction heating. A high-speed mixer 2922 comprising a motor, refractory shaft and refractory rotating disk may be operated in the molten mixture after it is melted, to thoroughly mix and homogenize the melted components. Upon operational engagement of the atomizing system, the thoroughly mixed phases of the silicon and molten salt components of silicon-salt melt are forced by pressure in the furnace shown into the atomizing conduit, to be discharged and dispersed into the vacuum chamber as a dispersion 2926. Argon is maintained in the furnace zone, which dissolves to a limited extent in the silicon-salt mixture. Small amounts of magnesium chloride or other low-boiling salt may be included in the mixture. Upon exit from the distal orifice of the dispersion conduit into the vacuum chamber, the argon and the molten magnesium chloride components "flash vaporize" to disperse and cool the droplets. High velocity argon and/or other cooling gas at the discharge end of the discharge conduit may also be used to assist dispersion and cooling of the small two-phase droplets.

The dispersed droplets comprise mixed phases of silicon and salt, which are solidified upon cooling. The molten salt typically shrinks upon cooling, while the silicon phase expands upon cooling, which can produce stress to aid fragmentation and phase separation during subsequent processing.

The molten salt can serve as a purification slag for removing a variety of impurities from metallurgical silicon or other impure silicon raw materials. Furthermore, as the silicon melt crystallizes in the droplets, impurities remaining in the silicon also tend to be concentrated in the last portion of the molten silicon to crystallize (eg, at crystal interfaces), where these impurities can more readily be leached or otherwise removed after fragmentation.

salts below the melting point of silicon, by alkali and/or alkaline earth reducing agents such as calcium, magnesium, sodium, and/or electroreduction. For example, solid silicon dioxide may be reduced to porous and/or nanocrystalline silicon by direct electrolytic reduction in electrical contact with a cathodic potential in $CaCl_2$ molten salt electrolyte[129]. The crystal size and porosity of NCs obtained at each temperature is determined by the saturation concentration of the reducing agent Mg, not by the overall amount of the starting materials (Mg and $SiO_2$). Mg has larger solubility in its own halide salts compared with salts of alkali metal halides. A mixed salt system of $MgCl_2$/NaCl with 1:1 molar ratio as the solvent to attain a higher Mg concentration produces larger silicon nanocrystals at the same operating temperatures. For example, an electrolysis system such as illustrated in FIG. 10 which is adapted for use with molten salt electrolyte such as a eutectic composition of LiCl/KCl in 45:55 mass ratio, may be charged with $SiO_2$ particulate as

TABLE 3

| Material | mp ° C. | (1 bar)bp ° C. | density g/cm$^3$ |
|---|---|---|---|
| MgO | 2852 | 3600 | 3.58 |
| $SiO_2$ | 1600-1725 | 2230 | 2.64 |
| Na2O | 1132 | 1950 | 2.27 |
| Si | 1414 | 3265 | 2.33 |
| Ca | 842 | 1484 | 1.55 |
| Mg | 650 | 1091 | 1.74 |
| $Mg_2Si$ | 1102 | — | 1.99 |
| $MgCl_2$ | 714 | 1412 | 2.32 |
| $CaCl_2$ | 772 | 1935 | 2.15 |
| NaCl | 801 | 1413 | 2.16 |
| LiCl | 605 | 1382 | 2.07 |
| KCl | 770 | 1420 | 1.98 |
| $BaCl_2$ | 962 | 1560 | 3.86 |
| $SrCl_2$ | 874 | 1250 | 3.05 |
| $CaF_2$ | 1418 | 2533 | 3.18 |
| $MgF_2$ | 1263 | 2260 | 3.15 |
| LiF | 845 | 1676 | 2.63 |
| NaF | 993 | 1704 | 2.56 |
| KF | 858 | 1502 | 2.48 |
| FLiNaK (46.5 LiF: 11.5 NaF: 42KF, mol %) | 454 | 1570 | 2.02 |
| FLiNaK-Mg (44 LiF: 12 NaF: 40KF: 4 MgF2 mol %) | 449 | — | — |
| $KCl-MgCl_2$ (68-32 mol %)) viscosity(cP) 1.4 @ 700° C.[128] | 426 | >1418| | 1.66 |
| LiCl-KCl (59.5-40.5) viscosity(cP) 1.15 @ 700° C. | 355 | ~1400| | 1.52 |

Figure 30:
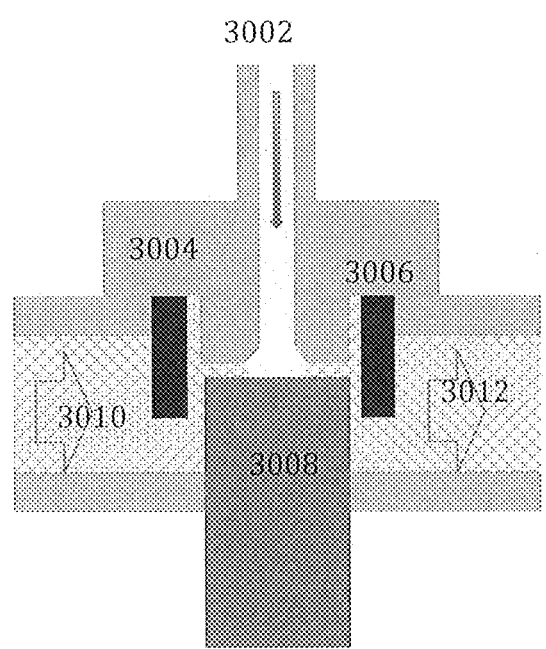
FIG. 30 is a schematic cross-sectional view of a high temperature fluid homogenizer for mixtures of molten silicon and molten salts.

Homogenization of molten silicon in a molten salt fluid may also be used to prepare small-dimension silicon for use, and for milling as described herein. In this regard, FIG. 30 is a cross-sectional schematic view of a homogenizing system 3000, which is constructed of high-temperature structural materials such as tungsten and tungsten carbide, or other suitable materials which are functional in a molten salt environment at temperatures, for example, 100° C. above the melting point of silicon. The central components 3004, 3006, 3008 of the homogenizer 3000 are radially symmetrical about its central axis. In this regard, the system 3000 comprises a seat 3004 having an inlet conduit for a high-pressure molten salt and molten silicon feed 3002. The outlet of seat 3004 faces a valve 3008 closely adjacent thereto, and is surrounded by a hard impact ring 3006. An optional inlet conduit conducts a molten (cooling) salt stream 3010, while a discharge conduit conducts the homogenized product, together with any cooling stream 3010 components, as output stream 3012, for further processing.

Other inexpensive processes for manufacturing nanosilicon particles utilize liquid melt reaction systems and temperatures below the melting point of silicon.

Silicon nanoparticles may also be economically synthesized from silicon oxides such as $SiO_2$ and talcs in molten a silicon source. The molten salt may be heated to a temperature above its melting point, preferably at least 500 C, but less than 1400° C., and desirably in the range of 500-1000 C, in an inert atmosphere and the SiO2 particles (eg, pure SiO2 sand, pulverized quartz, etc) charged into zone(s) adjacent and in electrical contact with the cathode. Smaller silicon particles are produced at lower temperatures, while larger particles are produced at higher temperatures as a result of increased solubility parameters at higher temperatures[130]. The silicon nanocrystals are aggregated, and may be processed by milling in the molten salt fluid to disperse them, and to separate MgO particles which may be formed. Similarly, the molten salt containing the silicon particles and other solids may be centrifuged to recover solids, the retained LiCl/MgCl with the solids may be at least partially vaporized, the solids then mixed with a fluid such as hexane and the solids milled in system such as that of FIG. 10 to further separate the silicon from salt and MgO of different densities.

This disclosure is also directed to structural and energetic materials, including silicon nanoparticle and/or graphene-based composite materials and propellants, as well as methods for making and using such materials. For example, nanosilicon and/or graphene-based, multi-functional structural and energetic materials, energy and weight-efficient munitions, and strong microvehicle and other casings and structural components are disclosed. Such materials and processes can have good electrostatic discharge (ESD) insensitivity, and high-temperature initiation performance. Energetic structural and multifunctional materials, components and casings using ultrastrong energetic (high oxidation enthalpy) nanosilicon and/or graphene composites in a polymer-matrix can have very high strength and toughness, together with high energetic content. The composites can also include internal nanoscale and microscale oxidizers which can function as storage-stable, high-energy energetics.

In accordance with various aspects of the present disclosure, nitrate and other energetic groups are covalently attached to graphene nanosheets to produce physically strong, gas-generating energetic compositions. Energetic polymers and oligomers such as polyGLYN can also be covalently grafted to or from graphene nanosheets to produce strong energetic nanoscale sheets for assembly into tough, strong energetic composites.

Figure 12A:
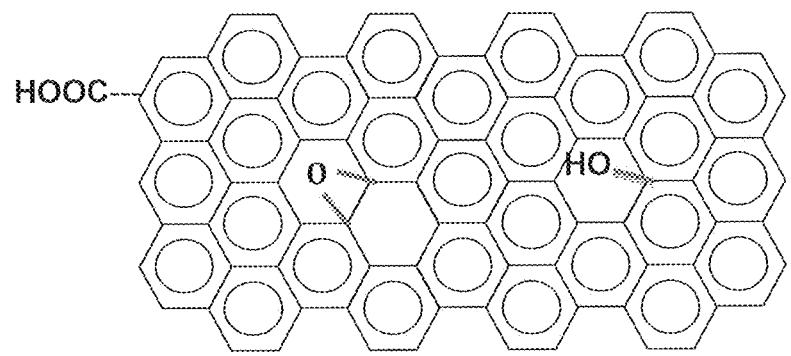
FIG. 12A is a representation of a portion of a graphene oxide sheet with pendant covalent carboxylic, hydroxide, and cyclic ether moieties.

FIG. 12A is a schematic top view of a partially oxidized nominal graphene sheet 1202, illustrating its still-largely carbon hexagonal structure, having edge carboxylic acid groups, and oxirane and hydroxyl groups projecting from the graphene plane, as is typical of partially oxidized graphene. The graphene sheet may have a carbon-to-oxygen ratio of from about 50:1 to about 1:1.4, depending on the degree of energetic and/or grafting functionalization desired[131].

FIG. 12 B is a schematic view of a partially oxidized graphene sheet 1204 like that of FIG. 12A which has been derivatized with nitrate ester groups to produce an energetic graphene material.

Figure 13A:
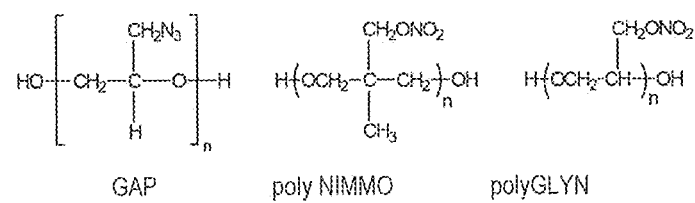
FIG. 13A illustrates several energetic polyethers, GAP, polyNIMMO, and polyGLYN.

FIG. 13A is a representation of polymers GAP 1302, polyNIMMO 1304 and polyGLYN 1306 which are conventional energetic polymers, respectively, of glycidyl azide, 3-nitratomethyl-3-methyloxetane, and glycidyl nitrate monomers[132].

Figure 13B:
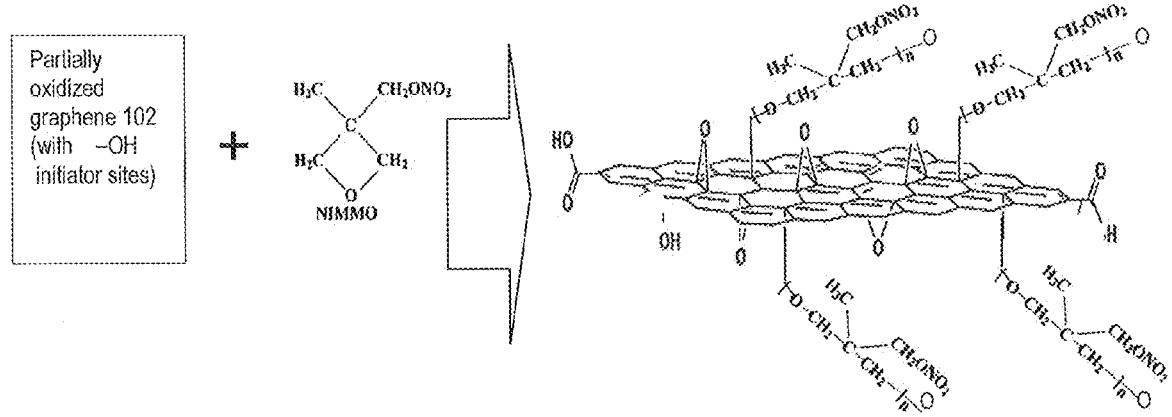
FIG. 13B illustrates the reaction of partially oxidized graphene sheets with NIMMO monomer, to produce graphene having energetic polyNIMMO grafts covalently attached thereto.

FIG. 13B is an illustration of the reaction of partially oxidized graphene nanosheets 1306 like those of FIG. 12A having hydroxyl initiator sites, with energetic monomers such as NIMMO 402, to grow energetic polymer chains such as polyNIMMO moieties 1308 from, and covalently bound to, the initiator sites.

Figure 14:
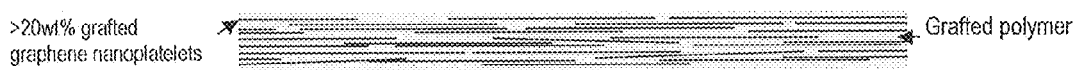
FIG. 14 is a representation of an oriented composite of strong graphene sheets in a matrix of grafted polymer.

FIG. 14 is a schematic cross-sectional side view of a composite 1400 of low-functionality high (at least 95%)-sp2 graphene nanoplatelets 1402 within a solid matrix 1404 of organopolymer chains like those of FIG. 13B grafted to the graphene nanoplatelets.

Graphene nanosheets are extremely strong and stiff in the in-plane 2-D directions (~1,060 GPa), which decreases somewhat with increasing loss of sp2 bonding. These ultra-stiff, ultrastrong graphene platelets have a very large length to thickness ratio ideal for bio-inspired nacre-like strength and toughness assembly. Thin, oriented composite 1400 of the wide-thin nanoplatelets 1402 with large multiple overlap are designed to be similar to the nanostructure found in nacre (mollusk shell), in which >90% of brittle calcium carbonate platelets in soft biological macromolecules, produces an extraordinary combination of mechanical strength, toughness, and stiffness[133]. Graphene may be readily oxidized and reduced, and polymers such as polyethylene may be readily grafted to graphene[134]. The grafting of suitable polymers (eg, diblock elastomers with the rubbery polymer component end grafted to the graphene) to the ends and surface of the nanoplatelet facilitates nano-"bottom-up" assembly at precise separation without platelet agglomeration, to produce strong physical capacity for transfer of impact from the nanoplatelet to the polymer matrix, adjacent nanoplatelets, and/or UHMWPE fibers in composites such as armor layers. The extreme stiffness of the nanoplatelets in their 2-D layer plane facilitates high lateral transfer of shock energy from high speed projectile impact.

Figure 12B:
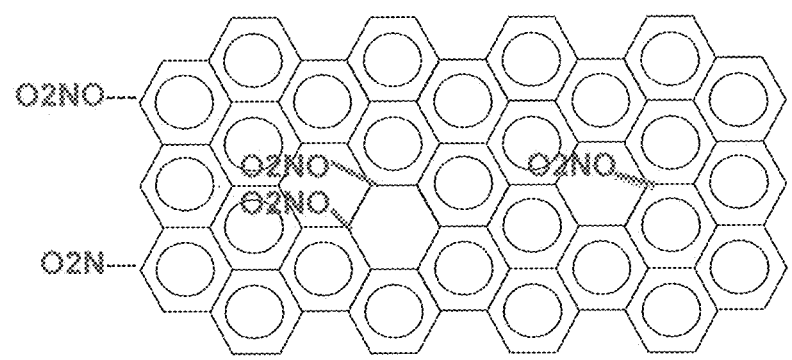
FIG. 12B is a representation of a portion of an energetic graphene sheet with pendant covalent nitrate and nitrate ester moieties.

Many conventional explosives and propellants are or comprise organic nitrates and azides. Multiple nitrate groups are typically attached directly to carbon or to carbon through an oxygen linkage (eg, TNT, RDX, nitrocellulose, PETN, BTNEN, etc.). Hydroxyl, epoxide and other groups are readily nitrated by a wide variety of methods[135], such as cold treatment with $N_2O_5$. By attaching nitrate esters (or azides) to graphene, as illustrated in FIG. 12B, a robust range of physically strong energetic nanoplatelets can be produced. For example, nitration of hydroxyl groups (eg, by $N_2O_5$) produces nitrate esters. By varying the hydroxyl and/or epoxy/cyclic ether content of the graphene[136] prior to nitration, the degree of nitrate ester formation can be easily controlled over a broad range. $N_2O_5$ can also be used to nitrate epoxide groups of graphene oxide, providing two —O—$NO_2$ groups per epoxide oxygen[137]. Direct nitration of aromatic sp2 carbon groups of graphene is also a route to nitration. Sensitivity of the resulting graphene nitrates can be reduced by the introduction of amino groups (—NH2) into the graphene aromatic structure, as is conventional for stabilizing benzene-ring explosives (eg, 1,3,5-Triamino-2,4, 6-trinitrobenzene, TATB, etc.). Azide and other energetic groups may also be covalently attached to the Graphene nanoplatelets. This provides a rich, robust platform for tailoring energy output, gas generation, oxygen balance, and sensitivity. Particularly useful graphenes are graphene nitrates having a graphene carbon to nitrate —NO2 group (either NO2 or —O—NO2) ratio of at less than about 4:1, and more preferably less than about 3:1. Such graphene nitrates may be manufactured by nitrating graphene oxides having a C:O ratio of less than about 4:1 with N2O5 in suspension in a chlorinated organic solvent (eg carbon tet or methylene chloride) at a temperature of for example 0° C. to about 10° C. The nitration may be sufficiently complete in a relatively short time (eg, less than 30 seconds, so is amenable to continuous flow operations with appropriate quenching. O-nitration of —OH groups with a dinitrogen pentoxide in chlorinated solvent is less exothermic and more controllable than nitration with conventional mixed nitration acid. Reactions are rewrapped and can be completed in a short period of time (eg, seconds). Nitric acid is formed during O-nitration of —OH groups so that in some cases the addition of a base such as sodium fluoride can be useful.

Dinitrogen pentoxide is added to graphene-oxide nano-platelets suspended in carbon tetrachloride or methylene chloride solvent at 0-10° C. to substantially fully nitrate the hydroxyl functional groups of the graphene oxide. O-ring cleavage nitration may also carried out in chlorinated solvent for the ring cleavage of strained oxygen heterocycles under non-acidic conditions, which is efficient in the use of N2O5 by adding up to two —O—NO2 groups to the graphene per N2O5 molecule and ether ring[138]. Ether rings of the graphene-oxide may be nitrated in methylene chloride or carbon tetrachloride at 0-10° C. over a 4-24 hour timeframe. Methylene chloride may also be used to add nitrate groups across isolated labile double bonds which may be exposed on the graphene nanoplatelets which are buckled and distorted by the loss of conjugated sp2 bonds as a result of sp3 bond formation as a result of graphene oxide formation.

Energetic graphene nanoplatelets such as illustrated in FIGS. 12B and 13B are mechanically strong components for composite, multifunctional energetics, such as strong moisture-resistant, gun-barrel-protecting consumable munitions casings, and exfoliating reactive materials.

Graphene oxide can be photothermally ("explosively") deoxygenated, which is especially useful for distributed and broad-area ignition/detonation[139]. Nitrated graphene oxides can be designed to retain their photodetonation property (which is likely an electronic stabilization) phenomenon[140]) and because of their exothermic potential, can be effective detonation agents. They may also be electrically detonated for modern fuzing system use and applications.

In accordance with the present disclosure, aldehyde, butadiene, epoxide, oxetane and/or oxirane monomers may be readily polymerized on hydroxyl groups of partially oxidized graphene sheets, to form grafted polyoxetanes[141] covalently bound to the graphene sheets. They can also be copolymerized with a wide variety of other energetic monomers. The polymerization of energetic oxetane and/or oxirane monomers is initiated by the —OH groups of a Graphene oxide, by a polymerization catalyst for such monomers, such as $BF_3$. Activated monomer polymerization may also be used with the Graphene —OH group initiators, to graft the polymer chains on the graphene —OH groups, while limiting the formation of unstable cationic propagating species[142]. Such ring-opening polymerizations may also proceed through oxirane (epoxide-type) groups on the graphene surface, to graft energetic polymer and/or oligomer chains to the graphene sheets. The energetic polymers and/or oligomers prevent the graphene sheets from coalescing, and facilitate dispersal and compatibility in energetic fluid, solid or gel matrices (eg, see FIGS. 9G, 9H). The size (area) of the Graphene sheets, the number of initiation sites on the Graphene, and the grafted energetic polymer or oligomer length can be readily controlled. The mass ratio of Graphene to energetic polymer can be also varied over a very wide range. Butadiene-grafted graphene oxide may be nitrated across the butadiene polymer double bonds by nitration with N2O5 (which also nitrates pendant hydroxyl and/or ether groups of the graphene) to produce butadiene nitrate polymer grafted graphene which is useful as a physically strengthening additive for propellants and explosives, and a strong energetic material when compressed alone. The —OH terminated grafted energetic polymer or oligomer chains may be subsequently cross linked, for example with isocyanates, to form strong graphene-based energetic composite materials.

Conventional polyNIMMO composites meet "Extremely Insensitive Detonating Composition (EIDC)" requirements. Energetic-grafted graphenes may also be designed to meet such EDIC requirements.

A variety of energetic polymer grafting processes and chemistries may be utilized, including free radical addition polymerization[143] (eg, for grafted acrylic, vinyl, polybutadiene monomers including hydroxyl-terminated polybutadiene), —OH initiated oxetane polymerization, ring-opening polymerization such as graphene oxirane group copolymerization with GLYN, esterification grafting and post-nitration, etc. The grafting of suitable polymers to the ends and surface(s) of graphene nanoplatelets provides strong structural capacity for energetic and nonenergetic composites containing such grafted graphenes. The number of grafting sites and the molecular weight of the polymers in a composite such as that of FIG. 14 may be designed so that at least 10, and preferably at least 25 volume percent of the composite matrix is graphene nanoplatelets. The polymer-grafted, ultrastrong nanoplatelets may be oriented into composite sheets or casings by compression, rolling, tensile-drawing, extrusion, and/or electrophoretic deposition. Graphene nanosheets are among the strongest and stiffest 2-D materials known in nature (~1,060 GPa). These ultra-stiff, ultrastrong graphene platelets have a very large length to thickness ratio ideal for strength and toughness assembly. An oriented composite of the wide-thin nanoplatelets with large multiple overlap produces an extraordinary combination of mechanical strength, toughness, and stiffness[144], particularly including lateral shock transmission. Even when grafted with energetic polymers of relatively poor physical strength such as polyNIMMO, GAP polymer or polyGLYN, a nacre-like assembly of energetic-polymer-grafted graphene nanoplatelets has a high level of strength and toughness.

Energetic polymer-grafted graphenes in accordance with the present disclosure are useful components of strong, tough, energetic structures having designed thermal and electrical conductivity properties. Varying the ratio of energetic polymer to Graphene mass permits tailoring a range of physical properties. By selecting the polymer type, from "rubbery" to higher glass transition (Tg) polymers, and/or from high-oxygen to lower-sensitivity material, the strength and energetic properties of the composite can be designed for specific applications. The energetic graphenes may also be filled with conventional propellants or explosives, and can be crosslinked to form strong, stable composites. They can be mixed with nanothermite powders such as $Al/Fe_2O_3$, $Ta/WO_3$ etc., hydrides such as $TiH_2$ and $Ta_2H$, and energetic metal powders, flakes and foils to form extremely strong casings which exfoliate and disperse upon munition detonation. They can incorporate wires, ultrastrong fibers such as UHMWPE and carbon fiber or nanotubes. The composite energetic graphenes can be strong and lightweight. They can be electrical insulators, or excellent electrical conductors (depending on degree of oxygenation and electron withdrawal), and composite composition, so may be used as structural and electrical components of small or disposable UAVs. The UAVs can be designed to be "swarmed" and detonated on target at the conclusion of their missions. The energetic graphene composites may also be used to form strong, high energy, waterproof munitions casings which are completely consumed.

Using energetic-polymer-grafted graphenes designed to retain some electrical and thermal conductivity (<1% of conventional graphene in a composite can provide significant electrical conductivity), the Electrostatic Discharge Sensitivity of nanothermite composites can be greatly reduced. Energetic graphene composites can contribute mechanical strength to nanothermite compositions. Combined with nanosilicon energetics of the present disclosure, high-energy nanothermites such as $Al/Fe_2O_3$, shaped cross-linked energetic graphene composites can provide excellent gas-generating, very high temperature propellant initiators. The crosslinked energetic Graphene-nanothermite composite may be detonated in a variety of ways, from conventional fuze, to electrical-discharge/plasma, to laser or light-flash initiation.

Certain linear crystalline polymers of high molecular weight can reach extremely high strength with appropriate processing. Highly oriented polyoxymethylene (POM) and polytetrafluoroethylene (PTFE) can reach ~2 GPa. Highly oriented ultrahigh molecular weight polyethylene (UHMWPE) can reach 7 GPa to achieve a specific strength more than 60 times that of carbon steel[145]. PTFE is a conventional oxidizer for Al powders and flakes, and POM readily depolymerizes to facilitate blast-oxidation-disintegration. UHMWPE has high air-oxidation enthalpy and low-temperature processing properties which are ideal for nanoenergetic processing.

Energetic munition casing materials are provided in accordance with the present disclosure which are designed for use as high energy munition casings, comprising metal/nanothermite and/or energetic graphenes covalently bonded in an ultrastrong polymer matrix. The composites can have a tensile strength of more than 0.5 GPa, with very high enthalpy in atmospheric oxidation-detonation with encased high explosive such as RDX.

For example, a composite of PTFE with fluorinated-polymer-or-other surface agent-coated silicon nanoparticles such as those of FIG. 9B and/or energetic graphene platelets having energetic oligomers grafted thereon energetic metal nanocomposites with thermite oxidizer particles embedded in an energetic metal matrix[146] may be incorporated in an orientable ultrastrong polymer matrix, and aligned to form extremely strong, yet energetic consumable structural materials. To utilize the strength of the energetic grafted silicon nanoparticles and graphenes, they are desirably compatible with and/or covalently bonded (directly or indirectly) to the polymer matrix. One approach is to use a coupling agent to react with a pre-formed polymer. There are a wide variety of chemistries to do this. The bonded polymer may be the matrix polymer, or a polymer which is sufficiently compatible with the matrix polymer to be capable of at least slight entanglement it. For example, ethylene, styrene, oxiranes and oxetanes can be grown from an appropriately functionalized nanosilicon energetic particle, or energetic graphene surface. To achieve high strength, the ultrahigh molecular weight polyethylene, perfluorinated or other polymer should have minimal entanglement, such as by having been grown in crystalline form, or by having been crystallized or "gelled" from solution. For an energetic casing composite using ultrahigh molecular weight polyethylene, the coupled or grafted particles may be suspended in moderately heated solution of the UHMWPE. The solution may then be slowly cooled to precipitate the UHMWPE on the energetic silicon nanoparticles and/or the graphene platelets. The solvent may then be removed. The precipitated UHMWPE coating may desirably be about 10-75 weight percent of the dried material including the nanoparticles and/or the functionalized graphene platelets.

Figure 16:
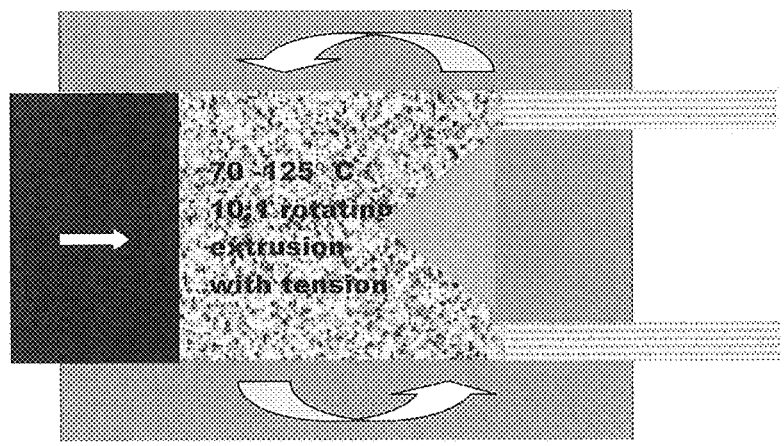
FIG. 16 is a schematic cross sectional view of a high extrusion ratio extruder for orienting composites.
Figure 17:
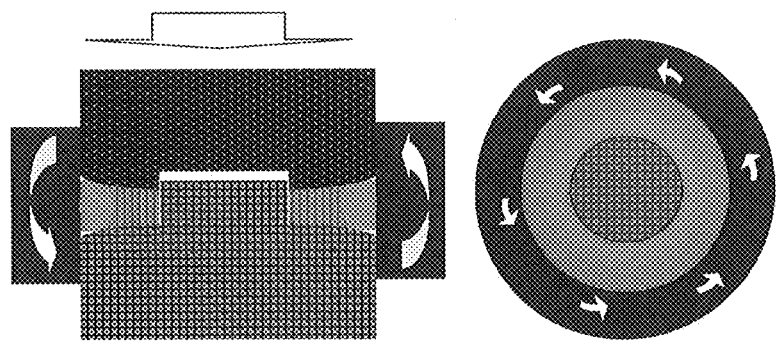
FIG. 17 is a schematic cross sectional side view and a cross sectional top view of a rotational composite orientation press.

UHMWPE can be blended with polyethylene oxide to form more processable mixtures. Blends of UHMWPE with energetic polymers such as polyoxetanes or oxiranes, such as ethylene oxide copolymers with NIMMO, polyGLYN, or stearate-grafted nitrocellulose may be used in the precipitating solution, to improve both processing, and the energetic capability. UHMWPE forms viscous solutions in solvents such as paraffin, xylene, and decalin at temperatures in the range of 140-170° C. As described with respect to FIG. 2, such high boiling solvents may be used to collect and process silicon nanoparticles produced in accordance with the present disclosure. Such slurries may be used directly in the preparation of high-strength nanocomposites. By slurrying the energetic particles in the UHMWPE solution, and then cooling the solution, uniformly-coated UHMWPE gel coatings of low molecular entanglement may be formed on the energetic nanoparticles which are suitable for shearing to ultrahigh strength, as illustrated in FIGS. 16 and 17, and by confined tensile stretching.

To reach ultrahigh strength, UHMWPE is conventionally subjected to extensive tensile shear at appropriate temperature to orient and crystallize the polymer chains. Neat UHMWPE is stretched up to 200×, in one or two stages at different temperatures, to reach ultrahigh 1-D or 2-D strengths. However, a high percentage of reinforcing silicon nanoparticles/graphenes will reduce the amount of external shear needed to strengthen these composites. High compression shear (easily reached with metalworking equipment at warm temperatures) is appropriate to achieve polymer alignment with high fill density. The polymer-coated energetic nanoparticles are warmed, and consolidated in a vacuum under high compression. Crystallized UHMWPE reactor powder can be warm-rolled or extruded below its melting point $T_m$, to form a very strong matrix. The UHMWPE "gel" coated energetic nanoparticles similarly consolidate and "knit" under high compression shear. Because the energetic nanoparticles are relatively insensitive at temperatures below about 200° C., processing temperatures up to 175° C., even beyond normal UHMWPE processing temperatures, can be used. Sheets and extrusions with a variety of cross-sections may be manufactured by constrained rolling or high-shear extrusion as in FIG. 16. High compression with rotational strain and large back pressure such as illustrated in FIG. 17 and high shear extrusion with large cross-section reduction, such as illustrated in FIG. 16 may be used to make high-strength energetic composite structural components such as energetic munition casing cylinders. Similarly, ultra-high strength disks and cylinders may' be produced by enclosed rotational strain under high compression.

Energetic graphene in accordance with various embodiments of the present disclosure has gas-generating energetic oxidizer at and covalently bound to its surface. HE detonation heats (and weakens) the casing and deflagrates the dispersed energetic components, to ignite in air. Assuming the silicon nanoparticles have a strength of 250 MPa, the UHMWPE matrix achieves a strength of 3 GPa, and the graphene nanoflakes contribute only 10% of their 10-40 GPa strength, by the rule of mixtures the composite may have a strength over 1-1.5 GPa. Depending on composition, it also can have an energy release upon ignition in the atmosphere which is at least that of RMX.

The previous example describes a munitions casing utilizing a composite UHMWPE matrix, but ultrahigh strength POM and perfluoropolymers may also be similarly used to provide a strong energetic with increased oxidizing capacity. A wide variety of energetic polymers and energetic components may be used as well.

The use of energetic graphene and/or silicon nanoenergetics in PTFE, POM and/or UHMWPE fibers or films drawn to ultrahigh strength are also useful energetic structural materials. The fibers can be electrically conductive and extremely strong, but electrically "detonatable".

Munitions casings are desirable which are relatively "safe" and strong, but also contribute significant output energy (eg, "as strong as steel but more energy than RDX"). Traditionally, heavy munition casings can be made of steel, which adds little or no energetic output. Steel itself is relatively inexpensive, strong, and can react with oxygen to release heat. Oxidation of iron can release more energy per gram than RDX, if a way can be found to rapidly oxidize it:

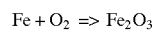

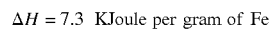

-continued $$RDX => CO/CO_2 + H_2O + N_2$$

$$\Delta H = 5.6 \text{ KJoule per gram RDX}$$

But conventional steel munition casings do not get hot enough, or finely divided enough, to react significantly with atmospheric $O_2$ upon munition detonation.

In accordance with various additional aspects of the present disclosure, steel is "finely divided" between strong composite layers of more energetic metals such as Al, Ti, Ta, which can heat and exfoliate the layers upon munition detonation. Steel composites with Al, Ti and Ta will have higher oxidation energy than steel alone. The more energetic metal layers contain "safe" heat and gas-generating nanoparticles which can explosively exfoliate the small steel particles or steel layers.

Under appropriate cold/warm rolling and/or warm extrusion conditions (eg, 100-250° C.), steel sheets, flakes or powders may can be caused to fragment in softer Aluminum layers[147]. This can even more finely divide the iron for atmospheric combustion upon exfoliation. The composite material may also be extruded in cylindrical form. But for purposes of illustration, micron- and nano-scale steel layers are described in the following discussion of exfoliation caused by detonation.

Steel may conventionally be rolled or otherwise strained to increase its strength. The strength of low alloy (and even maraging steel) can be doubled or tripled by rolling to small crystal grain size[148]. Laminated steel with remarkable properties has been known from ancient times. Legendary Damascus steels have alternating ductile and hard layers which provide both toughness and strength. Nanolaminated multilayers of "soft" metals such as Cu—Nb can be made with extremely high strengths (1-2 GPa for Cu—Nb)[149]. At submicron thicknesses, the high fraction of interlayer boundaries can dominate and improve mechanical strength[150]. Aluminum and Titanium are conventionally roll-bond-welded to steel[151] in industrial practice to make clad and "sandwich" composite sheets. Aluminum with just 1% $TiH_2$ can be roll-bonded between steel sheets, which when subsequently relatively slowly heated to a temperature above about >400° C., causes the aluminum sandwiched layer to "foam" to produce steel/aluminum foam/steel sandwich composites[152].

Warm and cold-rolling of metal sheets to make multilayer nanolaminates has also been extensively developed[153]. Alternating layers of different metal foils such as Al—Ti[154], Al—Cu, Al—Ni[155], Fe—Al, Fe—Ti, Al—Ta, Al—Cu—Fe[156], etc., can be stacked and cold-rolled to form metal nanolayer sheets with metallic bonding, without substantial interlayer reaction[157]. In accordance with one embodiment of the present disclosure, roll-bonded layers of interstitial-free ("IF") steel (or warm extrusion-bonding of iron/steel particles/powder) with Aluminum, Tantalum and/or Titanium interlayers/matrices can be at least as strong as conventional steel munition casings[158]. An aluminum foil which has a layer of PTFE nanoparticles (and/or Ti, Zr or Ta hydride nanoparticles) electrodeposited therein as described hereinabove, is a useful sheet material for warm-roll-bonding with soft iron foil to produce a strong, energetically-exfoliating metallic composite.

Hydride components such as Ti, Zr, Ta hydrides (including their subhydrides) are "safely" encapsulated in the aluminum layers up to temperatures of ~300-400° C. Above 400° C., the hydride decomposes to generate hydrogen gas.

Upon detonation of a HE-containing munition, the HE shockwave and its multiple reflections travel through the casing, dissipating as heat[14]. The mechanical work to expand the casing (about 2x) also adds heat. The temperature of a typical steel casing only increases to 300-600° C. from shockwave and expansion work upon munition detonation. This is insufficient to exfoliate the composite. However, unlike solid steel casings, the shockwave in the highly-impedance-varying composite casing of the present disclosure is very strongly multi-reflected at each density boundary, and each different-density particle, greatly increasing the conversion of detonation shockwave energy to heat, and concentrating it within the light aluminum layers which contain Ta, Ti, Zr hydrides and/or reactive thermite oxidants[159]. The result is:

highly exothermic Al reaction with encapsulated nanoparticle oxidant (PTFE, $Fe_2O_3$, etc), further raising the temperature, exothermic decomposition of encapsulated hydrides to react with the suddenly-molten Aluminum ($TiH_2$+ Al=>$TiAl3$+$H_2$ 142 KJ/mole), further increasing the temperature. Any admixed thermite oxidizers in the Aluminum will further increase the temperature.

melting of the aluminum layers @>660° C., increasing reactivity exothermic reaction of molten aluminum with the steel particle or layer interfaces to further increase the temperature (Fe+Al=>$FeAl_3$+107 KJ/mole).

Release of the $H_2$ gas from the hydride(s) in the aluminum at high temperature and pressure in the molten Aluminum metal. Suddenly-shockwave-heated molten Aluminum layers with 7% $TiH_2$ will "instantaneously" contain 50x their volume of explosively pressurizing hydrogen to expand and exfoliate the hot aluminum and micron-scale steel layers/particles and pyrophoric Titanium aluminides[160] to react in the atmosphere and explosive gases.

The high-temperature exfoliating layers are hot enough, and finely-divided enough, to rapidly react with the super-heated explosion gases, and atmospheric oxygen. This results in a strong, high-performance, inexpensive, "safe", highly energetic casing.

Figure 20:
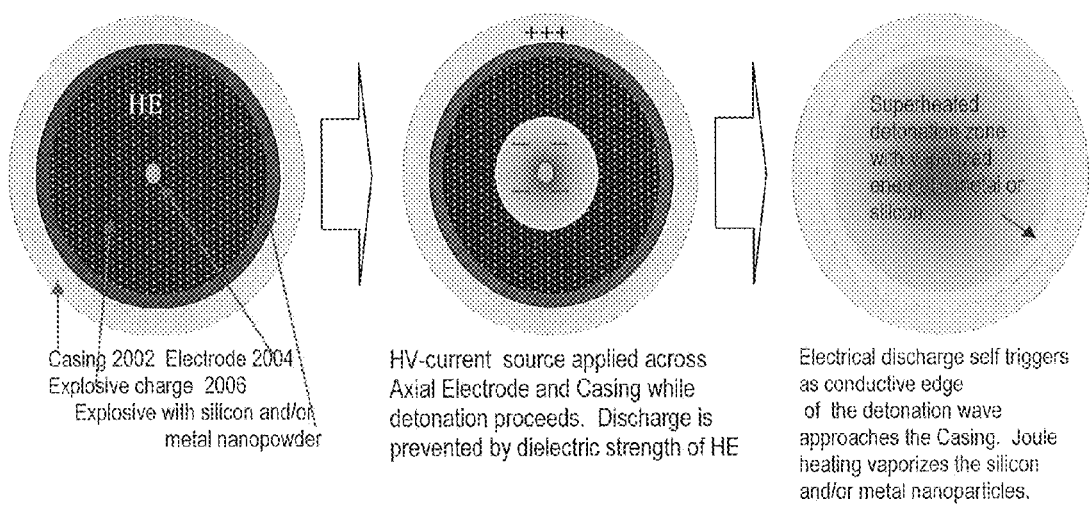
FIG. 20 is a is series a schematic cross sectional side view through a plane perpendicular to the munition axis, illustrating a self-timed electric discharge design for electric current pulse heating of an electrically conductive reactive metal zone adjacent the casing of an explosive munition.
Figure 21:
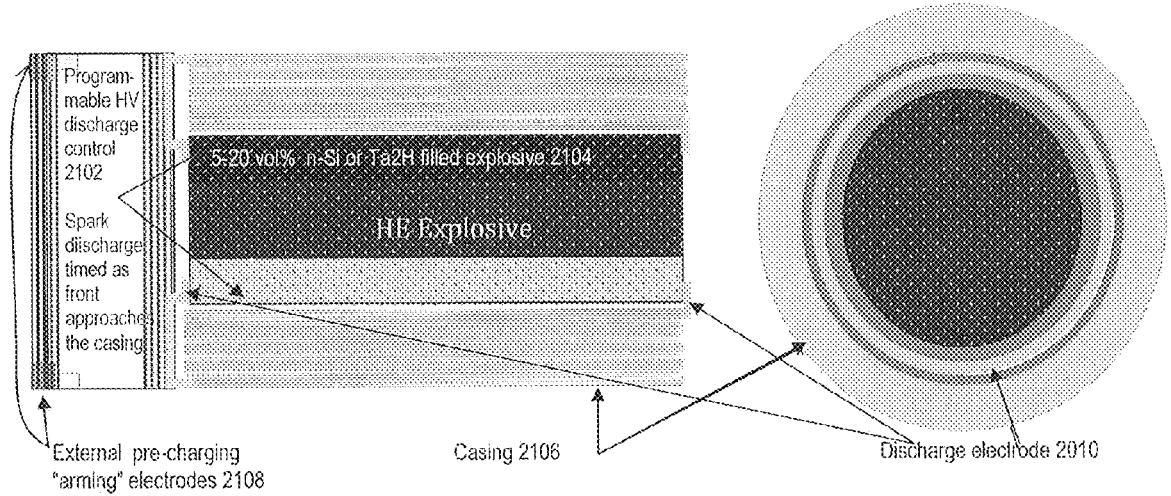
FIG. 21 is a schematic cross sectional side view of a munition like those of FIGS. 18, 19 and/or 20, which is designed for high brisance.

FIGS. 19, 20 and 21 illustrate variable brisance munition designs for low-to-very high brisance. The brisance is programmably increased by timed electric energy application to vaporize energetic metal in the reaction zone of a detonation wave, to increase detonation pressure, blast, and fragment velocity. The increased brisance is produced by dramatic shortening of the energetic metal oxidation reaction times. The increased blast energy is a large multiple of the electrical input energy. For decreased brisance, the energetic metal would not be vaporized so that the normally-slow-reacting energetic metal acts as a conventional heat sink and gas-volume reducer. For further-reduced brisance, the electric energy application is initiated prior to the detonation wave, to deflagrate the HE explosive around the energetic metal and casing, thereby reducing the mass of the munition explosive which detonates.

Light energetic metal particles such as Al, Mg and Ti powders and flakes ranging from 10's of nanometers to 10's of microns in size are conventionally blended with explosives such as RDX to increase total energy output. When a high explosive energetic material such as RDX is detonated, endothermic atomic bond-breaking of the RDX on an angstrom scale precedes exothermic reaction of the energetic components previously held apart by its molecular structure. However, because of the short inter-atom distance scale, exothermic reactions can take place within nanosecond timeframes in the reaction zone following the detonation shock front. However, to react a conventional energetic nanopowder/nanothermite, reactant mixing on a typically much larger scale is necessary to for rapid reaction, which can require a large amount of initial input energy for melting or vaporization of the energetic element core and its conventional inorganic oxide shell[161]. Accordingly, even nanoscale solid metal powders typically react by relatively slow diffusion mechanisms limited by initial heat transfer to the particles, rather than detonation, so have relatively slower energy release. They initially act as a heat sink in the detonation zone, rather than a thermal source. Metal powders can also consume detonation gas volume. Nevertheless, despite these adverse factors, energetic metal powders can increase energy output and brisance in appropriate compositions in which the net "push" from the high overall metal oxidation energy exceeds the adverse effects of thermal heat-sinking, gas-volume reduction, and slower reaction kinetics[162]. Conventional aluminum nanothermite compositions can have somewhat faster but still diffusion-limited reaction speeds, but are also somewhat unstable over time and lose energy output. By dramatically increasing the reaction rate of energetic metal powders, overcoming the heat-sink time-lag effect, and/or compensating for gas-consuming reactions, very large increases in brisance and blast are produced in accordance with the present disclosure.

HE explosives, such as RDX, HMX and Tetryl, are direct or indirect piezoelectrics with high dielectric strength and relatively low dielectric constant[163]. When the piezoelectric field developed on explosive grains at detonation pressure exceeds the dielectric breakdown field of about $1 \times 10^5$ to $10^6$ V/cm, the explosive is subjected to joule heating and ionized in detonation. The electrical conductivity of the detonation zone provides an electrical current path for Joule heating, which can produce double-digit increases of detonation velocity and pressure[164].

Detonation velocity and brisance are a function of the energy release and specific gravity of a unimolecular HE explosive. Heterogeneous explosive detonations are much more complex, but the transmission of the detonation shock wave to a solid casing of a munition or target is still a function of the density of the detonation wave, and the impedance relationship between the shock wave medium, and the solid casing/target. Higher density+fast reaction=>high Brisance Metals such as Mg (mp. 650° C., bp 1090° C. SCTP) and Zn (mp 420° C., bp 907° C.[165]) are fairly easily vaporized at relatively low temperatures. Vaporization of aluminum (mp 660° C., bp 2519° C.) is conventionally used as an ultrahigh velocity propellant. Heavier but highly energetic metals such as Zr (mp2125° C., bp4682° C.) and Ta (mp 3287° C., bp5726° C.) require external energy to vaporize. Vaporization of any of Al, Ta, Zr, etc to >6000° C. temperatures takes about the same amount of energy[166] Explosive bridge wires are used as detonation initiators. Electrically-vaporized aluminum wire is the basis of the "Alex" process to make nanoscale aluminum powders[167]. Electrically-exploded aluminum foils are used as ultra-velocity propellants. The Chinese have tested explosives with Zinc and Copper powders with RDX. Zinc powder was tested because its low volatility temperature facilitates vaporization[168]. Copper powder was tested because of its catalyzing effect to speed up nitrate decomposition[169] in RDX.

To achieve high brisance, the energetic metal adjacent the casing or target needs to be vaporized contemporaneously with the detonation wave. By connecting thin electrically-conductive wires, screens and/or foils of energetic metals and/or catalytic thermites across a properly applied high-voltage, high current power supply, the wires or screens can be rapidly vaporized at a program-controlled or self-triggered time[170]. If the metal wires are "exploded" adjacent a munition casing as the detonation front nears, the metal vapor will then be able to rapidly react in the violently turbulent detonation zone, without the reaction-slowing limitations of solid-state diffusion mechanisms and hard oxide barrier layers characteristic of conventional detonation reactions with solid metal particles (even nanoscale particles and thermites). The energetic contribution of the metal vapor will be rapidly added to the detonation front. There will be no loss of blast energy as a result of heat loss to solid metal particles before they "slowly" react by diffusion at their solid surfaces.

By timing the wire-exploding electrical discharge to occur just as an HE detonation wave is approaching, the energetic metal is converted to high-temperature, extremely reactive gas within the HE charge, in the detonation reaction zone.

As schematically illustrated in FIGS. 19-22, upon electrical discharge pulse across the volatile metal wires, the electrical energy is dissipated resistively within the "volatile" metal wires/particles to vaporize them. The metal particle "heat sink" problem is accordingly avoided. The oxidation reaction kinetics of the vaporized metal are much faster than the solid-state diffusion kinetics of solid metal particles. Accordingly, the properly timed, sudden electrical discharge through the volatile energetic metal wires produces joule heat deposition, vaporization of the energetic metal for fast reaction, a density increase, and therefore increased blast "brisance" against the energetic munition casing.

The HE explosive is typically a strong dielectric. Nano-silicon, energetic graphene oxide derivatives and/or energetic metal powders can be included in the HE explosive mixture, while retaining its strong dielectric properties. But the detonation pressure wave activates an ionizing piezoelectric voltage gradient across the advancing detonation zone, which turns it into an electrical conductor. Application of a high voltage/current source near the casing prior to creation of a conductive path between the electrodes (longitudinally or preferably axially !!) causes the electric discharge to be automatically triggered with the approach of the detonation wave. Energetic nanosilicon, graphene and/or metal powders in the HE explosive will be vaporized in the superheated detonation zone for immediate reaction, rather than delayed diffusion-limited reaction.

Because brisance increases with increasing HE explosive density (acting as a "tamper" as in nuclear explosives), dense energetic metal vapor designs can have enormous brisance if their reaction rate and "heat sink" problems can be overcome. In this regard, the munitions of FIGS. 19-22 can have:

- an explosive exterior shell charge which contains a very dense, energetic micro- or nanoscale powder, such as 5-20 volume percent Tantalum or Tantalum Hydride ($Ta_2H$) nanopowder or nanothermite
- a pulsed electrical power source (generator and/or storage)
- discharge electrodes across the desired detonation zone volume
- a programmable control to connect (arm) or disconnect (disarm) the discharge terminals across the dense energetic metal-filled HE explosive zone adjacent the casing.

A variety of pulse generators and stored electrical energy systems can be used[171] in accordance with conventional pulsed energy practice. For example, upon self-triggering "spark gap", of a thyratron or other mechanism, the electrical energy is discharged through the thin detonation plasma front. This is a relatively small volume, probably less than several millimeters thick. Sudden high electrical discharge through this thin plasma layer produces efficient Joule heating in the small electrically-conductive volume of the detonation front. It overcomes the "heat-sink-lag" effect of the higher-specific-gravity Si, Al, Ti, Zr, Ta (including hydrides) particles, increases their reaction rate and increases the blast "brisance" against the energetic munition casing. Effects are discussed in more detail below.

Even for a lower oxygen content explosive, the reaction of Zr or Ta with CO is quite energetic $$2Ta+5CO \Rightarrow Ta_2O_5+5C+357 \text{ Kcal}$$

The Ta nanopowder ultimately adds high energy output under atmospheric conditions. For high-oxygen reaction, the total energy is >20 kcal/cm³ of Ta:

$$2Ta+2.5O_2 \Rightarrow Ta_2O_5+489 \text{Kcal}$$

The density of Ta is ~16.65 g/cm³. Mixed with an explosive of ~1.9 g/cm³ density, even a small amount of Ta or Ta₂H produces a very significant increase in heterogeneous explosive density:

5 vol % Ta in 1.9 g/cm³ explosive=2.6 g/cm³ composite
10 vol % Ta"=3.4 g/cm³"
15 vol % Ta"=4.1 g/cm³"
20 vol % Ta"=4.8 g/cm³"

Such high density provide an enormous increase in brisance "shattering push", because the reaction rate is dramatically increased by vaporization of the Ta or other metal. At <5 vol % of the HE composition Zr or Ta, the gas volume reduction effect is negligible, but the blast density and impedance increase is substantial. At higher amounts, the Zr or Ta energy release speed and detonation product density counteracts the gas volume decrease. And by using Ta₂H and/or ZrH₂, the liberation of hydrogen further compensates for this gas volume loss. Ta₂H has a density of ~15, so has a similar density contribution. Attention to oxygen-excess formulations, and/or substoichiometric oxidizer in Ta nanothermites, can insure oxygen availability.

Heat transfer from detonating explosive to metal particles prior to their reaction conventionally causes initial detonation zone heat loss, before the slower diffusion initiation and reaction kinetics can generate thermal energy at the particle surfaces. To increase reaction speed and counteract the heat-sink effect of the energetic particles such as Si, Al, Ti, Zr, Ta and their hydrides, the arc discharge through the energetic particle composite detonation zone, timed just as the electroconductive front approaches the munition casing, adds thermal energy to compensate for detonation-wave thermal-sink heat loss to the metal particles, and to boost brisance as the shockwave hits the munition casing. Accordingly, the illustrated embodiments compensate for, or "correct", the heat-sink problem by energy input from the electrical discharge through the leading edge of the detonation zone.

Accordingly, the illustrated embodiments provide dense, electrically and chemically heated, high-density reaction products, for example at the munition casing. It also provides a dense reaction product mixture behind and within the detonation front, to act as a "tamper" (like that used in a thermonuclear implosion device) for the shock wave to "blast against" to produce high brisance. This greatly increases the blast and brisance of the explosive charge in the munition.

As a detonation front propagates through a high explosive mass, initial effects can include endothermic fragmentation and/or reorganization of the molecular structure of the explosive, followed by highly exothermic recombination to form lower-energy, more stable molecules in the reaction zone following the shock front, which may only persist for less than several hundred nanoseconds behind the shock front (eg, less than 4 millimeters wide for a high explosive with a detonation reaction zone persisting for less than 500 nanoseconds at detonation velocity of 8000 meters/second). The small intramolecular distances between energetic fuel and oxidative moieties in high explosive molecules permits such rapid reaction. However, even very small energetic nanoparticles such as aluminum, boron and/or silicon nanoparticles are relatively large compared to intramolecular Angstrom-scale distances of high-explosive molecules[172]. Their capacity for "mixing" with oxidants and exothermic reaction rates are slower than the components of HE explosives, such that their reaction is not substantially completed, or may not even be fully initiated, within the detonation reaction front. Accordingly, their mass and exothermic energy are typically not fully or substantially incorporated in the detonation front energy release, but rather are delayed for post-front reaction.

New technical approaches are needed to more rapidly initiate energetic nanoparticle exothermic reaction timing and energy release (and possible vaporization of "heavy" boron, aluminum, silicon and other nanoparticle reaction components)) to more closely coincide with the detonation reaction front.

Energetic fuel particles such as Al, Mg, Ti, Zr and Ta powders[173] ranging from 10's of nanometers to 10's of microns in size are conventionally blended with explosives such as RDX to increase total energy output. However, even nanoscale metal powders react by relatively slow diffusion mechanisms, in comparison to supersonic molecular-scale detonation explosive mechanisms, so have relatively slow energy release compared to high explosives. Energetic fuel particles also initially act as a "heat sink" in the detonation zone, delaying reaction initiation. These are significant limitations on the performance and potential of particulate energetic fuel materials and explosive compositions containing them. In accordance with the present disclosure, the reaction rate of energetic (eg, metal) powders can be significantly increased, their heat-sink effects overcome, and their ignition delay reduced, to provide increases in energy production rate, performance, brisance and/or blast.

In accordance with various preferred embodiments of the present disclosure, intense light is generated within an explosive detonation zone of a high explosive, and the intense light is applied to pre-heat a particulate energetic fuel in a high explosive composition immediately in advance of the explosive detonation zone. The electromagnetic light energy application to energetic particles, preferably nanoparticles, may be "automatically" exquisitely timed by the functional proximity of the advancing detonation zone to the undetonated explosive composite zone immediately adjacent to the extremely-rapidly-advancing explosive detonation zone. Preferably at least about 3% of the energy released during the detonation wave in the detonation zone is converted to light with a free-space wavelength less than 2 microns, and more preferably less than 1.3 microns. Light energy should be projected from the detonation zone into an explosive composition in the pathway of the fast-moving detonation wave with sufficient energy to heat energetic metal or semimetal particles within the explosive composite within 1 cm of the detonation zone, at least about 100° C., and more preferably at least about 200° C., before arrival of the detonation wave. Higher levels of such preheating >200° C. produce even more rapid initiation and reaction rates of the energetic fuel particles as they are enveloped by the oncoming detonation wave. The metal or semimetal particles preferentially absorb the projected light to preferentially apply the projected light energy to particle heating.

The pre-heated particles are also subjected to intense light as they are enveloped in the explosive detonation wave of the composite high explosive composition. Subjecting energetic fuel particles to intense light of <~2 micron free space wavelength (and preferably <~1 micron wavelength) within the detonation zone having a power density of at least 2%, and more preferably at least 3% of the detonation power density of the explosive detonation in the detonation wave, also increases the reaction rate and energy release rate of the fuel particles. Methods for enhancing the rate of energy release of energetic fuel particles in explosive composites, comprising the steps of providing an explosive mixture of a high explosive and a particulate high enthalpy fuel, initiating a detonation wave in the high explosive having a velocity of at least about 3 kilometers per second, and more preferably at least about 5 km/second, and converting at least about 1% of the high explosive energy of the detonation wave into electromagnetic energy (light) having a free space wavelength shorter than about 2 microns. Desirably, at least 3% of the detonation energy is converted to light energy having a free space (vacuum) wavelength of less than about 1.5 microns, and more preferably less than about 1μ. The method further includes radiating light from the detonation wave into the undetonated high explosive composite in the direction of the detonation wave vector, and preferentially absorbing the projected light energy in energetic fuel particles to heat them at least about 100° C. prior to being engulfed in the detonation wave. This disclosure is also preferably directed to explosive systems and compositions comprising a high explosive having a detonation enthalpy of at least about 3000 Joules per cubic centimeter, and a detonation velocity of at least about 3 km/second, more preferably at least about 6 km/second, and a candoluminescent material for converting at least 1% (and more preferably at least about 3 percent) of the explosive detonation enthalpy into light energy having free space (vacuum) wavelength less than about 2μ. The explosive compositions should best have a detonation temperature of at least 3,000° C. and more preferably at least about 443800° C. (as calculated or determined from a 25° C. predetonation temperature). The heat of explosion of the high explosive component should best be at least 3500 kJ/kg, and more preferably at least about 4000 kJ/Kg[174].

By "candoluminescent", or "candoluminescent material" is meant a material which when heated to a temperature above 2000° C. emits intense light in free space (vacuum) wavelengths shorter than 2 microns (and preferably shorter than 1.5 microns) at a rate at least twice (and preferably at least three times) the rate of blackbody radiation at that temperature. Candoluminescence in the VIS-UV range (less than about 400 nm free space wavelengths) is particularly useful.

Various aspects of the present disclosure apply pre-heating and/or pre-activation of nanoenergetics utilizing the speed of light. Cerium is an example of candoluminescent material which radiates intense VIS and UV light upon being heated to temperatures above about 2000° C. Xenon is a spectroscopically simple noble gas which emits intense VIS-UV energy when shock-compressed to 5000-30,000° C. (the Argon "flash bomb" effect[175]). The light intensity can be briefly over 500,000 thousand to a million watts per square centimeter at 25,000-30,000° C. shock compression temperatures. Xenon dichloride (XeCl2), perXenate salts, Xenon oxytetrafluoride (XeOF4), XeF6, XeF2 and XeF4, salts of the octafluoroxenate(VI) anion (XeF8)$^{2-}$ such as Na2XeF8, K2XeF8 can be included in the composite explosive, for example at a level of at least about 0.1 weight percent based on the total weight of the explosive composite containing the xenon compounds, to serve as an oxidizer, and as a Xenon source. Shaped voids, for example having a volume of about 1 to about 10 cubic centimeters, containing xenon can also be formed in the explosive adjacent dense nanofuel composite explosive zones, to generate light to heat the particles immediately in advance of a detonation front. The intense VIS-UV light emitted from candoluminesents and/or explosively-compressed gas travels "at the speed of light", which is much faster than the typical 4-9 Km/second detonation front of a high explosive. An intensely VIS-UV radiating candoluminescent within the detonating high-energy explosive pre-heats particles in a high explosive composition immediately in advance of the detonation shockwave, thereby greatly increasing energetic nanoparticle reaction velocity[176]. This also overcomes the "heat-sink" problem, and reduces or eliminates ignition delay for nanoparticle reaction[177].

In accordance with the present disclosure, enhancement of electromagnetic emission, including VIS and UV emission, can be utilized to enhance effective nanoparticle reactive velocity in the shock front and/or the reaction zone following the shock front of a detonating high explosive. Candoluminescent materials such as calcium and cerium (including less-expensive mixed "misch metal" materials) are excellent emitters of high-intensity VIS and UV light at high temperature, for example above about 1500° C. for cerium, and above about 2,200° C. for calcium ("limelight"). High explosives, such as HMX, RDX, Tetryl, Cl20, FOX, etc. readily provide such high temperatures in their detonation reaction zones, and energetic silicon and aluminum nanoparticles produce even higher temperatures. High explosives tend to be somewhat transmissive to VIS light, but can absorb more light energy at various wavelengths in the UV (to activate bonds, while energetic nanoparticles such as aluminum, boron, and/or silicon nanoparticles are optically dense, and rapidly heated by intense VIS and UV radiation. The development of explosive compositions with controllable sensitivity to laser radiation is of current research interest[178]. In this regard, explosive compositions are provided in accordance with the present disclosure which contain at least 0.01 weight percent, and preferably at least about 0.5 weight percent (such as 0.5 to about 5 wt %) of a high-temperature VIS and UV light-emitting candoluminescent material (based on the weight of the candoluminescent element and the total weight of the explosive composition containing the lanthanide). Upon detonation, the intense heat and plasma conditions in the narrow detonation reaction zone cause the lanthanide atoms to intensely radiate intense VIS and UV light, both back into the reaction gases behind the detonation reaction zone (where it may be absorbed by plasma), and forward, into the explosive composition ahead of the detonation reaction zone[179]. Despite the high speed of the shock and reaction front (eg, 2000 to 9000 or more meters per second), the high-intensity VIS and UV (and IR) light emitted by the lanthanide atoms propagates ahead of the detonation front reaction front at the speed of light in the HE matrix, where it is intensely absorbed by energetic fuel nanoparticles, any semiconductive layer resulting from incipient shock compression of the explosive, and less intensely by the unreacted explosive ahead of the reaction front. The intense light radiation pre-heats the nanoparticles and reduces the heat-sink reaction time-lag before the arrival of the shock/detonation/reaction front. The high-intensity VIS and UV light also heats and activates reactive oxidizing moieties and explosive composition moieties around the nanoparticles, to increase reaction speed with the heated nanoparticle surfaces. These effects at least partially compensate for the "heat sink" problem which limits reaction rate effectiveness of energetic nanoparticles in energetic compositions. During passage of the reaction front through the nanoparticle zone(s), the pre-heated nanoparticles react rapidly with the energetic reaction gases/plasma. The intense VIS-UV light emission from the candoluminescent atoms in the detonation reaction zone consumes energy, which therefor would tend to reduce the temperature of the detonation reaction front. However, the more rapid exothermic reaction of the energetic nanoparticles in and behind the detonation reaction zone can (more than) compensate in appropriate designs for the VIS-UV heat loss to the undetonated HE zone immediately ahead of the detonation shock front and reaction zone. Moreover, the VIS-UV heat energy absorbed by this undetonated HE zone is retained and contributes to a higher post-detonation temperature. And, the pre-heating and initiation-time-delay reduction of the zone ahead of the detonation front can increase the overall velocity of the detonation front and detonation reaction zone. The intense light of 2000-3000+° C. heated candoluminescent atoms/ions (eg Ca, Ce) within the reaction zone containing the energetic nanoparticles also further accelerates the exothermic reactions of the nanoparticles within the detonation reaction zone, thereby further heating the candoluminescent ions, assisting VIS/UV light production which transmits to the unreacted HE zone in advance of the detonation wave.

The candoluminescent elements should best be distributed on a molecular or nano-scale in the explosive. Desirably the candoluminescent elements may be salts of oxidatively energetic anions, such as nitrates or perchlorates, which can contribute oxygen balance to the explosive composition. However, because Ce, Ca and the like are energetic fuels, these candoluminescent materials may also be included in reduced nanoparticle form, such as components of core-shell nanoparticles as described hereinabove. Formation of heavy detonation zone nanoparticle vapor (eg, SiO, $BF_3$, AlO SiF having relatively high mass) assists the "brisance" of the explosive composition. Upon passage of the high-light-intensity detonation zone, the high VIS/UV light intensity radiated "backward" to the reacted zone facilitates continued rapid reaction of any remaining nanoparticle cores. Calcium nitrate, calcium perchlorate, ceric or cerous perchlorate ceric or cerous nitrate, calcium and/or ceric ammonium nitrate, oil soluble salts of cerium and/or calcium, such as a C2-20 carboxylic acid or phenol cerium salts or mixed cerium nitrate-salts, cerium dioctyl dithiocarbamates, etc[180] are useful explosive and propellant components. Energetic nanoparticles having cerium salt surface groups such as described hereinabove are useful components for such candoluminescent compositions.

Schematically illustrated in FIG. 22 is a cross section orthogonal to the axis of a cylindrically symmetrical explosive munition 2200 comprising a fuze and detonator (not shown), a casing 2202, a high explosive zone 2204 filled with a high explosive energetic nanoparticle composite composition including a candoluminescent material component, a high explosive VIS-UV emitting zone 2206 containing a candoluminescent component, and a high explosive core 2208. The high explosive core which may be any suitable explosive such as RDX, HMX, TNT, FOX, etc, is detonated in a conventional manner via appropriate fusing and detonator(s) components and materials (not shown). The light-generating zone 2206 surrounding the conventional HE zone 2208 may also comprise a conventional high explosive, but contains from about 0.1 to about 2 weight percent of cerium, desirably in the +4 oxidation state (calculated as an element) intimately dispersed in the zone 2206, preferably effectively dissolved in the high explosive and/or a binder thereof. For example, ceric nitrate or ceric ammonium nitrate may be "dissolved" or uniformly dispersed in a binder and/or cocrystallized/coprecipitated with another oxidizer component such as ammonium nitrate which is uniformly dispersed in the composite explosive composition. The zone 2206 may be relatively thin compared to the core 2008 (eg, less than a centimeter in thickness) to conserve cerium content. The energetic nanoparticle-loaded zone 2204 surrounding the zone 2206 comprises from about 5 to about 20 weight percent of high energy fuel Al, Ti, Mg, Zr, Ta, Si energetic nanoparticles, such as those described herein, together with from about 0.25 to about 5 weight percent of cerium desirably in the +4 oxidation state (calculated as an element) based on the total weight of the explosive zone composition. The cerium is preferably intimately (best molecularly) dispersed in the explosive matrix of the zone 2204, and/or surrounding nanoenergetic fuel particles which may be in the zone 2204. The casing 2202 may be a conventional steel or aluminum casing, or may be an energetically-exfoliating casing such as a wound or extruded casing of the type described herein. Upon detonation of the core explosive zone 2208, a detonation wave travels from the zone 2208 to the zone 2206, initiating its detonation. As the zone 2206 detonates, it heats the candoluminescent cerium (ions) atoms to a temperature in excess of 2500-3000° C., which radiate intense VIS-UV light, which in turn is absorbed by the nanoparticles (and explosive) of undetonated zone 2204. As the detonation wave from the zone 2206 travels to the zone 2204, the pre-heated nanoparticles (and explosive) have increased thermal energy, and reduced reaction-initiation time delay. As the detonation wave passes through the zone 2204 to the casing 2202, the cerium component of the zone 2204 is super-heated and radiates intense VIS-UV to enhance ultrafast thermal transfer to the nanoparticles of zone 2204 itself in advance of the collision of the detonation wave with the casing 2202. The zone 2204 may be thinner than the core 2208 to conserve cerium, being thick enough to support increased brisance of the outer zone 2204 against the casing 2202. The candolescent cerium components of post-detonation reaction products behind the detonation wave (such as the zone 2206 after detonation) are still superheated and radiating VIS-UV light while the detonation wave approaches and impacts the casing 2202. This post-detonation radiation can also be absorbed (directly or indirectly) by the nanoparticles of the undetonated regions of zone 2204 in advance of the detonation wave. The energetic nanoparticles of the composite zone 2204 do not impose a significant thermal heat-sink penalty, but instead react exothermically with significantly enhanced reaction velocity. The pre-irradiation heating and UV bond-breaking of the explosive component of the zone 2204 can also enhance the detonation velocity of the explosive in the zone 2204.

Noble gases such as xenon and argon have a simple radiation spectrum which is conventionally used for shock wave light sources in which a shock wave heats the gas to produce radiation. Compression heating of a noble gas may also be used to pre-heat energetic nanoparticles prior to detonation wave arrival. With reference to the munition 2200 of FIG. 22, another embodiment of a VIS-UV nanoparticle preheating munition may comprise a "foamed" cast high explosive (such as otherwise conventional pourable or melt castable explosives such as TNAZ, RDX/TNT, gelled explosive mixtures, etc) layer 2206 having 1-15 volume percent (eg, 5-8 vol %) of uniformly-dispersed argon or xenon closed cell gas bubbles with a diameter of at least 100 microns (eg, 0.5 millimeter to 5 millimeters) in the explosive matrix 2206, readily produced by mixing the gas with the explosive composition while melted and/or by introducing the gas under pressure into an explosive melt/fluid mixture followed by depressurizing to ambient conditions to "foam" the explosive melt/mixture. Pressure-formed explosive charges may be subjected to vacuum and then placed in the noble gas atmosphere prior to compression molding. The presence of noble gas "voids" can reduce the effective density and detonation speed of the explosive layer, but the inclusion of denser energetic fuel nanoparticles at least partially compensates for such density loss. When the detonation wave from the more central HE mass 2208 reaches the "foamed" layer, the shockwave collapses the "bubbles and compresses and heats the xenon/argon extremely rapidly to a temperature of 10,000° K to 30,000° K, to generate extremely intense visible and ultraviolet radiation peaking in the range of 90-300 nm. By also including and thoroughly distributing Cesium compounds such as Cesium nitrate in the explosive matrix 2206 (and 2204), the high-intensity light of both systems can be used to pre-heat energetic nanoparticles and ultimately surrounding explosive of adjacent unexploded explosive zones. Cesium-containing energetic particles such as made as described herein may also included in the explosive matrix 2206 (and 2204). Similarly, a blend of silicon, silicon-coated aluminum core-shell nanoparticles or silicon-boron nanoparticles as described herein, having ionically bound cesium amine nitrate or carboxylic acid cesium salts at the periphery of their covalently-bound organic coatings, may be blended in the cast explosive at 5-15 weight percent of the blend. The oxidizer and molecular proximity at the nanoparticle surface facilitates heating of the cesium to high temperatures which generate intense VIS-UV light to similarly pre-heat undetonated explosive zones adjacent the reaction front. Use of both superheated Ar/Xe and Ce produces enormous light output which utilizes the additional exothermic energy of the rapidly oxidizing nanoparticles to compensate for the correspondingly enormous heat/energy loss from this VIS radiation.

The compositions, processes and designs presented here can be synergistically combined with each other. For example, the "volatile" metal electric-discharge wires, foils and screens may be embedded in a $Ta_2H$-containing HE explosive. Ce may be included in the electrically explodable wires, screens or foils. Even though heavier energetic metals such as Ta (bp 5458° C.), Zr (bp 4409° C.) and Hf (bp 4603° C.) have extremely high vaporization temperatures, they can be included as alloying elements in the light metal wires, screens and foils to be electrically-explosively vaporized in the HE explosive. The wires themselves can be heated by VIS-UV a proximal, approaching detonation reaction wave zone, and the VIS-UV light emitted from an approaching detonation wave may be used to trigger an electric discharge into the wires using appropriate switch trigger means, to vaporize them as previously described.

The intense VIS-UV "flash bomb" emission from Argon and/or candoluminescent atoms in the detonation reaction zone consumes thermal energy. However, the more rapid exothermic reaction of the energetic nanoparticles in and behind the detonation reaction zone adds compensating enthalpy, and the VIS-UV heat energy absorbed by the undetonated HE zone is retained and contributes to a higher detonation zone temperature when the detonation zone "catches up" with the pre-heated nanoparticles. The intense light of 2000-3000$^{+\circ}$ C. candoluminescent Ce within the reaction zone also accelerates photothermal and exothermic reactions within the detonation reaction zone, thereby further heating the reaction mass.

Schematically illustrated in FIG. 31A is a schematic cross-sectional view of an explosive munition 3100 composition design like that of FIG. 22, having [from left to right] a layer of conventional "pure" high explosive 3101 for comparison purposes, a high explosive layer 3102 containing 5-10 vol % Argon bubbles or pressurized Ar microballoons and $Ce^{3,4+}$ perchlorate or nitrate salt, a high explosive layer 3103 comprising Al, $Ta_2H$ and/or Si nanoparticles and a candoluminescent $Ce^{+4}$ oxidizer compound, and a metal casing 3104 having a light-reflecting inner surface[181]. As illustrated in FIG. 31B, a detonation wave and reaction zone travelling [left-to-right] through a "pure" high explosive such as RDX/TNT travels at a speed of 7-9 km/second, leaving behind compressed, heated reaction gases. As the detonation shock front enters the "Argon foamed" explosive layer such as RDX/TNT with Ce candoluminescent material, the Argon bubbles are shock-compressed to extremely high Argon "flash bomb" temperatures to radiate intense VIS-UV and the Ceric salt is heated to >3000° C. where it radiates intense VIS-UV. This extremely intense VIS-UV emission travels ahead of the fast-moving supersonic detonation front "at the speed of light". The VIS-UV radiation is absorbed by, and intensely heats, the optically-dense nanoparticles immediately in front of the advancing detonation wave. The pre-heated nanoparticles in layer 3103 are activated (or even at least partially vaporized) by heat and photothermal effects to react at very high speed as the detonation front reaches them. The intense candoluminescence radiation on the detonation zone further drives the reaction rate of the fuel nanoparticles within the detonation front. As the detonation front advances to the casing, the light-reflecting munition casing 3104 reflects unabsorbed VIS-UV light back into the undetonated layer, further heating the fuel particles. Upon reaching the casing 3104, the detonation wave is a significantly higher-brisance front than it would be in the absence of the NIR/VIS/UV preheating.

Instead of "foamed" atmospheric pressure Argon in the explosive composite, the HE composites can include pressurized plastic, glass, and/or metal microballoons, such as those developed for laser-heated fusion, and explosion sensors. Thin-walled glass microspheres containing 10-200+ atmospheres of pressurized gas (eg, DT, Argon) have been available for decades.[182] By relaxing the laser-fusion requirement of perfect sphericity, they may be cheaply mass-manufactured in a variety of ways[183]. Pressurized Ar microspheres of a great variety of designs may "instantaneously" facilitate ignition of nano- and micro-fuel particles in a HE detonation wave.

Examples of explosive compositions in accordance with the present disclosure include those comprising from about 30 to about 95 weight percent of a high explosive, at least about 0.1 weight percent (preferably from about 0.3 to about 5 wt %) of a candoluminescent material, at least about 1 weight percent (preferably from about 5 to about 25 wt %) of a nanoparticulate fuel, and optionally at least about 1 weight percent (preferably from about 5 to about 25 wt %) of an oxidizer, based on the total weight of the explosive composition. A munition utilizing such compositions may comprise one or more embodiments of such explosive compositions, a casing for the composition(s) and a detonator for the composition(s), in accordance with conventional or subsequent state-of-the-art munition practice and construction.

As described herein, ≡Si—H, ≡Si—R (eg, ≡Si—CH2CH3, ≡Si-perfluorocarbon and the like) surface-terminated shelf-stable Si nanoparticles, including B, Ca, Mg, Ti, and/or Li-containing, and Si-coated Al nanoparticles and the like, are especially useful particulates for these energetic designs. The nanoparticles may desirably have Ce salt surface moieties, for example as illustrated in FIG. 22.

RDX and a number of other explosives are relatively transparent, so most of the forward-projected radiant energy is preferentially absorbed by the opaque metal nanoparticles in the explosive composition ahead of the detonation front. The energy released by high explosives in the detonation front can be relatively large, so that conversion of even a small percentage of this explosion energy to light, can produce a significant amount of energy transmission onto energetic particles immediately in advance of the detonation front. For example, RDX generates approximately ~5,000 J/gm enthalpy upon explosion. VIS-UV light is preferentially absorbed in metallic nanoparticles, which have plasmonic resonances which can couple to such light. Candoluminescent conversion of 3-10% of the detonation energy of one cubic centimeter of RDX to <1.5 micron wavelength radiation, and projection of such intense light into one cubic centimeter of an adjacent undetonated explosive composite comprising 10 wt % of energetic aluminum fuel nanoparticles, will heat the 0.1 gram of aluminum nanoparticles in the adjacent composite to a temperature above their melting point. The absorption zone of a 10% Al-containing explosive is probably only several millimeters at most[184] so this is a significantly effective amount of energy to deposit directly into the metal fuel nanoparticles ahead of the detonation zone. The pre-heated, optically opaque aluminum (high plasmon frequency) or silicon nanoparticles (~1.1 volt bandgap) with a covalent perfluorocarbon coating, or another surrounding oxidizer layer, can "immediately" start to react, preventing delay when the detonation zone reaches them. Mg or Ca nitrate/perchlorate/periodate etc. may also be a useful emitters, which could potentially rival $Ce^{+4}$ at temperatures over 2000 C. Cs+ is a good emitter in the NIR.

For example, two conventional aluminized explosive compositions consisting of RDX/AP/Al/Binder in weight ratio of (50/24/12/14) with a density of 1.68, and a composition of RDX/AP/Al/Binder in a constituent weight ratio of (20/43/25/12) with a density of 1.8 are prepared and explosively tested in accordance with conventional practice and modeling[185]. Substantially identical compositions are prepared in which 5 weight percent of $Ceric^{+4}$ nitrate is substituted for an equal weight of ammonium perchlorate, and 12 weight percent of nanoaluminum particles are substituted for an equal amount of micron+ sized aluminum powder. The nanoaluminum powder has a protective coating (such as described in See Jouet, R. J., A. D. Warren, et al. (2005) cited herein), or is a silicon-coated nanoaluminum powder having a protective alkyl or perfluoroalkyl covalent surface layer as described herein. The modified compositions have significantly enhanced reaction rate and energy-release rate from the energetic nanoparticles.

In various embodiments, it is important to maintain the candoluminescent material in an oxidized state. Some, perhaps most, high explosives have low, negative oxygen balance, and are capable of reducing candoluminescent materials such as $Ce^{+4}$. In addition, a nanoparticle fuel, such as Al, Si, Ti, Ta, B, Mg, etc is highly reducing. Accordingly, preferably the candoluminescent material is provided in the explosive composition in a form in which it is atomically surrounded with an oxidizing moiety. Ceric nitrates, ceric perchlorates, and ceric periodates are oxidizing compounds which are preferred candoluminescent materials for composite explosive-nanoparticle fuel mixtures. Ceric salts can be mixed salts (which facilitates attachment of ceric surface moieties to nanoparticle surfaces such as those with amine compounds covalently bound to the nanoparticle surface). Ceric ammonium nitrate, $(NH_4)_2Ce(NO_3)_6$ is a shelf-stable, oxidizing agent having a melting point of about 106° C. The ceric nitrato anion $[Ce(NO_3)_6]^{2-}$ is conventionally prepared, for example, by reacting cerium oxide, $CeO_2$ or $Ce_2O_3$, in hot concentrated $HNO_3$. $Ce^{4+}$ itself is an oxidizing agent (E°~1.61 V vs. N.H.E.), while nitrato, perchlorate groups and the like provide substantial oxygen reactant to at least briefly "protect" the $Ce^{4+}$ in an oxidized state while nanoparticulate aluminum, silicon, titanium, magnesium, tantalum or other highly energetic fuel nanoparticles react with other oxidizing agents in the detonation zone.

Porous silicon-based energetics have high energy content[186] potentially suitable for a wide variety applications and devices, such as fuzing, MEMS power sources, robotics, space propulsion, and other uses[187]. Unfortunately, conventional nanoporous energetics can have poor long-term storage stability, and can be dangerously unstable, severely limiting their usefulness. Accordingly, the present disclosure is also directed to explosive energetic compositions and devices comprising a high surface area porous silicon such as porous particles or substrates, an organic passivation layer covalently attached to the surface of the silicon, and an oxidizing agent within the pores of the nanoporous silicon separated from the silicon surface by the passivation agent. The present disclosure is also directed to rapidly reacting porous silicon energetics comprising a nanoporous silicon fuel substrate, a candoluminescent within the pores of the nano porous substrate, and an oxidizing agent within the pores of the nanopore substrate. Desirably, the energetics will have both a passivation layer, and candoluminescent means for generating intense light ahead of the exploding reaction front of the composite energetics and devices as described herein.

In this regard, FIGS. 32A, 32B and 32C are, respectively, schematic illustrations of a reticulated silicon composite energetic particle, a longitudinally-layered explosive munition fill utilizing composite energetic particles like those of FIG. 32A, and a radially-layered explosive munition fill utilizing such composite energetic particles. In this regard, illustrated in FIG. 32A is a partial schematic view of a silicon-based energetic composite particle 3202 comprising an interconnected silicon structural network 3204 and an interconnected oxidizer network 3206. The silicon network of the illustrated embodiment 3202 is preferably a reticulated silicon-based network having an open porous structure comprising an interconnected porous network of silicon-based open cells defined by silicon walls, struts or ligaments in which the open porosity is also interconnected, enabling energetic oxidizer and other components to be infused or otherwise added or placed within the reticulated energetic silicon fuel structure. A thin, atmospheric and electrically "insulating" organic layer may be provided between the silicon surface(s) of the silicon structural network and the adjacent oxidation agent of the oxidizer network 3206 for storage stability against surface oxidation in fully-assembled nanofuel-oxidizer composites, and to make the nanoporous silicon energetics less subject to unintended/accidental discharge. The surface of the interconnected silicon structure preferably has a covalently attached layer of hydrosilylation or other passivation agent, for example as described herein with respect to the embodiments 3302 of FIG. 33A. The interconnected oxidizer network 3206 may desirably include energetic metallic nanoparticles as described herein, for example with respect to the embodiments 3302 of FIG. 33A. The reticulated silicon may have an isotropic structure, with similar characteristics in all 3 Cartesian (x, y, z) directions, or may have an anisotropic structure in which the structure differs in different orthogonal directions. For example, isotropic reticulated porous silicon may be manufactured by thermal silica reduction with magnesium, and anisotropic reticulated porous silicon may be manufactured by electrodeposition of silicon or anodic etching of silicon, such as described herein. The interconnected pores of the reticulated silicon of the composite energetic of FIG. 32A may be relatively uniform, but preferably will vary widely to facilitate oxidizer and other component introduction into the structure. Typically, the porosity of the reticulated silicon will desirably be in the range of from about 40 volume percent to about 90 volume percent, more preferably in the range of from about 50 to about 80 vol %. The porosity is the volume of the open porous reticulated silicon structure divided by the total (outer) volume of the structure (eg, void volume). The relative volume density of the porous, open-celled reticulated silicon structure is defined as the volume of the silicon in the porous structure, divided by the total (outer) volume of the structure (eg, solid fraction). Porosity is accordingly generally inversely related to the relative volume density. The number of pores and their shapes and sizes substantially determine the (internal) surface area of the reticulated silicon, which is important for energetic devices comprising such porous silicon composites, such as those of FIGS. 32B and 32C.

Composite energetic particles with interconnected high interface surface area between the porous silicon-based structure and the oxidation component may be readily manufactured, for example, by combustion reaction such as described herein with respect to the embodiments of FIG. 27, electroreduction of silica in a molten salt, electrodeposition of porous silicon such as described with respect to FIGS. 10A, 10B, and/or anodization of silicon as described with respect to the embodiments of FIGS. 33A, 33B, and 33C. For example, combustion reaction products of silica with Mg and/or Ca may be ground to a desired particle size in the range of from about 3 to about 800 microns (in largest dimension) as described above, washed with hydrohalide acid (eg, HCl or HF) to remove CaO/MgO oxide reaction product and open the silicon pores, and leave a porous hydrogen-bonded reticulated silicon network of high internal surface area. The particles may be further treated to increase nanoporosity, such as be electroanodization. Electrochemically reduced silica in the form of porous interconnected silicon structures may be similarly produced. Electrodeposited porous silicon may be ultrasonicated, milled or otherwise fragmented to form porous silicon particles of desired size, which are preferably heated (eg, above ~450° C.) to convert amorphous silicon to crystalline form which can be more storage stable, and can be electroanodized to increase nanoporosity. The silicon surfaces, including the high internal surface area of these manufactured particles may optionally be hydrosilylated or otherwise covalently reacted with passivation agents, and the porous silicon particles then infused with oxidation agent. The oxidation agent may optionally include energetic metallic nanoparticles, such as also described herein. Desirably for energetic composites and devices designed for high-speed reaction, the oxidation agent and/or porous nanoparticles comprise a candoluminescent agent such as a cerium salt. The candoluminescent agent may desirably itself comprise an oxidizing agent (eg, Ce nitrate), be a part of the passivation agent (eg, ceric salt of hydrosilylation agent bonded to Si surface), or be mixed with the oxidation agent. The porous energetic composite particles may be used as components of energetic devices and composites such as those described herein.

Porous silicon-based energetic particles may be advantageously combined with explosives to provide increased energy output, increased density and brisance, and other benefits. For example, such porous silicon energetic composite particles may be mixed with high explosives such as HMX, RMX, Cl-20, TNT, Tetrl and others to form a composite comprising from about 1 to about 50 weight percent of porous silicon energetic particles, and from about 20 to about 80 percent by weight of high explosive in the composition, based on the total weight of the explosive composition. Desirably, the explosive will have an oxygen balance higher than −15, and more preferably higher than −10. Preferably the explosive within and immediately surrounding the energetic particles will have a positive oxygen balance. Oxygen balance % is a standard characteristic, which relates the oxygen content of a compound to the total oxygen required for the complete oxidation of all carbon, hydrogen and the like to form CO2, H2O, etc. High oxygen explosives (HOX) are particularly useful for energetic composites which comprise nanofuel components such as high surface area nanoaluminum, nanoboron and nanosilicon. BTHC (OB=3.6), BTC (OB=12.4), THE (OB=13.3), BTNA (OB=7), TAF (OB=6.4), BTAT (OB=−10.9), TTD (OB=−15.2), BTTD (OB=−3.8) are examples of HOX. RDX (OB=−21.6) and HMX (OB=−21.6) are not HOX, but nevertheless can be enhanced by nanoenergetics. Preferably the combined oxygen and nitrogen content of the explosive component will be at least 80% (eg, RDX, HMX % O+N=81.06%).

The porous particles of explosive composition utilizing such particles will desirably have a particle size in the range of from about 1 to about 1000 microns (largest diameter), more preferably from about 5 to about 800 microns, with an interfacial surface area between the porous silicon and the oxidation agent of at least about 1 square meter per gram of silicon, and more preferably at least about 5 square meters per gram of silicon.

Improvements in munition systems with increased nano-energetic reaction rates, and for maser and laser EM utilization and generation would be desirable[188]. In this regard, microwave energy may be used to "pre-heat" the porous silicon particles of the explosive composites containing such particles, so they can increase their participation in the detonation wave energy release of an explosive device. Microwave radiation can be generated into or within munitions in a variety of conventional ways such as explosive flux compression (EFC) systems, and propellant-driven magnetohydrodynamic generators (MHD) with RF-antenna systems, and the initiation and timing of microwave energy pulses can be precisely controlled in accordance with conventional practice.

Absorption of microwave energy produces localized higher temperature[189] within the energetic structure of the porous silicon particles, and can trigger a self-sustained exothermic chemical reaction of the porous silicon with the oxidizer component(s) of the porous silicon particles. The rate of heat generation by preferential EM absorption within the porous silicon energetic particles can exceed the rate of heat transport from the microwave-absorbing particles into the bulk munition. Thermal transport from the composite reticulated silicon energetic particles into the surrounding explosive is slower than the localized microwave energy deposition into the particles. The particles can be very rapidly heated to a temperature which initiates exothermic reaction, and/or which reaches the explosive ignition temperature. By timing the generation of a microwave energy pulse absorbed by the porous silicon particles of a composite explosive with and slightly before the arrival of a detonation shock wave, the reaction rate of the particles is increased to coincide with the detonation wave.

In addition to external microwave generators, microwave (RF) energy can be generated directly within an explosive composition. For example, various nitrogen-containing high temperature explosives such as hexogen (RDX) and octogen (HMX) generate broadband RF energy upon detonation. The intensity of wide-band microwave radiation (eg, from about $1\times10^8$ to about $1\times10^{11}$ Hz) can be designed to significantly exceed the intensity of the thermal radiation, particularly in cased explosives[190]. A highly non-equilibrium active medium is generated in the detonation products, for example in which oscillatory energy of heated detonation molecules/ions with excited oscillatory degrees of freedom (e.g., $N_2$ gas at temperatures higher than about 3340° K) exceeds the rotational energy, reportedly for example by an order of magnitude[191]. Typically, however, this microwave energy is significantly absorbed by the external shock wave plasma of conventional explosive devices, until the plasma dissipates through adiabatic expansion or instability, but appropriate shell design can increase microwave energy output[192].

The reactive materials of the illustrated embodiment can include controlled amounts of nitrogen (eg, from nitroamine energetics, nitrate oxidizers and the like) to produce a radiatively active nitrogen population inversion and other energized, actively radiating species. The high-energy-composite reactive materials of the illustrated embodiment which comprise highly energetic metallic energetic components can have increased reaction temperature over conventional bulk explosives such as "pure" RDX or HMX, so the radiating microwave energy is increased. Importantly, the detonated explosive is an "active" medium which can be configured to produce directional, maser-like stimulated emission in which the RF power is generated and directed in a maser-like manner.

Microwave function and enhancement includes control and enhancement of microwave generation, direction, or waveband, and/or heating of the energetic composite particles in an energetic device or composite. Illustrated in FIGS. 32B and 32C are schematic cross sectional views of explosive munitions 3210 and 3220 utilizing microwave generation and enhancement. The munition 3210 comprises a detonation means 3212 for detonating the munition in accordance with conventional practice, and a layered striation or "stack" of explosive layers 3214, 3216 of different explosive characteristics forming a distributed Bragg or rugate microwave grating. In the embodiment 3210, the layers 3214 may be a conventional microwave-generating explosive such as RMX or HMX. The layers 3216 alternating with the layers 3214 may be explosive compositions comprising a microwave-generating explosive such as HMX or RMX together with nanoenergetics such as porous silicon energetic particles and/or nanoaluminum particles such as those described herein. The use of layers or striations of significantly different density is further described hereinbelow. An oxidizing component such as $WOCl_4$ and $CeF_4$ may desirably be included in the layers 3216, such as described herein. The porous silicon structure of such porous composite particles for microwave enhancement of energetic composites or devices desirably has a silicon surface area of at least about 10 square meters per gram of silicon, and more preferably at least about 30 square meters per gram of nanoporous silicon. Similarly, energetic fuel nanoparticles such as aluminum and/or silicon nanoparticles (eg, Si-coated Al nanoparticles as described herein) used in the composite layers should best have a surface area of at least about 10 square meters per gram of fuel component, and more preferably at least about 30 square meters per gram of such fuel component. This high surface area forms a reactive interface with an oxidizer component of the composite, preferably with an intermediate passivation layer such as a covalently-bonded hydrosilylation layer as described herein. The reticulated composite silicon energetic particles contained in the layers 3216 should desirably have a particle size of at least about 100 microns (largest dimension) or a volume of at least about $1\times10^6$ cubic microns (eg, 200 micron diameter spherical particles), more preferably in the range of from about $1\times10^7$ to about $5\times10^9$ cubic microns. The thickness of the layers 3214, 3216 is designed to form a reflective and/or active grating for reinforcing generation and wavelength selection of microwave radiation of a preselected waveband. For example, the repeat separation width of pairs of adjacent high-dielectric contrast layers (3214-3216 to 3214-3216 repeat distance) may range from about 0.5 cm (shorter RF wavelengths) to about 20 cm (longer RF wavelengths) to form a reflective reinforcing microwave grating structure. Upon detonation of the explosive grating of elements 3214, 3216, a longitudinal array of actively-radiating detonation products of different reflective and absorptive characteristics is produced. An external RF pulse may be applied to the composite 3210 by external RF generator (not shown) coincident with detonation of the detonator 3212. Immediately after detonation, the regions 3214 are of lower temperature and ionization, while the regions 3216 are of higher temperature and ionization as a result of their higher energy content. Initial RF generation preferentially heats the energetic particles of layers 3216 so they can participate in the detonation. The generated RF energy and stimulated emission enhance reaction of the particulate nanoenergetic components, and can provide directed RF energy output. Use of candoluminescent components such as described herein is also desirable to enhance reaction rate and thermal output of nanoenergetic components within the detonating explosive. The spacing of the ionized and plasmonic grating pattern preferentially stimulates and enhances microwave radiation in a direction generally along its length. The enhanced frequency is desirably designed and selected and coordinated with the size (eg, diameter) of the composite porous silicon particles, such that the porous particles can absorb the microwave energy. In this way, the porous particles can be "pre-heated" to react more rapidly and vigorously when enveloped by the detonation wave of the exploding device such as 3210, 3220. Because of the velocity of detonation (eg, 5-9 kilometers/second), initially the ultrahot, nonequilibrium detonation products and the ionized RF grating they form are confined at high temperature and electron density within a volume of less than about 3 times the original volume of the undetonated explosive composite 3212, 3214, 3216. Subsequently, upon expansion of the detonation products, the grating enlarges and dissipates, reducing the frequency of the enhanced RF waveband as the ensemble grating array cools and dissipates.

Conventional explosive RF output is reduced and limited by absorption in plasma shock wave zones. As illustrated in FIG. 32C, further design improvements can enhance RF radiation output. In this regard, FIG. 32C is a schematic cross sectional view of a radially layered explosive fill comprising radially symmetrical cylindrical layers of explosive 3214, 3216 as previously described. Upon detonation, the layers form a radial grating passing through the central axis of the explosive fill. Around the outside layer of explosive fill, rings of longitudinally alternating explosive material extend along the exterior surface of the explosive fill. Upon detonation by suitable detonator (not shown), RF energy is generated, and selectively reinforced in a radial direction along the explosive composite fill. At the outside surface of the device 3202, the alternating rings of different RF-generating explosive material 3214, 3216 form a plasma grating which radiates RF energy. The different external surface grating zones can expand and cool at different rates, briefly maintaining the radiating grating structure which includes imposing a grating structure on shock wave plasma and facilitating dissipation of RF-absorption.

Also importantly, the high electron density produced by the extraordinarily high temperatures generated by the detonation of the energetic composite reactive materials can be exploited by providing magnetic fields together with an electrical current. A longitudinal pulsed magnetic field together with a longitudinal electric current through the detonation plasma, timed with detonation, may be provided by pulse generators and coils in accordance with conventional practice. As schematically illustrated in FIG. 32D, ionized electrons with high explosive velocity are forced in helical paths along the magnetic lines of force. These helically-accelerated electrons can generate RF emission by converting kinetic explosive energy into RF radiation, as they are accelerated along helical paths by the magnetic lines of force created in the explosive reaction.

Nanoporous silicon may be conventionally produced by processes including patterned and unpatterned anodic, chemical and/or photochemical etching of monocrystalline or polycrystalline silicon substrates in the presence of a haloacid etchant, preferably comprising hydrofluoric acid. Other production processes include cathodic reduction of silica as described herein. A very wide range of porosity structures can be designed and manufactured[193]. Typically, an etching electrolyte comprises aqueous HF and a surface active agent such as ethanol, and may include an oxidizing agent and/or metal ions. Pore size, pore structure, porosity volume percent, thickness and depth are readily controllable in accordance with conventional practice.

Porous silicon devices and structures[194] such as those illustrated in FIGS. 33A, 33B, 33C may be formed using conventional anodic etching processing steps[195]. The porous structure may be designed and characterized by the pore size, porosity and surface area created during the etching process. Pore sizes of etched porous silicon can be conventionally formed, for example, to range from about 2 nm to more than 100 nm to permit design of a wide range of combustion regions within the porous silicon structure[196] Porous silicon structures may also be conventionally etched to form micron-scale pores (with nanoporosity), for example with light-directed and/or template-directed etching followed by nanoporosity etching.

Illustrated in schematic cross-section in FIG. 33A is an energetic nanoporous device 3302 comprising a monocrystalline silicon wafer substrate 3304 and an anodically etched nanoporous zone 3306. Upon surface passivation as described herein and subsequent infusion of the porosity with oxidizer, safer devices significantly less subject to unintended detonation are provided. In this regard FIG. 33A includes a magnified schematic cross sectional view of a portion of the nanoporous zone 3306 after surface passivation and infusion of energetic oxidizer 3308. In this regard, upon anodization fabrication of the device 3302, the nanoporous silicon has surface hydrogen moieties which are reacted with a hydrosilyation agent to covalently attach a dense substantially monomolecularly-thin passivation layer 3310 to protect the silicon surface. The covalently bonded organic passivation layer may desirably be less than about 3 nm thick. Following Si-protective passivation, an oxidizer component 3312 is infused into the pores of the device 3302, such as by vacuum-infusion and drying of a solution of the oxidation agent (which may be repeated to increase oxidation agent density). The passivation agent may bind a candoluminescent agent such as a Cerium ion, and the oxidation agent may comprise a candoluminescent agent, such as Ceric nitrate or perchlorate. The infused oxidation agent 3312 may include energetic fuel nanoparticles 3314 such as described herein. In this regard, the illustrated energetic fuel nanoparticles comprise an Aluminum and/or Boron based core having a particle size (largest dimension) of from about 15 to about 200 nm (preferably in the range of from about 25 to about 100 nm), surrounded by a thin, dense, adherent (hermetically-sealing) 2-5 nm thick silicon layer 3316 to which is covalently attached a passivation agent 3210 to protect the nanofuel particles from premature reaction with the oxidation agent 3312. In the illustrated embodiment 3302 of FIG. 33A, the volume percent of silicon may desirably range from about 15 to about 70 percent, the oxidation agent may range from about 30 to about 80 volume percent, the covalently-bonded passivation layer(s) may range from about 0.5 to about 5 volume percent, and the fuel nanoparticle volume may range from about 0 to about 15 volume percent, based on the total volume of the porous silicon composite structure 3306. Different zones within the porous structure 3306 of the device 3302 may have different porosities and compositions, as described below. An exothermic reaction between the silicon fuel and the oxidizer of the surface-hydrosilylated or otherwise covalently-surface-passivated composite structure can still be triggered using heat, spark, impact or electromagnetic radiation according to device-designed operation.

As a silicon sheet or wafer is etched, the porosity, and accordingly the refractive index of the porous silicon (and its oxidant-infused composite) can be controlled and changed by periodically changing the etching current density, as illustrated by the devices 3302, 3304 of respective FIGS. 33A, 33B and 33C which are schematic cross-sectional views of etched porous silicon layers 3308, 3310 on silicon substrates 3306. The energetic device 3302 of FIG. 33A comprises a monocrystalline silicon substrate 3304 into which a porous zone 3306 including nanoporosity has been etched to form layers of relatively lower porosity alternating with layers of relatively higher porosity. Desirably the porosity of the different layers will vary by at least 5 vol %. For example, the porosity (open volume in the silicon) of the lower porosity silicon layers may be selected to be in the range of from about 30 to about 70 volume percent, while the higher porosity layers may be selected to be in the range of from about 50 to about 80 volume percent, and at least 5 volume percent higher than their adjacent lower porosity layers. Crystalline silicon has a density of about 2.33 g/cm$^3$, and a relatively high refractive index of about 3.96. Silicon with a bandgap of about 1.1 volt absorbs UV/VIS light, but its transparency increases with porosity, and at wavelengths greater than about 900-1100 nm. The refractive index of silicon only varies from about 3.47 to about 3.42 over the wavelength range from 2000 nm to 6000 nm, where it is relatively transparent to NIR/MWIR radiation.

Preferably after applying a thin (eg less than 2 nm thick) electrical and atmospheric passivation layer to the nanoporous silicon surface(s), a solution of an oxidization agent such as ceric perchlorate, sodium perchlorate, tungsten nitrate, tungsten perchlorate, ceric nitrate, calcium perchlorate or cesium nitrate having a lower index of refraction than silicon is infused into the porous silicon layers 3308, to form a distributed Bragg or rugate reflection zone in the layers 3308. The infusion/impregnation solution may include other components such as explosives (eg RDX) and energetic fuel nano particles such as B, Al, Ti and the like. The solvent may be evaporated to leave the oxidizing agent and other components in the pores. The infusion process may be repeated to increase oxidant density in the pores. The oxidizing agent may also desirably comprise a wide range of high-oxygen content organic compounds such as polynitro aliphatic compounds such as BTAT, BTHC and other HOX with an oxygen balance greater than zero. Compounds such as derivatives of trinitromethane and trinitroethane can contain available oxygen in large amounts[197]. Such organic oxidizing energetics, some of which are liquid, and some of which are solid at ambient temperatures, may also have high density, which is important for generation of detonation pressure in an exploding energetic composite device. In this regard, it is also noted that heavy metal inorganic oxidizer salts of metals with an ambient temperature elemental density at least 6.5 g/cm$^3$ and preferably at least 15 g/cm$^3$, such as tantalum (16.65 g/cm$^3$), tungsten (19.25 g/cm$^3$), iron (7.87 g/cm$^3$), copper (8.92 g/cm$^3$), and cerium (6.69 g/cm$^3$) perchlorates and nitrates, are useful high density oxidizing agent components for energetics in accordance with the present disclosure. Compounds such as bis(2,2,2-trinitroethyl) carbonate have oxygen content in the range of or exceeding that of liquid oxygen[198]. Inorganic oxidizers may be blended with such energetic organic oxidizers within the pores of the porous silicon energetic device. In this regard for example, submicron inorganic oxidizer components may be suspended in liquid organic oxidizers for direct infusion or introduction into the porous silicon. Both inorganic and inorganic oxidizers may be dissolved in a common solvent for such infusion, which may be followed by solvent evaporation to leave the oxidizing agent in the pores. Such oxidizing components can be used with the various nanoparticle energetic composites and porous silicon composites and devices and described herein.

The refractive index of porous silicon is generally less than that of bulk silicon[199]. When the silicon pores are filled with energetic oxidizer having a refractive index less than that of bulk silicon, the refractive index of the energetic porous silicon-oxidizer composite decreases with increasing porosity of the porous silicon. The porosity, and accordingly the refractive index of the porous silicon-oxidizer composite made therefrom, is readily controlled by the electrolyte composition and anodization current/voltage processing during production of the porous silicon. Porous silicon photonic mirrors or filters are readily fabricated by periodically varying the anodization current to form periodic dielectric constant variations along the designed optical axis. The period of the variation of the anodization current, together with the rate of anodization etching, generally determine the layer thicknesses, which may be established and verified experimentally for various anodization conditions, materials and electrolytes. By employing abrupt changes in anodization current, multilayered distributed Bragg laser or maser reflector structures with relatively abrupt transition between layers of relatively higher and lower refractive index can be formed. Similarly, by using a less abrupt variation of anodization current, such as a sinusoidal variation, the transition between zones of lower and higher dielectric constant is smother and less abrupt, which can also be used to produce distributed laser or maser rugate structures.

In the illustrated embodiment, the distributed Bragg or rugate grating has a reflected waveband in the VIS-IR wavelength region of from about 400 nm to about 3000 nm. The thickness and separation distances of the different-refractive-index layers 3308 may be determined by conventional Bragg/rugate calculations and experimental verification, based on the refractive indices of the porous silicon and the oxidation agent, and the porosity structure. In this regard for example, the Sodium Perchlorate has a density of about 2.5 g/cm$^3$ (2.02 g/cm$^3$ monohydrate), and a refractive index of about 1.46. Sodium nitrate has a density of 2.26 g/cm$^3$ and refractive indices of ~1.59 (trigonal) 1.34 (rhombohedral), while Cesium perchlorate has a density of ~3.33 g/cm$^3$ and a refractive index of about 1.49. Oxidation agents such as tungsten nitrates or perchlorates have relatively high density which can contribute to high detonation pressure. The organic passivation agent, although very thin, can also affect the effective refractive indices of the composite. For example, fluorocarbon passivation agents typically have a refractive index of about 1.36, while alkane hydrocarbon (eg, paraffin) passivation component moieties have a refractive index of about 1.45, which although extremely thin, tends to somewhat reduce the effective refractive index of the porous silicon to which it is covalently attached.

Ceria (eg, used in gas lantern mantles) is an example of a candoluminescent which radiates intense VIS and UV light at levels much greater than the corresponding blackbody rate at temperatures above about 1500-2000° C. This VIS-UV light output increases exponentially with temperature. At explosion temperatures >3000° C., at least from about 2 to about 10% of the nanosilicon energetic device thermal oxidation energy can be converted to intense VIS-UV-NIR light[200]. This is enough energy to heat, melt, or even ignite adjacent, unreacted silicon. As shown in FIG. 33A, highly energetic metal nanoparticles[201] can also be infused into the nanoporous silicon to increase explosion energy and temperature.

The intense VIS-UV light emitted from ultrahot cerium ions "automatically" pre-heats the nanosilicon (and other metallic fuel particles) within the device structure immediately adjacent the advancing reaction zone, thereby reducing ignition delay for nanoscale reaction to increase explosion velocity in the reaction zone[202].

While micron-scale metallic particles can reflect light, metallic nanoparticles highly absorb VIS-UV light due to electronic plasmon and other effects. Most oxidizing agents and explosives are relatively transparent, so VIS-UV (and some NIR) light is preferentially absorbed by opaque metal nanoparticles (and silicon). There is insufficient time for thermal equilibrium during the short time of an advancing explosive front, so absorbed light/heat remains largely at these nanofuel surfaces in contact with oxidizer. A burst of intense light further produces reactive electron-hole dominated surfaces on the silicon (and metal) fuel. These heated, electronically "hot" silicon surfaces (eg, with a covalent perfluorocarbon coating) can then "immediately" react and ignite the surrounding composite at a rate faster than the conventional progress of the explosion front without the reaction-rate assistance of intense candoluminescent light generation.

Figure 34:
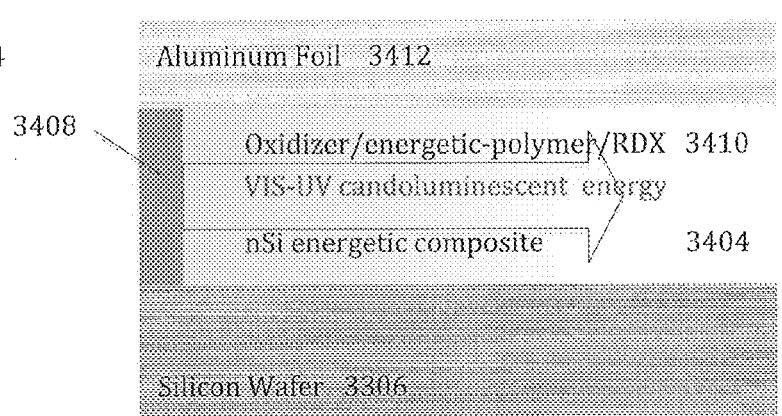
FIG. 34 is a schematic cross sectional illustration of a light-assisted explosion of a nanoporous silicon energetic comprising a candoluminescent and an aluminum cover-sheet reflector.
Figure 35:
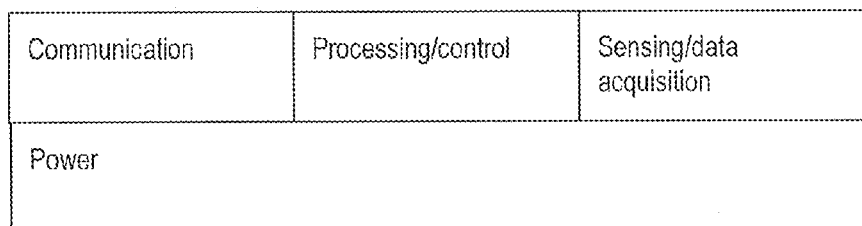
FIG. 35 is a schematic functional block diagram of an impermanent RF-communicating sensor which is designed for self-destruction upon user or timed signal.

Covering the surface of a nanoporous silicon energetic layer with a reflector such as an Aluminum layer (and/or applying porous energetic Si to aluminum) can confine and maximize the temperature and light intensity, as illustrated in FIGS. 34 and 35.

There are many variations, designs, shapings, and applications for integrated circuits, fuzing, surveillance-lighting imaging, "flash-bang" devices, self-destroying non-reverse-engineerable circuitry, etc.

As indicated, conventional nanoporous silicon energetics are typically unstable and unsafe. In accordance with the present disclosure, nanosilicon energetic surfaces are provided with a covalently attached organic passivation layer, which may also be an energetic fuel (eg, an alkane moiety) or oxidizer (eg, a perfluorocarbon moiety). Wide ranges of processes and materials for applying a covalent organic layer on the surface(s) of nanoporous silicon[203] may be utilized to provide the passivation layer for the energetic nanoporous and nanosilicon energetics. Mono- and di-alkenes/alkynes, acetylenes, perfluorinated alkenes, carboxylates, amines, perfluorinated sulfur alkyls such as $SF_5$ $(CF_2CF_2)_nCH_2CH{=}CH_2)$, dienes and diynes (eg, 1,8 nonadiyne), haloalkylsilanes such as dichlorodimethylsilane, electrografted alkyls, and Grignard reagents/reactions, using a wide variety of reaction systems such as Lewis acid, catalysts, thermal activation, UV, white light, and the like[204] can be used in accordance with the present disclosure to stabilize nanoporous energetic devices and systems. For example, simple alkanes such as ethylene densely covalently bonded to the silicon surface are protective against oxidative degradation and stable to over 200° C.[205] to provide electrical and oxidative stabilization. A wide variety of electrically and atmospheric passivating organic molecules may also be covalently attached to silicon surfaces having surface silanol (Si—OH) groups. The surface silanol groups should be substantially monomolecular in thickness to limit the amount of deadweight oxygen content. Silanes such as mono-, di- and tri-chloro and alkoxy silanes with attached organic moieties, such as (heptadecafluoro-1,1,2,2-tetrahydrodecyl) dimethylchlorosilane[206] and trimethoxy gamma propyl amine, readily react with surface silanol groups to form highly ordered self-assembled monolayers which passivate the porous silicon surface to resist storage instability and unintended detonation.

In this regard, in the illustrated embodiment 3302 of FIG. 33A, an atmospheric and electrically "insulating" organic layer 3310 provides storage stability against surface oxidation in fully-assembled nanosilicon-oxidizer composites, and can provide stabilization against accidental or unintended discharge. Functionality of the surface-bonded organic can be selected and patterned in a variety of ways, to enable tailoring of energetic function and design. For example, a carboxylic-ended alkane attached to the H-terminated nanosilicon surface(s) by UV assisted hydrosilylation can accommodate cerium ions and salts for optical light-generating intensity, while perfluorinated alkyl groups hydrosilylated within deeper zones of a nanoposous silicon structure by deeper-penetrating white light can populate interior zones of the composite energetic nanoporous structure. Masking, etching, electrodeposition and printing permit 2D and 3D designs and structures.

While FIGS. 33B, 33C illustrate a nanoporous energetic device fabricated by anodization of a monocrystalline silicon wafer, electrodeposited nanoporous silicon[207] in amorphous[208] or crystallized form can also be used to manufacture energetic silicon devices in accordance with the present disclosure. They may be reacted with hydrosilylation or other organic passivation agents to make them more air-stable, and then infused with oxidizer to produce energetic sheets, rolls, or other energetic porous silicon structures of scalable area. The porous silicon can also be ultrasonicated, milled or ground to form nanoparticles or nanoporous microparticles which can be hydrosilylated, mixed/infused with oxidizer, and combined with explosives in a composite munition, or printed in functional patterns. The oxidizer can comprise a candoluminiscent such as ceric nitrate or perchlorate, and/or an oxidizing polymer such as soluble fluorinated copolymers, polyNIMMO or the like to strengthen the porous structures or printed designs.

The spacing and regularity of the layers 3308 are designed for reflection and reinforcement of electromagnetic radiation of predetermined wavelength(s) within the emission wavelength band of the ignited energetic device 3320. The layers 3308 of the device 3320 are anodized to produce alternating layers of different nanoporosity varying by at least 5 volume percent, and preferably at least 10 volume percent. Upon infusion of an energetic oxidizing agent, the layers form a Bragg or rugate reflector. For example, the layers of the Bragg or rugate reflector zone with infused oxidizer may be spaced to reflect (at perpendicular incidence) light in the visible range, at eg, 400-700 nm when using a candoluminescent material for light generation, or in the NIR range of 700-1500 nm when using a NIR light emitting material such as Cs perchlorate in the energetic device 3302. Upon ignition, light emission generated in the active, ultra-hot reaction medium formed by the porous silicon layers 3308 of device 3320 reacting with the oxidation agent is reinforced by reflection, to briefly enhance radiated light in a preselected wavelength range. A similar energetic device 3330 is illustrated in FIG. 33C, in which the porous grating 3310 is etched into a monocrystalline silicon wafer 3306 in a vertical grating alignment with lateral spacing of the alternating zones of different porosity are generally aligned perpendicular to the surface of the device 3330 as illustrated in FIG. 33C. Upon ignition, light emission generated in the active, ultra-hot reaction medium formed by the porous silicon of devices 3330 reacting with the oxidation agent is reinforced by reflection along the length of the surface, to heat and facilitate reaction ignition of adjacent volumes of the energetic device. Light emission at grating orders and angles for grating wavelengths determined by the grating structure can also be facilitated.

By modifying the thickness and refractive index contrast of the composite silicon-oxidizer layers, the resulting reflectance features across the optical and IR spectrum can be tailored for specific energetic device applications and wavelengths. A reflective metallic sheet or mirror can be useful at the bottom and/or top of the devices 3302, 3304.

Upon ignition of the energetic devices, the ultrahot reaction zone forms an active light-emitting medium which is reinforced in its reaction velocity by reflection at the predetermined wavelength(s) of their Bragg or rugate zone, enhancing and stimulating light in the direction and wavelength(s) of the reflector zone. A Bragg grating or other rugate optical distributed feedback can persist briefly immediately before and upon ignition, via temperature and component variation of the reacting components and their reaction products. Electromagnetic radiation continues to be absorbed and reflected by the unreacted zone(s) adjacent the reacting/reacted zone(s). As the reaction proceeds and the reaction zone expands, the grating separation scale increases in the reaction zone(s), briefly increasing the wavelength of the grating-reflected and enhanced or stimulated emission radiation, and the refractive index difference decreases as the reactants are consumed.

Figure 36:
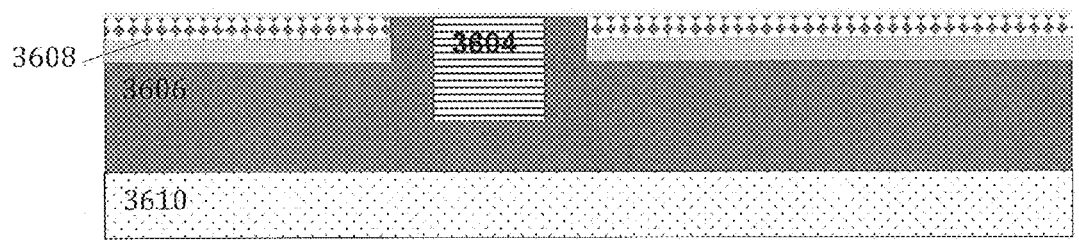
FIG. 36 is a schematic cross sectional view of an integrated circuit of the sensor system of FIG. 35 comprising a porous silicon energetic zone and an energetic package or printed circuit board.

Porous silicon energetics are useful for non-permanent electronic systems. In this regard, for example, high-performance and sophisticated defense electronic microsystems need to be protected from decryption or analysis upon loss or capture. Electronic systems can now be made at relatively low cost for widely distributed remote sensing and communications. For environmental and/or security reasons, there is a need for electronic systems capable of disappearing or being physically destroyed in a controlled, triggerable manner, such as by timer, event, or external signal[209]. Illustrated in FIG. 35 is a block diagram of such transient sensors with RF links for sensing and reporting environmental or biomedical conditions, and communicating with a remote user. Such nonpermanent sensors can include means for RF or other communication, means for processing and/or control, means for sensing, and a power supply. FIG. 36 is a schematic cross sectional view of a nonpermanent sensing system 3502 which is fabricated as integrated circuitry on one or more silicon wafer(s) 3306. As shown in FIG. 36, The electronic components are fabricated in a conventional manner on a silicon or other substrate(s) 3420 in defined zones 3424, 3426.

A crosslinked energetic plastic packaging or support layer, capable of self-sustained reaction upon ignition such as nitrocellulose, crosslinked nitroacrylates, crosslinked NIMMO, GAP, PVN, GLYN, PNP, N, N'-epoxy binders, Nitramine polyethers, which may include nitrated graphenes and the like such as described with respect to the embodiments of FIG. 13. The composite may include iron powder with a chloride salt or other environmentally degradable components. It may also comprise an electrodeposited energetic metal such as aluminum or titanium with embedded fluorocarbon polymer, such as embodiment 2300 described herein with respect to FIG. 23. Desirably, a printed circuit board utilizing a crosslinked energetic polymer instead of a conventional high-permanence, long-lasting, nonflammable or poorly flammable plastic is particularly useful. For printed circuit boards, conventional metal trace processing may be utilized, but the attachment systems for integrated circuits and other components need to accommodate the thermal sensitivity of the energetic polymer matrix. In this regard, plug-in connectors may be molded in the PC board, and/or a thin layer of the PC board having high thermal stability may be provided adjacent the solder-attachment surface to facilitate fast thermal soldering. Low-melting solders are desirably used. Upon activation of a "destruct" signal, such as a signal to ignite a porous silicon fuze component, the integrated circuit device can be energetically ignited, destroying the integrity of the integrated circuit(s), and the energetic PC board or substrate can be ignited to rapidly or slowly react or burn to fully destroy the sensor system 3502. If the device is encased in an environmentally degradable package, the reaction energy can be contained for safety purposes.

As described herein, in addition to etching silicon or polysilicon wafers, porous silicon can also be easily and cheaply[210] electrodeposited on conductive substrates, such as aluminum foil and other electroconductive surfaces. See FIG. 35. Electrodeposition of porous silicon from inexpensive electrolytes such as acetonitrile and propylene carbonate is fast, efficient, inexpensive, and scalable[211]. Aliphatic dinitriles such as NC—(CH2)$_n$—CN (n=2-6 such as glutaronitrile and adiponitrile) have high electrooxidation resistance and a large electrochemical window[212].

Electrodeposition rates of porous silicon can be very high, and the porosity and silicon thickness can be controlled by gas ($H_2$) evolution from the electrolyte composition, and plating conditions. The electrodeposited porous silicon[213] can be anodized in a manner similar to anodic micro- and/or nanoporous silicon formation on monocrystalline, polycrystalline and αSi-H wafers/sheets to further open up or etch nanoporosity in the structure (if appropriate), and then stabilized by hydrosilylation, electrochemical attachment or other surface functionalizing agents/processes to make them air-stable. The electrodeposited silicon may be crystallized if desired, such as by pulsed light or other rapid thermal treatment (which may be patterned if desired). The porous silicon may then be infused with oxidizer (which may include above-described materials such metallic nanoparticles and Ceric or other candoluminescent agents) to produce large-area energetic sheets, rolls or other structures. It may be desirable to heat the electrodeposited amorphous silicon to a crystallization temperature (in an inert atmosphere or vacuum) prior to anodization and/or functionalization. The porous silicon can also be ultrasonicated and/or ground to form particles which can be hydrosilylated, mixed with oxidizer, and printed in functional patterns. The oxidizer can comprise a candoluminescent and/or an oxidizing polymer such as soluble fluorinated copolymers, polyN-IMMO, etc to strengthen the porous structures or printed designs. Energetic polymers can be grafted onto the surfaces. Al, Ca—Al, Al—B and energetic graphene materials may be included in the composites.

Porous Silicon itself is fragile, but can remain coherent when infused with a polymer, such as a flexible energetic polymer. Electrodeposited silicon is largely amorphous. It may be heated in inert atmosphere or vacuum (eg, $H_2$) to crystallize at a relatively low temperature (eg, 440° C.) via twinning-crystallization mechanism, if desired before hydrosilylation, candoluminescent/polymer/oxidizer infusion. The fragile electrodeposited nanoporous silicon can also be milled, hydrosilylated, mixed with an oxidizer matrix, and printed or formed in any desired pattern. Milled porous silicon, including newly-exposed silicon surfaces formed by milling, is highly reactive with hydrosilylation and other covalent-capping materials such as 1-alkenes and alkynes (eg, 1-decene, heptadecafluoro-1-decene, $SF_5$ $(CF_2CF_2)_n$—$CH_2CH$=$CH_2$, amines, etc)[214]. Hydrosilylation reaction can be facilitated by UV/VIS light, and microwave treatment. The covalently-surface-bonded silicon nanoparticles produced by reactive milling (or separate hydrosilylation or amine reaction) are well protected against oxidative degradation, and stable to over 200° C.[215]. However, when ignited, they are extremely rapidly exothermic because of their high surface area.

Silicon may be electrodeposited and retained on metal foil, sheets, structures and the like by batch or continuous procedures[216]. Aluminum-PTFE composites with the nano PTFE/Aluminum surface area "on the inside" of the composite as described herein reduces aluminum surface oxidation problems. The aluminum foil has embedded and encapsulated PTFE nanoparticles which are hermetically sealed within the Aluminum matrix, and excluded from the atmosphere by the dense encapsulating electrodeposited aluminum matrix. This encapsulation of the PTFE nanoparticles within the reactive aluminum matrix produces an enormous nanoscale surface area of un-oxidized aluminum in intimate contact with the oxidatively reactive PTFE. The foil can be initiated by current pulse, or external thermal source. It can initiate the will also react with the nanoporous silicon deposited on its surface. Depending on the degree of porosity, the electrodeposited silicon may have some closed cells. A short conventional porous and/or nanoporous silicon anodization treatment can be used to open the electrodeposit to high porosity. When the foil is an energetic metal such as aluminum with internal nano-oxidizer such as polytetrafluoroethylene (PTFE) particles, the entire composite is a form-stable, highly energetic structure.

Conventional munitions can have limited penetration effectiveness as a result of relatively low density which limits the kinetic energy and momentum density which is transferred to the target at design velocity. For example, the conventional USAF Massive Ordnance Penetrator (MOP) has a reported nominal penetration distance of 61 meters, length of 6.2 meters, diameter of 0.8 meters, and total weight of 30,000 pounds including a warhead comprising 5300 pounds of high explosive[217]. The overall density of the conventional MOP is accordingly reported to be only about 4 g/cm$^3$. Desirably however, such a MOP should be significantly denser and a fraction (eg ½ or less) of the size of the conventional MOP for use by standard stealthy aircraft, optionally with rocket or scramjet power to add kinetic energy[218].

Embodiments of the present disclosure are also directed to high density munitions, such as energetic or penetrating kinetic munitions, comprising a munition casing having a density of at least about 7 g/cm$^3$ and preferably at least about 8 g/cm$^3$, and a composite energetic fill within the casing having a density of at least about 3 g/cm$^3$, and preferably at least about 5 g/cm$^3$. Steel and iron alloys (including amorphous alloys) having a bulk density of at least about 8 g/cm$^3$ provide high strength and concentrated momentum for deep penetration upon impact against hardened targets. Especially for hard and deeply buried targets (HDBT), casing materials having a density of at least about 15 g/cm$^3$ are particularly preferred, including casings fabricated from tungsten and/or uranium and their alloys. Uranium and amorphous metal alloys which have high strength, hardness and self-sharpening (eg, conchoidal) fracture upon impact are more functionally useful than metals such as normally-structured crystalline tungsten which blunt upon impact. Depleted uranium is a desirable form of uranium such munitions because it has relatively little $^{235}$U content, so is particularly useful for casings for munitions directed at underground uranium enrichment or storage facilities which will result in release of $^{235}$U-enriched uranium where its minimal $^{235}$U content will be insignificant. The composite fill desirably comprises at least about 25 mass percent of a halothermite oxidizer (including halooxythermites) having a density of at least about 4 g/cm$^3$ and at least 25 mass percent of an energetic metallic fuel having a density of at least about 2.6 g/cm$^3$ and a full oxygenation enthalpy (with oxygen) at 100° C. of at least about 11 KCal per cm$^3$ and more preferably at least about 15 KCal per cm$^3$. Preferably at least about 25 mass % of the metallic fuel component is in the form of submicron particles having a specific surface area of at least about 25 m$^2$/cm$^3$, and more preferably at least about 150 m$^2$/cm$^3$. The specific surface area is defined herein as the surface area per gram times the bulk density (calculated at zero porosity) of the material per cubic centimeter. Especially for hard and deeply buried targets (HDBT), energetic mixtures or composites having a density of at least about 8 g/cm$^3$, and more preferably at least about 10 g/cm$^3$ are particularly preferred, as will be described in more detail below.

The composite energetic fill may desirably further comprise an oxidizer selected from the group consisting of nonhalothermite energetic oxidizing agents and high oxygen balance (HOB) high explosives.

In some embodiments such as those illustrated in FIGS. 19, 20, 21, 31, 32, 42 at least a portion of the fuel may be in the form of an energetic metal wire, tape, screen or tube immediately adjacent or containing at least a portion of a halothermite oxidizer, and the munition may further comprise means for applying an electric current pulse to the wire or tube to vaporize at least a portion of the wire or tube and the halothermite. In the case of a tube, the halothermite may be encased within the tube. In the case of wire, tape (including perforated tape) or screen designs, the halothermite may immediately surround the energetic wire, tape or screen. The composite energetic fill may also comprise a candoluminescent agent as described herein which when heated to at least 3500° C. generates and radiates UV/VIS (and NIR) radiation of intensity to radiatively pre-heat surface zones of the unreacted fuel to an elevated temperature of at least about 500° C. prior to explosion. The electromagnetic radiation from the candoluminescent agent continues to heat the reacting components during explosive reaction. The speed of the detonation wave and microsecond heating time of the transient light-generating detonation wave limit the relatively slower thermal equilibrium of the pre-heating or pre-heated metallic fuel particles by conduction, with the particle surfaces where reaction occurs being more intensely pre-heated prior to engulfment in the detonation wave, while shadow-zones and internal zones can remain cooler.

The munition casing and its energetic fill may typically have a mass ratio of from about 4:1 to about 1:4 casing to fill mass ratio. casing, which is typically steel or a higher density alloy of tungsten or depleted uranium may be selected based on cost, strength, density, and ease of manufacture. The munition including its casing and fill may desirably have an overall total density (total munition mass divided by total munition volume) of at least about 8, and more preferably at least about 10 grams per cubic centimeter, and a length to width ratio of at least about 5. Dense hypersonic projectiles are examples of munitions which can beneficially utilize certain high density compositions and designs of the present disclosure. Hypersonic kinetic munitions such as railgun projectiles are subjected to enormous atmospheric resistance. This adversely heats and slows the projectile, and decreases its kinetic energy. By cooling its inner surface with a coolant such as liquid $H_2$, liquid He, liquid/solid $NH_3$, silane and/or methane[219], the projectile can have reduced velocity drag loss, and can be kept at a lower surface temperature during hypersonic transit. Liquid $H_2$, He, and $NH_3$ (eg, with a decomposition catalyst $2NH_3 \Rightarrow N_2 + 3H_2$) can (with appropriate pumps and valving) be injected into a projectile reservoir immediately prior to launch. Such coolants can be made on-site or on-board such as by nuclear-powered DD(X) and other (eg, US Navy) ships from seawater, reducing munition storage requirements. A coolant and guidance gas reservoir can be in the nose cone, body, sabot and/or the C-armature.

Chemical energy of the light, reducing-gas cooling envelope, and chemical energy of an energetic-composite railgun sabot, can be used to maintain or enhance projectile velocity.

A "square" railgun sabot can be designed as a scramjet around a cylindrical projectile body. The liquid $H_2$ and/or $NH_3$ coolants are energetic propellants which can assist in driving the scramjet. The sabot (which may include a C-type armature) can be constructed of a physically strong energetic metal composite which reacts (oxidizes) rapidly with the atmosphere to heat it and generate thrust in the scramjet interior[220], as part of a consumable scramjet. The sabot and/or railgun armature can be designed to be consumed in providing thrust, rather than simply falling away, and wasting their velocity-and-mass energy immediately after launch.

Figure 41:
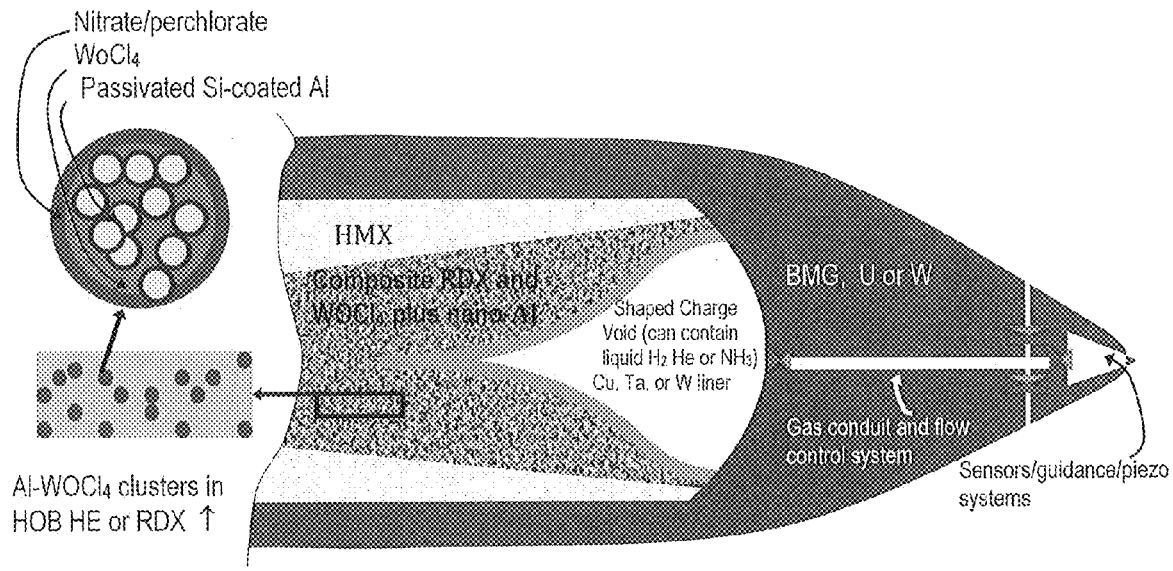
FIG. 41 is a schematic cross-sectional side view of the leading end of a kinetic or penetrating projectile, with a schematic magnified view of a portion of the energetic composite fill of the projectile showing Al—$WOCl_4$ clusters in HOB HE or RDX, and a further schematic magnified view of that magnified portion showing individual energetic particles of the composite energetic fill.

In this regard, illustrated in FIG. 41 is a hypersonic munition projectile 4102 comprising a casing 4104, a conventional guidance control system or means 4106 (GPS, laser, lidar, and/or radar) and an internal pressurized refrigerant gas storage cavity 4108. The projectile 4102 may further comprise a gas discharge conduit 4110 in fluid communication with the storage cavity 4108, means 4112 for conducting refrigerant gas to the projectile forward tip/nosecone 4120, at least three discharge orifices 4114 distributed about the radial circumference of the projectile tip 4120 for controlling the discharge of such gas at each respective orifice in response to the guidance control system 4106. The projectile may further comprise conventional guidance means such as movable vanes, ailerons or plasma-generating surfaces (not shown) co-operational with the control system 4106 for steering the projectile to its target. However, the illustrated embodiment comprises means for directing the refrigerant gas to specific discharge orifices for discharge to steer the projectile, wherein the refrigerant gas is hydrogen, helium, ammonia, methane or mixtures thereof in gas or liquid phase. The differential discharge of a light refrigerant gas reduces drag along the side of the projectile where it is released, thereby facilitating a turning force on the projectile toward the highest-drag side. By ejecting a light refrigerating and reducing gas such as $H_2$, He or $NH_3$ (which can be catalyzed to form its elemental gases hydrogen+nitrogen) at the projectile tip[221], the hypersonic kinetic projectile surface can be protected from rapid heating and oxidation, and an internal energetic fill can be protected from premature detonation by cooling from evaporation and expansion of the light reducing gas. In addition, the skin friction drag and consequent heating of the external projectile surface is dramatically reduced by the lighter gas at the surface[222]. This greatly increases both the permissible range and velocity of the projectile. More importantly, differential discharge of the lighter gas at different points or zones around the tip of the projectile can be used to steer and guide the projectile. Outside surfaces of the projectile having larger amounts of light He and/or $H_2$ gas have less atmospheric friction, causing the projectile to turn toward its side opposite from the discharge as a result of higher drag on the opposite side. Conventional GPS, MWIR, computer-controlled guidance systems and laser-guided targeting systems can be used with suitable fast-response conventional valving to control light gas discharge to the respective different surface points or zones for projectile steering. This steering mechanism is simpler than conventional mechanical/electrical steering vanes or fins, and can introduce less overall atmospheric drag to the projectile. However, steering vanes, fins and/or zone-induced plasma guidance systems may also be used alone, or in combination with the illustrated vapor-friction-reduction guidance system. The munitions may include conventional guidance systems and fuzes such as void-sensing fuzes developed by Alliant Techsystems (ATK), capable of both burrowing and counting the layers through which they travel before detonating. Such HDBT penetrator munitions should have casings capable of withstanding layers of concrete and reinforcing materials. The missile design and flight sensing and control system may be conventional, for example like that of the MBDA Dual Mode Brimstone missile. The high density energetic compositions may also be used to manufacture munitions which that reduce collateral damage risk on land and at sea and in complex environments. In this regard, the munition casing may be constructed of a lightweight carbon-aluminum structural composite, or an aluminum matrix-tungsten (or tantalum) particle composite[223] which fragments to minimize the distance which the casing structure travels at high velocity after detonation of the internal explosive. Weapon release or launch may typically be in the range of from about 2 km to about 20 km release altitude, and 2 km to about 30 km range-to-target distance. The conventional control system of the munition system may be remotely piloted in beyond line of sight (SATCOM) conditions, with tracking and designation of targets being conducted in manual-track mode, auto-track mode, or a mixture of both modes in accordance with conventional practice and design. Integrated GPS, Laser and MMW radar seeker systems may be used separately, or in tandem, also in accordance with conventional practice and equipment guidance system design.

As schematically illustrated by the magnified insert of FIG. 41, energetic fuels can be used comprising a central nanoscale core 4150 comprising aluminum, boron, calcium, magnesium, lithium, silicon or mixtures thereof, a dense nanoscale silicon shell 4152 surrounding and encapsulating the central core, an organic passivation layer 4154 covalently bonded to the outer surface of the silicon shell, wherein the central core and silicon shell and organic passivation layer in total together comprise less than about five mass percent oxygen. Methods including those described herein, for manufacturing core-shell energetic particles can be employed, such as exemplified by forming aluminum particles comprising the steps of vaporizing a metal vapor such as aluminum or decomposing an alane to form a stream of aluminum vapor, rapidly flash cooling and condensing the aluminum vapor stream to form a stream of submicron aluminum particles having a surface area of at least about 25, and more preferably at least 75 square meters per gram, depositing a dense shell of silicon at least 1 nm (and preferably in the range of from about 2 nm to about 10 nm) thick on the outer surface of the submicron aluminum particles, and covalently bonding an organic passivation layer on the outer surface of the silicon shell. The metal vapor may be aluminum, calcium, magnesium, lithium, sodium, boron or mixtures thereof, wherein the silicon is deposited from silicon vapor, silane vapor or solution, wherein the passivation layer is applied by hydrosilylation, Grignard reaction, salt-exchange, light-induced coupling reaction and/or metathesis reaction.

The present disclosure is also directed to dense energetic explosive or munition ordnance fills for enhancing momentum, detonation pressure and blast effects for momentum effect devices such as structural demolition, impact-driven munitions[224] such as those for hard and deeply buried targets (HDBT), hypersonic projectiles and/or railgun projectiles[225]. For limiting collateral damage while maintaining or enhancing target effects, it may also be desirable to combine dense metal such as Tantalum and/or Tungsten particles or reactive salts, and lighter but highly oxidatively energetic metals such as Aluminum, in an explosive composition or casing for combined momentum and energetic effects. However, achieving fast, optimized energy output from both Al and W has been an ongoing technical problem[226]. A primary disadvantage of energetic nanometallic fuels such as aluminum is their formation of solid oxides which do not generate gas, and which slow surface reaction. High Explosive (HE) composite munitions with fluorothermite and other halothermite oxidation agents can be designed to generate large heat output and gas reaction products, while preventing surface oxide layers on fuel components. In this regard, "halothermites" such as $CuF_2$, $CuI_2$, $CeF_4$, $XeF_6$, $MoO_2Cl_2$, $MoF_4$ and $WOF_4$ can be employed as oxidizing agents for enhancing aluminum or other energetic metal oxidation while limiting obstructive $Al_2O_3$ layer formation. By "halothermite" is meant an inorganic halogen-containing compound of a transition metal in which the halide component of the anion of the compound comprises at least 50 mass % of the anion moiety. The halothermite should desirably react with aluminum with an enthalpy of at least 2 kilocalories/cm$^3$ of a combined halothermite-aluminum mixture determined from a temperature of 100° C. In view of the relatively low melt temperatures of certain halothermitic oxidizers such as $WOCl_4$, $WOF_4$, $WOBr_4$, $MoO_2Cl_2$, $XeF_6$ and the like, they may readily be processed to form particles by spraying of their melt and cooling the particles below their melting point. The particles may be coated with relatively inert materials such as highly (eg per-)fluorinated alkane polymers such as tetrafluoroethylene-co-perfluoroalkylvinylether (PFA) and tetrafluoroethylene-co-hexafluoropropylene (FEP) to isolate the halothermitic component(s) if desired to facilitate stability if appropriate in the energetic compositions of which they are a part. Grinding, precipitation from inert solvents and other comminution processes may also be used to produce powdered halothermitic oxidizer components for use in energetic compositions in accordance with the present disclosure. Composite components may be mixed in accordance with conventional procedures. In addition, components such as nanoaluminum as described herein may be spray dried from a solution/slurry in perfluoromethane or perfluoroethane with dissolved high fluoride substantially chemically inert polymer, a halothermite oxidizer such as $WOCl_4$, and a High Explosive (HE) such as a high oxygen content HE explosive.

Energetic metals[227] such as Al, B, Ti, Ta, Zr, Si, Mg typically react in explosive compositions by relatively slow diffusion mechanisms, compared to detonation reactions of HE explosive compounds. Metallic nanoparticles can also initially act as a "heat sink" in an HE detonation zone, initially cooling and slowing detonation power and reaction rates in an HE composite detonation zone, until the slower fuel-oxidizer exothermic reactions later take place after passage of the HE detonation shock wave. As described herein, self-timed pre-heating of energetic metal particles can be carried out in an explosive composite[228] immediately in advance of a detonation wave, by engineered use of candoluminescents such as Ceric salts, Xenon fluorides, and/or Xenon and/or Argon "flashbomb" gases. An HE detonation is fast, but intense light generated in the detonation zone can project ahead of the detonation shock wave, literally "at the speed of light". This intense light energy can pre-heat the surfaces of metal nanofuel particles to reaction temperatures micro/nano seconds prior to being engulfed in the advancing HE detonation shock wave. This intense light can also melt and/or vaporize halothermite oxidizing agents such $WOCl_4$, $XeF_6$ etc. at the nanofuel surface exposed to the oncoming light radiation. The preheated/melted nanofuel particles and melted or vaporized oxidizer at the interface zone can participate in the detonation zone reactions without ignition delay or heat-sink behavior. The intense light within the detonation zone promotes reactant electrons to highly excited and reactive states, to further enhance exothermic reaction rates of the oxidizer components, as well as the nanometal particles.

Figure 43:
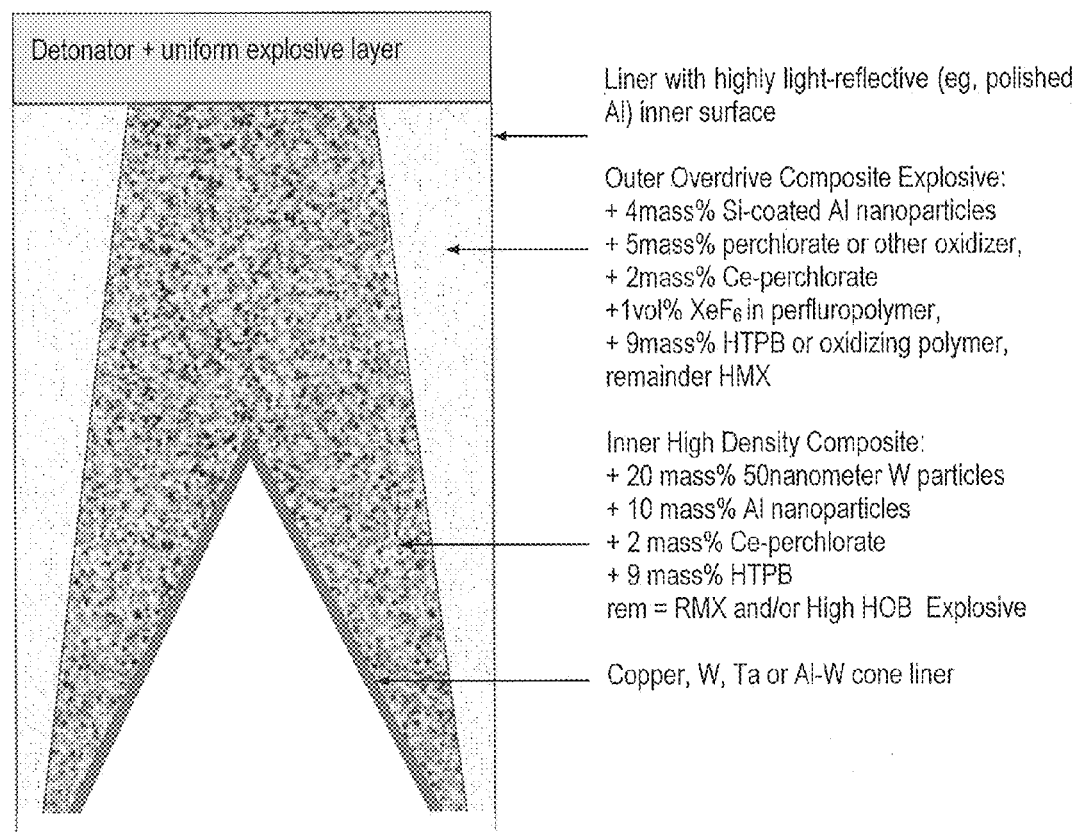
FIG. 43 is a schematic side cross-section view of an overdriven shaped charge device employing high density composite energetics.

Solid Xenon salts can function as both candoluminesents and as an oxidizer for metallic fuel particles such as nanoaluminum particles, which generates reactant gases. For example, $XeF_6$ has a reasonably high density of ~4 g/cm$^3$, and is relatively thermodynamically stable as shown in FIG. 43 A at ambient temperatures[229]. However, when shock-heated and decomposed in a HE detonation zone, it converts to a large volume of dense, intensely luminescent gas (eg, Xe, XeF$^-$, F) as shown in FIG. 43 B[230]. Accordingly, one mole of $XeF_6$ solid "instantaneously" converts to 7 moles of gas upon flash heating to >1500° C. in a HE detonation zone. This expansion ratio of about 2250:1 at standard temperature-pressure (STP) compares favorably to the expansion ratio of high explosives such as RDX upon detonation[231].

The fluorine content of Xenon fluorides such as $XeF_6$ is extremely oxidizing for energetic metal particles such as Al, B, Ta, Ti, Si nanoparticles. Even relatively low-oxidative-energy-content W particles are highly exothermically reactive with $XeF_6$:

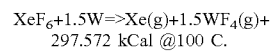

$$XeF_6 + 1.5W => Xe(g) + 1.5WF_4(g) + 297.572 \text{ kCal @100 C.}$$

Fluorine from halothermites such as $XeF_6$ reacts with nanoenergetic metal particles to form gases (eg, AlF, $AlF_2$, $AlF_3$, AlOF, $SiF_3$, $SiF_2$) which can also remove or limit formation of passivating surface oxides such as $Al_2O_3$, $B_2O_3$, or $SiO_2$ from metal fuel particles, and significantly increase the metal particle reaction rate.

Detonation shock pressure increases with specific gravity/density of the explosives converted to gasses. So in addition to their light-generation mechanism, the high ~4$^+$ g/cm$^3$ density of Xenon salts and other dense halothermites increases the detonation power of munitions by their density and gas-conversion. The advance heating and light-activation of highly energetic Al, B, Ta, Ti, Zr, Si nanofuel particles further increases the detonation power of munitions, because they are activated to react in the detonation zone to more quickly generate thermal energy, and form dense gases.

$XeF_6$ forms $XeF_5$ salts[232] such as $[FeF_4]^-[XeF_5]^+$ with fluoride acceptors such as $FeF_3$ which can also be used as candoluminescent halothermite oxidizer components in composite munitions as disclosed herein. $XeF_6$ can be stored/employed in perfluorinated (eg "Teflon-like") microspheres or porous grains in the composite munition mixture. Other halothermites may also be used as oxidizer components in energetic compositions in accordance with the present disclosure. $CeF_4$ (4.7 g/cm$^3$) decomposes at ~600° C., so can serve as a density-enhancing candoluminescent and volatizing oxidizer. Transition metal fluorides and oxyfluorides such as $CuF_2$ (4.23 g/cm$^3$ density, 836° C. mp), $WOF_4$ and $FeF_3$ are moderately dense solids which produce volatile fluoride gases when exothermically reacted with energetic metallic fuels such as aluminum, titanium, silicon, tantalum and/or boron fuel particles at HE explosion temperatures. Fluoride-containing oxidizers may have somewhat lower, but still formidable reaction energy compared to corresponding thermite oxides, but have the advantage of producing gases and removing, preventing or otherwise limiting reaction-slowing oxide-coatings on metallic fuels. Moreover, subsequent reaction in air or with oxygen oxidizer can release residual enthalpy in a munition fill:

| Reaction | ΔH@ 100° C. | ml reactants | kcal/ml |
|---|---|---|---|
| $FeF_3 + Al \Rightarrow Fe + AlF_3(gas)$ | −112.2 | 41.2 | −2.9 |
| $1.5CuF_2 + Al \Rightarrow 1.5Cu + AlF_3(gas)$ | −168.0 | 46.0 | −3.7 |
| $3WOF_4 + 6Al \Rightarrow 3W + 4AlF_3(gas) + Al_2O_3$ | −846.2 | 223.2 | −3.8 |
| $XeF6 + 1.5W \Rightarrow Xe(gas) + 1.5WF_4(gas)$ | −297.6 | 83.2 | −3.6 |
| $XeF6 + 1.5Si \Rightarrow Xe(gas) + 1.5SiF_4(gas)$ | −504.1 | 87.0 | −5.8 |
| $XeF6 + 2Al \Rightarrow Xe(gas) + 2AlF_3(gas)$ | −503.3 | 88.9 | −5.7 |
| RDX detonation energy (for comparison) | −267.2 | 122.0 | −2.2 |

Accordingly, certain halothermite candoluminesents can be employed to generate intense light within a detonation zone for "lightspeed" thermal energy transfer pre-heating of the undetonated explosive material zone immediately adjacent thereto, reactant activation, and reactivity enhancement[233].

Further in accordance with the present disclosure, dense explosives with increased detonation pressure, blast and momentum effects are provided. In this regard, munition detonation results are strongly dependent on detonation pressure, itself a function of detonation velocity, energy release and explosive density.

Total energy release, energy release rate, and detonation pressure can be greatly increased by pre-heating/melting/vaporizing surfaces of energetic nanoparticles "at the speed of light" as described herein. Dense halothermites can be employed for formulation of high density energetic compositions. For example, energetics comprising exceptionally dense and volatile tungsten oxide tetrachloride, $WOCl_4$, as a volatizing oxidant for very dense, energetic munitions are an important aspect of various embodiments of the present disclosure.

Oxidation reaction with Aluminum vapor and aluminum liquid need not be limited by the relatively slow diffusion through solid $Al_2O_3$ formed on the surface of liquid/solid Aluminum. Intense UV/VIS (and NIR) via $Ce^{+4}$ and/or Xe light can activate, heat, melt and then even help vaporize Al surfaces significantly faster than thermal conduction. And halothermites can limit and remove aluminum oxide surfaces. Al vapor mixes and oxidizes faster and more completely than solid Al oxidizes through $Al_2O_3$. Intense microsecond-scale UV/VIS/NIR light in the timeframe of a detonation wave and its near-volumes can vaporize aluminum nanoparticle surfaces. Even moderately intense nanosecond-scale laser pulses can vaporize aluminum[234]. Intense UV/VIS/NIR light can photoionize/photoactivate and initiate plasmonic activity at Al and oxidizing atom surfaces in a detonation, for faster, high-enthalpy reaction toward thermodynamic equilibrium. Activated/ionized atoms are much more reactive than ground-state atoms. Al oxidation raises the detonation wave and near-zone temperatures, which generates more UV/VIS/NIR, which increases Al melt/vaporization, which self-reinforces to a runaway reaction. The explosive-Al nanoparticle mixture can contain a volatizable fluorothermite oxidant such as PTFE, $FeF_3$, $FeI_2$, $CuF_2$ to prevent and remove $Al_2O_3$ surface oxide. Aluminum reaction with Fluorine, chlorine, bromine or iodine produces gases such as $AlF(g)$, $AlF_2(g)$, $AlF_3(g)$ and $AlOF(g)$ which enhance explosive power and remove/disrupt $Al_2O_3$ formed on an Al surface. Furthermore, oxidation of Al containing some B or C (etc.) produces HBO, CO (etc.) gas which can also disrupt an $Al_2O_3$ cover layer, and generate fresh Aluminum reaction surface. These approaches also apply to other oxide-forming metal surfaces, such as those which can form on Ti, Zr, Ta, B, Si. Accordingly there are a variety of approaches described herein for dramatically increasing the reaction rate of aluminum and other metallic particles.

As indicated, a "halothermite" of a lower enthalpy metal chloride, bromide or iodide such as $CuCl_2$, $FeCl_3$, $CuBr_2$, etc. can also be used in an HE/nanofuel composite in accordance with the present disclosure. Ammonium, guanidine, Fe(II and III), Cu(I and II), Ce(III and IV preferred), Bi, Ca, Mg, Ba, Sr, and Sn Perfluorates, Periodates, Perchlorates, Perbromates, Fluorates, Iodates, Bromates, and Chlorates are examples of oxidizers for use with energetic metals. Chloride-based halothermites are typically of lower cost than other halide compounds, and their $AlCl_3$, $AlClO$ and aluminum subhalide reaction products with aluminum are gases. Halothermites useful herein also include iodates, periodates, iodohalo-oxythermites such as tungsten and molybdenum oxyhalides which contribute high density to a kinetic munition.

| Halothermitic Oxidizer | Density g/cm³ | mp ° C. | bp ° C. | Formation ΔH kcal/mol |
|---|---|---|---|---|
| $WOCl_4$ | 11.92 | 211 | 227 | −160.4 |
| $WOF_4$ | 5.07 | 106 | 187 | −333.26 |
| $WOBr_4$ | 5.5 | 267 | 387 | −140.6 |
| $WCl_6$ | 3.52 | 275 | 347° C. | −141.9 |
| $ReCl_6$ | — | — | — | — |
| $WBr_6$ | — | 309 | 327 (sublimes) | −82.0 |
| $XeF_6$ | — | — | — | −80.8 |
| $CuF_2$ | 4.23 | 836 | 1676 | −128.8 |
| $FeF_3$ | 3.87 | >1000 C. | — | −249 |
| $WO_2Cl_2$ | 4.67 | 265 | — | −186.5 |
| $MoF_4$ | — | 98 | 186 | −275.1 |
| $MoO_2Cl_2$ | — | 175 | — | — |

While $WOCl_4$ has extremely favorable density, less-dense halothermitic oxidizers such as $WOBr_4$ also can provide significant munition enhancement with production of reaction product gases which can inhibit formation of dense $Al_2O_3$ layers:

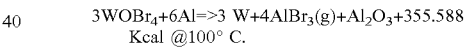

$3WOBr_4 + 6Al \Rightarrow 3 W + 4AlBr_3(g) + Al_2O_3 + 355.588$ Kcal @100° C.

The conversion of energetic Al (Ti, Zr, Ta, B, Si) nanoparticle reactants to dense gas (eg, $AlF_3(g)\uparrow$ $AlOF(g)\uparrow$ or $AlF_2(g)\uparrow$ as distinguished from inorganic solid or liquid oxides such as $B_2O_3$ or $Al_2O_3$) increases reaction rate and detonation pressure. Functionally volatile, relatively dense oxidizers such as $CuF_2$, $FeF_3$, $WOCl_4$ and $WOF_4$ which also generate gas reaction products upon reaction with oxidatively reactive metals and semimetals such as Al, B, Ti, Ta, Zr increase the specific density of the explosive composite containing them and the detonation gas density, which inherently increases the blast pressure.

For example, conventional coaxial shaped charges[235] such as illustrated in FIG. 43 can utilize an outer high detonation velocity explosive 4302 such as HMX, and an inner overdriven core 4304 such as RM with 20-60 mass % micron- or sub-micron sized tungsten or tantalum powders to multiply the CJ pressure. The increased high-energy reaction rate of intense light-assisted reaction of Al nanoparticles as described herein, and halide-induced gas generation, can significantly increase the detonation pressure of such munitions. The overdriven or shaped-charge munition of FIG. 43 is designed to generate detonation velocity higher than conventional CJ velocity, and detonation pressure significantly higher than CJ pressure of conventional designs. The illustrated high density core 4304 has nano-W powder in a high oxygen balance explosive (HOB) or high-velocity RMX with a candoluminescent agent and Al nanopowder. Nanoparticle W powder used in the designed core can be manufactured very cheaply in tonnage quantities by fast-quench plasma arc reduction of $WO_3$ using Hydrogen gas, in a manner similar to that described herein for Al and/or Si nanoparticle manufacture. Nanoparticle W fill components have advantages of faster momentum transfer, faster heat transfer, and faster surface reaction, as compared to W micron-scale or millimeter-scale particles. An alternative core 4304 may comprise Si-coated Al and/or Ta nanoparticles with Ce-perchlorate or $CeF_4$ candoluminescent oxidizer to increase blast temperature, and a $CuF_2$, $WOF_4$ and/or $WOCl_4$ oxidizer to generate dense gas upon reaction with the metallic fuel[236]. Such halothermite oxidizers are dense solids which produce volatile halide gases when exothermically reacted with aluminum (or Si, Ti, B) fuel particles at HE explosion temperatures. Fluoride oxidizers such as $WOF_4$ have high reaction energy with aluminum which is higher than that of RDX, so not only contribute to energy release, but also provide denser gas volume plus dense W reaction-product nanoparticles with high directed momentum.

Such designs and compositions are, in general, useful for improved tungsten-aluminum blast, momentum and impact-driven munitions, such as those schematically illustrated in cross section in FIG. 43.

As illustrated in FIGS. 44A and 44B, $WOCl_4$ and exemplified in the following Table, an energetic metal may be blended, and optionally combined with a high explosive (HE) to form a high-density, highly energetic composite fill in a conventional or kinetic projectile. The high-density energetic blend may be used in kinetic projectiles without an additional HE explosive[237]. To maximize energy output as discussed below, an additional oxidizer and/or high oxygen balance explosive may be used[238]. The energetic metal can be surface-passivated, oxide-free, highly energetic aluminum-core nanoparticle components such as described herein.

Examples of Dense Energetic Munition Fill each having greater chemical reaction energy per cm³ than TNT
Fill Component proportions shown as: Volume % (mass %)

| Components | Example 1 Dense Kinetic Railgun Fill | Example 2 another Dense Railgun Fill | Example 3 Hypersonic Projectile Fill | Example 4 non-HE Projectile Fill | Example 3 + 7% OB BTNA[a] Fill | Example 4 + 3.6% OB BTHC[b] Fill | Example 5 Energetic RDX Fill |
|---|---|---|---|---|---|---|---|
| $WOCl_4$ | 68 (60) | 59 (59) | 28 (61)) | 29 (68) | 12 (45) | 9 (38) | 8 (34) |
| Aluminum | § | § | § | 30 (16) | 13 (11) | 13 (12) | 11 (11) |
| Titanium (or $TiH_2$) | § | § | 28 (23)) | § | § | § | § |
| Tantalum (or $Ta_2H$) | 32 (40) | 28 (41) | § | § | § | § | § |
| High Explosive | * | * | * | * | BTNA 76 (44) | BTHC 71 945) | RDX 73 (49) |
| $NH_4ClO_4$ | * | 12 (2) | 44 (16) | 41 (16) | * | 7 (5) | 8 (6) |
| Other[c] | | | | | | | |
| Density of Composite | 13.45 g/cm³ | 12.01 g/cm³ | 5.45 g/cm³ | 5.04 g/cm³ | 3.19 g/cm³ | 2.86 g/cm³ | 2.70 g/cm³ |

[a]BTNA Explosive ($C_4H_5N_7O_{12}$ has +7% Oxygen Balance) bis(2,2,2-trinitroethyl)amine with density 1.881 g/cm³
[b]BTHC Explosive ($C_6H_6N_8O_{16}$ has +3.6% Oxygen Balance) bis(2,2,2-trinitroethyl)-hydrazodicarboxylate with density 1.8 g/cm³
[c]Other composite components may be added such as binders, catalysts, additional halothermite or other oxidizers, candoluminescents and other materials, typically with decreased density, depending on the density of the additional materials.
* High Explosives and oxidizing agents can be added and combined, with corresponding decrease in composite density. However, dense oxidizers such as W and other highly oxidative heavy metal nitrates, halates, perhalates and the like are useful for maintaining, or increasing density.
§ Energetic metals such as Al, Ti, B, Zr, Hf, Ta can be used as micron- and/or nano-scale powders. Different metals and particle sizes can be blended to achieve density and reaction rate designs. Preferably the metal powders are substantially oxide-free, and are surface-passivated by appropriate chemistry. The $WOCl_4$ and metal components may be pelletized together in composites so they are in close proximity for initial vaporizing reaction. The pelletized particles may be coated with an oxidizer, and blended with HE if desired. Because $WOCl_4$ is red-colored, VIS candoluminesents in the energetic mixture can be utilized to pre-heat/vaporize the $WOCl_4$ to speed reaction.

$WOCl_4$ is readily vaporized and reacts vigorously with aluminum (preferably each as gases) to form aluminum chloride and oxychloride gases, dense tungsten nanoparticles, and smaller amounts of aluminum oxide nanoparticles. The reaction is quite exothermic, eg:

$$3WOCl_4 + 6Al \Rightarrow 3W + 4AlCl_3(g) + Al_2O_3 + 480.686 \text{ Kcal (molar)}$$
~60 ml volume, ~86 ml volume, ~90,000 ml volume at stp When blended with energetic Aluminum or other energetic metal particles[239], $WOCl_4$ provides a dense composite explosive:

Solid $WOCl_4$ has a very high ambient temperature density of 11.92 g/cm³

The density of $3WOCl_4$+6 Aluminum (molar) mixture is also high, >8 g/cm³

$3WOCl_4$+6Al has more volumetric energy (3.29 kCal/cm³) than RDX (2.44 kCal/cm³)

$WOCl_4$ reacts with aluminum to form a large gas volume, not just $Al_2O_3$ surface layers $WOCl_4$ has a convenient 211° C. melting point (TNT mp=80.8° C.)

$WOCl_4$ has a low 227° C. vaporization point, for fast reactivity via mixing $WOCl_4$+Al reactant gases and nano-tungsten reaction products have high density, for extreme near-zone detonation pressure Reactant mixtures with higher Aluminum ratios[240] to form $AlCl_2(g)$ and $AlCl(g)$, which are more stable at explosion temperatures, can be surrounded by oxidizers such as dense tungsten or other heavy metal nitrates, chlorates, perbromates, periodates and/or perchlorates to complete large aluminum oxidation energy release, while contributing to both fill energy release, and reaction product density to enhance detonation pressure. Other oxidizers such as nitrates, chlorates and perchlorates, and/or high oxygen balance (HOB) explosives can be used in the composite energetic fill composition to maximize Aluminum energy release in the vapor state. Aluminum subchloride gases such as $AlCl_2(g)$ and $AlCl(g)$ are more stable at HE detonation temperatures than $AlCl_3(gas)$ and produce significantly greater gas volume. Aluminum subhalides can react with oxidizers (eg, HOB HE explosive and/or added oxidizer in the explosive composition) or atmospheric oxygen or water. This adds significantly more energy to the explosion, eg:

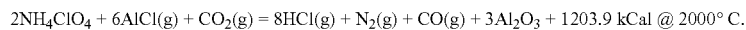

~117.5 grams per mole of ammonium perchlorate adds extra 5.12 kCal per gram of ammonium perchlorate

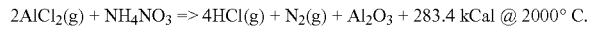

~80 grams per mole of ammonium nitrate adds extra 3.54 kCal per gram of ammonium nitrate

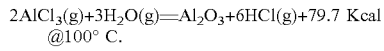

Upon complete high-temperature reaction with energetic aluminum, the $WOCl_4$ gas is reduced in the vapor state to tungsten micro- and/or nano-particles. The tungsten micro-nano-powder from the vapor-phase reaction is in optimized form (very hot, with extreme surface area and momentum of the reactants from which it is formed) for momentum functionality, and for subsequent oxidation (eg, in the atmosphere) for additional energy release:

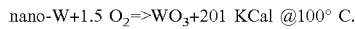

The high density of $WOCl_4$-containing composite energetic fills and other high density fills described herein can be exploited for focused detonation pressure effects by shaped charges in munitions. The reactants are very dense, the reaction products are very dense, and the $WOCl_4$ vapor-phase-enhanced reaction is very fast. Detonation pressures significantly greater than 45-50 GPa may be produced. Aluminum is inexpensive and very energetic, but other energetic metals, particularly denser energetic metals such as Ti, Zr, Ta can also be used to advantage in formulating dense energetic fills.

If there are energetic fuel nanoparticles within the zone(s) or particles of tungsten halothermite oxidizer concentration, additional impedance-mismatched boundaries are located at the fuel-oxidizer interface if the fuel particles and tungsten oxidizer have different densities. For example, Aluminum particles (2.7 g/cm³) within a $WOCl_4$ (11.92 g/cm³)-based matrix, and Tantalum particles (16.69 g/cm³) within a $WCl_6$ (3.52 g/cm³), $WOF_4$ (5.07 g/cm³), $WOCl_4$, and/or $CuF_2$ (4.23 g/cm³)-based matrix produce composites 3214, 3224 with large impedance mismatch for enhancing conversion of shockwave energy to electromagnetic energy and momentum transfer.

As illustrated in FIGS. 31 and 32, dense particles or concentrations of tungsten halo-oxidizer within a less dense high explosive can provide dense and differentially energetic zones such as 3214, 3224 in a non-uniform impedance volume which produces intense reflection(s) at the abrupt differential density interface(s), as well as intense turbulence and mixing upon passage of an impact shock wave and/or detonation shock wave. If not already vaporized by candoluminescent heating in advance of an explosion front, detonation shockwave heating can vaporize the tungsten halothermite oxidizer component substantially simultaneously with the shock wave passage, producing intense mixing of the halothermite oxidizer component with explosive reaction product gases. By providing layers or other striations of widely varying density, munitions and other energetic devices are provided which produce a frequency-modulated shockwave. In this regard, such energetic devices should preferably have at least 4, and more preferably at least 8 layers of detonating high explosive compositions having alternatingly different densities such that the difference of density between alternating layers is at least about 1 g/cm³, and more preferably at least about 2 g/cm³. The different layers should have a thickness of at least 1 centimeter in the direction of detonation shockwave travel. Upon detonation, a frequency modulated shockwave is produced having a length of at least 2, and more preferably at least 4 wavelengths. For high explosive layers having a thickness in the direction of the detonation shockwave of about 1.8 centimeters, and a detonation velocity in the range of for example from about 4.5 to about 9 kilometers/second, the frequency of the modulated shockwave will be in the range of from about 125 KHz to about 250 KHz. For example, a munition like that of FIG. 32B may comprise a layered striation or "stack" of explosive layers 3214, 3216 of different specific gravity, adapted to produce a frequency modulated shock wave. In such an embodiment 3210, the layers 3216 may be a conventional explosive such as RMX or HMX having a thickness in the range of from about 1 to about 5 centimeters, a specific gravity of about 1.9 g/cm³ and a detonation velocity of about 9 kilometers/second. The layers 3214 alternating with the layers 3216 may be high explosive compositions having a specific gravity of at least about 3 g/cm³ such as described herein, a thickness in the range of from about 1 to about 5 centimeters, and a detonation velocity of at least about 5 kilometers per second. Such higher density explosive layers 3214 may be intimate homogenous blends of high explosive such as HMX or RMX together with dense oxidant materials such as $CeF_4$ and $WOCl_4$. The denser layers may include fuel nanoparticles such as composite Al nanoparticles (or denser Ti, Zr, Ta nanoparticles) preferably having a largest dimension (eg diameter for spherical particles) of less than 100 nm. Upon detonation of the munition 3210 via detonator 3212, the detonation shockwave (travelling from left-to-right in FIG. 32B) produced by the alternating density layers 3214, 3216 is a frequency-modulated high intensity shockwave.

The $Al_2O_3$ reaction rate diffusion-limitation problem in explosive composites can also be overcome as described herein by electric-pulse and/or intense light heating/vaporization of Aluminum, and/or use of halothermitic oxidizer components which limit surface metal oxide formation.

These technologies can be used synergistically together. When combined with high density gas-generating energetics comprising halothermitic oxidizers, munitions and commercial explosives of extremely high detonation pressure, eg well over 45-50 GPa are provided. As indicated, light metals such as lithium, magnesium and aluminum are readily vaporized.

By coating light metal (eg, aluminum) wire or foil with a halothermite oxidizer (eg, $WOCl_4$, $CuF_3$, $XeF_6$, $CeF_4$ etc. in a binder such as a fluorinated polymer), or encapsulating the halothermite oxidizer in an aluminum tube, the aluminum and oxidizer can be vaporized together by electric pulse for rapid and thorough exothermic reaction to form vaporized reaction products. A variety of explosive pulse generators and stored electrical energy systems can be used. The energetic metal and halothermite oxidizer can be vaporized by electric pulse timed contemporaneously with an HE detonation wave as discussed with respect to the embodiments of FIGS. 19A, 19B, 20, 21. When the Al or other energetic metal tapes/wires/tubes are electrically "exploded" as the detonation front nears, the metal vapor can react extremely rapidly with the halothermite oxidizer vapor and the detonation wave gases. Aluminum vapor and the aluminum halide reaction gases are not slowed by hard aluminum oxide barrier layers characteristic of conventional reactions with solid Aluminum particles. The dense vapor reaction products produce a greatly increased detonation pressure.

Preheating and melting/vaporization of Al nanoparticles produce extremely fast-reacting Al vapor, which is not limited by slow-diffusion-through-$Al_2O_3$ reaction rates. $WOCl_4$ is orange/red, so is readily heated to its melt and vaporization temperatures by absorbing significantly in the VIS range when the energetic composition comprises a candoluminescent agent. Aluminum and oxidizer vapor reactants mix rapidly in the turbulent reaction and detonation zones—much more rapidly than diffusion rates through dense $Al_2O_3$ layers in conventional aluminized energetics. Moreover, intense UV/VIS light can photoionize/photoactivate aluminum and oxidizing species in a detonation—for faster, maximum-enthalpy reaction to thermodynamic equilibrium. UV/VIS activated/ionized atoms are more reactive than ground-state atoms. Al oxidation raises the detonation wave and near-zone temperatures, which generates more UV/VIS light, which increases Al melt/vaporization, which self-reinforces to a runaway reaction. The increased high-energy reaction rate of intense light-induced reaction of Al vapor, and halide-induced gas generation, significantly increases the detonation pressure of such munitions.

While various aspects of the present invention have been described with respect to particular embodiments of apparatus, methods, products and devices, it will be appreciated that modifications, applications, adaptations and improvements may be made based on the present disclosure, and are intended to be within the scope of the accompanying claims.

ENDNOTES

Each citation or reference in this specification including the following endnotes is hereby incorporated in its entirety herein by reference.],.[

[1] J. Heitmann et al, "Silicon Nanocrystals: Size Matters", Advanced Materials 17, 795-803 (2005)

[2] Ferrara, M. A., I. Rendina, et al. (2012). "Raman Amplifier Based on Amorphous Silicon Nanoparticles." International Journal of Photo Energy: 254946 (254945 pp.)

[3] Zhang, N., Q. Deng, et al. (2011). "Deformation mechanisms in silicon nanoparticles." Journal of Applied Physics 109(6).

[4] Lopez-Suarez, A., R. Rangel-Rojo, et al. (2011). Enhancement of the Optical Kerr Effect Exhibited by an Integrated Configuration of Silicon Quantum dots and Silver Nanoparticles. XVII Reunion Iberoamericana de Optica & X Encuentro de Optica, Laseres y Aplicaciones, 20-24 Sep. 2010, UK, IOP Publishing Ltd.

[5] Zdetsis, A. D. (2011). "Functionalizable magnetic/luminous silicon/bismuth core/shell nanocrystalline particles." *Chemical Physics Letters* 508(4-6): 252-257

[6] Yo-Han, K., J. Sung Mok, et al. (2011). "Memory Charging Effect in Silicon Nanoparticles of Pentacene Capacitor Device." *Electrochemical and Solid-State Letters* 14(4): 149-151; Kim, Y.-H., S. M. Jung, et al. (2011). "Memory charging effect in silicon nanoparticles of pentacene capacitor device." *Electrochemical and Solid-State Letters* 14(4): H149-H151; Black, C. T. U. S. and K. W. Guarini (2011). Nonvolative Memory Device Using Semiconductor Nanocrystals And Method Of Forming Same, International Business Machines. USPA 13095577.

[7] Poplayskyy, D., G. Scardera, et al. (2010). *Silicon ink selective emitter process: Optimization of selectively diffused regions for short wavelength response.* 2010 35th IEEE Photovoltaic Specialists Conference (PVSC), 20-25 Jun. 2010, Piscataway, N.J., USA, IEEE; Meisel, A., M. Burrows, et al. (2010). *Impact of metal contact misalignment in silicon ink selective emitter solar cells.* 2010 35th IEEE Photovoltaic Specialists Conference (PVSC), 20-25 Jun. 2010, Piscataway, N.J., USA, IEEE; Antoniadis, H., F. Jiang, et al. (2010). *All screen printed mass produced silicon Ink selective emitter solar cells.* 35th IEEE Photovoltaic Specialists Conference, PVSC 2010, Jun. 20, 2010-Jun. 25, 2010, Honolulu, Hi., United states, Institute of Electrical and Electronics Engineers Inc.

[8] Xia, Z., Y. Wu, et al. (2011). *Optimized light trapping in thin film silicon solar cells by metal nanoparticle.* 7th International Conference on Thin Film Physics and Applications, Sep. 24, 2010-Sep. 27, 2010, Shanghai, China, SPIE; Zhao, H., B. Ozturk, et al. (2010). *Plasmonic light-trapping and quantum efficiency measurements on nanocrystalline silicon solar cells and silicon-on-insulator devices.* 2010 MRS Spring Meeting, Apr. 5, 2010-Apr. 9, 2010, San Francisco, Calif., United states, Materials Research Society; Rier, C., G. Schierning, et al. (2010). *Photovoltaic devices from silicon nanoparticles.* 2010 MRS Spring Meeting, Apr. 5, 2010-Apr. 9, 2010, San Francisco, Calif., United states, Materials Research Society.

[9] Szczech, J. R. and S. Jin (2011). "Nanostructured silicon for high capacity lithium battery anodes." *Energy and Environmental Science* 4(1): 56-72.

[10] Petermann, N., N. Stein, et al. (2011). "Plasma synthesis of nanostructures for improved thermoelectric properties." *Journal of Physics D: Applied Physics* 44(17)

[11] Morales-Snchez, A., K. Monfil-Leyva, et al. (2011). "Strong blue and red luminescence in silicon nanoparticles based light emitting capacitors." *Applied Physics Letters* 99(17)

[12] Kang, Z., Y. Liu, et al. (2011). "Small-sizedsilicon nanoparticles: New nanolights and nanocatalysts." *Nanoscale* 3(3): 777-791

[13] Vons, V. A., L. C. P. M. De Smet, et al. (2011). "Silicon nanoparticles produced by spark discharge." *Journal of Nanoparticle Research* 13(10): 4867-4879; Vladimirov, A., S. Korovin, et al. (2011). "Synthesis of luminescent Si Nanoparticles using the laser-induced pyrolysis." *Laser Physics* 21(4): 830-835; Verdoni, L. P., M. J. Fink, et al. (2011). "A fractionation process of mechanochemically synthesized blue-green luminescent alkyl-passivated silicon nanoparticles." *Chemical Engineering Journal* 172 (1): 591-600; Spencer, G., B. Anyamesem-Mensah, et al. (2011). "Silicon nanoparticle synthesis by short-period thermal anneals at atmospheric pressure in argon." *Journal of Vacuum Science and Technology A: Vacuum, Surfaces and Films* 29(5); Scriba, M. R., D. T. Britton, et al. (2011). *Electrically active, doped monocrystalline silicon nanoparticles produced by hot wire thermal catalytic pyrolysis*, P.O. Box 211, Amsterdam, 1000 AE, Netherlands, Elsevier; Petermann, N., N. Stein, et al. (2011). "Plasma synthesis of nanostructures for improved thermoelectric properties." *Journal of Physics D: Applied Physics* 44(17): 174034 (174039 pp.); Perminov, P. A., I. O. Dzhun, et al. (2011). "Creation of silicon nanocrystals using the laser ablation in liquid." *Laser Physics* 21(4): 801-804; Kuz'min, G. P., N. N. Kononov, et al. (2011). "The formation of nanoparticles in laser-induced SiH4 gas reactions." 68(1-2): 504-506; Kortshagen, U., E. J. U. S. Thimsen, et al. (2011). Process and apparatus for forming nanoparticles using radiofrequency plasmas. M. Regents of the University of U.S. Ser. No. 12/263,616; Kormer, R., M. Otto, et al. (2011). "EPR investigations of non-oxidized silicon nanoparticles from thermal pyrolysis of silane." *Physica Status Solidi—Rapid Research Letters* 5(7): 244-246; Kelm, E., S. Korovin, et al. (2011). "Luminescent silicon nanoparticles with magnetic properties—production and investigation." *Applied Physics B: Lasers and Optics* 105(3): 599-606; Hilleringmann, U., K. Wolff, et al. (2011). *Semiconductor nanoparticles for electronic device integration on foils*. AFRICON 2011, 13-15 Sep. 2011, Piscataway, N.J., USA, IEEE; Hilleringmann, U., K. Wolff, et al. (2011). *Semiconductor nanoparticles for electronic device integration on foils*. IEEE Africon'11, Sep. 13, 2011-Sep. 15, 2011, Victoria Falls, Livingstone, Zambia, Institute of Electrical and Electronics Engineers Inc; Gordiets, B. F., M. J. Inestrosa-Izurieta, et al. (2011). *Nanoparticles in SiH4-Ar plasma: Modelling and comparison with experimental data*, 2 Huntington Quadrangle, Suite N101, Melville, N.Y. 11747-4502, United States, American Institute of Physics; Dvorsky, R., J. Lunacek, et al. (2011). "Dynamics analysis of cavitation disintegration of microparticles during nanopowder preparation in a new Water Jet Mill (WJM) device." *Advanced Powder Technology* 22(5): 639-643; Donato, M. G., M. A. Monaca, et al. (2011). "Optical trapping of porous silicon nanoparticles." *Nanotechnology* 22(50); Zhu, S., L. Wang, et al. (2010). "Synthesis and Photoluminescence of Silicon Nanoparticles Fabricated by Pulse Laser Ablation." *Chinese Journal of Lasers* 37(3): 882-886; Wang, Y., Q. Luo, et al. (2010). "Influence of additional gas flow on size distribution of Si nanoparticles deposited by pulsed laser ablation." *Qiangjiguang Yu Lizishu/High Power Laser and Particle Beams* 22(9): 2199-2202; Umezu, I., Y. Nakayama, et al. (2010), "Formation of core-shell structured silicon nanoparticles during pulsed laser ablation." *Journal of Applied Physics* 107(9); Seunghyun, J., K. Jihoon, et al. (2010). "New Synthetic Route Of Alkyl-terminated Silicon Nanoparticles And Their Optical Characteristics." *Journal of Nanoscience and Nanotechnology* 10(5): 3557-3561; Sato, S., K. Kimura, et al. (2010), Silicon Particle, Silicon Particle Superlattice And Method For Producing The Same. U.S. Ser. No. 12/823,314; Perminov, P. A., I. O. Dzhun, et al. (2010). "Silicon nanoparticles formation by means of laser ablation in liquid media." *Bulletin of the Russian Academy of Sciences. Physics* 74(1): 93-95; Kravitz, K., A. Kamyshny, et al. (2010). "Solid state synthesis of water-dispersible silicon nanoparticles from silica nanoparticles." *Journal of Solid State Chemistry* 183(6): 1442-1447; Kormer, R., H. J. Schmid, et al. (2010). "Aerosol synthesis of silicon nanoparticles with narrow size distribution-Part 2: Theoretical analysis of the formation mechanism." *Journal of Aerosol Science* 41(11): 1008-1019; Kormer, R., M. P. M. Jank, et al. (2010). "Aerosol synthesis of silicon nanoparticles with narrow size distribution-Part 1: Experimental investigations", *Journal of Aerosol Science* 41(11): 998-1007; Grimm, H., N. Petermann, et al. (2010). *Synthesis of highly doped silicon and germanium nanoparticles in a low-pressure plasma-reactor for thermoelectric and solar applications*. Nanotechnology 2010: Advanced Materials, CNTs, Particles, Films and Composites—2010 NSTI Nanotechnology Conference and Expo, NSTI-Nanotech 2010, Jun. 21, 2010-Jun. 24, 2010, Anaheim, Calif., United states, Nano Science and Technology Institute; Bo Yun, J., L. Jeong Chul, et al. (2010). "Microstructures of Silicon Nanoparticles Synthesized Using Double Tube Reactor with Inductively Coupled Plasma." *Journal of the Korean Physical Society* 57(4): 1029-1032; P. A. Storozhenko et al, "Nanodispersed Powders: Synthesis Methods and Practical Applications", Nanotechnologies in Russia, 2009, Vol. 4, Nos. 5-6, pp. 262-274; See also commercial sharp-edged fluid milling processes http://www.vestaceramics.net/sicomill html

[14] Elena Abadjieva et al, "Fluorocarbon Coatings Deposited on Micron-Sized Particles by Atmospheric PECVD", Plasma Process. Polym. 2012, 9, 217-224

[15] E. M. Popenko, et al, "Effect of the Addition of Ultrafine Aluminum Powders on the Rheological Properties and Burning Rate of Energetic Condensed Systems", Combustion, Explosion, and Shock Waves, Vol. 43, No. 1, pp. 46-50 (2007) A. P. Il'in et al, "Properties of Ultrafine Aluminum Powder Stabilized by Aluminum Diboride", Combustion, Explosion, and Shock Waves, Vol. 38, No. 1, pp. 123-126 (2002)

[16] Allen, M. J., V. C. Tung, et al. (2010). "Honeycomb carbon: A review of graphene." Chemical Reviews 110 (1): 132-145.

[17] Compton, O. C., D. A. Dikin, et al. (2010). "Electrically conductive "alkylated" graphene paper via chemical reduction of amine-functionalized graphene oxide paper." Advanced Materials 22(8): 892-896.
Stankovich, S., D. A. Dikin, et al. (2006). "Graphene-based composite materials." Nature 442(7100): 282-286. (Graphene thermal conductivity ~3,000 W/m° K, stiffness 1,060 GPa, fracture strength ~carbon nanotubes)

[18] An, X. et al. "Stable Aqueous Dispersions of Noncovalently Functionalized Graphene from Graphite and their Multifunctional High Performance Applications." Nano Letters. (mass-production of graphene)
Ang, P. K., S. Wang, et al. (2009). "High-throughput synthesis of graphene by intercalation-exfoliation of graphite oxide and study of ionic screening in graphene transistor." ACS Nano 3(11): 3587-3594.
Che, J., L. Shen, et al. (2010). "A new approach to fabricate graphene nanosheets in organic medium: Combination of reduction and dispersion." Journal of Materials Chemistry 20(9): 1722-1727.
Chen, W. and L. Yan (2010). "Preparation of graphene by a low-temperature thermal reduction at atmosphere pressure." Nanoscale 2(4): 559-563; Chen, W., L. Yan, et al. (2010). "Preparation of graphene by the rapid and mild thermal reduction of graphene oxide induced by microwaves." Carbon 48(4): 1146-1152.

Geng, Y., S. J. Wang, et al. (2009). "Preparation of graphite nanoplatelets and graphene sheets." Journal of Colloid and Interface Science 336(2): 592-598.

Hamilton, C. E., J. R. Lomeda, et al. (2009). "High-yield organic dispersions of unfunctionalized graphene." Nano Letters 9(10): 3460-3462.

Lv, W., D.-M. Tang, et al. (2009). "Low-temperature exfoliated graphenes: Vacuum-promoted exfoliation and electrochemical energy storage." ACS Nano 3(11): 3730-3736.

Mohanty, N., A. Nagaraja, et al. (2010). "High-throughput, ultrafast synthesis of solutiondispersed graphene via a facile hydride chemistry." Small 6(2): 226-231.

Pu, N.-W., C.-A. Wang, et al. (2009). "Production of few-layer graphene by supercritical CO2 exfoliation of graphite." Materials Letters 63(23): 1987-1989.

Shen, J., Y. Hu, et al. (2009). "Fast and facile preparation of graphene oxide and reduced graphene oxide nanoplatelets." Chemistry of Materials 21(15): 3514-3520.

Soldano, C., A. Mahmood, et al. (2010). "Production, properties and potential of graphene." Carbon 48(8): 2127-2150.

[19] Sabourin, J. L., D. M. Dabbs, et al. (2009). "Functionalized graphene sheet colloids for enhanced fuel/propellant combustion." ACS Nano 3(12): 3945-3954.

[20] Compton, O. C. and S. T. Nguyen (2010). "Graphene oxide, highly reduced graphene oxide, and graphene: Versatile building blocks for carbon-based materials." Small 6(6): 711-723.

Fan, Z., K. Wang, et al. (2010). "An environmentally friendly and efficient route for the reduction of graphene oxide by aluminum powder." Carbon 48(5): 1686-1689.

[21] L. J. Cote, R. Cruz-Silva, J. Huang, J. Am. Chem. Soc. 2009, 131, 11027.

Gilje, S., S. Dubin, et al. (2010). "Photothermal deoxygenation of graphene oxide for patterning and distributed ignition applications." Advanced Materials 22(3): 419-423.

Gilje, S., J. Farrar, et al. (2009). "Photothermal Deoxygenation of Graphene Oxide to Graphitic Carbon for Distributed Ignition and Patterning Applications (Preprint)." AFRL-RZ-ED-JA-2009-152 Proj. 4347, Task 08 report 15p.

[22] Stankovich, S., R. D. Piner, et al. (2006). "Synthesis and exfoliation of isocyanate-treated graphene oxide nanoplatelets." Carbon 44(15): 3342-3347.

[23] Zhang, B., Y. U. Chen, et al. (2010). "Poly(N-vinylcarbazole) chemically modified graphene oxide." Journal of Polymer Science, Part A: Polymer Chemistry 48(12): 2642-2649.

[24] Schniepp, H. C., J.-L. Li, et al. (2006). "Functionalized single graphene sheets derived from splitting graphite oxide." Journal of Physical Chemistry B 110(17): 8535-8539.

[25] Cao, Y., J. Feng, et al. (2010). "Alkyl-functionalized graphene nanosheets with improved lipophilicity." Carbon 48(5): 1683-1685.

[26] Fang, M., K. Wang, et al. (2009). "Covalent polymer functionalization of graphene nanosheets and mechanical properties of composites." Journal of Materials Chemistry 19(38): 7098-7105.

Fang, M., K. Wang, et al. (2010). "Single-layer graphene nanosheets with controlled grafting of polymer chains." Journal of Materials Chemistry 20(10): 1982-1992.

[27] By "substantially fully vaporized" is meant that at least 90 wt %, preferably at least 95 wt % and more preferably at least 98 wt % of the solid silicon (and/or other) feedstock is vaporized. This does not include solid nanoparticle core materials introduced into a vaporized stream which is undergoing cooling and condensation to coat the solid nanoparticle core materials. See P. A. Storozhenko et al, "Nanodispersed Powders: Synthesis Methods and Practical Applications", Nanotechnologies in Russia, 2009, Vol. 4, Nos. 5-6, pp. 262-274, for plasma arc equipment and processing for making silicon nanopowder with relatively slow gas stream processing and relatively high unvaporized feedstock flow-through.

[28] The following US Army SBIR Topic A12-005 for proposals due in January 2012, entitled "Low Cost Scalable Technology for Nano Silicon Powder Synthesis", describes military and commercial uses for nanosilicon particles and the critical need for a "cheap, innovative process to produce nano silicon powder":

OBJECTIVE: Develop a cost effective technology that can produce large quantities of high purity, nano-scale silicon powder. The technology should have control over the desired particle size and morphology of the powder.

DESCRIPTION: The U.S. Army has a need for cheap, high quality nano silicon powder. It has been shown that by using nano-scale fuels and oxidizers, more complete reactions can be achieved. This is primarily a result of the increased surface area achieved at the nano-scale. For this reason, traditional metallic fuels such as aluminum are being examined on the nano-scale, with impressive results. Silicon has a similar energy density to aluminum and is a natural extension of nano aluminum research. By using nano silicon as a fuel, similar performance to nano aluminum mixtures can be achieved but with different burn characteristics due to silicon's higher initiation temperature. But more importantly, silicon is not prone to some of the major problems that detract from the potential uses of nano aluminum. Nano silicon is not susceptible to the rapid aging effects observed in nano aluminum, so mixtures using nano silicon will have a much better shelf-life. In addition to the better stability, nano silicon is also easier to handle than nano aluminum— the passive oxide layer is thinner than aluminum's and subsequently is easier to process. It is also important to note that silicon's higher initiation temperature (as compared to aluminum) makes it less sensitive to accidental initiation. Thus nano silicon has the potential to be a safer, more stable alternative to nano aluminum.

The military and commercial uses for nano silicon are rapidly growing, but the high cost of the powder severely restricts its use to ultra high value applications. With current domestic prices on the order of several thousand dollars per kilogram, the need for a cheap, innovative process to produce nano silicon powder is critical. It should be noted that the demand for nano silicon is currently unknown but for successful incorporation into Army items, the material cost must be drastically reduced.

PHASE I: Develop a semi-continuous process that can produce 98-99% pure silicon powder with a surface area in the range of 32-50 m$^2$/g, an average particle size less than 80 nm, and a volumetric d90=100 nm at a cost of no more than \$200/kg. A surface area of 32 m$^2$/g typically corresponds to an average particle size of 80 nm for spherical Si, however the particle size distribution may be very broad. It is important that the particle size distribution be fairly tight for incorporation into nano silicon based compositions for energetic applications. The process must be amenable to synthesizing the silicon powder free of hard agglomerates, preferably with a spherical morphology. Synthesis rates should be on the order of 1-5 kg/day.

PHASE II: Optimize the process developed in Phase I to produce greater than 99.9% pure silicon powder with a surface area in the range of 32-50 m^2/g, an average particle size less than 80 nm and a volumetric d90=85 nm at a cost of no more than $50/kg. Synthesis rates should be on the order of 50 kg/day.

PHASE III: The material developed under this effort will have a myriad of applications in the military as well as the commercial sector. Such uses include novel energetics/pyrotechnics as well as low cost electronics. Through the use of a nano silicon suspension, cheap/disposable devices can be fabricated through manufacturing technologies such as ink-jet printing. Such technology will bring a new level of capability to military as well as commercial consumers. Thus, the ultimate objective is a continuous process capable of producing electronics grade nano silicon at a cost of approximately $25/kg or less.

REFERENCES

C. W. Won, H. H. Nersisyan, H. I. Won, H. H. Lee, "*Synthesis of nanosized silicon particles by a rapid metathesis reaction,*" *Journal of Solid State Chemistry* 182 (2009) pp. 3201-320

Chien-Chong Chen, Chia-Ling Li, Keng-Yuan Liao, "*A cost-effective process for large-scale production of submicron SiC by combustion synthesis,*" *Materials Chemistry and Physics* 73 (2002) pp. 198-205

Yi-Xiang Chen, Jiang-Tao Li, Ji-Sheng Du, "*Cost effective combustion synthesis of silicon nitride,*" *Materials Research Bulletin* 43 (2008) pp. 1598-1606

Singanahally Aruna, Alexander Mukasyan, "*Combustion synthesis and nanomaterials,*" *Current Opinion in Solid State and Materials Science* 12 (2008) pp. 44-50

Hai-Bo Jin, et al, "*Influence of mechanical activation on combustion synthesis of fine silicon carbide (SiC) powder*" *Powder Technology* 196 (2009) pp. 229-232

Zhanna Yermekova, Zulkhair Mansurov, Alexander Mukasyan, "*Influence of precursor morphology on the microstructure of silicon carbide nanopowder produced by combustion synthesis,*" *Ceramics International* 36 (2010) pp. 2297-2305

[29] Energetic Aluminum nanocomposites are highly susceptible to accidental electrostatic ignition, and can have relatively low reaction initiation temperatures in the 300-400° C. range.

[30] Aluminum nanopowders are difficult and expensive to prepare and may not retain performance even close to the "theoretical" energy output. Aluminum nanopowders form surface oxides, and age poorly by slowly oxidizing/reacting over time. See Jouet, R. J., A. D. Warren, et al. (2005). "Surface passivation of bare aluminum nanoparticles using perfluoroalkyl carboxylic acids." Chemistry of Materials 17: 2987-2996. Nanoscale aluminum can form 20-30 weight % surface oxide content, which significantly degrades performance, reaction rate and energy density.

[31] US DoD has extensively funded development of nanoscale Aluminum with oxidizers to produce nanoscale thermite energetics. But only a fraction of the "theoretical" reactive capacity remains in the nanocomposites, and the energetics are typically not shelf-stable. The surface area of nanoscale-MoO3 can decrease twofold within 10-12 days, and the Al-metal content in nanoscale-Al can decrease as much as 50% over two years. Walter, K. C. et al. (2007). "Manufacturing and performance of nanometric Al/MoO3 energetic materials." *Journal of Propulsion and Power* 23(4): 645-650. See also, eg, "Kinetic analysis of thermite reactions in Al—MoO3 nanocomposites", Journal of Propulsion and Power 23(4): 683-687 (2007); "Arrested reactive milling synthesis and characterization of sodium-nitrate based reactive composites." Propellants, Explosives, Pyrotechnics 32(1): 32-41 (2007); "Control of structural refinement and composition in Al—MoO3 nanocomposites prepared by arrested reactive milling" Propellants, Explosives, Pyrotechnics 31(5): 382-389 (2006); "Exothermic reactions in Al—CuO nanocomposites." Thermochimica Acta 451(1-2): 34-43. See also U.S. Pat. No. 6,652,682 (Navy boron propellant) and U.S. Pat. No. 6,613,168.

[32] Calculations from Outokumpu HSC Thermochemistry software, normalized to fuel gram weight (first rows) and cubic centimeter volume (second row), upon oxidation at 100° C. ($Si+O_2 = SiO_2 =>$ 217.741 KCal/28.086 grams; $2Al+1.5O_2 = Al_2O_3 =>$ 400.547 KCal/53.96 grams; $2B+1.5O2 = B_2O_3 =>$ 304.032 KCal/21.62 grams, etc.)

[33] Elemental silicon of 95+% purity ("silicon metal") represents about 20% of the world total elemental silicon production. Impurities can include alkaline earth and transition metals such as Fe, Al, and B, P, O. Metallurgical grade silicon, typically of at least 98.5% purity as an item of commerce, is prepared by carboreduction of high purity silica in an electric arc furnace. Metallurgical grade (>98.5%) silicon has varied in price over a range of from about $0.80, to about $1.80 in the US over the past 5 years, currently priced at about $1.30/pound in the US (current price of about $1.10/lb in China). http://www.metal-prices.com/silicon; http://www.metalprices.com/pubcharts/Public/Silicon_Price_Charts.asp Solar-grade silicon of higher purity can be produced from metallurgical grade silicon by E-beam vacuum melting of silicon to volatilize impurities, followed by plasma torch heating to selectively oxidize boron, together with zone recrystallization. Even higher-purity silicon may be produced by the high-temperature Siemens trichlorosilane decomposition process, the fluidized bed silane thermal decomposition process, the lower temperature bromosilicon (Schumacher) thermal decomposition process and silicon iodide thermal decomposition processes. See, eg, http://www.peaksunsilicon.com/schumacher-process/, U.S. Pat. No. 8,029,756 issued Oct. 4, 2011 to Peak Sun Silicon Corporation.

[34] K. Sullivan, et al, "Enhanced reactivity of nano-B/Al/CuO MIC's", Combustion and Flame 156 (2009) 302-309

[35] A. Dębski et al, "Enthalpy of formation of intetmetallic compounds from the Li—Si system", Intermetallics, Volume 26, July 2012, Pages 157-161; See also Structure and Properties of Li—Si Alloys: A First-Principles Study", Hyunwoo Kim et al, Journal of Physical Chemistry C, 2011, 115 (5), pp 2514-2521

[36] S. D. Beattie, et al, ?Si Electrodes for Li-Ion Batteries—A New Way to Look at an Old Problem?, Journal of The Electrochemical Society, 155, 2, A158-A163 (2008)

[37] S. D. Beattie, et al, "Si Electrodes for Li-Ion Batteries—A New Way to Look at an Old Problem", Journal of The Electrochemical Society, 155_A158-A163 (2008)

[38] http://www.icis.com/chemicals/channel-info-chemicals-a-z/

[39] These values are preferably calculated by excluding nanoparticles of less than 1 nanometer, and greater than 250 nanometers in largest dimension.

[40] It is noted that less than ~40 nm radius (80 nm diameter) silicon nanoparticles are specified by the US Army for energetic applications. Much smaller nanoparticles, such as less than 5 or 10 nm diameter silicon nanoparticles are significantly superior for many energetics, propulsion and explosives uses, if they are available at appropriate cost and stability.

[41] N. Venkatramani, "Industrial plasma torches and applications", Current Science, VOL. 83, 254-262 (2002)

[42] http://www.metalprices.com/pubcharts/Public/Silicon_Price_Charts.asp?WeightSelect=LB&SizeSelect=M&ccs=1011&cid=0

[43] see Alan Donaldson et al, "Rapid Plasma Quenching for the Production of Ultrafine Metal and Ceramic Powders", JOM (Journal of Materials of the TMS—Minerals, Metals and Materials society) April 2005, pp 58-64.

(current cost of raw materials at approximately $1.30 per pound of metallurgical silicon, $<1.00 per pound for high-carbon coal or graphite, and about $0.50 per pound for boric oxide. The primary byproduct gases for S—B nanoparticle production from metallurgical silicon and B2O3 are heated H2 and CO, which have economic value as raw materials for Fischer-Tropsch syntheses carried out at elevated temperatures in the range of 150° C. to 350° C. Energy use for efficient large scale plasma reactors would be less than 5-10 kwh/pound). Similar energy utilization and low-cost materials for production of purified nanoparticle silicon from less pure feedstock in a hydrogen and/or argon plasma gas with small amounts of "gettering" siCl4 and SiF4 result in very low production costs. [44] N. Venkatramani, "Industrial plasma torches and applications", Current Science, Vol. 83, No. 3, pp. 254-262 (2002)

[45] It is noted that "flattened" silicon nanoparticles may be produced by impinging at least partially molten silicon condensed nanoparticles on a smooth, relatively cold surface. In this regard, the gas/plasma containing vaporized silicon may be cooled to a temperature slightly above the melting point of silicon nanoparticles (eg, 1450-1500° C.) by expansion, to form a stream of liquid silicon nanoparticles in the process gas. The stream of nanoparticles may be directed against a rotating, polished (to prevent mechanical attachment) drum of copper or other suitable heat conductive material which is cooled to a temperature well below the melting point of silicon (for example in the range of from about 0° C. to about 100° C.) The silicon nanoparticles "splat" on the polished rotating, cooled drum (which is rotated rapidly enough to prevent undesirable overlap of particle impingement), where they flatten and solidify. They may be "scraped" off or otherwise removed and recovered in a suitable manner.

[46] Thermal spray powders are typically introduced into the throat of the output nozzle, to melt the particles while minimizing vaporization. Nevertheless, particles less than about 5 microns in diameter are generally fully vaporized. Accordingly Plasma Spray powders introduced by powder feeders in electric arc plasma spray guns are usually 30-50 microns in diameter to provide sufficient mass to control vaporization.

However, as discussed, full Silicon vaporization is important, so micron-scale silicon particles may be introduced farther back in the gun, and a longer throat region in the plasma gun may be employed for full for vaporization. A reactant (SiCl4) also enhances full volatilization of silicon within the plasma. We expect particle sizes of 5-10 microns (and larger depending on gun design) to fully vaporize without any SiCl4 reactant. With Si particles up to 30 microns (and larger depending on design) should be vaporized.

[47] Alan Donaldson et al, "Plasma Quench Production of Titanium Powder," EPD Congress 2001, ed. P. R. Taylor (Warrendale, Pa.: TMS, 2001), pp. 67-77; Maurice G. Fey et al, "Metal Powder Production by Direct Reduction in an Arc Heater," U.S. Pat. No. 3,992,193 (1976); John S. McFeaters, "Method of Making Carbide, Nitride, and Boride Powders" U.S. Pat. No. 4,851,262 (1989); Detering et al U.S. Pat. No. 5,749,937 "Fast quench reactor and method" (1998) and U.S. Pat. No. 5,935,293 "Fast quench reactor method" (1999)

[48] Anon, "Rocket motor uses common household product for fuel", Volume 1, Issue 3, Page 6, Stennis Space Center, www.ssc.nasa.gov, Fall, 2004;

K. Kelley, US Patent application 20120124897, "Propellant Compositions and Methods of Making and Using the Same", published May 24, 2012;

M. A. Arabeyoglu et al, US Patent application 20030098107, "High Regression Rate Hybrid Rocket Propellants And Method Of Selecting", Published May 29, 2003

[49] For silicon purification rather than nanoparticle production, the substantially vaporized silicon may be condensed on a cooled surface as a melt or solid, and conducted into an ingot mold like that of FIG. 6.

[50] eg, see oxide-coated Al processing—Mark Hull, "Tetronics: plasma processing holds key to consistent nanopowders", Powder Metallurgy 2002 Vol. 45 No. 1, pp 8-10

R Groza, "Sintering of Nanocrystalline Powders", International Journal of Powder Metallurgy, 35 (7), pp. 59-66 (1999)

K. T. Higa et al., U.S. Pat. No. 5,885,321 Mar. 23, 1999 issued Mar. 23, 1999 for "Preparation of fine aluminium powders by solution methods"

F. Tepper, "Nanosize Powders Produced by Electro-explosion of Wire and their Potential Applications", Powder Metallurgy 43(4), 320-322 (2000)

[51] M. Notin et al, "Gibbs Energy And Entropy Of Formation Of Intermetallic Al—Ca Compounds-Solid Electrolyte Galvanic Cell Studies", Journal Of The Less Common Metals, 85(2): 205-212 (1982)

[52] L. M Yeddanapalli et al, "Thermal and Photochemical Decomposition of Gaseous Aluminum Trimethyl", J. Chem. Phys. 14, 1-7 (1946

K. Itatani et al. (1995). "Some properties of aluminum carbide powder prepared by the pyrolysis of alkylaluminum." Journal of the American Ceramic Society 78(3): 801-804. (Ultrafine 40 nm aluminum carbide (Al4C3) powder by 950-1100 C pyrolysis of triethyl aluminum.

Cabrera, A. L. et al. (1991). "Oxidation protection of mild steel by coatings made with aluminum alkyls." Oxidation of Metals 36(3-4): 265-280.

H. O. Pierson, "Aluminum Coatings By The Decomposition Of Alkyls" Thin Solid Films, 45(2), 257-263 (1977).

Wartik, T. and W. Smith (1963). Preparation and Properties of Unsolvated Aluminum Hydride. Thermal Decomposition of Gaseous Triethylaluminum. NTIS accession number AD-403 978/0 Technical report Contract Number NONR65622, United States: 201p.

[53] G. Hsu et al, "Fines in Fluidized Bed Silane Pyrolysis", J. Electrochem. Soc.: Solid-State Science And Technology Vol. 131, No. 3 pp. 660-663 (1984) and references there cited.

[54] Mg/Mg2Si and Mg2Si/Si can form eutectics at ~637° C. and ~946° C. which can facilitate reaction.

[55] See, for example, P. S. Shah et al, "Nanocrystal and Nanowire Synthesis and Dispersibility in Supercritical Fluids", Phys. Chem. B 2004, 108, 9574 and J. D. Holmes et al, "Highly Luminescent Silicon Nanocrystals with Discrete Optical Transitions", Journal of the American Chemical Society 123, 3743 (2001). In silicon shell deposition in accordance with the present disclosure, nanoparticle cores (eg, aluminum) are preferably provided in the reaction medium before initiation of silicon deposition reaction, to adsorb and form silicon-precipitation nucleation sites for silicon shell deposition, in preference to new silicon nanoparticle nucleation. In any event, the core surface interface forms a nucleation-deposition site, even in the presence of independent Si nanoparticle formation.

[56] Eg, for various silicon decomposition/reduction conditions which can be applied to boron, silicon or aluminum nanoparticle cores when present in the reaction media under appropriate conditions, see R. K Baldwin et al, "Solution reduction synthesis of surface stabilized silicon nanoparticles", Chem. Commun. (2002), 1822-1823; J. Zou, Nano Lett. 2004, 4, 1181; R. K. Baldwin et al, J. Am. Chem. Soc. (2002), 124, 1150; J. P. Wilcoxon, Appl. Phys. Lett. (1999), 74, 3164.

[57] see US Air Force SBIR Solicitation AF131-173

[58] H. S. Chung et al, "Recent Developments in High-Energy Density Liquid Hydrocarbon Fuels", Energy & Fuels 1999, 13, 641-649 Naval Air Warfare Center, Weapons Division, China Lake, Calif. 93555

[59] Tae-Ho Lee et al, "Inlet Air Temperature Effects on the Performance of the Solid Fuel Ramjet", Journal Of Thermophysics And Heat Transfer Vol. 20, No. 4, October-December 2006
A. M. Tahsini et al, "Igniter jet dynamics in solid fuel ramjets", Acta Austronautica 64, (2009) 166-175

[60] See, eg Macromolecules, 2011, 44 (3), pp 444-452

[61] J. Warner et al, "Water-Soluble Photoluminescent Silicon Quantum Dots", Angew. Chem., Int. Ed. 44, 4550 (2005).

[62] Rabah Boukherroub et al, "Microwave-Assisted Chemical Functionalization of Hydrogen-Terminated Porous Silicon Surfaces", J. Phys. Chem., 107 (48), pp 13459-13462 (2003)

[63] See Loes Ruizendaal, "Functional Silicon Nanoparticles", PhD Thesis submitted at Wageningen University, Oct. 18, 2011

[64] See, for example, R. W. Day et al, U.S. Pat. No. 5,319,068, Nitramine Containing Polyether Polymers and a Process for the Preparation Thereof (1994)

[65] See for example, for thermal decomposition of alkyl silicon, Natalia Zaitseva et al, "Effect of Nitrogen on the Stability of Silicon Nanocrystals Produced by Decomposition of Alkyl Silanes", Journal of Physical Chemistry C 112, 3585-3590 (2008) and P. R. Girardot, "Preparation of pure silicon or germanium from their alkyls", U.S. Pat. No. 2,927,004 issued Mar. 1, 1960

[66] Examples of which generally may include US Patent Application publications:
2013/0344383 Template Electrode Structures For Depositing Active Materials
2013/0320582 Interconnected Hollow Nanostructures Containing High Capacity Active Materials For Use In Rechargeable Batteries
2013/0011736 Template Electrode Structures With Enhanced Adhesion Characteristics
2012/0301789 Template Electrode Structures For Depositing Active Materials
2012/0183856 Electrode Including Nanostructures For Rechargeable Cells
2012/0121989 Electrolytes For Rechargeable Batteries
2012/0100438 Composite Structures Containing High Capacity Porous Active Materials Constrained In Shells
2012/0070741 High Capacity Battery Electrode Structures
2012/0045670 Auxiliary Electrodes For Electrochemical Cells Containing High Capacity Active Materials
2011/0287318 Multidimensional Electrochemically Active Structures For Battery Electrodes
2011/0229761 Interconnecting Electrochemically Active Material Nanostructures
2011/0171502 Variable Capacity Cell Assembly
2011/0159365 Template Electrode Structures For Depositing Active Materials
2011/0143019 Apparatus For Deposition On Two Sides Of The Web
2011/0111304 Preloading Lithium Ion Cell Components With Lithium
2011/0111300 Intermediate Layers For Electrode Fabrication
2011/0111296 Open Structures In Substrates For Electrodes
2010/0285358 Electrode Including Nanostructures For Rechargeable Cells
2014/0315097 Asymmetric Battery Having A Semi-Solid Cathode And High Energy Density Anode
2014/0248521 High Energy Density Redox Flow Device
2014/0170524 Semi-Solid Electrodes Having High Rate Capability
2014/0154546 High Energy Density Redox Flow Device
2014/0039710 Energy Storage Modeling And Control
2014/0030623 Semi-Solid Filled Battery And Method Of Manufacture
2013/0337319 Electrochemical Slurry Compositions And Methods For Preparing The Same
2013/0309547 Electrochemical Cells And Methods Of Manufacturing The Same
2013/0065122 Semi-Solid Electrode Cell Having A Porous Current Collector And Methods Of Manufacture
2013/0055559 Stationary Semi-Solid Battery Module And Method Of Manufacture
2011/0189520 High Energy Density Redox Flow Device

[67] Volodymyr Pavlyuk et al, "High hydrogen content super-lightweight intermetallics from the Li—Mg—Si system", International journal of Hydrogen Energy 38 (2013) 5724-5737
Yongfeng Liu et al, "Improved lithium storage properties of Mg2Si anode material synthesized by hydrogen-driven chemical reaction", Electrochemistry Communications 25 (2012) 15-18

[68] See Ionic Liquids: Applications And Perspectives, Edited by Alexander Kokorin, Published by InTech, Croatia, (2011); H. Matsumoto et al (2005). Preparation of room temperature ionic liquids based on aliphaticonium cations and asymmetric amide anions and their electrochemical properties as a lithium battery electrolyte, J. Power Sources, 146, 45-50; H. Sakaebe et al (2007), Application of room temperature ionic liquids to Li batteries, Electrochimica Acta, 53, 1048-1054; V. D. Noto, et al, (2010), Structure-Relaxation interplay of a new nanostructured membrane based on tetraethylammonium trifluoromethanesulfonate ionic liquid and neutralized nafion 117 for high temperature fuel cells, J. Am. Chem. Society, 132, 2183-2195; Kim, et al (2010). An imidazolium based ionic liquid electrolyte for lithium batteries, J. Power Sources, 195, 7641-7643.

[69] A. Debski et al, "Enthalpy of formation of intermetallic compounds from the Li—Si system", Intermetallics 26 (2012) 157-161

[70] For larger systems, inexpensive lower alkanes such as methane, ethane, butane, pentane hexane, etc. are very inexpensive, relatively inert cooling agents, which can also serve as fluid or supercritical reaction media for thermolytic silicon coating and hydrosilylation reactions on the particle surfaces. When delivered in the liguid state, additional cooling is provided by the heat of vaporization necessary to change state to a gas. They are readily recovered for reuse.

[71] B. Bokhonov, et al, "In situ investigation of stage of the formation of eutectic alloys in Si—Au and Si—Al systems", Journal of Alloys and Compounds 312 (2000) 238-250

[72] Kuixian Wei et al, "Study on volatilization rate of silicon in multicrystalline silicon preparation from metallurgical grade silicon", Vacuum 85 (2011) 749-754; N. Yuge et al, "Purification of metallalurgical grade silicon up to solar grade", Progress in Photovoltaics: Research and Applications, 9: 203-209 (2001)

[73] Arno de Klerk et al, "Linear r-Olefins from Linear Internal Olefins by a Boron-Based Continuous Double-Bond Isomerization Process", Ind. Eng. Chem. Res. 46, 400-410 (2007)

[74] eg, see N. Shirahata, et al, Chem. Commun. (2009), 4684; I. Umezu et al, Appl. Phys. A:
Mater. Sci. Process. (2008), 93, 717.

[75] B. Ameduri, et al, "Fluoroelastomers: synthesis, properties andapplications", Progress in Polymer Science 26 (2001) 105-187

[76] Boron tends to form a glass-like surface upon reaction with oxygen (as can Al and Si), but surface treatment with perfluoro compounds which generate volatile boron reaction products can produce an extremely rapid reaction capability for high surface area B and Si nanoparticles.

[77] Joel A. Kelly et al, "An Investigation into Near-UV Hydrosilylation of Freestanding Silicon Nanocrystals", ACS Nano 4,-4656 (2010)
Bart Rijksen et al, "Mimicking the Silicon Surface: Reactivity of Silyl Radical Cations toward Nucleophiles", J. Am. Chem. Soc., 133, 4998-5008 (2011)

[78] eg, see Sri Sai S. Vegunta, et al, "Electrochemical and Thermal Grafting of Alkyl Grignard Reagents onto (100) Silicon Surfaces", Langmuir 2009, 25(21), 12750-12756;
T. Yamada, et al, "Detection of C—Si Covalent Bond in CH3 Adsorbate Formed by Chemical Reaction of CH3MgBr and H:Si(111)", J. Am. Chem. Soc., 125, 8039 (2003)

[79] eg, see above reference, and Tetsuya Osaka, et al, "Electrical and Electrochemical Properties of Alkyl-Monolayer Modified Si (111) in the Presence of Water", Journal of The Electrochemical Society, 154 (11) H919-H926 (2007)

[80] Bart Rijksen et al, "Mimicking the Silicon Surface: Reactivity of Silyl Radical Cations toward Nucleophiles", J. Am. Chem. Soc. 2011, 133, 4998-5008;
Youlin Pan et al, "Long-Chain Organofunctional Silanes: Synthesis and Surface Derivatization" Advanced Materials Research Vols. 415-417 (2012) pp 1829-1836;
Bhavin N. Jariwala et al, "In Situ Gas-Phase Hydrosilylation of Plasma-Synthesized Silicon Nanocrystals", ACS Appl. Mater. Interfaces 2011, 3, 3033-3041

[81] Hussein Sabbah et al, "Selective patterning of covalent molecular grafting on doped amorphous silicon templates", Phys. Status Solidi C 7, No. 3-4, 720-723 (2010)

A dense monomolecular layer of grafted 3,3,4,4,5,5,6,6,7,7,8,8,9,9,10,10,10-heptadecafluoro-1-decene ($C_8F_{17}CH=CH_2$) provides a coating approximately 1+ nanometer thick around the silicon nanoparticles. This coating is highly reactive with silicon at elevated temperatures, but protects the nanosilicon particles during storage. See J Polym Sci Part A: Polym Chem 40: 3120-3128 (2002); Pace, S, "New approach for the selective chemical functionalization of porous silicon films with organic monolayers", Physica Status Solidi A, v 206, n 6, 1326-9 (2009); Langner, Alex et al, "Silicon surface functionalization by UV-initiated alkene hydrosilylation", AIChE Annual Meeting, Conference Proceedings, p 5003, (2005); Stewart, M. P. et al, "Three methods for stabilization and functionalization of porous silicon surfaces via hydrosilylation and electrografting reactions", Physica Status Solidi (A) Applied Research, v 182, n 1, p 109-115 (2000)

[82] Veinot, J. G. C., "Synthesis, Surface Functionalization, and Properties of Freestanding Silicon Nanocrystals", Chem. Commun. 2006, 4160-4168; see also Y. Furukawa et al, "Synthesis of fluorosilicone having highly fluorinated alkyl side chains based on the hydrosilylation of fluorinated olefins with polyhydromethylsiloxane", Journal of Polymer Science Part A: Polymer Chemistry. Vol. 40, Issue 18, pp 3120-3128, (2002)

[83] see P. Nixon et al, "Pentafluoro-$\lambda^6$-sulfanyl-Terminated Chlorosilanes: New $SF_5$-Containing Films and Polysiloxane Materials Chem. Mater., 2000, 12 (10), pp 3108-3112

[84] see, eg, Joel A. Kelly, et al, "An Investigation into Near-UV Hydrosilylation of Freestanding Silicon Nanocrystals", ACSNano, 4:4645-4656 (2010)

[85] A. Faucheux et al, "Mechanisms of Thermal Decomposition of Organic Monolayers Grafted on (111) Silicon", Langmuir 2007, 23, 1326-1332

[86] J. A. McCormick, et al, "Rotary reactor for atomic layer deposition on large quantities of nanoparticles", J. Vac. Sci. Technol. A vol 25, no1, pp. 67-74 (2007)

[87] David Jurbergs et al, "Silicon nanocrystals with ensemble quantum yields exceeding 60%", Applied Physics Letters 88, 233116 (2006)

[88] For example, vinyl and other unsaturated groups may be covalently attached to silicon nanoparticle surfaces by reaction with interfacial bonding agents such as trimethoxy or trifluoro vinyl silanes (vinyl hydrosilanes are also useful to avoid a monomolecular oxygen interlayer). Fluorinated telomers may be grafted to the surface of silicon nanoparticles bearing surface vinyl or other unsaturated groups. Eg, see Nelly Durand, et al, "Radical Grafting of Tetrafluoroethylene and Vinylidene Fluoride Telomers onto Silica Bearing Vinyl Groups", Macromolecules, 44, 6249-6257 (2011)

[89] see D. A. Kritskaya, Et Al, "Kinetics Of Radiation Polymerization Of Tetrafluoroethylene Adsorbed On Silica Gel At 196° K", Polymer Science U.S.S.R. Vol. 24, No. 2, Pp. 279-280 (1982), and
M. R. Muidinov, "Development of Methods for Synthesis of Surface-Modified Fluoropolymer-Containing Composite Materials", Russian Journal of General Chemistry, 2009, Vol. 79, No. 3, pp. 606-615 (γ-rays from $^{60}Co$)

[90] Bart Rijksen, et al, "Mimicking the Silicon Surface: Reactivity of Silyl Radical Cations toward Nucleophiles", J. Am. Chem. Soc. 2011, 133, 4998-5008

[91] see, eg, Colin Anolick, et al, "Soluble Perfluoropolymers", Advanced Materials (1998) 10: 1212-1214;

B. Ameduri et al, "Fluoroelastomers: synthesis, properties and applications", Prog. Polym. Sci. 26 (2001) 105-187 Polymerization of fluoroalkenes;

P. R. Gustaysson et al, "Thermal Decomposition Of Fluorinated Polymers", Combust. Sci. and Tech., 178: 2097-2114, 2006

[92] U.S. Pat. No. 5,272,249, Archibald et al, "Difluoroamino oxetanes and polymers formed therefrom for use in energetic formulations" (Dec. 21, 1993)

[93] Silane is conventionally produced from metallurgical grade silicon by reacting powdered silicon with HCl at about 300° C. to produce chlorosilanes such as trichlorosilane $HSiCl_3$ and hydrogen:

$$Si + 3\ HCl \rightarrow HSiCl_3 + H_2$$

The trichlorosilane may be heated with a catalyst (eg a metal halide such as $AlCl_3$) to form silane, $SiH_4$, by disproportionation: $4\ HSiCl_3 \rightarrow SiH_4 + 3\ SiCl_4$ Industrial processes for manufacturing high purity silane can use metallurgical grade silicon, hydrogen, and silicon tetrachloride as feedstock for equilibrium reactions, together with isolation of desired products by distillation:

$$Si + 2H_2 + 3\ SiCl_4 \rightarrow 4\ SiHCl_3$$

$$2\ SiHCl_3 \rightarrow SiH_2Cl_2 + SiCl_4$$

$$2\ SiH_2Cl_2 \rightarrow SiHCl_3 + SiH_3Cl$$

$$2\ SiH_3Cl \rightarrow SiH_4 + SiH_2Cl_2$$

It is not necessary to purify chlorosilanes prior to plasma use, to produce energetic nanosilicon particles.

[94] See, eg, G. Hsu et al, "fines in fluidized bed silane pyrolysis", Journal of the electrochemical society, 131: 660-663 (1984)

[95] see, eg, Tatsuya Shimoda et al, "Solution-processed silicon films and transistors", Nature, Vol 440, pp. 783-786 (2006)

[96] Each of the Al—Si eutectic elements have little solubility in the other. Aluminum melts at 660° C. while silicon melts at 1414° C. with a 577° C. eutectic melting point at about 12.6 wt. % Si.

[97] K. T. Higa et al, U.S. Pat. No. 5,885,321, Preparation of fine aluminum powders by solution methods", issued Mar. 23, 1999

[98] In this regard, high energy oxidizers and explosives such as perchlorates, Nitramines such as RDX (hexahydro-1,3,5-trinitro-1,3,5 triazine), HMX (octahydro-1,3,5,7-tetranitro-1,3,5,7 tetrazocine), CL-20 (2,4,6,8,10,12-hexanitrohexaazaisowurtzitane-20 percent more powerful that HMX), TATB (triamino-trinitrobenzene), TNAZ (1,1,3 Trinitroazetidine), Polynitrocubanes energetics such as heptanitrocubane (HpNC) and octanitrocubane (ONC) which have high enthalpy from carbon-bond ring strain (~166 Kcal/mole) are useful components in composites with the nanoparticles of the present disclosure.

[99] See, for example, Michael A. Dewey, "Synthesis, Evaluation, and Formulation Studies on New Oxidizers as Alternatives to Ammonium Perchlorate in DoD Missile Propulsion Applications", SERDP Project WP1403 Final Report, 23 Apr. 2007, 130 pages; and Martin Rahm, "Green Propellants", Doctoral Thesis, KTH Chemical Science and Engineering, Royal Institute of Technology, Stockholm, Seweden, (2010), ISBN 978-91-7415-758-1, ISSN 1654-1081, TRITA-CHE-Report 2010:43

[100] Y. Nishimura et al, "Electrochemical reduction of silicon chloride in a non-aqueous solvent", Electrochim. Acta 53 (2007) 111

J. P. Nicholson, "Electrodeposition of Silicon from Nonaqueous Solvents", J. Electrochem. Soc. 152 (2005) C795.

T. Munisamy, et al, "Electrodeposition of Si from organic solvents and studies related to initial stages of Si growth", Electrochim. Acta 55 (2010) 3797.

F. Rahimi, et al, "Characterization of Pd nanoparticle dispersed over porous silicon as a hydrogen sensor", J. Phys. D: Appl. Phys. 40 (2007) 7201.

[101] see, eg, A. E. Austin, U.S. Pat. No. 3,990,953 (1976); E. R. Bucker et al, U.S. Pat. No. 4,192,720 (1980).

[102] Silicon halides such as SiCl4 react with water to "remove" it, but it is desirable to eliminate reactive oxygen components independently of SiCl4 reaction. Use of pure solvents and electrolyte components, exclusion of atmospheric contamination, use of molecular sieves, etc are conventional ways to provide reactive-oxygen-free electrodeposition conditions. In addition, introduction of a small amount of a water- and oxygen-reactive material such as triethyl aluminum into the electrolyte can remove water and other reactive oxygen, without producing silicon oxyhalide components which can contaminate the electrodeposit. [eg, see U.S. Pat. No. 7,250,102 to Fischer]. However, excess aluminum alkyl can consume silicon halide, so its use should be carefully titrated to moisture and oxygen removal from the electrodeposition system.

[103] Al-Salman, R., S. Z. El Abedin, et al. (2008). "Electrodeposition of Ge, Si and SixGe1-x from an air- and water-stable ionic liquid." *Physical Chemistry Chemical Physics* 10(31): 4650-4657. Al-Salman, R., S. Z. ElAbedin, et al. (2008). *Electrodeposition of nanoscale SixGe1-x from an air-and water stable ionic liquid.* 3rd SiGe, Ge, and Related Compounds: Materials, Processing and Devices Symposium—214th ECS Meeting, Oct. 12, 2008-Oct. 17, 2008, Honolulu, Hi., United states, Electrochemical Society Inc.

Al-Salman, R. and F. Endres (2009). "Template-assisted electrodeposition of SixGe1-x nanowires with varying length and composition from two different ionic liquids." *Journal of Materials Chemistry* 19(39): 7228-7231.

Al-Salman, R., X. Meng, et al. (2010). "Semiconductor nanostructures via electrodeposition from ionic liquids." *Pure and Applied Chemistry* 82(8): 1673-1689.

Bebensee, F., N. Borissenko, et al. (2008). "Surface analysis of nanoscale aluminium and silicon films made by electrodeposition in ionic liquids." *Zeitschrift fur Physikalische Chemie* 222(4): 671-686.

Bechelany, M., J. Elias, et al. (2012). "Electrodeposition of amorphous silicon in non-oxygenated organic solvent." *Thin Solid Films* 520(6): 1895-1901.

Ghanbari, E., A. R. Saatchi, et al. (2012). "Amorphous silicon-coated carbon nanofibers composite as anode material for lithium-ion batteries." *7th International Conference on Processing and Manufacturing of Advanced Materials, THERMEC'2011, Aug. 1, 2011-Aug. 5, 2011* 706-709: 1029-1034.

Martineau, F., K. Namur, et al. (2009). "Electrodeposition at room temperature of amorphous silicon and germanium nanowires in ionic liquid." *Semiconductor Nanostructures Towards Electronic & Optoelectronic Device Applications. II. Symposium K, EMRS 2009 Spring Meeting, 8-12 Jun.* 2009 6: 012012 (012014 pp.).

Martinez, A. M., K. S. Osen, et al. (2010). *Electrodeposition of silicon thin films from ionic liquids.* Semiconductors, Metal Oxides, and Composites: Metallization and Electrodeposition of Thin Films and Nanostructures—216th ECS Meeting, Oct. 4, 2009-Oct. 9, 2009, Vienna, Austria, Electrochemical Society Inc.

Nishimura, Y., Y. Fukunaka, et al. (2008). *XPS study and optical properties of Si films electrodeposited in a room-temperature ionic liquid*. Electrodeposition for Energy Applications—213th Meeting of The Electrochemical Society, May 18, 2008-May 23, 2008, Phoenix, Ariz., United states, Electrochemical Society Inc.

Nishimura, Y., T. Nohira, et al. (2009). "Electrochemical reduction of silicon tetrachloride in an intermediate-temperature ionic liquid." *Electrochemistry* 77(8): 683-686.

Saakes, M. and P. M. M. C. Bressers (2007). A method for applying at least one silicon containing layer onto an electron conductive layer. T. N. O. Nederlandse Organisatie voor toegepast-natuurwetenschappelijk Onderzoek. EP. 05077474.4.

Schmuck, M., A. Balducci, et al. (2010). "Alloying of electrodeposited silicon with lithium—a principal study of applicability as anode material for lithium ion batteries." Journal of Solid State Electrochemistry 14(12): 2203-2207.

Szczech, J. R. and S. Jin (2011). "Nanostructured silicon for high capacity lithium battery anodes." Energy and Environmental Science 4(1): 56-72.

Zein El Abedin, S., N. Borissenko, et al. (2004). "Electrodeposition of nanoscale silicon in a room temperature ionic liquid." *Electrochemistry Communications* 6(5): 510-514.

[104] see, eg, R. N. Pereira et al, "Solution-Processed Networks of Silicon Nanocrystals: The Role of Internanocrystal Medium on Semiconducting Behavior", J. Phys. Chem. C 2011, 115, 20120-20127

[105] M A Qiu-ping, et al, "Electrodeposition of Silicon in Organic Solvent Containing Silicon Chloride", Advanced Materials Research Vols. 79-82 (2009) pp 1635-1638;

Wen Liu et al. "The comparison research of two working electrodes in electrochemical reduction of silicon tetrachloride", Advanced Materials Research Vols. 97-101 (2010) pp 32-35

[106] Hallmann, S., M. J. Fink, et al. (2011). "Mechanochemical synthesis of functionalized silicon nanoparticles with terminal chlorine groups." Journal of Materials Research 26(8): 1052-1060.

Verdoni, L. P., M. J. Fink, et al. (2011). "A fractionation process of mechanochemically synthesized blue-green luminescent alkyl-passivated silicon nanoparticles." Chemical Engineering Journal 172(1): 591-600.

Hallmann, S., M. J. Fink, et al. (2011). The mechanochemical formation of functionalized semiconductor nanoparticles for biological, electronic and superhydrophobic surface applications. Advances in Nanomaterials and Nanostructures—Materials Science and Technology 2010 Conference and Exhibition, MS and T'10, Oct. 17, 2010-Oct. 21, 2010, Houston, Tex., United states, American Ceramic Society.

Dvorsky, R., J. Lunacek, et al. (2011). "Dynamics analysis of cavitation disintegration of microparticles during nanopowder preparation in a new Water Jet Mill (WJM) device." Advanced Powder Technology 22(5): 639-643.

Donato, M. G., M. A. Monaca, et al. (2011). "Optical trapping of porous silicon nanoparticles." Nanotechnology 22(50): 505704 (505708 pp.).

[107] A. Kruger et al, "Unusually tight aggregation in detonation nanodiamond: Identification and disintegration", Carbon 43 (2005) 1722-1730

[108] Tsuda, T. and C. L. Hussey (2008). "Electrodeposition of photocatalytic AlInSb semiconductor alloys in the Lewis acidic aluminum chloride-1-ethyl-3-methylimidazolium chloride room-temperature ionic liquid." Thin Solid Films 516(18): 6220-6225.

Tsuda, T., S. Arimoto, et al. (2008). "Electrodeposition of Al—Mo—Ti ternary alloys in the Lewis acidic aluminum chloride-1-ethyl-3-methylimidazolium chloride room-temperature ionic liquid." Journal of the Electrochemical Society 155(4): D256-D262.

Tsuda, T., S. Arimoto, et al. (2008). "Electrodeposition of Al—Mo—Ti ternary alloys in the Lewis acidic aluminum chloride-1-ethyl-3-methylimidazolium chloride room-temperature ionic liquid." Journal of the Electrochemical Society 155(4): 256-262.

Koura, N., H. Nagase, et al. (2008). "Electroless plating of aluminum from a room-temperature ionic liquid electrolyte." Journal of the Electrochemical Society 155(2): D155-D157.

Koura, N., H. Nagase, et al. (2008). "Electroless plating of aluminum from a room-temperature ionic liquid electrolyte." Journal of the Electrochemical Society 155(2): 155-157.

Tsuda, T., C. L. Hussey, et al. (2006). *Electrodeposition of Al—Mo—X (X: Mn or Ni) ternary alloys from lewis acidic AlCl3-EtMeImCl molten salts*, Honolulu, Hi., United States, Electrochemical Society Inc., Pennington, N.J. 08534-2896, United States.

Tsuda, T., C. L. Hussey, et al. (2005). "Electrodeposition of Al—Mo—Mn ternary alloys from the Lewis acidic AlCl3-EtMeImCl molten salt." Journal of the Electrochemical Society 152(9): 620-625.

Tsuda, T., C. L. Hussey, et al. (2004). "Electrodeposition of Al—Zr alloys from lewis acidic aluminum chloride-1-ethyl-3-methylimidazolium chloride melt." Journal of the Electrochemical Society 151(7): 447-454.

Tsuda, T., C. L. Hussey, et al. (2004). "Electrodeposition of Al—Mo alloys from the Lewis acidic aluminum chloride-1-ethyl-3-methylimidazolium chloride molten salt." Journal of the Electrochemical Society 151(6): 379-384.

Tsuda, T., C. L. Hussey, et al. (2003). "Electrochemistry of titanium and the electrodeposition of Al—Ti alloys in the Lewis acidic aluminum chloride-1-ethyl-3-methylimidazolium chloride melt." Journal of the Electrochemical Society 150(4): 234-243.

Tsuda, T., T. Nohira, et al. (2002). "Nucleation and surface morphology of aluminum-lanthanum alloy electrodeposited in a LaCl3-saturated AlCl3-EtMeImCl room temperature molten salt." Electrochimica Acta 47(17): 2817-2822. (use for Ce alloying with Al for candoluminescent energetics)

See also Ali Muhammad (ed) Green Solvents II: Properties and Applications of Ionic Liquids, Chapter 5 (G. Tian) pp. 132-135 Springer (2012) Library of Congress control Number 2012933835

[109] eg, see E. Ghanbari, et al, "Amorphous Silicon-Coated Carbon Nanofibers Composite as Anode Material for Lithium-Ion Batteries", Materials Science Forum Vols. 706-709 (2012) pp 1029-1034

[110] Mikhael Bechelany et al, "Electrodeposition of amorphous silicon in non-oxygenated organic solvent", Thin Solid Films, 520: 1895-1901 (2012)

[111] See, eg I. Shitanda et al., "Electroless plating of aluminum using diisobutyl aluminum hydride as liquid reducing agent in room-temperature ionic liquid", Electrochimica Acta 54 (2009) 5889-5893

[112] T. Tsuda et al, (2008). "Electrodeposition of Al—Mo—Ti ternary alloys in the Lewis acidic aluminum chloride-1- ethyl-3-methylimidazolium chloride room-temperature ionic liquid." Journal of the Electrochemical Society 155(4): 256-262.

T. Tsuda et al, (2002). "Nucleation and surface morphology of aluminum-lanthanum alloy electrodepsited in a LaCl3-saturated AlCl3-EtMeImCl room temperature molten salt." Electrochimica Acta 47(17): 2817-2822.

T. Tsuda et al, (2005). "Anodic hydrogen electrode reaction in aluminum chloride-1-ethyl-3-methylimidazolium chloride ionic liquids." Electrochemistry 73(8): 644-650.

T. Tsuda et al, (2005). "Electrodeposition of Al—Mo—Mn ternary alloys from the Lewis acidic AlCl3-EtMeImCl molten salt." Journal of the Electrochemical Society 152 (9): 620-625.

T. Tsuda et al (2004). "Electrodeposition of Al—Mo alloys from the Lewis acidic aluminum chloride-1-ethyl-3-methylimidazolium chloride molten salt." Journal of the Electrochemical Society 151(6): 379-384.

T. Tsuda et al (2003). "Electrochemistry of titanium and the electrodeposition of Al—Ti alloys in the Lewis acidic aluminum chloride-1-ethyl-3-methylimidazolium chloride melt." Journal of the Electrochemical Society 150(4): 234-243.

T. Tsuda et al (2004). "Electrodeposition of Al—Zr alloys from lewis acidic aluminum chloride-1-ethyl-3-methylimidazolium chloride melt." Journal of the Electrochemical Society 151(7): 447-454.

[113] Ashkan Garshasbi et al, "Comparative Investigation of the Formation of Polytetrafluoroethylene Nanoparticles on Different Solid Substrates Through the Adsorption of Tetrafluoroethylene", Journal of Applied Polymer Science, Vol. 121, 2369-2377 (2011)

[114] Matthias Gabriel et al, "Wet-chemical approach for thecell-adhesive modification of polytetrafluoroethylene", Biomedical Materials 6 (2011) 035007 (5pp)

[115] T. Hirato et al., "Electrolytic Codeposition of Silica Particles with Aluminum from AlCl3-Dimethylsulfone Electrolytes", J. Electrochemical Society, 148(4), pp C280-283 (2001)

[116] see, G. Smith, et al, "Electrolytic Preparation Of Fe—Ni—Cr Alloys Using A Particle-Occlusion And Heat-Treatment Method", US Bur of Mines, Journal of Metals, v 37 p. 55, (1985)

[117] Perfluorinated microemulsion polymerization (H. Bladel et al. U.S. Pat. No. 5,576,381 (1994). Aqueous dispersion of fluoropolymers, its preparation and use for coating; E. Giannetti, M. Visca. U.S. Pat. No. 4,864,006 (1987). Process for the polymerization in aqueous dispersion of fluorinated monomers; M. Visca, A. Chittofrati. U.S. Pat. No. 4,990,283 (1988). Microemulsions containing Perfluoropolyethers; H. S. Wu. U.S. Pat. No. 5,523,346 (1994). Seeded microemulsion polymerization for the production of small polymer particles; S. Wu. U.S. Pat. No. 5,616,648 (1996). Microemulsion of polytetrafluoroethyleneparticles.

[118] such as described in J. Fischer, U.S. Pat. No. 7,250,102 "Aluminium electroplating formulations", issued Jul. 31, 2007

[119] T. Tsuda, "Irradiation-Induced Metal Nanoparticles in Room-Temperature Ionic Liquid", Abstract #2173, 218th ECS Meeting, (2010) The Electrochemical Society

[120] See, for example, U.S. Pat. No. 6,409,797 of D. R. Armstrong et al, "Method of making metals and other elements from the halide vapor of the metal", issued Jun. 25, 2002 see also subsequent published US patent applications:

20080264208 Liquid injection of VCl4 into superheated TiCl4 for the production of Ti—V alloy powder
20080199348 Elemental material and alloy
20080187455 Titanium and titanium alloys
20080152533 Direct passivation of metal powder
20080031766 Attrited titanium powder
20070079908 Titanium boride
20070017319 Titanium alloy
20060150769 Preparation of alloys by the armstrong method
20060107790 System and method of producing metals and alloys
20060086435 Separation system of metal powder from slurry and process
20050284824 Filter cake treatment apparatus and method
20050225014 Filter extraction mechanism
20050081682 Method and apparatus for controlling the size of powder produced by the Armstrong Process
20040079197 Preparation of alloys by the armstrong method
20040079196 Method and apparatus for controlling the size of powder produced by the Armstrong Process

[121] E. Godlewska et al, "Combustion synthesis of Mg2Si", Intermetallics 19, 1983-1988 (2011)

[122] Zh. Yermekova et al, "Combustion Synthesis of Silicon Nanopowders", International Journal of Self Propagating High Temperature Synthesis, Vol 19, pp. 94-101 (2010); see also Zh Yermekova et al, "Influence of precursor morphology on the microstructure of silicon carbide nanopowder produced by combustion syntheses", Ceramics International 36, 2297-2305, (2010)

[123] Adam C. Powell IV et al, Final Technical Report "Efficient One-Step Electrolytic Recycling of Low-Grade and Post-Consumer Magnesium Scrap", DOE Award Number DE-EE0003454, Jul. 19, 2012

[124] Young et al, U.S. Pat. No. 6,390,395, May 21, 2002

[125] Huiping Li et al, "Prediction of powder particle size during centrifugal atomization using a rotating disk", Science and Technology of Advanced Materials 8 (2007) 264-270

[126] Y. E. Kalay et al, "Characterization of Hypereutectic Al—Si Powders Solidified under Far-From Equilibrium Conditions", METALLURGICAL AND MATERIALS TRANSACTIONS A, 38A; 1452-1457 (2007)

A. J. Heidloff et al, "Advanced gas atomization processing for Ti and Ti Alloy powder processing", JOM 62: 35-41 (2010) (good equipment and processing)

Iver E. Anderson et al, "Progress toward gas atomization processing with increased uniformity and control", Materials Science and Engineering A326 (2002) 101-109

[127] W. Tang et al, "Magnetic properties and microstructure of gas atomized MRE2(Fe,Co)14B powder with ZrC addition (MRE=Nd+Y+Dy) Journal Of Applied Physics 105, 07A728 (2009)

[128] see L. C. Olson, PhD Dissertation "Materials Corrosion in Molten LiF—NaF—KF Eutectic Salt", University of Wisconsin-Madison (2009) and cited references;

D. Williams, "Assessment of Candidate Molten Salt Coolants for the NGNP/NHI Heat-Transfer Loop," Oak Ridge National Laboratory, ORNL/TM-2006/69, 2006.

[129] Kouji Yasuda et al, "Mechanism of Direct Electrolytic Reduction of Solid SiO2 to Si in Molten $CaCl_2$", J. Electrochem. Soc. 2005, Volume 152, Issue 4, Pages D69-D74.

[130] Xiaofeng Liu et al, "A molten-salt route for synthesis of Si and Ge nanoparticles: chemical reduction of oxides by electrons solvated in salt melt", J. Mater. Chemistry 22, 5454 (2012).

[131] Daniela C. Marcano et al, "Improved Synthesis of Graphene Oxide", acsNANO, VOL. 4 pp 4806-4814 (2010)

[132] Arthur Provatas, "Energetic Polymers and Plasticisers for Explosive Formulations. A Review of Recent Advances" Weapons Systems Division Aeronautical and Maritime Research Laboratory, Australia DSTO-TR-0966, April 2000

[133] Tzung-Hua Lin, et al, (2010), "Bioinspired assembly of surface-roughened nanoplatelets", Journal of Colloid and Interface Science 344 (2010) 272-278

P. Podsiadlo, et al, (2007), "Ultrastrong and Stiff Layered Polymer Nanocomposites", *Science* 318, 80 (LBL work)

[134] L. Yue et al, "Preparation and characterisation of covalent polymer functionalized graphene oxide." Journal of Materials Chemistry 21(10): 3455-3461 (2011)

J. Wang et al, "An Effective Method for Bulk Obtaining Graphene Oxide Solids." Chinese Journal of Chemistry 28(10): 1935-1940 (2010)

G. Eda et al, "Insulator to semimetal transition in graphene oxide." Journal of Physical Chemistry C 113(35): 15768-15771 (2009)

W. Min et al, "Magnetism in Graphene Oxide." New Journal of Physics 12(8): 083040 (2010)

K. Erickson et al, "Determination of the local chemical structure of graphene oxide and reduced graphene oxide." Advanced Materials 22(40): 4467-4472 (2010)

[135] J. P. Agrawal and R. D. Hodgson, "Organic chemistry of Explosives", John Wiley & Sons, Ltd, 2007, ISBN-13: 978-0-470-02967-1 ISBN-10: 0-470-02967-6 (384 pages)

[136] Ju, H.-M., S. H. Huh, et al. (2010). "Structures of thermally and chemically reduced graphene." Materials Letters 64(3): 357-360. (graphene with a small number of surface oxide groups);

United States Published Patent Applications of Robert Prud'Homme et al, (Princeton):

20120088084, Conductive Circuit Containing A Polymer Composition Containing Thermally Exfoliated Graphite Oxide And Method Of Making The Same 20110178224, Multifunctional Graphene-Silicone Elastomer Nanocomposite, Method Of Making The Same, And Uses Thereof 20110114897, Functionalized Graphene Sheets Having High Carbon To Oxygen Ratios 20110052476, Thermally Exfoliated Graphite Oxide 20110049437, Coatings Containing Functionalized Graphene Sheets And Articles Coated Therewith 20110042813, Printed Electronics 20100330368, Composite Flash-Precipitated Nanoparticles 20100096597, Functional Graphene-Rubber Nanocomposites 20100096595, Functional Graphene-Polymer Nanocomposites For Gas Barrier Applications 20090143515, Bridged Graphite Oxide Materials 20080306225, Polymerization Method For Formation Of Thermally Exfoliated Graphite Oxide Containing Polymer

[137] Provatas, A., (2000) "Energetic Polymers and Plasticisers for Explosive Formulations. A Review of Recent Advances", DSTO-TR-0966, Australia AR-011-428.

[138] see Agrawall and Hodgson "Organic chemistry of Explosives" (Wiley) cited herein, page 360-361

[139] Gilje, S., S. Dubin, et al. (2010). "Photothermal deoxygenation of graphene oxide for patterning and distributed ignition applications." Advanced Materials 22(3): 419-423. (light flash on photopatterned Graphene oxide causes rapid deoxygenation to graphitic carbon)

Gilje, S., J. Farrar, et al. (2009). "Photothermal Deoxygenation of Graphene Oxide to Graphitic Carbon for Distributed Ignition and Patterning Applications (Preprint)." 15p. (flash exposure results in a pronounced photoacoustic effect along with a rapid temperature increase, which initiates a secondary deoxygenation reaction to yield graphitic carbon and CO2. A photo-initiated reaction could be used to achieve multiple ignition nucleation sites simultaneously)

[140] Liu, H., S. Ryu, et al. (2009). "Photochemical reactivity of graphene." Journal of the American Chemical Society 131(47): 17099-17101. (photochemical electron transfer from graphene to benzoyl peroxide)

[141] Mo, H.-C. and X.-X. Gan (2007). "Synthesis and properties of 3-nitratomethyl-3-ethyloxetane and its homopolymer." Hanneng Cailiao/Chinese Journal of Energetic Materials 15(4): 313-315+319.

Mohan, Y. M., Y. Math, et al. (2006). "Synthesis of azido polymers as potential energetic propellant binders." Designed Monomers and Polymers 9(3): 201-236. (glycidyl azide polymers (GAP)s, GAP co-polymers, oxetane polymers, oxirane polymers . . . )

Reddy, T. S., J. K. Nair, et al. (2007). "Bis(azidomethyl) oxetane/hydroxyl-terminated polybutadiene/bis(azidomethyl) oxetane triblock copolymer: Synthesis and characterization." Journal of Applied Polymer Science 106(3): 1885-1888. (copolymer of bis(azidomethyl) oxetane and hydroxyl-terminated polybutadiene)

Diaz, E., P. Brousseau, et al. (2003). "Heats of combustion and formation of new energetic thermoplastic elastomers based on GAP, polyNIMMO and polyGLYN." Propellants, Explosives, Pyrotechnics 28(3): 101-106. (Preparation and heats of combustion and formation of glycidyl azide polymer, poly(3-nitratomethyl-3-methyloxetane) and poly glycidyl nitrate)

[142] Provatas, A., (2000) "Energetic Polymers andPlasticisers for Explosive Formulations. A Review of Recent Advances", DSTO-TR-0966, Australia AR-011-428

[143] Beidi Wang et al, "Stimuli-Responsive Polymer Covalent Functionalization of Graphene Oxide by Ce(IV)—Induced Redox Polymerization", J. Phys. Chem. C, 115, 24636-24641 (2011)

Lanyan Kan et al, "General Avenue to Individually Dispersed Graphene Oxide-Based Two-Dimensional Molecular Brushes by Free Radical Polymerization", Macromolecules 2011, 44, 444-452

[144] Tzung-Hua Lin, et al, (2010), "Bioinspired assembly of surface-roughened nanoplatelets", Journal of Colloid and Interface Science 344 (2010) 272-278

[145] Azuma, M., L. Ma, et al. (2004). "Ultradrawing of blend films of ethylene-dimethyl-aminoethyl methacrylate copolymer and ultra-high molecular weight polyethylene prepared by gelation/crystallization from solutions." Polymer 45(2): 409-421.

Chen, Q., Y. Bin, et al. (2006). Electrical and mechanical properties of blend films of ethylene-methyl methacrylate copolymer and ultrahigh molecular weight polyethylene with multi-wall carbon nanotubes, Nagoya, Japan, Society of Polymer Science. (MWNTs and UHMWPE with copolymer ethylene-methyl methacrylate composite prepared by gelation/crystallization from solution to form conductive material with high modulus)

Chen, Q., Y. Xi, et al. (2008). "Electrical and dielectric properties in carbon fiber-filled LMWPE/UHMWPE composites with different blend ratios." Journal of Polymer Science, Part B: Polymer Physics 46(4): 359-369. (gelation from solution with 23.5 vol % carbon fibers)

Kanamoto, T., A. Tsuruta, et al. (1988). "Superdrawing Of Ultrahigh Molecular Weight Polyethylene. 1. Effect Of Techniques On Drawing Of Single Crystal Mats." Macromolecules 21(2): 470-477. (Single crystal mats of ultrahigh molecular weight polyethylene (Draw ratios over 200 at >90° C.)

Ko, J.-H. and J.-H. Chang (2009). "Properties of ultrahigh-molecular-weight polyethylene nanocomposite films containing different functionalized multiwalled carbon nanotubes." Polymer Engineering and Science 49(11): 2168-2178.

Komatsu, T. (1997). "Mechanical properties and structure relationships in drawn fibers of elastomer-polyoxymethylene blends." Journal of Polymer Science, Part B: Polymer Physics 35(1): 107-118.

Komatsu, T., S. Enoki, et al. (1991). "Effect of pressure on drawing poly(oxymethylene) fibres. 4. Heat shrinkage of annealed superdrawn fibres." Polymer 32(16): 2992-2994.

Komatsu, T., S. Enoki, et al. (1991). "Effects of pressure on drawing polyoxymethylene. 2. Drawn fibre properties and structure." Polymer 32(11): 1988-1993. (Superdrawn polyoxymethylene fibres produced by pressurized drawing are dense and transparent, 2.0 GPa and 1.45 g/cm-3)

Kunugi, T., S. Oomori, et al. (1988). "Preparation of ultra-high modulus polyethylene films by the zone-annealing method." Polymer 29(5): 814-820. (dynamic modulus and tensile strength at room temperature of superdrawn films were 232 and 6 GPa, respectively)

Mohan, Y. M., Y. Math, et al. (2006). "Synthesis of azido polymers as potential energetic propellant binders." Designed Monomers and Polymers 9(3): 201-236.

Mohanraj, J., D. C. Barton, et al. (2009). "Orientation of polyoxymethylene by plane strain compression and rolling with side constraints." Plastics, Rubber and Composites 38(1): 10-12.

Mohanraj, J., J. Morawiec, et al. (2008). "Orientation of polyoxymethylene by rolling with side constraints." Polymer 49(1): 303-316.

Nakahara, T., H. Zenkoh, et al. (2005). Ultra high molecular weight polyethylene blown film process, Boston, Mass., United states, Society of Plastics Engineers.

Pennings, A. J. and J. Smook (1984). "MECHANICAL PROPERTIES OF ULTRA-HIGH MOLECULAR WEIGHT POLYETHYLENE FIBRES IN RELATION TO STRUCTURAL CHANGES AND CHAIN SCISSIONING UPON SPINNING AND HOT-DRAWING." Journal of Materials Science 19(10): 3443-3450.

Pielichowska, K. (2008). "Preparation of polyoxymethylene/hydroxyapatite nanocomposites by melt processing." International Journal of Material Forming 1(SUPPL. 1): 941-944.

Ratner, S., A. Weinberg, et al. (2003). "Neat UHMWPE filament wound composites by crosslinking compaction." Advanced Composites Letters 12(5): 205-210.

Ruan, S., P. Gao, et al. (2006). "Ultra-strong gel-spun UHMWPE fibers reinforced using multiwalled carbon nanotubes." Polymer 47(5): 1604-1611

Sawai, D., D. Watanabe, et al. (2006). "Superdrawing of polytetrafluoroethylene nascent powder by solid-state coextrusion." Journal of Polymer Science, Part B: Polymer Physics 44(23): 3369-3377.

Sawatari, C., P. Panbumrung, et al. (2003). "Interchain interaction in ultradrawing UHMWPE/Tri-O-alkylcellulose blend film obtained by gelation/casting from solution." Sen'i Gakkaishi 59(7): 251-259.

Smook, J., H. B. Savenije, et al. (1985). "EFFECTS OF ADDITIVES ON GEL-SPINNING OF ULTRA-HIGH MOLECULAR WEIGHT POLYETHYLENE." Polymer Bulletin 13(3): 209-214.

Wang, L.-H. and R. S. Porter (1990). "New approach for processing ultrahigh-molecular weight polyethylene powder. Solid-state rolling followed by hot stretch (roll-draw) ." Journal of Polymer Science, Part B: Polymer Physics 28(12): 2441-2444. A UHMWPE film with a Young's modulus of 68 GPa and tensile strength of 1.3 GPa has been prepared, all by processing at temperature below the melting point.

Wang, L.-H. and R. S. Porter (1991). "Rolling and roll-drawing of ultrahigh molecular weight polyethylene reactor powders." Journal of Applied Polymer Science 43(8): 1559-1564.

Yeh, J.-T., S.-S. Chang, et al. (1998). "Ultradrawing behavior of one- and two-stage drawn gel films of ultrahigh molecular weight polyethylene and low molecular weight polyethylene blends." Journal of Applied Polymer Science 70(1): 149-159.

Yeh, J.-T., S.-C. Lin, et al. (2008). "Investigation of the ultradrawing properties of gel spun fibers of ultra-high molecular weight polyethylene/carbon nanotube blends." Journal of Applied Polymer Science 110(5): 2538-2548.

[146] For background on our cold-weld rolling of energetic metal with thermite oxidizers to make structurally-strong nanothermites, please see my Nov. 6, 2008 Final Report for Navy SBIR Contract N68936-08-C-0047, "Low-Cost Production of Super-Thermites", when it becomes available.

[147] Blackford, J. R., R. A. Buckley, et al. (1996). "Production of iron aluminides by co-rolling of elemental foils followed by heat treatment." Scripta Materialia 34(5): 721-728 (co-rolled iron and aluminium foils with repeated folding and cold rolling produced multiple necking and fragmentation of the iron constituent, to produce flake formation)

[148] Sugimoto, K.-I., J. Tsuruta, et al. (2010). "The effects of cold-rolling strain on microstructure and formability of Al bearing TRIP-aided cold-rolled steel sheets with annealed bainitic lath structure matrix." Tetsu-To-Hagane/Journal of the Iron and Steel Institute of Japan 96(1): 29-35.

Tsuji, N., Y. Ito, et al. (2002). Mechanical properties of ultrafine grained aluminum and ultra low carbon steel produced by ARB process, Seattle, Wash., United states, Minerals, Metals and Materials Society. (1100 aluminum and ultralow carbon IF steel were strained by ARB process to have strengths 2-3 times higher than starting materials)

Tsuji, N., Y. Ito, et al. (2002). "Strength and ductility of ultrafine grained aluminum and iron produced by ARB and annealing." Scripta Materialia 47(12): 893-899.

Tsuji, N., N Kamikawa, et al. (2007). Grain size saturation during severe plastic deformation, Vancouver, Canada, Trans Tech Publications Ltd.

Tsuji, N., N. Kamikawa, et al. (2004). Effect of strain on deformation microstructure and subsequent annealing behavior of IF steel heavily deformed by ARB process, Annecy, France, Trans Tech Publications Ltd THE TENSILE PROPERTIES OF 18% Ni MARAGING STEELS." *Tetsu-To-Hagane/Journal of the Iron and Steel Institute of Japan* 62(2): 220-227;

Roberson, J. A. and A. M. Adair (1968). The Effects of Prior Deformation on the Strengthening Processes in Maraging Steel. *Reprint: The Effects of Prior Deformation on the Strengthening Processes in Maraging Steel*. United States: 8p.

Azevedo, G. et al. (2005). "Development of an ultrafine grained ferrite in a low C—Mn and Nb—Ti microalloyed steels after warm torsion and intercritical annealing." Materials Science and Engineering A 402(1-2): 98-108.

Dobatkin, S. (2004). "Nano- and submicrocrystalline steels by severe plastic deformation." JOM 56(11): 158.

Kestens, L., A. C. C. Reis, et al. (2004). The role of surface shear during accumulative roll bonding of an interstitial free steel, Charlotte, N.C., United states, Minerals, Metals and Materials Society.

Kolahi, A., et al. (2009). "Electron back scattered diffraction (EBSD) characterization of warm rolled and accumulative roll bonding (ARB) processed ferrite." Journal of Materials Processing Technology 209(3): 1436-1444.

Lan, H. F., W. J. Liu, et al. (2007). "Ultrafine ferrite grains produced by tempering cold-rolled martensite in low carbon and microalloyed steels." ISIJ International 47(11): 1652-1657.

Lee, S.-H., H. Utsunomiya, et al. (2004). "Microstructures and mechanical properties of ultra low carbon interstitial free steel severely deformed by a multi-stack accumulative roll bonding process." Materials Transactions 45(7): 2177-2181.

Ma, Y., J.-E. Jin, et al. (2005). Grain refinement and mechanical properties of a metastable austenitic Fe—Cr—Ni—Mn alloy, Beijing, China, Trans Tech Publications Ltd.

Movaghar et al. (2008). "X-ray diffraction peak profile analysis aiming at better understanding of the deformation process and deformed structure of a martensitic steel." Thin Solid Films 516(22): 8117-8124.

Samuel, F. H. (1985). "INTERRELATIONS OF COLD WORK, MICROSTRUCTURE AND MECHANICAL BEHAVIOUR OF CARBON-FREE CUBIC MARTENSITES." Zeitschrift fuer Metallkunde/Materials Research and Advanced Techniques 76(2): 115-119.

Shirazi, H., M. Nili-Ahmadabadi, et al. (2010). Effect of severe plastic deformation on mechanical properties of Fe—Ni—Mn high strength steel, Manama, Bahrain, Trans Tech Publications.

Tamimi, S., M. Ketabchi, et al. (2009). "Microstructural evolution and mechanical properties of accumulative roll bonded interstitial free steel." Materials and Design 30(7): 2556-2562.

Tanaka, M., N. Fujimoto, et al. (2008). "Fracture toughness enhanced by grain boundary shielding in submicron-grained low carbon steel." Materials Transactions 49(1): 58-63.

Tanaka, M., K. Higashida, et al. (2010). The effect of severe plastic deformation on the brittle-ductile transition in low carbon steel, Laubisrutistr.24, Stafa-Zuerich, CH-8712, Switzerland, Trans Tech Publications Ltd.

Tsuji, N., N. Kamikawa, et al. (2007). Grain size saturation during severe plastic deformation, Vancouver, Canada, Trans Tech Publications Ltd.

Tsuji, N., S. Okuno, et al. (2004). "Toughness of ultrafine grained ferritic steels fabricated by ARB and annealing process." Materials Transactions 45(7): 2272-2281.

Wang, J.-M., J. Lu, et al. (2008). "Ultra-fine grained medium-carbon steel produced by equal-channel angular pressing process." Cailiao Rechuli Xuebao/Transactions of Materials and Heat Treatment 29(2): 76-81.

Xu, R., D. Tang, et al. (2005). "Improvement of the quality and mechanical properties of a plain carbon steel by accumulative roll-bonding." Beijing Keji Daxue Xuebao/Journal of University of Science and Technology Beijing 27(4): 448-452.

Yang, Z et al, Effect of prior cold rolling deformation on strengthening of maraging steel, Kang Tieh/Iron and Steel (Peking) 43:66-69 (2008)

Yin, Z. and Y. Zhou (1992). "Transformation induced superplasticity in 18Ni maraging steel." Acta Metallurgica Sinica Series A, Physical Metallurgy & Materials Science 5 A(4): 278-281.

[149] A. Misra, et al Scripta Materialia 39 (1998) 555-560;

N. A. Mara, et al, "Tensile behavior of 40 nm Cu/Nb nanoscale multilayers", Scripta Materialia 58 (2008) 874-877

Mara, N. A. et al. (2008). "High-temperature mechanical behavior/microstructure correlation of Cu/Nb nanoscale multilayers." *Materials Science and Engineering A* 493 (1-2): 274-282.;

Mara, N. A. et al. (2008). "Deformability of ultrahigh strength 5 nm Cu/Nb nanolayered composites." *Applied Physics Letters* 92(23); A. Misra, J. P. Hirth, H. Kung, Philos. Mag. A 82 (2002) 2935-2951.

[150] Rao, S. I., P. M. Hazzledine, et al. (1995). Interfacial strengthening in semi-coherent metallic multilayers, Boston, Mass., USA, Materials Research Society.

Phillips, M. A., et al, Acta Mater. 51 (2003) 3157-3170;

Misra, A., et al, Encyclopedia of Nanoscience and Nanotechnology, vol. 10, American Scientific Publishers, 2005.

[151] Funke, P., H.-R. Priebe, et al. (1990). "Investigation of process parameters in roll-bonded cladding" Stahl and Eisen 110(6): 67-71.

Hirahara, K., K. Namba, et al. (1997). "Titanium/aluminum wide clad metal sheet." Sumitomo Metals 49(4): 98-101 (clad Ti/Al wide coil produced using a warm-roll bonding)

Hwang, Y.-M. and M. Kiuchi (1992). "Analysis of asymmetrical complex rolling of multi-layer sheets by upper bound method." Chung-Kuo Chi Hsueh Kung Ch'eng Hsueh Pao/Journal of the Chinese Society of Mechanical Engineers 13(1): 33-45 (clad sheet rolling and sandwich sheet rolling employing aluminum, copper, and steel sheets as layers of clad sheet and sandwich sheet)

Pang, Y., J. Yuan, et al. (2009). Processing 20 ply clad plate by accumulative clad rolling from stainless steel/aluminum/aluminum alloy./stainless steel sheets, Chongqing, China, Trans Tech Publications Ltd.

Park, J. S., E. Fleury, et al. (2004). "Synthesis of icosahedral phase during cold working and annealing of elemental multilayers in the Al—Cu—Fe ternary system." Materials Science and Engineering A 382(1-2): 237-242 (repeated cold rolling and folding (R and F) process of elemental foils with a target composition of Al62.5Cu25 Fe12.5 (at. %). Upon early increments of the rolling and folding cycles, the elemental Fe foil was dispersed through the refined Al and Cu layers)

Zhang, R. and V. L. Acoff (2005). Processing Ti—Al—Nb multi-layered composites from elemental foils using accumulative roll bonding, San Francisco, Calif., United States, Minerals, Metals and Materials Society, Warrendale, Pa. 15086, United States. The hard Ti and Nb layers were observed to neck and break down due to the repeated mechanical deformation, and the Ti and Nb particles embedded in the soft Al matrix.

Behera, T. (1978). "EXPERIMENTAL INVESTIGATION ON SANDWICH ROLLING." Journal of the Institution of Engineers (India), Part MC: Mechanical Engineering Division 59(pt ME 3): 151-154.

Chen, L. and B. Jha (2005). Roll bonding and the application in making FeCrAl alloy, Beijing, China, Trans Tech Publications Ltd, Zurich-Ueticon, CH-8707, Switzerland.

Dehghanian, H. A., M. H. Shariat, et al. (2007). Formation of ceramic layer on steel strips by combined method of cladding and PEO, Detroit, Mich., United States, Association for Iron and Steel Technology, AISTECH, Warrendale, Pa. 15086 7528, United States. (In this work a triple layer (Al/Steel/Al) was made by cladding of St 12 and Al 1050)

Dong, C., Y. Li, et al. (2008). "Joint interface characteristics of TA1/Q235 clad plates manufactured by accumulative roll-bonding." Beijing Keji Daxue Xuebao/Journal of University of Science and Technology Beijing 30(3): 249-253.2008 Trans Tech Publications.

Hwang, Y.-M. and M. Kiuchi (1992). "Analysis of asymmetrical complex rolling of multi-layer sheets by upper bound method." Chung-Kuo Chi Hsueh Kung Ch'eng Hsueh Pao/Journal of the Chinese Society of Mechanical Engineers 13(1): 33-45.

Kim, J.-K., M.-Y. Huh, et al. (2005). Texture evolution during roll-cladding of a composite of five plies of ferritic stainless steel and aluminum sheets, Leuven, Belgium, Trans Tech Publications Ltd, Stafa-Zuerich, CH-8712, Switzerland.

Lee, J. E., D. H. Bae, et al. (2007). "Effects of annealing on the mechanical and interface properties of stainless steel/aluminum/copper clad-metal sheets." Journal of Materials Processing Technology 187-188: 546-549.

Li, B.-M., J.-F. Han, et al. (2005). "Effect of cold-rolling and annealing on interfacial structures and properties of A500/steel bimetal strip." Transactions of Nonferrous Metals Society of China (English Edition) 15(4): 754-758.

Manesh, H. D. (2006). "Assessment of surface bonding strength in Al clad steel strip using electrical resistivity and peeling tests." Materials Science and Technology 22(6): 634-640.

Manesh, H. D. and A. K. Taheri (2003). "Bond strength and formability of an aluminum-clad steel sheet." Journal of Alloys and Compounds 361(1-2): 138-143.

Manesh, H. D. and A. K. Taheri (2003). "Bond strength and formability of an aluminum-clad steel sheet." Journal of Alloys and Compounds 361(1-2): 138-143. (production of an aluminum-clad steel sheet by the cold rolling process is a more efficient and economical approach compared with the other types of processes)

Manesh, H. D. and A. K. Taheri (2004). "Study of mechanisms of cold roll welding of aluminium alloy to steel strip." Materials Science and Technology 20(8): 1064-1068.

Manesh, H. D. and A. K. Taheri (2005). "An investigation of deformation behavior and bonding strength of bimetal strip during rolling." Mechanics of Materials 37(5): 531-542.

Masahashi, N., K. Komatsu, et al. (2006). "Fabrication of iron aluminum alloy/steel laminate by clad rolling." Metallurgical and Materials Transactions A: Physical Metallurgy and Materials Science 37(5): 1665-1673.

Nakanishi, Y. and A. Nishimoto (1985). "PRODUCTION AND PROPERTIES OF STEEL FOIL." Nippon Kokan Technical Report Overseas(43): 47-49. (Steel foil is now in regular use . . . . The steel foil has a high strength and is cheap)

Nishimoto, A. and K. Akamatsu (2007). Preparation of homogeneous Fe—Al intermetallic compound sheet by multi-layered rolling and subsequent heat treatment, Jeju, South Korea, Trans Tech Publications Ltd, Stafa-Zuerich, CH-8712, Switzerland.

Nishimoto, A., K. Akamatsu, et al. (2004). "Preparation of Fe—Al binary system intermetallic compounds by multi-layered roll-bonding." Cailiao Rechuli Xuebao/Transactions of Materials and Heat Treatment 25(5): 53-55.

Pang, Y., J. Yuan, et al. (2009). Processing 20 ply clad plate by accumulative clad rolling from stainless steel/aluminum/aluminum alloy./stainless steel sheets, Chongqing, China, Trans Tech Publications Ltd.

Tagata, T., Y. Abe, et al. (1999). "Development of aluminum alloy sandwich panel using roll bonding and superplastic buldge forming." Keikinzoku/Journal of Japan Institute of Light Metals 49(8): 353-357.

Tzou, G.-Y. and M.-N. Huang (2003). "Analytical modified model of the cold bond rolling of unbounded double-layers sheet considering hybrid friction." Journal of Materials Processing Technology 140(1-3 SPEC): 622-627.

Tzou, G.-Y., T. Neitzert, et al. (2004). "A new analytical approach to the cold and hot bond rolling of unbounded clad sheet with constant shear friction." Key Engineering Materials 274-276(I): 999-1004.

Xu, R., D. Tang, et al. (2007). "Mechanics properties of metal materials strengthened by accumulative roll bonding process." Beijing Keji Daxue Xuebao/Journal of University of Science and Technology Beijing 29(3): 310-314.

Xu, R.-C., X.-P. Ren, et al. (2006). "Study on the manufacture of sub-micron metal materials by severe deformation of ARB process." Suxing Gongcheng Xuebao/Journal of Plasticity Engineering 13(4): 86-89.

Yahiro, A., T. Masui, et al. (1991). "Development of non-ferrous clad plate and sheet by warm rolling with different temperature of materials." ISIJ International 31(6): 647-654.

[152] Zhang, M., G.-Y. Zu, et al. (2006). "Preparation of aluminum foam sandwich and foam cell." Dongbei Daxue Xuebao/Journal of Northeastern University 27(5): 517-519.

[153] Acoff, V. L. and G. Chaudhari (2003). Processing intermetallic sheet materials from elemental foils using cold roll bonding and reaction annealing, Madrid, Spain, Trans Tech Publications Ltd.

Asanuma, H. and A. Okura (1982). FABRICATION OF CARBON FIBER REINFORCED ALUMINUM COMPOSITES BY ROLL DIFFUSION BONDING METHOD, Tokyo, Jpn, Japan Soc for Composite Materials Behera, T. (1978). "EXPERIMENTAL INVESTIGATION ON SANDWICH ROLLING." Journal of the Institution of Engineers (India), Part MC: Mechanical Engineering Division 59(pt ME 3): 151-154.

Blackford, J. R., R. A. Buckley, et al. (1996). "Production of iron aluminides by co-rolling of elemental foils followed by heat treatment." Scripta Materialia 34(5): 721-728.

Bordeaux, F. and R. Yavari (1990). "Multiple necking and deformation behaviour of multilayer composites prepared by cold rolling." Zeitschrift fuer Metallkunde 81(2): 130-135.

Chaudhari, G. P., K. Serin, et al. (2004). Processing ultrafine grained composites of elemental titanium and aluminum by severe plastic deformation, Charlotte, N.C., United States, Minerals, Metals and Materials Society, Warrendale, United States.

Chen, C.-Y., H.-L. Chen, et al. (2006). "Influence of interfacial structure development on the fracture mechanism and bond strength of aluminum/copper bimetal plate." Materials Transactions 47(4): 1232-1239.

Chen, G., X. Yin, et al. (2006). "Rolling process of SiC particulates reinforced heat resistant Al-8.5 Fe-1.3 V-1.7 Si aluminum alloy." Tezhong Zhuzao Ji Youse Hejin/ Special Casting and Nonferrous Alloys 26(12): 765-767.

Cherenichenko, G. I., A. K. Karaulov, et al. (1982). EFFECT OF ROLLING LUBRICANT COMPONENTS ON TRI-BOCHEMICAL PROCESSES DURING COLD ROLLING OF METALS, Warsaw, Pol, Elsevier Scientific Publ Co, Amsterdam, Neth.

Esawi, A. M. K. and M. A. El Borady (2006). Powder rolling of carbon nanotube-reinforced aluminium, Honolulu, Hi., United States, American Society of Mechanical Engineers, New York, N.Y. 10016-5990, United States.

Fink, D., V. Hnatowicz, et al. (1992). "External oxidation of aluminium-lithium alloys." Surface & Coatings Technology 51(1-3): 57-64.

Huang, B., K. N. Ishihara, et al. (2000). "Bulk nano-scale Fe/Cu multilayers produced by repeated pressing-rolling and their magnetoresistance." Journal of Materials Science Letters 19(19): 1763-1765.

Huang, T., J. Qu, et al. (2005). "Evolution of the orientation of cross shear rolling high purity aluminum foils during deformation and recrystallization." Jinshu Xuebao/Acta Metallurgica Sinica 41(9): 953-957.

Lee, J. C. and K. N. Subramanian (1992). "Effect of cold rolling on the tensile properties of (Al2O3)pA1 composites." Materials Science & Engineering A: Structural Materials: Properties, Microstructure and Processing A159(1): 43-50.

Lee, S.-H., T. Sakai, et al. (1999). "Strengthening of sheath-rolled aluminum based MMC by the ARB process." Materials Transactions, JIM 40(12): 1422-1428.

Lee, Y. B., W. J. Nam, et al. (2004). The effect of cryogenic rolling on the formation of ultra-fine grains in 5052 al alloy, Charlotte, N.C., United States, Minerals, Metals and Materials Society, Warrendale, United States.

Lyttle, M. T. and D. A. Hughes (2001). Nano-lamellar structures in a rolled Cu—Ag alloy, San Francisco, Calif., United States, Materials Research Society, Warrendale, Pa. 15086, United States.

Misra, A., H. Kung, et al. (2003). "Damage mechanisms in nanolayered metallic composites." International Journal of Damage Mechanics 12(4): 365-376.

Okumura, Y., S. Saji, et al. (1999). "Fabrication of composite materials from multilayered Al/Ti foils by pressure welding at room temperature." Keikinzoku/Journal of Japan Institute of Light Metals 49(6): 238-243.

Ohsaki, S., S. Kato, et al. (2007). "Bulk mechanical alloying of Cu—Ag and Cu/Zr two-phase microstructures by accumulative roll-bonding process." Acta Materialia 55(8): 2885-2895.

Park, J. S., E. Fleury, et al. (2003). Structural evolution of cold rolled multi-layers in the Al—Cu—Fe ternary system, Boston, Mass., United States, Materials Research Society.

Qiu, X. and J. Wang (2007). "Experimental evidence of two-stage formation of Al3Ni in reactive Ni/Al multilayer foils." Scripta Materialia 56(12): 1055-1058.

Saito; Y., N. Tsuji, et al. (1998). "Ultra-fine grained bulk aluminum produced by accumulative roll-bonding (ARB) process." Scripta Materialia 39(9): 1221-1227.

Sasaki, M., D. Imai, et al. (2000). "Magnetic and mechanical properties of ultrafine Fe/Cu laminates produced by repeated rolling." Journal De Physique. IV: JP 10(6): 6-27.

Shingu, P. H., K. N. Ishihara, et al. (1999). "Nano-scaled multilayered bulk materials manufactured by repeated pressing and rolling in the Ag—Fe and Cu—Fe systems." Materials Science Forum 312: 293-298.

Sieber, H. and J. H. Perepezko (1998), "Reactive phase formation in cold rolled aluminum-tantalum multilayers", San Antonio, Tex., USA, Minerals, Metals & Materials Soc (TMS), Warrendale, Pa., USA.

Sieber, H., G. Wilde, et al. (1999). "Thermally activated amorphous phase formation in cold-rolled multilayers of Al—Ni, Al—Ta, Al—Fe and Zr—Cu." Journal of Non-Crystalline Solids 250-252(pt 2): 611-615.

Sieber, H., G. Wilde, et al. (1999). "Amorphous phase formation during cold rolling of Al—Sm and Zr—Cu—Ni—Al multilayer structures." Journal of Non-Crystalline Solids 250-252(pt 2): 616-620.

Taleff, E. M., O. A. Ruano, et al. (1992). "Superplastic behavior of a fine-grained Mg-9Li material at low homologous temperature." Journal of Materials Research 7(8): 2131-2135.

Utsunomiya, H., M. P. F. Sutcliffe, et al. (2006). "Experimental investigation of roughening of the matt surface in pack rolling." Journal of Materials Processing Technology 177(1-3): 501-504.

Yin, F., M. Li, et al. (2003). "Distribution of heat production in aluminum foil mills." Beijing Keji Daxue Xuebao/ Journal of University of Science and Technology Beijing 25(6): 568-571.

[154] Zhang, R. and V. L. Acoff (2005). *Processing Ti—Al—Nb multi-layered composites from elemetal foils using accumulative roll bonding*, San Francisco, Calif., United States, Minerals, Metals and Materials Society, Warrendale, Pa. 15086, United States.

[155] Cui, C., M. Demura, et al. (2005). "Notch sensitivity of heavily cold-rolled Ni3Al foils." *Scripta Materialia* 53(12): 1339-1343.

[156] Park, J. S., E. Fleury, et al. (2004). "Synthesis of icosahedral phase during cold working and annealing of elemental multilayers in the Al—Cu—Fe ternary system." *Materials Science and Engineering A* 382(1-2): 237-242.

[157] Acoff, V. L., R. Zhang, et al. (2005). "Using severe plastic deformation to process multilayered composites from elemental titanium, aluminum, and niobium foils." *Materials Forum* 29: 568-573

Sauvage, X., G. P. Dinda, et al. (2007). "Non-equilibrium intermixing and phase transformation in severely deformed Al/Ni multilayers." Scripta Materialia 56(3): 181-184.

Chaudhari, G. P., K. Serin, et al. (2004). Processing ultrafine grained composites of elemental titanium and aluminum by severe plastic deformation, Charlotte, N.C., United States, Minerals, Metals and Materials Society, Warrendale, United States

[158] If desired by the Air Force, we believe that a steel composite could exceed 1 GPa in tensile strength. Multilayer maraging steel composites with 4 GPa steel layers could exceed 2 GPa. See our STTR Proposal A10A-001-0472 "Volume Steel Components Approaching their Theoretical Strength >4 GPa (>600 ksi)"

[159] Chen, X. et al, "Analytical solution to the plate impact problem of layered heterogeneous material systems", International Journal of Solids and Structures 41 (2004) 4635-465

Ruden, E. L. and G. F. Kiuttu (2002). "Adiabatic, shock, and plastic work heating of solids and exploding metal cylinders." IEEE Transactions on Plasma Science 30(5 I): 1692-1699.

Zhao, S. et al (2006), "Atomistic simulations of shock-induced alloying reactions in Ni/Al nanolaminates", The Journal Of Chemical Physics 125, 164707

[160] Ti hydrides are conventionally used with $Fe_2O_3$ in shrink-wrap plastic film of caseless munitions to assist polymer consumption during the timeframe of munition propellant discharge. Ti subhydrides are on the ITAR munitions list, strongly suggesting rapid kinetic utilization capability. You certainly know more about $TiH_2$ dehydration kinetics than we do. We note that other hydrogen sources, such as Mg and Ns borohydrides can be encapsulated. Ta2H has high specific gravity and oxidative energetic content, if a higher density composite is desired for earth-penetrating capability. The impedance mismatch of Ta2H in Aluminum will also increase heating from the detonation shockwave.

[161] R. W. Conner and D. D. Dlott, "Comparing boron and aluminum nanoparticle combustion in Teflon using ultra-fast emission spectroscopy", Journal of Physical Chemistry 116: 2751-2760 (2012)

[162] Vadhe, P. P., R. B. Pawar, et al. (2008). "Cast aluminized explosives (review)." Combustion, Explosion and Shock Waves 44(4): 461-477.

[163] K. Raha et al, (1993), "Static charge development and impact sensitivity of high explosives", Journal of Hazardous Materials 34:385-391

K. Raha et al, (1991), "Piezoelectricity in single crystal of pentaerythritol tetranitrate", Defence Science Journal, 41:295-304

[164] Toton, E. T. (1979). High Explosive Detonation and Electromagnetic Interaction. NTIS Government report ADA0725770, NSWC/WOL/TR-79-205, Proj. ZR00001, Task ZR0000101, 37p.

[165] Atmospheric pressure elemental boiling point serves only as a relative indication of vapor pressure in a high-pressure detonation environment.

[166] Initial metal vapor pressure is confined by magnetic pinch from the vaporizing current. Release from the magnetic confinement can produce "explosive" mixing.

[167] Berger, T. L. (1979). "Effects Of Surrounding Medium On The Performance Of Exploding Aluminum Foil Fuses." IIHR Report (Iowa Institute of Hydraulic Research): 237-241.

Gromov, A. A., U. Forter-Barth, et al. (2006). "Aluminum nanopowders produced by electrical explosion of wires and passivated by non-inert coatings: Characterisation and reactivity with air and water." Powder Technology 164(2): 111-115.

Jayaraman, K., K. V. Anand, et al. (2007). "Production and characterization of nano-aluminum and its effect in solid propellant combustion." Collection of Technical Papers—45th AIAA Meeting 24: 16887-16895.

Kwon, Y.-S., Y.-H. Jung, et al. (2001). "Ultra-fine powder by wire explosion method." Scripta Materialia 44(8-9): 2247-2251.

Logan, J. D. and R. S. Lee (1976). EBF1: A Computer Simulation of the Preburst Behavior of Electrically Heated Exploding Foils. United States: 31p.

Rosenthal, S. E., M. P. Desjarlais, et al. (2001). "Equation of state and electron transport effects in exploding wire evolution." IEEE International Conference on Plasma Science: P1C34-P1C34.

Rousskikh, A. G., V. I. Oreshkin, et al. (2008). "Study of the strata formation during the explosion of a wire in vacuum." Physics of Plasmas 15(10).

Sarkisov, G. S., S. E. Rosenthal, et al. (2005). "Nanosecond electrical explosion of thin aluminum wires in a vacuum: Experimental and computational investigations." Physical Review E—Statistical, Nonlinear, and Soft Matter Physics 71(4): 046404/1-046404/21.

Tao, W. C., A. M. Frank, et al. (1989). Fundamentals of metal combustion in composite explosives revealed by high speed microphotography. United States: 14p.

Tepper, F. (1999). "Metallic nanopowders produced by the electro-exploding wire process." International Journal of Powder Metallurgy (Princeton, N.J.) 35(7): 39-44.

[168] Xue, M.-A., J.-H. Wu, et al. (2008). "Shock-induced fast reactions of zinc nanoparticles and RDX." Journal of Physics D: Applied Physics 41(4).

[169] Xue, M.-A., X. Yuan, et al. (2009). "Effects of copper micro-particles on the detonation characteristics of RDX powder." Journal of Physics D: Applied Physics 42(4).

[170] To heat one mole of Zn (~65 grams, 9.2 cm³) past its bp, to 1000° C., requires ~27 Kcal.

To heat one mole of Mg (~24 grams, 14 cm³) past its bp, to 1000° C., requires ~31 Kcal. These amounts of electrical energy could be substantially reduced by incorporating nanoscale oxidizers such as $Fe_2O_3$ or CuO in the "exploding" wire or foil.

The electrical energy to vaporize a light energetic metal is relatively modest, to "unleash" more energetic, fast, kinetic gas-phase reactions of the energetic metal within the explosive:

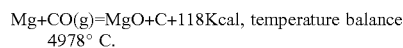
Mg+CO(g)=MgO+C+118Kcal, temperature balance 4978° C.

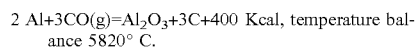
2 Al+3CO(g)=$Al_2O_3$+3C+400 Kcal, temperature balance 5820° C.

[171] Agee, F. J., F. M. Lehr, et al. (1995). Explosively-driven magnetohydrodynamic (MHD) generator studies, Albuquerque, N. Mex., USA, IEEE, Piscataway, N.J., USA. (Plasma jet generator driven by 2 pounds of C4 explosive, which produces 1.8 gigawatts of pulsed power)

Alberta, E. F., B. Michaud, et al. (2009). Development of ferroelectric materials for explosively driven pulsed-power systems, Washington, D.C., United States, IEEE Computer Society.

Altgilbers, L. L. (2009). Explosive pulsed power: An enabling technology, Al. Lotnikow 32-46, Warzsawa, 02-668, Poland, Polish Academy of Sciences.

Altgilbers, L. L., S. Shkuratov, et al. (2001). Explosive driven ferroelectric generators, Las Vegas, Nev., Institute of Electrical and Electronics Engineers Inc.

Elsayed, M. A., A. A. Neuber, et al. (2009). Integration of a self-contained compact seed source and trigger set for flux compression generators, Washington, D.C., United states, IEEE Computer Society.

Istenic, M., B. M. Novac, et al. (2006). Magnetic insulation of MV pulse transformers, Washington, D.C., United states, Institute of Electrical and Electronics Engineers Inc.

Krasik, Y. E., A. Dunaevsky, et al. (2000). "Microwave generation in a reflex triode powered by an explosive wire generator." IEEE International Conference on, Plasma Science: 268. (compact high-voltage generator based on inductive energy storage and explosive wires).

Neuber, A. A. and J. C. Dickens (2004). "Magnetic flux compression generators." Proceedings of the IEEE 92(7): 1205-1215.

Novac, B. M. and I. R. Smith (2000). "Consideration of an autonomous compact source for high-power microwave applications." IEEE Transactions on Plasma Science 28(5): 1620-1623.

Novac, B. M., I. R. Smith, et al. (2002). "Magnetically self-insulated transformers." Journal of Physics D: Applied Physics 35(13): 1467-1472.

Novac, B. M., I. R. Smith, et al. (2007). Simple high-performance exploding wire opening switch, Albuquerque, N. Mex., United states, IEEE Computer Society.

Novac, B. M., I. R. Smith, et al. (2009). High power RF capabilities at Loughborough University, London, United kingdom, Institution of Engineering and Technology.

Shkuratov, S. I., J. Baird, et al. (2007). Pulsed charging of capacitor bank by compact explosive-driven high-voltage primary power source based on longitudinal shock wave depolarization of ferroelectric ceramics, Monterey, Calif., United states, Institute of Electrical and Electronics Engineers Inc.

Shkuratov, S. I., E. F. Talantsev, et al. (2006). "Compact autonomous explosive-driven pulsed power system based on a capacitive energy storage charged by a high-voltage shock-wave ferromagnetic generator." Review of Scientific Instruments 77(6): 066107.

Shkuratov, S. I., E. F. Talantsev, et al. (2007). Operation of the longitudinal shock wave ferroelectric generator charging a capacitor bank: Experiments and digital model, Albuquerque, N. Mex., United states, IEEE Computer Society.

Shkuratov, S. I., E. F. Talantsev, et al. (2006). "Completely explosive ultracompact high-voltage nanosecond pulse-generating system." Review of Scientific Instruments 77(4): 043904.

Shkuratov, S. I., E. F. Talantsev, et al. (2006). "Completely explosive autonomous high-voltage pulsed-power system based on shockwave ferromagnetic primary power source and spiral vector inversion generator." IEEE Transactions on Plasma Science 34(5 I): 1866-1872.

Shkuratov, S. I., E. F. Talantsev, et al. (2007). Depolarization of A Pb(Zr52Ti48)O3 polycrystalline piezoelectric energy-carrying element of compact pulsed power generator by a longitudinal shock wave, Monterey, Calif., United states, Institute of Electrical and Electronics Engineers Inc.

Shkuratov, S. I., E. F. Talantsev, et al. (2002). "Compact explosive-driven generator of primary power based on a longitudinal shock wave demagnetization of hard ferri- and ferromagnets." IEEE Transactions on Plasma Science 30(5 I): 1681-1691.

[172] However, it is noted that the nitrated graphenes described herein have fuel and NO2 oxidizer within angstrom-scale separation distance, and the high surface area ultrananosilicon-fluoroalkane compositions described herein have such a nanoscale fuel-oxidizer scale over a very high surface area per gram of energetic material, producing high reaction rate capacity.

[173] Including their hydrides and subhydrides such as TiH2, Ta2H, ZrH2

[174] Explosives. Sixth Edition. Rudolf Meyer, Josef Köhler, Axel Homburg, 2007 Wiley-VCH & Co. KGaA, Weinheim ISBN: 978-3-527-31656-4

J. Akhavan, The Chemistry of Explosives, The Royal Society of Chemistry 2004 ISBN 0-85404-640-2

P. P. Vadhe et al, Cast Aluminized Explosives (Review), Combustion, Explosion, and Shock Waves, Vol. 44, No. 4, pp. 461-477, 2008

[175] A detonation-induced compression plasma in inert noble gases such as Argon, Xenon, etc produces extremely high intensity light, known as an "argon flash bomb". Eg, see http://en.wikipedia.org/wiki/Argon_flash The high explosive shock wave compresses even unenclosed atmospheric pressure gas to very high temperatures of 10,000 to 25,000° C. or more, to emit intense visible and UV radiation, peaking in the range of 90-300 nm.

[176] Candoluminescent materials such as calcium and cerium are strong emitters of high-intensity VIS and UV light at high temperature, for example above about 1500° C. for cerium, and above about 2,200° C. for calcium ("limelight"). The amount of VIS-UV greatly exceeds ordinary blackbody emission at these temperatures. High explosives, such as HMX, RDX, Tetryl, C120, FOX, etc. readily provide such high temperatures in their detonation reaction zones, and energetic Al, Si, B and other nanoparticles react therein to produce even higher temperatures. High explosives tend to be somewhat transmissive to VIS light, while energetic nanoparticles such as aluminum, boron, and/or silicon nanoparticles are optically extremely dense, and rapidly heated by intense VIS and UV radiation.

[177] With appropriate design, surface reaction of the energetic nanoparticles could be "pre-initiated" to coincide with, or immediately before, envelopment in the onrushing detonation wave. We are developing a robust family of surface-functional energetic nanoparticles which are useful for such energetic compositions.

[178] B. P. Aduev et al, "The Influence of Added Aluminum Nanoparticles on the Sensitivity of Pentaerythritol Tetranitrate to Laser Irradiation", Russian Journal of Physical Chemistry B, Vol. 5, No. 2, pp. 290-292 (2011).

[179] A detonation-induced compression plasma in inert noble gases such as Argon, Xenon, Krypton, etc produces extremely high intensity light, known as an "argon flash bomb". Eg, see http://en.wikipedia.org/wiki/Argon_flash The high explosive shock wave compresses and therefore heats a very thin (eg, 75 micron-thick) layer of the gas to very high temperature of 10,000 to 25,000° C. or more to emit a flash of intense visible and UV radiation, including molecular bond-breaking 100 nm-200 nm ultraenergetic UV.

[180] See for example I. M. Hawkins et al, European patent publication EP0575189 Apr. 17, 1997, "Organische Cerium-IV-Verbindungen und deren Herstellung und Verwendung"

[181] The explosive may be any suitable explosive such as RDX, HMX, TNT, FOX, and/or ammonium perchlorate plus fuels, etc. The candoluminescent elements should best be distributed on a molecular or nano-scale in the explosive. Desirably the candoluminescent elements may be salts of oxidatively energetic anions, such as nitrates or perchlorates, which can contribute oxygen balance to the explosive composition. However, because Ce, Ca and the like are energetic fuels, these candoluminescent materials can also be included in reduced nanoparticle form, such as metallic components of fuel nanoparticles. The cerium may be in an oxidizer compound such as ceric or cerous nitrate or cerium coated energetic silicon or aluminum nanoparticles, eg, at a 0.25-1 weight percent Ce elemental basis in the explosive.

[182] Oakley, D. C. and H. G. Hanson (1962). "Explosive flashbomb luminosity factors." Society of Motion Picture and Television Engineers—Journal 71(12): 920-925.

Katkov, A. I., Y. A. Medvedev, et al. (1976). Phenomenon of a Short Large Argon Flash Triggered by the Charge Detonations. Phenomenon of a Short Large Argon Flash Triggered by the Charge Detonations—Translation.: 7p.

Solomon, D. E., T. M. Henderson, et al. (1975). Thermonuclear fuel pellets for plasma experimentation. 2nd International Conference on Plasma Science. (Abstracts only received), 14-16 May 1975, New York, N.Y., USA, IEEE. [Pellets for use in laser fusion experiments have been fabricated and cover the diameter range of 30 to 600 micrometers . . . with pressures ranging from 0.1 to 240 atmospheres]

Mayer, F. J., R. L. Maynard, et al. (1986). Recent developments in Microshell-tipped optical fibers as high-pressure shock detectors. Shock Waves in Condensed Matter, 22-25 Jul. 1985, New York, N.Y., USA, Plenum.

Izgorodin, V. M., S. N. Abramovich, et al. (2003). Filling of glass microshells with heavy gases by radiation-simulated diffusion. ECLIM 2002: 27th European Conference on Laser Interaction with Matter, 2002, USA, SPIE-Int. Soc. Opt. Eng.

Qi, X.-b., Y.-j. Tang, et al. (2006). "Fabrication of hollow glass microspheres used for ICF targets by dried-gel method." High Power Laser and Particle Beams 18(1): 55-60.

Seely, J. F. and J. G. Lunney (1982). "Digital Enhancement Of The Argon Dielectronic Satellite Spectrum From A Laser-Imploded Microballoon." Optics Communications 41(1): 43-46.

Clement, X., A. Coudeville, et al. (1983). X-ray absorption in characterization of laser fusion targets. Proceedings of the 29th National Symposium of the American Vacuum Society, 16-19 Nov. 1982, USA. [argon pressures in the range of 5-13 bars]

Benjamin, R. F., F. J. Mayer, et al. (1984). Microshell-Tipped Optical Fibers As Sensors Of High-Pressure Pulses In Adverse Environments. Fiber Optics in Adverse Environments II., San Diego, Calif., USA, SPIE.

Hooper, C. F., et al. (1988). Analysis of K- and L-shell spectra emitted from implosions of argon filled and argon/krypton filled microballoons. High Intensity Laser-Matter Interactions, 12-13 Jan. 1988, USA.

Bourgade, J. L., O. Cabourdin, et al. (1994). Monochromatic penumbral imaging diagnostic development for argon filled microballoon imploded by powerful laser. 6th Symposium on High-Temperature Plasma Diagnostics, 26 May-1 Jun. 1993, Russia.

[183] eg, see G. M. Halpern, "Microfabrication and microcharacterization techniques for laser fusion targets", 17(5) 1184-1194 (1980); A. T. Lowe et al, "Magnetron sputter coating of microspherical substrates", Journal of Vacuum Science and Technology 16(2) 197-199 (1979)

[184] A. Lefrancois et al, "Nanometric Aluminium Powder Influence On The Detonation Efficiency Of Explosives", 12th International Detonation Symposium, Aug. 11-16, 2002, San Diego, Calif. French Ministry of Defense DGA/DCE/CEG, Centre d'Etudes de Gramat, Gramat, France

[185] J. Massoni et al, "Modeling spherical explosions with aluminized energetic materials", Shock Waves 16:75-92 (2006)

[186] Currano, L., W. Churaman, et al. (2009). Nanoporous silicon as a bulk energetic material. IEEE—TRANSDUCERS 2009-15th International Conference on Solid-State Sensors, Actuators and Microsystems, Jun. 21, 2009-Jun. 25, 2009, Denver, Colo., United states, IEEE Computer Society.

[187] Piekiel, N. W., W. A. Churaman, et al. (2013). "Combustion and material characterization of porous silicon nanoenergetics", IEEE 26th International Conference on Micro Electro Mechanical Systems, MEMS 2013, Jan. 20, 2013-Jan. 24, 2013: 449-452.

Morris, C. J., K. E. Laflin, et al. (2012). "Initiation of nanoporous energetic silicon by optically-triggered, residual stress powered microactuators", 2012 IEEE 25th International Conference on Micro Electro Mechanical Systems, MEMS 2012, Jan. 29, 2012-Feb. 2, 2012: 1245-1248.

Churaman, W. A., L. J. Currano, et al. (2012). "The First Launch of an Autonomous Thrust-driven Microrobot Using Nanoporous Energetic Silicon", Journal of Microelectromechanical Systems 21(1): 198-205.

Becker, C. R., S. Apperson, et al. (2011). "Galvanic porous silicon composites for high-velocity nanoenergetics." Nano Letters 11(2): 803-807.

Churaman, W. A., C. R. Beckera, et al. (2010). "Optical initiation of nanoporous energetic silicon for Safing and Arming Technologies." SPIE—Optical Technologies for Arming, Safing, Fuzing, and Firing VI, Aug. 2, 2010-Aug. 2, 2010 7795: The Society of Photo-Optical Instrumentation Engineers (SPIE).

Churaman, W. A., C. R. Becker, et al. (2010). "Optical initiation of nanoporous energetic silicon for sating and arming technologies." SPIE—Optical Technologies for Arming, Safing, Fuzing, and Firing VI, 2 Aug. 2010 7795: 779506 (779509 pp.).

Churaman, W., L. Currano, et al. (2010). "Initiation and reaction tuning of nanoporous energetic silicon." Journal of the Physics and Chemistry of Solids 71(2): 69-74.

Becker, C. R., L. J. Currano, et al. (2010). "Thermal analysis of the exothermic reaction between galvanic porous silicon and sodium perchlorate." ACS Applied Materials and Interfaces 2(11): 2998-3003.

Currano, L. J. and W. A. Churaman (2009). "Energetic nanoporous silicon devices." Journal of Microelectromechanical Systems 18(4): 799-807.

Churaman, W., L. Currano, et al. (2008). "Understanding the high energetic behavior of nano-energetic porous silicon." Chemical Physics Letters 464(4-6): 198-201.

See also:

Christopher D. Malec et al, "Carbon nanotubes initiate the explosion of porous silicon", Materials Letters 64 (2010) 2517-2519

Plummer, A., V. Kuznetsov, et al. (2011). "The Burning Rate of Energetic Films of Nanostructured Porous Silicon." Small 7(23): 3392-3398.

Andrew Plummer et al, "The influence of pore size and oxidising agent on the energetic properties of porous silicon", Proc. of SPIE Vol. 7267, 72670P (2008)

Monuko du Plessis et al, "Properties of porous silicon nano-explosive devices", Sensors and Actuators A 135 (2007) 666-674

[188] See eg, Air Force SBIR R&D solicitation AF141-145, Electromagnetic Effects in Energetic Materials (2013)

Abegg Moroni Taylor et al, U.S. Pat. No. 3,453,558 Jul. 1, 1969

Herschel S. Pilloff U.S. Pat. No. 4,016,500 Apr. 5, 1977

Jaime Cuadros U.S. Pat. No. 5,745,518 Apr. 28, 1998

[189] W. Lee Perry et al., "Electromagnetically induced localized ignition in secondary high explosives: Experiments and numerical verification," Journal of Applied Physics, 110, 034902 (2011)

[190] V. A. Cherepenin, V. P. Shumlini, "Mechanism Of Wideband Microwave Radiation At Explosion Of Condensed High Explosives", Journal Of Radioelectronics, N 1, 1998; V. A. Cherepenin, V. P. Shumlini, "About Mechanism Of Wideband Microwave Radiation At Explosion Of Condensed High Explosives", Ultra-Wideband, Short-Pulse Electromagnetics 4 pp 33-39, Edited by Heyman el al., Kluwer Academic I Plenum Publishers, New York (1999) A. B. Prishchepenko, V. V. Kiseljov and I. S. Kudimov, Radio frequency weapon at the future battlefield, in: "Electromagnetic Environments and Consequences. Proc. of the EUROEM 94 Int. Symp.", D. J. Serafin, J. Ch. Bolomey, D. Dupouy ed., Gramat, France, I:266 (1995); A. P. Boronin, V. N. Kapinos, S. A. Krenev, About physical mechanism of electromagnetic field generation by explosion of condensed HE charge. Experimental research data, *The Phys. of Combus. and Explos*. (Russian). 26:117 (1990); A. P. Boronin, V. N. Kapinos, S. A. Krenev, V. N. Mineev, About physical mechanism of electromagnetic field generation by explosion of condensed HE charge. Review, *The Phys. of Combus. and Explos*. (Russian). 26:110 (1990).

[191] M. S. Jijoev, V. V. Korolev, V. N. Markov, V. G. Platonenko, R. V. Khokhlov, Detonating gasdynamic laser, *J. Exper. and Theor Phys. Lett*. (Russian). 14:73 (1971); V. M. Marchenko, A. M. Prochorov, About an opportunity of creation of inverse medium for lasers by means of explosion, *J. Exper. and Theor Phys. Lett*. (Russian). 14:116 (1971).

[192] B. Koch, Emission d' ondes radioelectriques par des detonations, *Academie des Sciences. comp. rend*. 248: 2173 (1959); N. M. Kuznetsov, Oscillatory relaxation in recombinating extending gas, *High Temperature Thermophysics* (Russian). 4:282 (1966); N. M. Kuznetsov. "Air Thermodynamic Functions and Shock Adiabats at High Temperatures." Mashinostroenie, Moscow (1965).

[193] Andrew Jane et al, "Porous silicon biosensors on the advance", Trends in Biotechnology Vol. 27 No. 4, pp. 230-239 (2009)

[194] Currano et al, United States Patent Application 20120174808, Jul. 12, 2012, "Silicon-Based Explosive Devices And Methods Of Manufacture"

Collin R. Becker et al. United States Patent Application 20130149460, Jun. 13, 2013, "Galvanic Porous Silicon Composites For Nanoenergetics And Monolithically Integrated Ignitor"

[195] D. Clement et al, "Highly explosive nanosilicon-based composite materials," Physica Status Solidi (a), vol. 202, no. 8, pp. 1357-1364, 2005.

C. R. Becker et al, "Galvanic porous silicon composites for high-velocity nanoenergetics," Nano Letters, vol. 11, no. 2, pp. 803-807, 2011.

D. Kovalev et al, "Strong explosive interaction of hydrogenated porous silicon with oxygen at cryogenic temperatures," Phys. Rev. Lett., vol. 87, p. 068301 (2001)

M. du Plessis, "Nanoporous silicon explosive devices," Materials Science and Engineering: B, vol. 147, pp. 226-229 (2008)

R. Thiruvengadathan et al, "Combustion characteristics of silicon-based nanoenergetic formulations with reduced electrostatic discharge sensitivity," Propellants, Explosives, Pyrotechnics, vol. 37, no. 3, pp. 359-372 (2012)

M. du Plessis, "Properties of porous silicon nano-explosive devices", Sensors and Actuators A: Physical, vol. 135, no. 2, pp. 666-674 (2007)

S. Wang et al, "An investigation into the fabrication and combustion performance of porous silicon nanoenergetic array chips," Nanotechnology, vol. 23, no. 43, p. 435701 (2012)

A. Plummer et al, "The burning rate of energetic films of nanostructured porous silicon," Small, vol. 7, no. 23, pp. 3392-3398 (2011)

V. S. Parimi et al, "Control of nanoenergetics through organized microstructures," Journal of Micromechanics and Microengineering, vol. 22, no. 5, p. 055011 (2012

L. Currano et al, "Nanoporous Silicon As A Bulk Energetic Material", Transducers 2009, Denver, Colo., USA, Jun. 21-25, 2009 pp 2172-2175

S. F. Son et al, "An overview of nanoscale silicon reactive composites applied to microenergetics" 48th AIAA Aerospace Sciences Meeting Including the New Horizons Forum and Aerospace Exposition, Jan. 4, 2010-Jan. 7, 2010, Orlando, Fla., United States, American Institute of Aeronautics and Astronautics Inc.

[196] Nicholas W. Piekiel et al, "Combustion And Material Characterization Of Porous Silicon Nanoenergetics", MEMS 2013, Taipei, Taiwan, January 20-24, pp 449-452 (2013)

[197] Michael Gobel and Thomas M. Klapotke, "Development and Testing of Energetic Materials: The Concept of High Densities Based on the Trinitroethyl Functionality", Advanced Functional Materials 2009, 19, 347-365

[198] Michael GoEbel, "Exceeding the oxygen content of liquid oxygen: bis(2,2,2-trinitroethyl) carbonate", Acta Cryst. (2008). C64, o58-o60

[199] Y. L. Khung et al, "Multidirectional lateral gradient films with position-dependent photonic signatures made from porous silicon", Optical Materials 32 (2009) 234-242

[200] Herbert E. Ives Et Al, "A Physical Study Of The Welsbach Mantle", Journal Of The Franklin Institute, Vol. 186: 585-625 (1918)

[201] egg see Jouet, R J, et al. (2005). "Surface passivation of bare aluminum nanoparticles using perfluoroalkyl carboxylic acids." Chemistry of Materials 17: 2987-2996

[202] Candoluminescent materials such as calcium and cerium (and cesium for NIR) are strong emitters of high-intensity VIS and UV light at high temperature, for example above about 1500° C. for cerium, and above about 2,200° C. for calcium ("limelight"). The amount of candoluminescent VIS-UV greatly exceeds ordinary blackbody emission at these temperatures. High explosives, such as HMX, RDX, Tetryl, C120, FOX and the like readily provide higher temperatures in their detonation reaction zones, and energetic Al, Si, B and other nanoparticles can react therein to produce even higher temperatures. High explosives tend to be transmissive to VIS light, while energetic nanoparticles such as aluminum, Ti, Zr, boron, and/or silicon (above ~1.1 volt bandgap) nanoparticles are optically dense, and rapidly heated by intense VIS and UV radiation.

[203] Zhu, Y., B. Gupta, et al. (2013). "Photolithographic strategy for patterning preformed, chemically modified, porous silicon photonic crystal using click chemistry." ACS Applied Materials and Interfaces 5(14): 6514-6521.

Xiao, M., H. Han, et al. (2013). "High hydrosilylation efficiency of porous silicon SUN species produced by Pt-assisted chemical etching for biochip fabrication." Science China Chemistry 56(8): 1152-1163.

Tzur-Balter, A., N. Massad-Ivanir, et al. (2012). Surface engineered porous silicon-based nanostructures for cancer therapy. 2011 MRS Fall Meeting, Nov. 28, 2011-Dec. 3, 2011, Boston, Mass., United states, Materials Research Society.

Tudisco, C., P. Betti, et al. (2012). "Cavitand-functionalized porous silicon as an active surface for organophosphorus vapor detection." Langmuir 28(3): 1782-1789.

Sweetman, M. J., M. Ronci, et al. (2012). "Porous silicon films micropatterned with bioelements as supports for mammalian cells." Advanced Functional Materials 22(6):

1158-1166. (UV initiated hydrosilylation reaction through a photomask, using undecylenic acid N-hydroxysuccinimide (NHS) ester, and the pSi surfaces were stabilized by a second hydrosilylation reaction with a polyethylene glycol (PEG) appended alkene)

Huck, L. A. and J. M. Buriak (2012). "Toward a mechanistic understanding of exciton-mediated hydrosilylation on nanocrystalline silicon." Journal of the American Chemical Society 134(1): 489-497. (White-light initiated hydrosilylation of nanocrystalline porous silicon is more efficient in the presence of halocarbons).

Gupta, B., B. Guan, et al. (2012). Porous silicon photonic crystals for detection of infections. Biosensing and Nanomedicine V, 12-15 Aug. 2012, USA, SPIE—The International Society for Optical Engineering. (porous silicon hydrosilylated with 1,8-nonadiyne)

Guan, B., S. Ciampi, et al. (2012). "Depth-resolved chemical modification of porous silicon by wavelength-tuned irradiation." Langmuir 28(44): 15444-15449. (UV-assisted hydrosilylation, limited by the penetration depth of UV light, is used to decorate the outside of the mesoporous structure with carboxylic acid molecules, and white light illumination triggers the attachment of dialkyne molecules to the inner porous matrix)

Young, D. (2011). Electrical Characterization of Printed Nanocrystalline Silicon Films: Cooperative Research and Development Final Report, CRADA Number: CRD-07-00241. United States: 8p.

Thompson, C. M., A. M. Ruminski, et al. (2011). "Preparation and characterization of pore-wall modification gradients generated on porous silicon photonic crystals using diazonium salts." Langmuir 27(14): 8967-8973.

Sweetman, M. J., F. J. Harding, et al. (2011). "Effect of oligoethylene glycol moieties in porous silicon surface functionalisation on protein adsorption and cell attachment." Applied Surface Science 257(15): 6768-6774.

Scardera, G., D. Poplayskyy, et al. (2011). Highly tunable single step selective emitter diffusion process using silicon ink technology. 2011 37th IEEE Photovoltaic Specialists Conference (PVSC 2011), 19-24 Jun. 2011, Piscataway, N.J., USA, IEEE.

Sam, S. S., J. N. J. N. Chazalviel, et al. (2011). "Peptide immobilisation on porous silicon surface for metal ions detection." Nanoscale Research Letters 6: 412 (418 pp.).

Guan, B., S. Ciampi, et al. (2011). "Different functionalization of the internal and external surfaces in mesoporous materials for biosensing applications using "click" chemistry." Langmuir 27(1): 328-334.

Flavel, B. S., M. J. Sweetman, et al. (2011). "Micropatterned arrays of porous silicon: Toward sensory biointerfaces." ACS Applied Materials and Interfaces 3(7): 2463-2471.

Terry, M. L., A. Meisel, et al. (2010). All screen-printed 18% homogeneous emitter solar cells using high volume manufacturing equipment. 35th IEEE Photovoltaic Specialists Conference, PVSC 2010, Jun. 20, 2010-Jun. 25, 2010, Honolulu, Hi., United states, Institute of Electrical and Electronics Engineers Inc.

Sam, S., J. N. Chazalviel, et al. (2010). "Covalent immobilization of amino acids on the porous silicon surface." Surface and Interface Analysis 42(6-7): 515-518.

Ruminski, A. M., B. H. King, et al. (2010). "Porous silicon-based optical microsensors for volatile organic analytes: Effect of surface chemistry on stability and specificity." Advanced Functional Materials 20(17): 2874-2883. (ozone oxidation, thermal oxidation, hydrosilylation (1-dodecene), electrochemical methylation, reaction with dicholorodimethylsilane and thermal carbonization with acetylene are compared. The thermally oxidized and the dichlorodimethylsilane-modified materials show the greatest stability under atmospheric conditions) Singh, S., S. N. Sharma, et al. (2009). Hydrosilylation of 1-dodecene on nanostructured porous silicon surface: role of current density and stabilizing agent. Transport and Optical Properties of Nanomaterials, 5-8 Jan. 2009, USA, American Institute of Physics.

Pace, S., L. Gazagnes, et al. (2009). "New approach for the selective chemical functionalization of porous silicon films with organic monolayers." Physica Status Solidi A 206(6): 1326-1329.

Guo, D.-J., J. Wang, et al. (2009). "Macroporous silicon templated from silicon nanocrystallite and functionalized Si—H reactive group for grafting organic monolayer." Journal of Colloid and Interface Science 336(2): 723-729.

Antoniadis, H. (2009). Silicon ink high efficiency solar cells. 2009 34th IEEE Photovoltaic Specialists Conference, PVSC 2009, Jun. 7, 2009-Jun. 12, 2009, Philadelphia, Pa., United states, Institute of Electrical and Electronics Engineers Inc.

Ruminski, A. M., M. M. Moore, et al. (2008). "Humidity-compensating sensor for volatile organic compounds using stacked porous silicon photonic crystals." Advanced Functional Materials 18(21): 3418-3426. [top stack is chemically modified to be hydrophobic (by hydrosilylation with dodecene) and the bottom stack is made hydrophilic (by hydrosilylation with undecylenic acid)].

Petit, A., M. Delmotte, et al. (2008). "Microwave effects on chemical functionalization of hydrogen-terminated porous silicon nanostructures." Journal of Physical Chemistry C 112(42): 16622-16628. (chemical functionalization of hydrogen-terminated porous silicon with alkenes, aldehydes, and alkyl halides under microwave irradiation)

Kilian, K. A., T. Bocking, et al. (2008). "Organic modification of mesoporous silicon rugate filters: The influence of nanoarchitecture on optical behaviour." International Journal of Nanotechnology 5(2-3): 170-178.

Giovannozzi, A. M. and M. Rocchia (2008). "Effect of the reaction time, reagent concentration and sample thickness on the thermal derivatisation of p+ porous silicon with -undecene and -carboxy alkenes: A FTIR investigation." Sensors and Actuators, B: Chemical 130(2): 795-801.

Gelloz, B., K. Murata, et al. (2008). Stabilization of porous silicon free-standing coupled optical microcavities by surface chemical modification. Porous Semiconductors: A Symposium Held in Memory of Vital Parkhutik and Volker Lehmann—214th ECS Meeting, Oct. 12, 2008-Oct. 17, 2008, Honolulu, Hi., United states, Electrochemical Society Inc. (hydrosilylated porous Si is stable for many months)

Ciampi, S., T. Bocking, et al. (2008). "Click chemistry in mesoporous materials: Functionalization of porous silicon rugate filters." Langmuir 24(11): 5888-5892.

Albrecht, D. S., J. T. Lee, et al. (2008). Functionalized porous silicon in a simulated gastrointestinal tract: Modeling the biocompatibility of a monolayer protected nanostructured material. Solids at the Biological Interface, Nov. 26, 2007-Nov. 30, 2007, Boston, Mass., United states, Materials Research Society.

(native hydride-termination is only metastable with respect to surface oxidation under ambient conditions. Hydrosilylated samples demonstrated superior durability as opposed to the unfunctionalized controls)

Romano, E. and D. Narducci (2007). "Vibrational study on styrene functionalized porous silicon: A method for determining the relative yield of different grafting routes."

Surface Science 601(13): 2836-2839. (grafting of Si-styrenyl moieties by ethylaluminium dichloride mediated hydrosilylation of phenylacetylene leads to higher yields than organometallic addition onto either hydrogenated or brominated silicon)

Jelinek, I., V. Vrkoslav, et al. (2007). "Host-guest interactions in gas phase chemical sensing of permethyl-6I-alkenoylamino-6I-deoxy-cyclodextrin derivatized porous silicon." Physica Status Solidi C 4(6): 2083-2087.

Dian, J., V. Vrkoslav, et al. (2007). "Porous silicon with -cyclodextrin modified surface for photoluminescence sensing of organic molecules in gas and liquid phase." Physica E 38(1-2): 200-204.

Dattilo, D., L. Armelao, et al. (2007). "Wetting properties of flat and porous silicon surfaces coated with a spiropyran." Langmuir 23(26): 12945-12950.

Zipoli, F. and M. Bernasconi (2006). "Ab initio simulation of the grafting of phenylacetylene on hydrogenated surfaces of crystalline silicon catalyzed by a Lewis acid." Journal of Physical Chemistry B 110(46): 23403-23409.

Wang, D. and J. M. Buriak (2006). "Trapping silicon surface-based radicals." Langmuir 22(14): 6214-6221. (reduction of diazonium salts on hydride-terminated porous silicon to react with reagents such as alkyl/arylselenoethers, alkenes, alkynes, and alkylbromide groups to generate covalently bound functionalities)

Dattilo, D., L. Armelao, et al. (2006). "Wetting behavior of porous silicon surfaces functionalized with a fulleropyrrolidine." Langmuir 22(21): 8764-8769.

Coletti, C., A. Marrone, et al. (2006). "Nonradical mechanisms for the uncatalyzed thermal functionalization of silicon surfaces by alkenes and alkynes: A density functional study." Langmuir 22(24): 9949-9956.

Boukherroub, R., A. Petit, et al. (2006). Organic functionalization of porous silicon nanostructures. 206th Electrochemical Society Meeting, Oct. 3, 2004-Oct. 8, 2004, Honolulu, Hi., United states, Electrochemical Society Inc.

Gelloz, B., H. Sano, et al. (2005). Stable electroluminescence from passivated nano-crystalline porous silicon using undecylenic acid. 4th International Conference on Porous Semiconductors-Science and Technology (PSST-2004), 14-19 Mar. 2004, Germany, Wiley-VCH. (Stabilization of electroluminescence by replacing silicon-hydrogen bonds with more stable silicon-carbon bonds by hydrosilylation)

De Smet, L. C. P. M., H. Zuilhof, et al. (2005). "Mechanism of the hydrosilylation reaction of alkenes at porous silicon: Experimental and computational deuterium labeling studies." Journal of Physical Chemistry B 109(24): 12020-12031.

Bocking, T., S. Ilyas, et al. (2005). Functionalization of porous silicon based photonic crystals with organic monolayers. COMMAD04-2004 Conference on Optoelectronic and Microelectronic Materials and Devices, Dec. 8-10, 2004, Bribane, QLD, Australia, Institute of Electrical and Electronics Engineers Inc.

Barrett, C. P. G. B. and L. T. G. B. Canham (2005). Derivatized porous silicon. L. Psimedica. US. 159340. (hydrosilylation derivatized porous silicon is claimed to be stable to boiling in aerated basic solutions of aqueous KOH (pH 10) and solutions of 25% EtOH/75% aqueous KOH (pH 10) for one hour).

Salonen, J., M. Bjorkqvist, et al. (2004). "Stabilization of porous silicon surface by thermal decomposition of acetylene." Applied Surface Science 225(1-4): 389-394.

Schmeltzer, J. M., L. A. Porter, Jr., et al. (2003). Functionalization of porous silicon with alkenes and alkynes via carbocation-mediated hydrosilylation. Quantum Confined Semiconductor Nanostructures. Symposium, 2-5 Dec. 2002, Warrendale, Pa., USA, Mater. Res. Soc.

Salonen, J., E. Laine, et al. (2003). Thermal analysis of hydrosilylation of 1-dodecene on porous silicon surface. 3rd International Conference Porous Semiconductors—Science and Technology, Mar. 10, 2002-Mar. 15, 2002, Puerto de la Cruz, Spain, Wiley-VCH Verlag.

Salonen, J., E. Laine, et al. (2003). "Thermal analysis of hydrosilylation of 1-dodecene on porous silicon surface." Physica Status Solidi A 197(1): 246-250.

Boukherroub, R., A. Petit, et al. (2003). "Microwave-assisted chemical functionalization of hydrogen-terminated porous silicon surfaces." Journal of Physical Chemistry B 107(48): 13459-13462.

Schmeltzer, J. M., L. A. Porter Jr, et al. (2002). "Hydride, abstraction initiated hydrosilylation of terminal alkenes and alkynes on porous silicon." Langmuir 18(8): 2971-2974.

Chvojka, T., T. Holec, et al. (2002). Optical porous silicon based sensors with chemically modified surface for detection of organic vapors. Photonics, Devices, and Systems II, May 26, 2002-May 29, 2002, Prague, Czech republic, SPIE.

Boukherroub, R., J. T. C. Wojtyk, et al. (2002). "Thermal hydrosilylation of undecylenic acid with porous silicon." Journal of the Electrochemical Society 149(2): H59-H63.

Barrett, C. P. and L. T. Canham (2002). DERIVATIZED POROUS SILICON. Q. L. Qineti. EP. 00925461. (hydrosilylation derivatized porous silicon is stable to boiling in aerated water for at least two hours)

Stewart, M. P., E. G. Robins, et al. (2000). "Three methods for stabilization and functionalization of porous silicon surfaces via hydrosilylation and electrografting reactions." Physica Status Solidi (A) Applied Research 182(1): 109-115. [Three reactions which accomplish a high degree of substitution of the silicon hydride bonds on the porous silicon (pSi) surface—Lewis acid mediated (LAM) and white light-promoted (LP) hydrosilylation of alkynes and alkenes, and cathodic electrografting (CEG) reaction]

Holland, J. M., M. P. Stewart, et al. (1999). "Metal, Mediated Reactions on Porous Silicon Surfaces." Journal of Solid State Chemistry 147(1): 251-258.

Canham, L. T., C. L. Reeves, et al. (1999). "Derivatized mesoporous silicon with dramatically improved stability in simulated human blood plasma." Advanced Materials 11(18): 1505-1507.

Buriak, J. M., M. P. Stewart, et al. (1999). "Lewis acid mediated hydrosilylation on porous silicon surfaces." Journal of the American Chemical Society 121(49): 11491-11502.

Buriak, J. M., M. P. Stewart, et al. (1999). "Functionalization of porous silicon surfaces through hydrosilylation reactions." Materials Research Society Symposium—Proceedings 536: 173-178.

Buriak, J. M. (1999). "Silicon-carbon bonds on porous silicon surfaces." Advanced Materials 11(3): 265-267.

Feng, W. and B. Miller (1998). "Fullerene monolayer-modified porous Si. Synthesis and photoelectrochemistry." Electrochemical and Solid-State Letters 1(4): 172-174.

Buriak, J. M. and M. J. Allen (1998). "Photoluminescence of porous silicon surfaces stabilized through Lewis acid mediated hydrosilylation." Journal of Luminescence 80(1-4): 29-35.

But see, Editors: Rakic, A. D. and Yeow, Y. T. (2004). Functionalization of porous silicon based photonic crystals with organic monolayers. 2004 Conference on Optoelectronic and Microelectronic Materials and Devices. Proceedings, 8-10 Dec. 2004, Piscataway, N.J., USA, IEEE (slow oxidation of porous silicon matrix in air)

[204] A. Faucheux et al, "Mechanisms of Thermal Decomposition of Organic Monolayers Grafted on (111) Silicon", Langmuir 2007, 23, 1326-1332 see P. Nixon et al, "Pentafluoro-$\lambda^6$-sulfanyl-Terminated Chlorosilanes: New $SF_5$—Containing Films and Polysiloxane Materials Chem. Mater., 2000, 12 (10), pp 3108-3112

[205] Veinot, J. G. C., "Synthesis, Surface Functionalization, and Properties of Freestanding Silicon Nanocrystals", Chem. Commun. 2006, 4160-4168; see also Y. Furukawa et al, "Synthesis of fluorosilicone having highly fluorinated alkyl side chains based on the hydrosilylation of fluorinated olefins with polyhydromethylsiloxane", Journal of Polymer Science Part A: Polymer Chemistry. Vol. 40, Issue 18, pp 3120-3128, (2002)

[206] Leonora Velleman et al, "Fabrication of self-supporting porous silicon membranes and tuning transport properties by surface functionalization", Nanoscale, 2010, 2, 1756-1761

[207] The porous silicon electrodeposited on a suitable substrate (eg, Al foil) can be hydrosilylated in situ, and then vacuum-filled with an oxidant such as a perchlorate, Ceric perchlorate or nitrate, energetic RTIL, or other oxygen-rich material.

[208] A porous silicon electrodeposit is typically not crystalline unless electrodeposited at high temperature (eg, using molten inorganic salt electrolytes). However, by heating to ~440° C. the amorphous Si crystallizes via twinning-mechanism. Rapid thermal processing such as patterned or unpatterned light flash heating is also a useful approach for bulk and structured crystallization. See U.S. Pat. No. 5,288,619

[209] See United States DARPA Broad Agency Solicitation BAA-13-23

[210] Eg, see Y. Nishimura et al, "Electrochemical reduction of silicon chloride in a non-aqueous solvent", Electrochim. Acta 53(2007) 111

J. P. Nicholson, "Electrodeposition of Silicon from Non-aqueous Solvents", J. Electrochem. Soc. 152 (2005) C795.

T. Munisamy, et al, "Electrodeposition of Si from organic solvents and studies related to initial stages of Si growth", Electrochim. Acta 55 (2010) 3797.

F. Rahimi, et al, "Characterization of Pd nanoparticle dispersed over porous silicon as a hydrogen sensor", J. Phys. D: Appl. Phys. 40 (2007) 7201

Mikhael Bechelany et al, "Electrodeposition of amorphous silicon in non-oxygenated organic solvent", Thin Solid Films, 520: 1895-1901 (2012)

Y. Nishimura et al, "Electrochemical reduction of silicon chloride in a non-aqueous solvent", Electrochimica Acta 53 (2007) 111-116

A. E. Austin, U.S. Pat. No. 3,990,953 (1976); E. R. Bucker et al, U.S. Pat. No. 4,192,720 (1980).

[211] Electrodeposition is an inexpensive manufacturing process—bulk aluminum, made by electrodeposition, sells for less than $1 per pound. Such an industrial electrodeposition system may use very cheap SiCl4 waste byproduct from the Siemens Process for electronic-grade silicon manufacture, with an environmental benefit. But it is even simpler to use inexpensive metallurgical-grade silicon as the anodes which dissolve in the electrolyte (from Cl, Br, generation) while porous silicon is deposited on the cathodes. This requires even less power. Small amounts of chlorosilanes ($HSiCl_3$, $H_2SiCl_2$) in the electrolyte produce H-terminated silicon surfaces, desirable for hydrosilylation and other surface chemistry.

[212] Yaser Abu-Lebdeh et al, "High-Voltage Electrolytes Based on Adiponitrile for Li-Ion Batteries", Journal of The Electrochemical Society, 156 (1) A60-A65 (2009)

[213] The porous silicon electrodeposited on a suitable substrate (eg, Al foil) can be hydrosilylated in situ, and then vacuum-filled with an oxidant such as a perchlorate, Ceric perchlorate or nitrate, energetic RTIL, or other oxygen-rich material.

[214] A. Faucheux et al, "Mechanisms of Thermal Decomposition of Organic Monolayers Grafted on (111) Silicon", Langmuir 2007, 23, 1326-1332 see P. Nixon et al, "Pentafluoro-$\lambda^6$-sulfanyl-Terminated Chlorosilanes: New $SF_5$—Containing Films and Polysiloxane Materials Chem. Mater., 2000, 12 (10), pp 3108-3112

[215] Veinot, J. G. C., "Synthesis, Surface Functionalization, and Properties of Freestanding Silicon Nanocrystals", Chem. Commun. 2006, 4160-4168; see also Y. Furukawa et al, "Synthesis of fluorosilicone having highly fluorinated alkyl side chains based on the hydrosilylation of fluorinated olefins with polyhydromethylsiloxane", Journal of Polymer Science Part A: Polymer Chemistry. Vol. 40, Issue 18, pp 3120-3128, (2002)

[216] Depending on the degree of porosity, the electrodeposited silicon may have some closed cells. A short conventional porous and/or nanoporous silicon anodization treatment can be used to open the electrodeposit to high porosity.

[217] http://en.wikipedia.org/wiki/Massive_Ordnance_Penetrator Jun. 26, 2014

[218] http://www.aviationweek.com/Article/PrintArticle.aspx?id=/article-xml/AW09_17_2012_p56-492712.xml&p=1&printView=true

[219] Naval use of $H_2$ and $NH_3$ is not uncommon. Missile engines are cooled by liquid hydrogen propellant. German 212/214 and Russian 677 Lada Class submarines use liquid hydrogen. $NH_3$ is easier to handle because it melts at −77° C., boils at −33.34° C. and has the advantage of a high heat of vaporization (1371 kJ $kg^{-1}$), while that of $CH_4$ is only 760 kJ $kg^{-1}$ and 112 is 452 kJ $kg^{-1}$.

[220] To maximize thermal output, the energetic metal sabot interior composite surface should not form a self-protective alumina coating. Reactive metal hydrides such as TiH2 and/or Ta2H and less-energetic-metal fluorides such as $CuF_2$ can also be incorporated in a strong aluminum matrix, to destroy the protective $Al_2O_3$ surface of the sabot-scramjet interior as it oxidizes.

[221] Larger projectiles may have liquid $H_2$ and/or $NH_3$ injected at launch. Smaller projectiles can contain hydrogen storage materials such as $LiAlH_4$, $(Na,Mg)BH_4$, etc., which release hydrogen at moderate temperatures.

[222] Bruckner, A. and A. Higgins (1997). Investigation of Ram Accelerator Gasdynamic Limits. United States: 166p.

Chandwick, K. M., D. J. DeTurris, et al. (1993). "Direct measurement of skin friction in supersonic combustion flow fields." Journal of Engineering for Gas Turbines and Power 115(3): 507-514.

Choi, J.-Y., I.-S. Jeung, et al. (1996). Transient simulation of superdetonative mode initiation process in scram-accelerator, Napoli, Italy, Combustion Inst.

Denman, A. W., P. A. Jacobs, et al. (2005). Compressible, turbulent flow with boundary-layer heat addition, Reno, Nev., United states, American Institute of Aeronautics and Astronautics Inc. (reduction in viscous drag in scramjet combustors through hydrogen combustion in the boundary layer)

Gonor, A. L. et al. (2007). "Numerical simulations of the performance of scramjet engine with pylon set and of the supersonic star-shaped inlet flow", Reno, Nev., American Institute of Aeronautics and Astronautics Inc.

Goyne, C. P., R. J. Stalker, et al. (1999). "Shock-tunnel skin-friction measurement in a supersonic combustor." Journal of Propulsion and Power 15(5): 699-705.

Miller, A. R. (2010). "Hydrogen tube vehicle for supersonic transport: 2. Speed and energy." International Journal of Hydrogen Energy 35(11): 5745-5753. (low density of hydrogen increases sonic speed by a factor of 3.8 and decreases drag by 15 relative to air)

Paull, A., R. J. Stalker, et al. (1995). "Experiments on supersonic combustion ramjet propulsion in a shock tunnel." Journal of Fluid Mechanics 296: 159-183

Stalker, R. J. (2006). Scramjets, sub-orbital flight and skin friction, Canberra, Australia, American Institute of Aeronautics and Astronautics Inc. (Combustion of hydrogen in turbulent boundary layers to reduce skin friction. When applied to a simplified scramjet flowpath in flight at 4.3 km/s (Mach 14), the use of boundary layer combustion doubles the net hydrogen fuel specific impulse for the scramjet)

Stalker, R. J., A. Paull, et al. (2005). "Scramjets and shock tunnels—The Queensland experience." Progress in Aerospace Sciences 41(6): 471-513.

Tanno, H., A. Paull, et al. (2001). "Skin-friction measurements in a supersonic combustor with crossflow fuel injection." Journal of Propulsion and Power 17(6): 1333-1338.

[223] Olney, Nesterenko and Benson, "Mechanisms of fragmentation of aluminum-tungsten granular composites under dynamic loading", Applied Physics Letters 100, 191910 (2012) and "Dynamic Behavior Of Particulate/Porous Energetic Materials", AIP Conference Proceedings, 1426, 533 (2012); doi: 10.1063/1.3686334

[224] See U.S. Air Force Transformation Flight Plan, United States Air Force, November 2003 (a 9-ton 6.1 m×0.3 m tungsten cylinder impacting at Mach 10 has a kinetic energy equivalent to approximately 11.5 tons of TNT) http://en.wikipedia.org/wiki/Kinetic_bombardment Dense railgun and HDBT projectiles such as tungsten/tungsten carbide are more efficient in delivered energy than lighter projectiles. A dense hypersonic W-based projectile filled with a >5-13$^+$ g/cm$^3$ energetic has a multiple of the kinetic impact energy of a conventional projectile with a conventional ~2 g/cm$^3$ energetic fill, which it retains more efficiently through the atmosphere because its smaller cross section reduces air friction.

[225] The total kinetic energy $E=mV^2/2$ for a hypersonic projectile volume is directly related to mass density, while projectile atmospheric resistance (with energy loss and projectile heating) is an increasing function of velocity. Because of the longer time in the railgun barrel, kinetic energy transfer to a dense projectile is more efficient than to lighter projectiles for a given railgun barrel length.

[226] US Navy SBIR Topic solicitation N141-072 TITLE: Deflagration Efficiencies in Metals, November 2014

[227] Including their hydrides and subhydrides such as $TiH_2$, $Ta_2H$, $ZrH_2$

[228] Desirably, the explosive will have an oxygen balance higher than −15, and more preferably higher than −10. Preferably the explosive immediately surrounding the energetic particles will have a positive oxygen balance. Examples of high oxygen explosives (HOX) include BTHC (OB=3.6), BTC (OB=12.4), THE (OB=13.3), BTNA (OB=7), TAF (OB=6.4) and BTAT (OB=−10.9).

[229] Xenon fluoride salts are so oxidatively reactive, they may desirably be confined or encapsulated, such as in perfluorinated polymer capsules or microspheres such as those of tetrafluoroethylene polymers, which are also fluoride-based oxidizers for metal fuel particles. The salts and/or their PTFE blends or capsules may be porous, to increase their temperature upon being enveloped by the detonation wave.

[230] Xe emits intense light when superheated, as in Xenon flashlamps. XeF— is used in military and other lasers.

[231] One mol $XeF_6$ with a volume of ~0.07 liter=>~156 liters of Xe+F

One mol RDX $C_3H_6N_6O_6$ 1.82 g/cm$^3$=>3 $CO+3H_2O+3$ $N_2$ [222/1.82] for an STP expansion ratio of ~1650

[232] Greenwood, Norman N.; Earnshaw, Alan (1997). Chemistry of the Elements (2nd ed.). Butterworth-Heinemann ISBN 0080379419; http://en.wikipedia.org/wiki/Iron(III)_fluoride Over 30 Xe compounds are known.

[233] Reduced tungsten nano-micro-particles generated in the detonation gases from Tungsten-based halothermite oxidizers retain their momentum properties. They are also very hot and optimized by dispersion and extreme surface area for energetic oxidation when exposed to an oxidizing atmosphere.

[234] AFKL paper, "Spatially and temporally resolved temperature and shock-speed measurements behind a laser-induced blast wave of energetic nanoparticles", Journal Of Applied Physics 113, 184310 (2013)

[235] Hisaatsu Kato et al, "Application Of Overdriven Detonation In High Density Explosive To Shaped Charge", 23RD International Symposium On Ballistics Tarragona, Spain 16-20 Apr. 2007, p 223-230.

[236] eg 30 mass % Ta nanoparticles, which can be Si/hydrosilylation nanocoated
10 mass % Si/hydrosilylation-nanocoated Al nanoparticles,
20 mass % $CuF_2$ or $WOF_4$,
1 mass % $CeF_4$ candoluminescent oxidizer,
1 mass % $Fe_4XeF_5$ in perfluoropolymer,
9 mass % HTPB or other, preferably oxidizing, polymer
remainder RMX or high oxygen balance HE

[237] Hypersonic kinetic energy is rapidly dissipated thermally to heat on target impact, which can abruptly raise the temperature of reactant fills to 1000-2000° C. or more upon impact, immediately vaporizing $WOCl_4$ content. For $WOCl_4$-metal reactant fills described here, their reaction enthalpy typically increases significantly with increasing temperature.

[238] High-oxygen balance (HOB) explosives are desirable to maximize energetic metal energy output. HOBs and other less poisonous energetics can beneficially replace toxic RDX, such as N3,N6-bis-(2,2,2-trinitroethyl)-1,2,3,4-tetrazine-3,6-diamine (BiTNEAT), bistetrazolylamine (H2BTA), triaminoguanidinium dinitramide (TAG-DN), triaminoguanidinium 1-methyl-5-nitriminotetrazolate (TAG-1-MeAtNO2), 5-nitriminotetrazole (H2AtNO2), 5-aminotetrazolium dinitramide, BTAT and BTHC. T. M Klapotke et al, International Journal of Energetic Materials and Chemical Propulsion, v 10, n 1, p 45-54, 2011; Advanced Functional Matererials 2009, 19, 347-365

[239] Boron (neat or as Al-borides) has higher energy per gram than Al, despite its tendency to form HBO and $HBO_2$ gases. Ti, Zr, Ta are denser energetic metals useful as nanoparticle energetic components if maximizing munition density is desired. Nano-Si is also a useful energetic.

[240] For example, 3 $WOCl_4$+12 Al (molar) react to primarily form AlCl(gas) at temperatures over ~2000° C.

What is claimed is:

1. Flash-cooled freestanding silicon particles for electrochemical use, wherein said particles are solidified from a vapor or molten phase at a cooling rate of at least about $1\times10^3$ degrees Celsius per second, said particles having a major dimension less than 1 micron, comprising silicon, and an electrically conductive component within said freestanding submicron particles having an electrical conductivity higher than that of silicon, wherein said silicon is in the form of elemental silicon or Lithiated silicon, and the electrically conductive component has a weight ratio to said silicon in the range of from about 0.01 to about 0.25 to 1, and wherein the electrically conductive component is in the form of electrically conductive zones within said flash-cooled freestanding silicon particles.

2. Silicon particles in accordance with claim 1 wherein said silicon is a lithiated silicon with a molar ratio of lithium to silicon of at least about 1:1, and wherein said conductive component is an electrically conductive metal silicide formed within said lithiated silicon so it has electroconductive form stabilized for expansion and contraction of said silicon when used in a lithium ion battery anode.

3. Silicon particles in accordance with claim 1 wherein said particles further include an agent for reducing lithium oxide in a weight ratio to said silicon from about 0.01 to about 0.2 to 1.

4. Silicon particles in accordance with claim 3 wherein said reducing agent is calcium and said electrically conductive component is $TiSi_2$, said $TiSi_2$ within said respective nanoparticles tending to maintain their size, condition and position for electrical continuity during battery use, and wherein said calcium is within said particles for restoring the lithium to active use in the battery to repair SEI formation during battery operation.

* * * * *

UNITED STATES PATENT AND TRADEMARK OFFICE
CERTIFICATE OF CORRECTION

PATENT NO. : 10,858,296 B1  
APPLICATION NO. : 15/136818  
DATED : December 8, 2020  
INVENTOR(S) : James J. Myrick Page 1 of 1

It is certified that error appears in the above-identified patent and that said Letters Patent is hereby corrected as shown below:

In the Specification

In Column 13, Line 43, delete "electro generating" and replace with -- electrogenerating --

In Column 56, Line 56, delete "10 vol %" and replace with -- 10 vol% --

In Column 91, Line 63, delete "stiffiiess" and replace with -- stiffness --

In Column 96, Line 29, delete "may'" and replace with -- may --

In Column 106, Line 6, delete "fusing'" and replace with -- fuzing --

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*